US012361599B2

(12) United States Patent
Sugio et al.

(10) Patent No.: US 12,361,599 B2
(45) Date of Patent: Jul. 15, 2025

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Toshiyasu Sugio, Osaka (JP); Noritaka Iguchi, Osaka (JP); Masato Ohkawa, Toyama (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 405 days.

(21) Appl. No.: 18/073,789

(22) Filed: Dec. 2, 2022

(65) Prior Publication Data
US 2023/0100085 A1 Mar. 30, 2023

Related U.S. Application Data

(63) Continuation of application No. PCT/JP2021/023208, filed on Jun. 18, 2021.

(60) Provisional application No. 63/041,389, filed on Jun. 19, 2020.

(51) Int. Cl.
*G06T 9/00* (2006.01)
(52) U.S. Cl.
CPC .................. *G06T 9/001* (2013.01)

(58) Field of Classification Search
CPC .................. G06T 9/001; G06T 9/00
See application file for complete search history.

(56) References Cited

U.S. PATENT DOCUMENTS

| 2014/0375638 | A1 | 12/2014 | Tomaru et al. |
| 2021/0105494 | A1* | 4/2021 | Sugio ............... H04N 19/13 |
| 2021/0297698 | A1* | 9/2021 | Sugio ............... G06T 9/001 |
| 2021/0312669 | A1* | 10/2021 | Sugio ............... G06V 20/653 |

(Continued)

FOREIGN PATENT DOCUMENTS

WO 2014/020663 2/2014

OTHER PUBLICATIONS

International Search Report issued Aug. 24, 2021 in International (PCT) Application No. PCT/JP2021/023208.

*Primary Examiner* — Charles T Shedrick
(74) *Attorney, Agent, or Firm* — Wenderoth, Lind & Ponack, L.L.P.

(57) ABSTRACT

A three-dimensional data encoding method includes: encoding attribute information of three-dimensional points, the three-dimensional points being classified into one or more layers, based on geometry information of the three-dimensional points; and generating a bitstream including the attribute information encoded. In encoding of attribute information of a current three-dimensional point included in the three-dimensional points, same layer reference is performed when a total number of the one or more layers is one, the same layer reference including generating a prediction value of the attribute information of the current three-dimensional point by reference to attribute information of an other three-dimensional point included in a same layer as the current three-dimensional point.

17 Claims, 79 Drawing Sheets

(56) References Cited

U.S. PATENT DOCUMENTS

| | | | | |
|---|---|---|---|---|
| 2021/0314612 A1* | 10/2021 | Sugio | .................. | H04N 19/132 |
| 2022/0353548 A1* | 11/2022 | Oh | ............................ | G06T 9/40 |
| 2022/0360797 A1* | 11/2022 | Oh | ........................ | H04N 19/42 |
| 2022/0366611 A1* | 11/2022 | Bai | .................... | H04N 21/2362 |
| 2024/0430480 A1* | 12/2024 | Lee | ...................... | H04N 19/597 |

* cited by examiner

| | GEOMETRY INFORMATION | ATTRIBUTE INFORMATION |
|---|---|---|
| n = 1 | $G(1) = (x_1, y_1, z_1)$ | $A(1) = (R_1, G_1, B_1)$ |
| n = 2 | $G(2) = (x_2, y_2, z_2)$ | $A(2) = (R_2, G_2, B_2)$ |
| ⋮ | ⋮ | ⋮ |
| n = N | $G(N) = (x_N, y_N, z_N)$ | $A(N) = (R_N, G_N, B_N)$ |

FIG. 27

```
EXAMPLES OF SEMANTICS OF pcc_nal_unit_type
(1) if pcc_codec_type == Codec 1
       0:Codec1 Goemetry
       1:Codec1 AttributeX
       2:Codec1 AttributeY
       3:Codec1 Geom. PS
       4:Codec1 AttrX. PS
       5:Codec1 AttrX. PS
       6:Codec1 Geometry Sequence PS
       7:Codec1 AttributeX Sequence PS
       8:Codec1 AttributeY Sequence PS
       9:Codec1 AU Header
      10:Codec1 GOF Header
    11 ~:Codec1 reserved for future use (2) if pcc_codec_type == Codec 2
       0:Codec2 DataA
       1:Codec2 MetaDataA
       2:Codec2 MetaDataB
     3 ~:Codec2 reserved for future use
```

FIG. 37

| VALUE | BIT |
|---|---|
| 0 | 1 |
| 1 | 010 |
| 2 | 011 |
| 3 | 00100 |
| 4 | 00101 |
| 5 | 00110 |
| 6 | 00111 |
| 7 | 0001000 |
| ... | ... |

FIG. 38

| VALUE | BIT |
|---|---|
| 3 | 00100 |
| 4 | 00101 |
| 5 | 00110 |
| 6 | 00111 |

PREFIX SUFFIX 00 1 00

↑ TERMINATE SYMBOL

FIG. 39

```
attribute_header{
...
NumLoD
...
for (i=0; i<NumLoD; i++) {
 NumOfPoint[i]
}
...
for (i=0; i<NumLoD-1; i++) {
 Thres_LoD[i]
}
...
for (i=0; i<NumLoD; i++) {
 NumNeighborPoint[i]
}
...
for (i=0; i<NumLoD; i++) {
 THd[i]
}
...
for (i=0; i<NumLoD; i++) {
 QS[i]
}
...
for (i=0; i<NumLoD; i++) {
 R_TH[i]
}
...
}
```

FIG. 40

```
attribute_data{
...
for (i=0; i<NumLoD; i++) {
 for(j=0; j<NumOfPoint[i]; j++) {
  n-bit code
  if (n-bit code == R_TH[i])
   remaining code
 }
}
...
}
```

FIG. 43

| VALUE | BIT |
|---|---|
| 3 | 00100 |
| 4 | 00101 |
| 5 | 00110 |
| 6 | 00111 |

PREFIX  SUFFIX 00  1  00

TERMINATE SYMBOL

FIG. 44

| VALUE | BIT |
|---|---|
| 0 | 1 |
| 1 | 010 |
| 2 | 011 |
| 3 | 00100 REVERSE LOOKUP |
| 4 | 00101 |
| 5 | 00110 |
| 6 | 00111 |
| 7 | 0001000 |
| ... | ... |

FIG. 55

```
attribute_header {
  ...
  EnableReferringSameLoD
  ...
  NumLoD
  ...
  for (i=0; i<NumLoD; i++) {
    SearchNumPoint[i]
  } for (i=0; i<NumLoD; i++) {
    NumNeighborPoint[i]
  }
  ...
}
```

FIG. 56

```
attribute_header {
  ...
  EnableReferenceLoD
  ...
  NumLoD
  ...
  for (i=0; i<NumLoD; i++) {
    SearchNumPoint[i]
  } for (i=0; i<NumLoD; i++) {
    NumNeighborPoint[i]
  }
  ...
}
```

FIG. 67

```
attribute_header {
  ...
  EnableReferringSameLoD
  ...
  maxLoD
  ...
  if (EnableReferringSameLoD) {
    ReferringSameLoDminLayer
  }
  ...
}
```

FIG. 68

```
attribute_header {
  ...
  CodingType
  EnableReferringSameLoD
  ...
  maxLoD
  ...
  if (EnableReferringSameLoD and CodingType!=Lifting) {
    ReferringSameLoDminLayer
  }
  ...
}
```

FIG. 76

```
attribute_header {
...
maxLoD
...
if (maxLoD > 1) {
  ReferringSameLoDNumLayer_minus1
}

```
attribute_header {
...
maxLoD
...
ReferringSameLoDNumLayer_minus1

...
}
```

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2021/023208 filed on Jun. 18, 2021, claiming the benefit of priority of U.S. Provisional Patent Application No. 63/041,389 filed on Jun. 19, 2020, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (for example, see International Publication WO 2014/020663).

SUMMARY

There has been a demand for improving coding efficiency in a three-dimensional data encoding process and a three-dimensional data decoding process.

The present disclosure has an object to provide a three-dimensional data encoding method, a three-dimensional data decoding method, a three-dimensional data encoding device, or a three-dimensional data decoding device that is capable of improving the coding efficiency.

A three-dimensional data encoding method according to one aspect of the present disclosure includes: encoding attribute information of three-dimensional points, the three-dimensional points being classified into one or more layers, based on geometry information of the three-dimensional points; and generating a bitstream including the attribute information encoded, wherein in encoding of attribute information of a current three-dimensional point included in the three-dimensional points, same layer reference is performed when a total number of the one or more layers is one, the same layer reference including generating a prediction value of the attribute information of the current three-dimensional point by reference to attribute information of an other three-dimensional point included in a same layer as the current three-dimensional point.

A three-dimensional data decoding method according to one aspect of the present disclosure includes: obtaining encoded attribute information of three-dimensional points from a bitstream, the three-dimensional points being classified into one or more layers, based on geometry information of the three-dimensional points; and decoding the encoded attribute information by performing same layer reference when a total number of the one or more layers is one, the same layer reference including generating a prediction value of attribute information of a current three-dimensional point included in the three-dimensional points by reference to attribute information of an other three-dimensional point included in a same layer as the current three-dimensional point.

The present disclosure provides a three-dimensional data encoding method, a three-dimensional data decoding method, a three-dimensional data encoding device, or a three-dimensional data decoding device that is capable of improving the coding efficiency.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 27 is a diagram illustrating a semantics example of pcc_nal_unit_type according to Embodiment 2;

FIG. 37 is a diagram illustrating examples of exponential-Golomb codes according to Embodiment 3;

FIG. 38 is a diagram indicating a process on exponential-Golomb codes according to Embodiment 3;

FIG. 39 is a diagram indicating an example of a syntax in attribute header according to Embodiment 3;

FIG. 40 is a diagram indicating an example of a syntax in attribute data according to Embodiment 3;

FIG. 43 is a diagram indicating processing on exponential-Golomb codes according to Embodiment 3;

FIG. 44 is a diagram indicating an example of a reverse lookup table indicating relationships between remaining codes and the values thereof according to Embodiment 3;

FIG. 55 is a diagram showing a syntax example of an attribute information header according to Embodiment 4;

FIG. 56 is a diagram showing a syntax example of the attribute information header according to Embodiment 4;

FIG. 67 is a diagram showing a syntax example of an attribute information header according to Embodiment 5;

FIG. 68 is a diagram showing a syntax example of an attribute information header according to Embodiment 5;

FIG. 76 is a diagram illustrating a syntax example of an attribute information header according to Embodiment 6;

FIG. 77 is a diagram illustrating a syntax example of the attribute information header according to Embodiment 6;

DETAILED DESCRIPTION OF THE EMBODIMENTS

Figure 1:
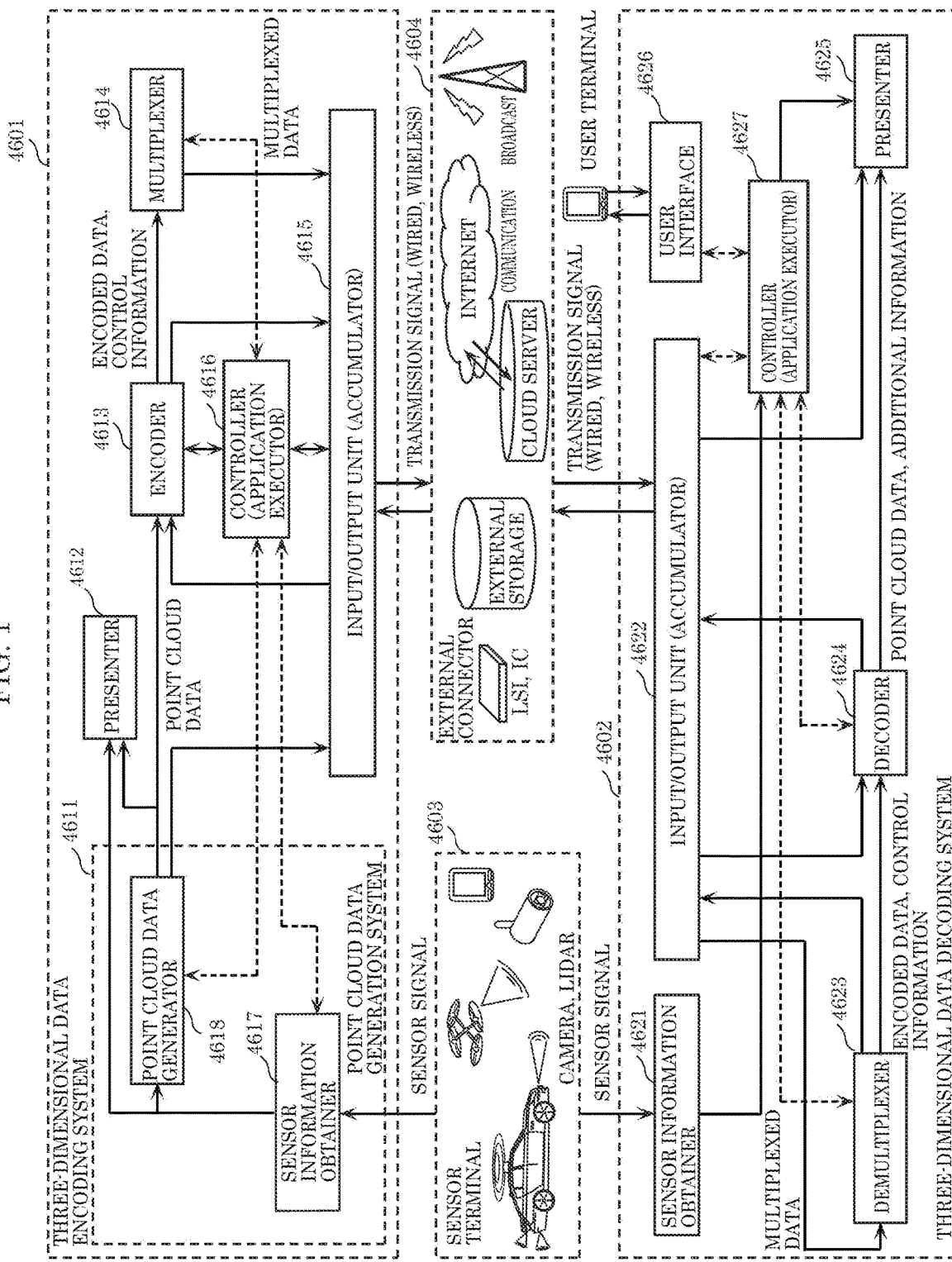
FIG. 1 is a diagram illustrating a configuration of a three-dimensional data encoding and decoding system according to Embodiment 1.

A three-dimensional data encoding method according to one aspect of the present disclosure includes: classifying three-dimensional points included in point cloud data into one or more layers, based on geometry information of the three-dimensional points; permitting same layer reference when a total number of the one or more layers is one, and generating encoded attribute information by encoding attribute information of the three-dimensional points, the same layer reference including generating a prediction value of attribute information of a current three-dimensional point by reference to attribute information of an other three-dimensional point included in a same layer as the current three-dimensional point; and generating a bitstream including the encoded attribute information.

According to this feature, in the three-dimensional data encoding method, when the number of the layers is one, the same layer reference is permitted, whereby the coding efficiency can be increased.

For example, the three-dimensional data encoding method may include: determining, from among two or more layers, a layer for which the same layer reference is permitted and a layer for which the same layer reference is prohibited, when the total number of the one or more layers is two or more; and permitting or prohibiting the same layer reference, based on a result of the determining, and generating the encoded attribute information by encoding the attribute information.

For example, the three-dimensional data encoding method may include: permitting the same layer reference for, among the two or more layers, layers ranging from an uppermost layer to an N-th layer and prohibiting the same layer reference for a layer lower than the N-th layer, and generating the encoded attribute information by encoding the attribute information, N being a natural number.

For example, the bitstream may include first information indicating a layer for which the same layer reference is permitted or a layer for which the same layer reference is prohibited.

For example, the bitstream may include second information indicating the total number of the one or more layers.

A three-dimensional data decoding method according to one aspect of the present disclosure includes: obtaining, from a bitstream, encoded attribute information of three-dimensional points included in point cloud data, the encoded attribute information being obtained by encoding attribute information of the three-dimensional points classified into one or more layers based on geometry information of the three-dimensional points; and permitting same layer reference when a total number of the one or more layers is one, and decoding the encoded attribute information, the same layer reference including generating a prediction value of attribute information of a current three-dimensional point by reference to attribute information of an other three-dimensional point included in a same layer as the current three-dimensional point.

According to this feature, in the three-dimensional data decoding method, when the number of the layers is one, the same layer reference is permitted, whereby the coding efficiency can be increased.

For example, the three-dimensional data decoding method may include: determining, from among two or more layers, a layer for which the same layer reference is permitted and a layer for which the same layer reference is prohibited, when the total number of the one or more layers is two or more; and permitting or prohibiting the same layer reference, based on a result of the determining, and decoding the encoded attribute information.

For example, the three-dimensional data decoding method may include: permitting the same layer reference for, among the two or more layers, layers ranging from an uppermost layer to an N-th layer and prohibiting the same layer reference for a layer lower than the N-th layer, and decoding the encoded attribute information, N being a natural number.

For example, the three-dimensional data decoding method may include obtaining, from the bitstream, first information indicating a layer for which the same layer reference is permitted or a layer for which the same layer reference is prohibited.

For example, the three-dimensional data decoding method may include obtaining, from the bitstream, second information indicating the total number of the one or more layers.

For example, the three-dimensional data decoding method may include: obtaining, from the bitstream, (1) the first information indicating the layer for which the same layer reference is permitted or the layer for which the same layer reference is prohibited and (2) the second information indicating the total number of the one or more layers; and determining that the bitstream is not compliant with standards, in a case where the first information indicates that the same layer reference is not permitted for one layer among the one or more layers when the total number of the one or more layers indicated in the second information is one.

A three-dimensional data encoding device according to one aspect of the present disclosure includes a processor and memory. Using the memory, the processor classifies three-dimensional points included in point cloud data into one or more layers, based on geometry information of the three-dimensional points; permits same layer reference when a total number of the one or more layers is one, and generates encoded attribute information by encoding attribute information of the three-dimensional points, the same layer reference including generating a prediction value of attribute information of a current three-dimensional point by reference to attribute information of an other three-dimensional point included in a same layer as the current three-dimensional point; and generates a bitstream including the encoded attribute information.

According to this feature, the three-dimensional data encoding device permits the same layer reference when the number of the layers is one, whereby the coding efficiency can be increased.

A three-dimensional data decoding device according to one aspect of the present disclosure includes a processor and memory. Using the memory, the processor obtains, from a bitstream, encoded attribute information of three-dimensional points included in point cloud data, the encoded attribute information being obtained by encoding attribute information of the three-dimensional points classified into one or more layers based on geometry information of the three-dimensional points; and permits same layer reference when a total number of the one or more layers is one, and decodes the encoded attribute information, the same layer reference including generating a prediction value of attribute information of a current three-dimensional point by reference to attribute information of an other three-dimensional point included in a same layer as the current three-dimensional point.

According to this feature, the three-dimensional data decoding device permits the same layer reference when the number of the layers is one, whereby the coding efficiency can be increased.

It is to be noted that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

Hereinafter, embodiments will be specifically described with reference to the drawings. It is to be noted that each of the following embodiments indicate a specific example of the present disclosure. The numerical values, shapes, materials, constituent elements, the arrangement and connection of the constituent elements, steps, the processing order of the steps, etc., indicated in the following embodiments are mere examples, and thus are not intended to limit the present disclosure. Among the constituent elements described in the following embodiments, constituent elements not recited in any one of the independent claims will be described as optional constituent elements.

Embodiment 1

When using encoded data of a point cloud in a device or for a service in practice, required information for the application is desirably transmitted and received in order to reduce the network bandwidth. However, conventional encoding structures for three-dimensional data have no such a function, and there is also no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as point cloud compression (PCC).

With regard to this embodiment, a configuration of PCC-encoded data that involves two codecs, a first encoding method and a second encoding method, and a method of storing the encoded data in a system format will be described.

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614. Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor. That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LiDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
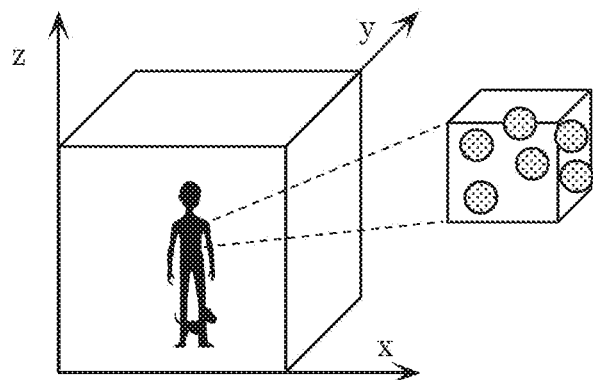
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One item of attribute information (in other words, a piece of attribute information or an attribute information item) may be associated with one item of geometry information (in other words, a piece of geometry information or a geometry information item), or attribute information on a plurality of different types of attributes may be associated with one item of geometry information. Alternatively, items of attribute information on the same type of attribute may be associated with one item of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example. A representative data file is ply file, for example.

Figure 4:
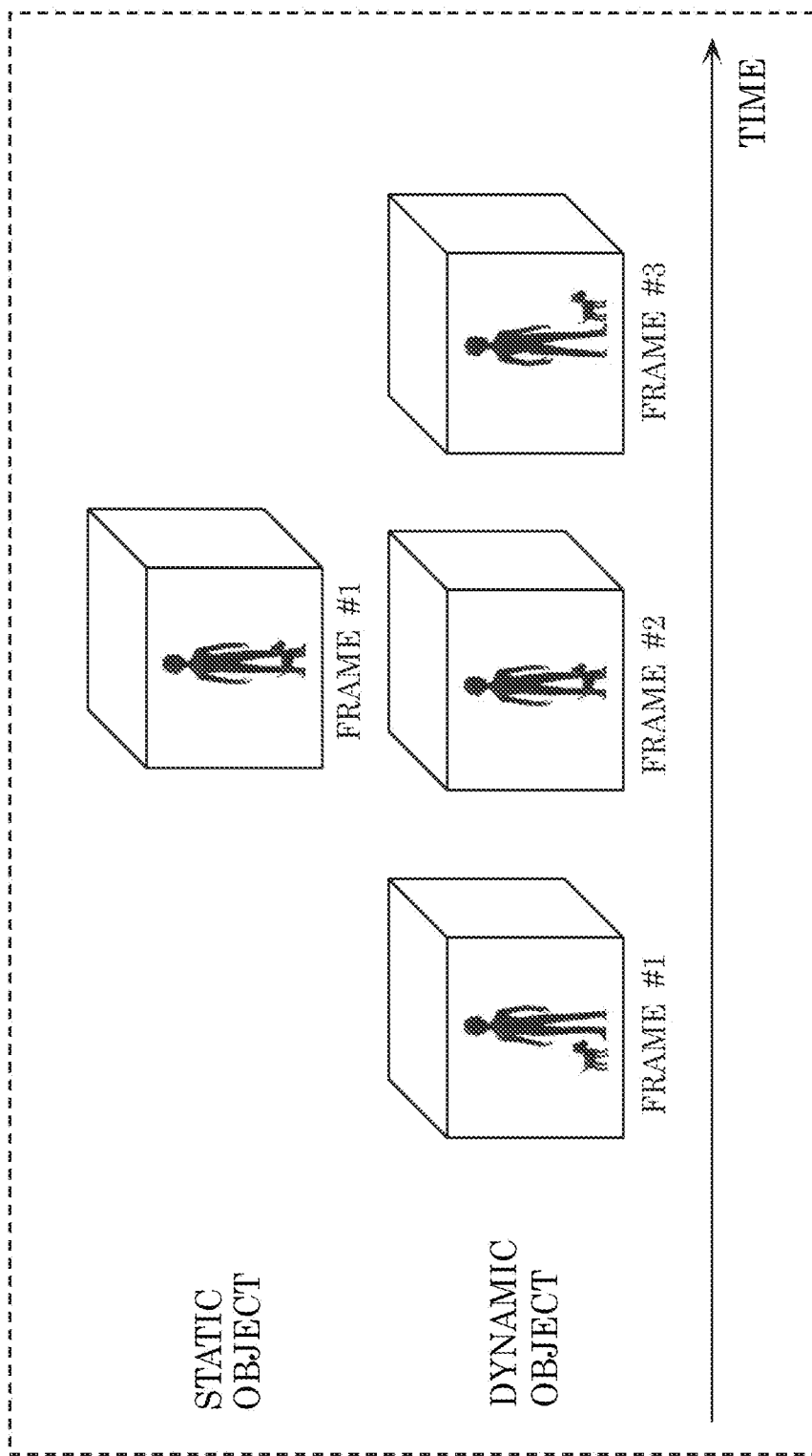
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LiDAR or a range finder, a stereo camera, or a combination of a plurality of monocular cameras. Point cloud data generator 4618 generates point cloud data based on the sensor information obtained by sensor information obtainer 4617. Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

As a broadcasting scheme, DVB-T2, DVB-S2, DVB-C2, ATSC3.0, or ISDB-S3 is used, for example.

Figure 5:
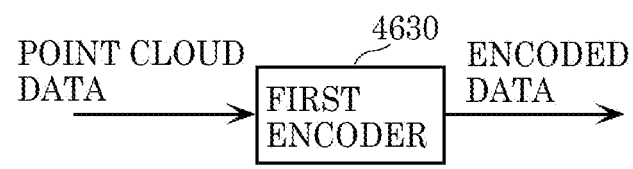
FIG. 5 is a diagram illustrating a structure of a first encoder according to Embodiment 1.
Figure 6:
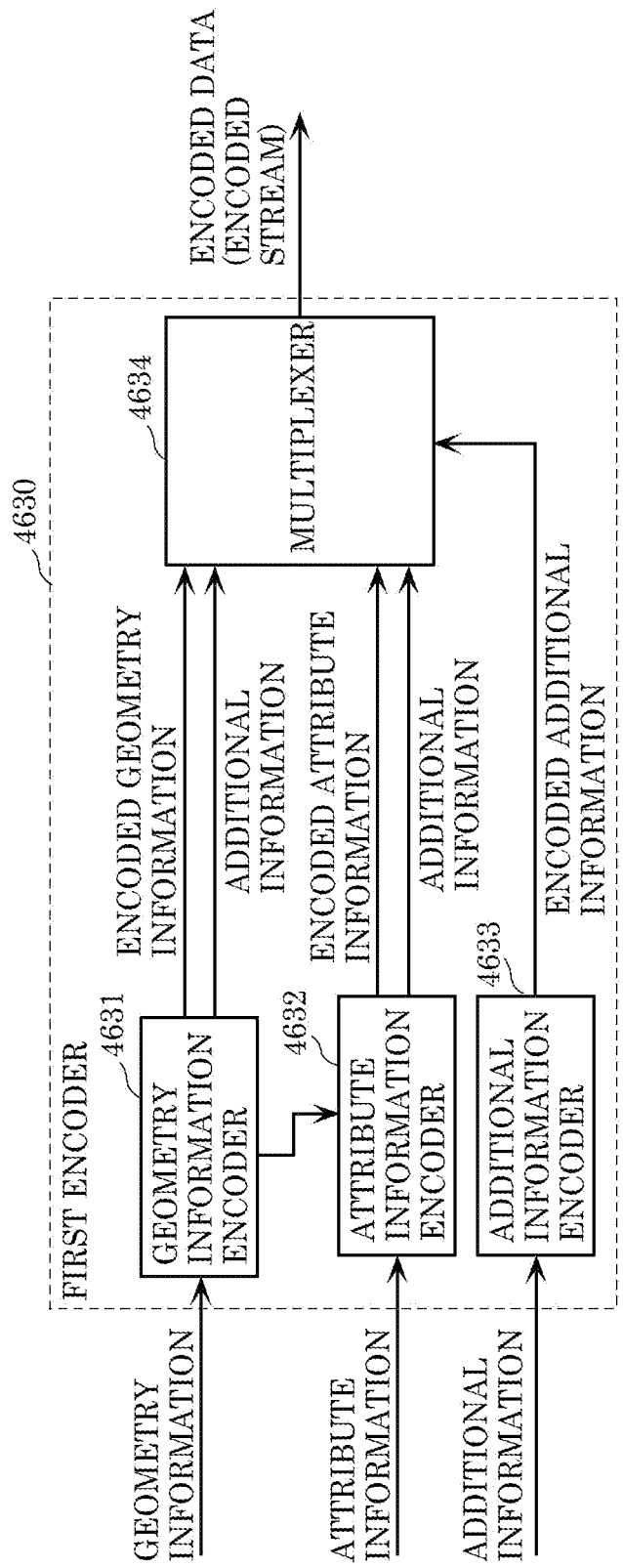
FIG. 6 is a block diagram illustrating the first encoder according to Embodiment 1.

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space (target space) is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (in other words, a current node or a target node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
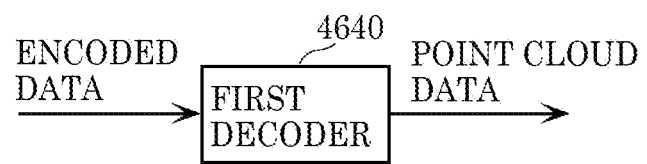
FIG. 7 is a diagram illustrating a structure of a first decoder according to Embodiment 1.
Figure 8:
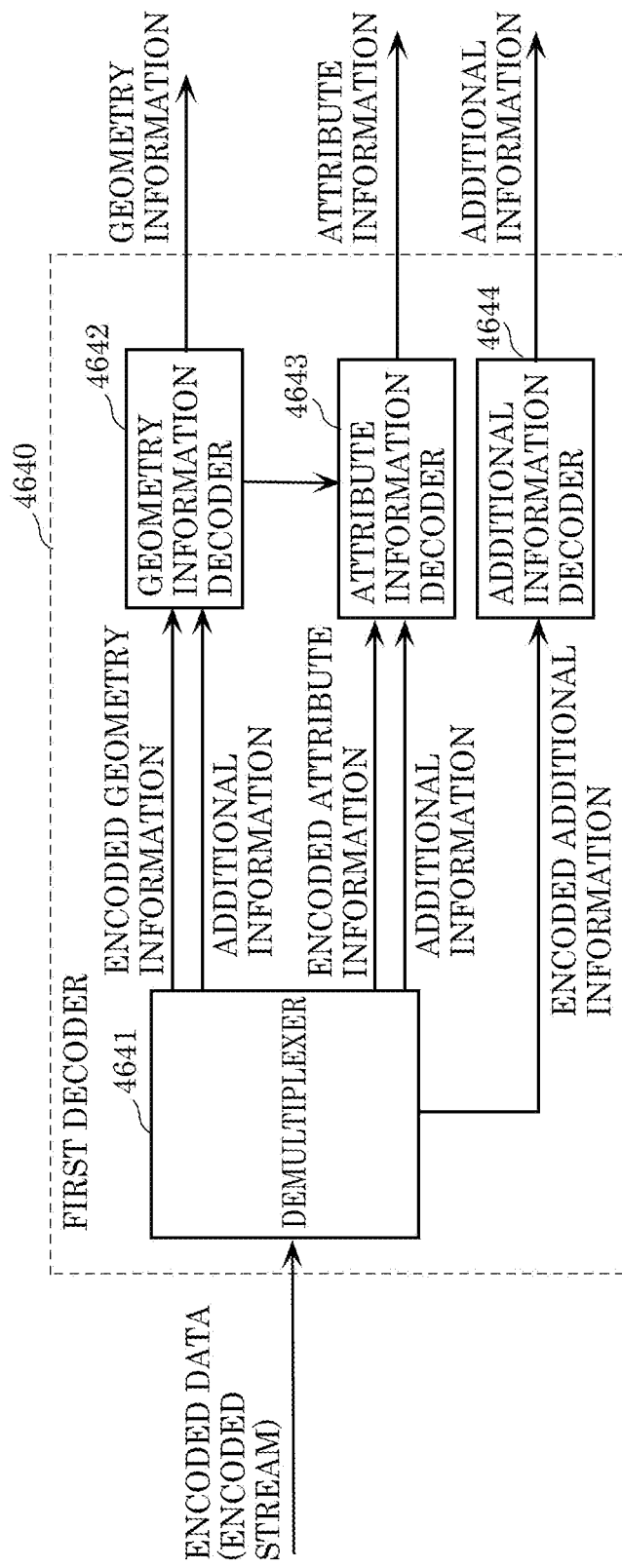
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream) encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
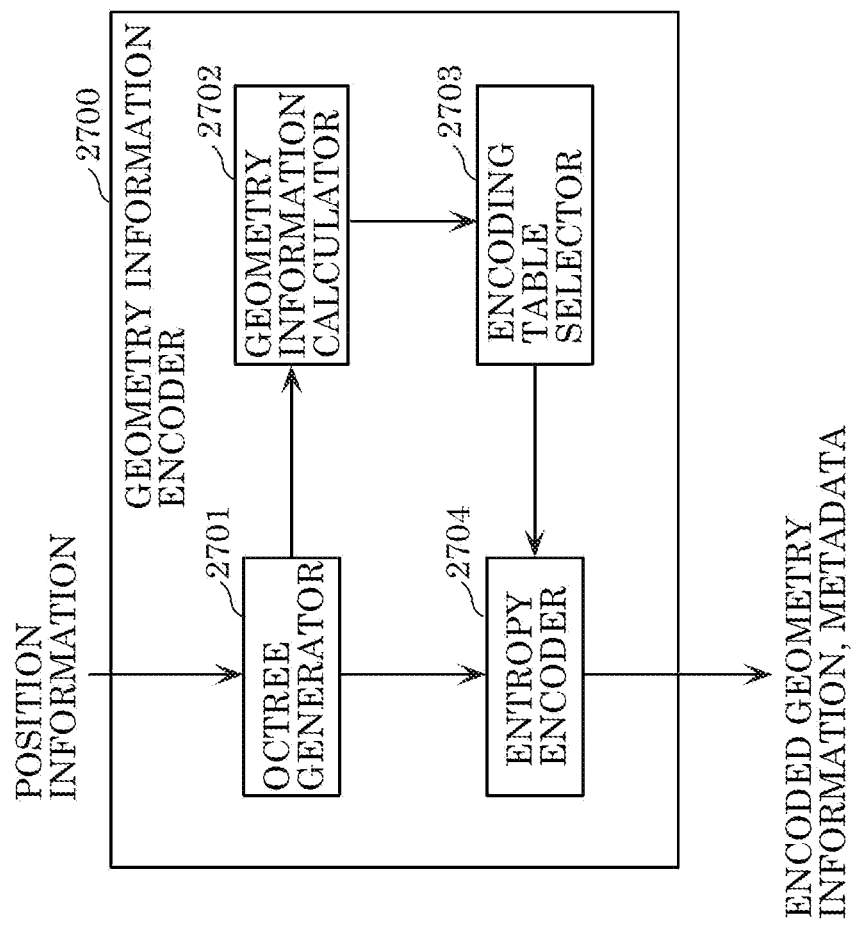
FIG. 9 is a block diagram of a three-dimensional data encoding device according to Embodiment 1.

Next, an example configuration of a geometry information encoder will be described. FIG. 9 is a block diagram of geometry information encoder 2700 according to this embodiment. Geometry information encoder 2700 includes octree generator 2701, geometry information calculator 2702, encoding table selector 2703, and entropy encoder 2704.

Octree generator 2701 generates an octree, for example, from input position information, and generates an occupancy code of each node of the octree. Geometry information calculator 2702 obtains information that indicates whether a neighboring node of a current node (target node) is an occupied node or not. For example, geometry information calculator 2702 calculates occupancy information on a neighboring node from an occupancy code of a parent node to which a current node belongs (information that indicates whether a neighboring node is an occupied node or not). Geometry information calculator 2702 may save an encoded node in a list and search the list for a neighboring node. Note that geometry information calculator 2702 may change neighboring nodes in accordance with the position of the current node in the parent node.

Encoding table selector 2703 selects an encoding table used for entropy encoding of the current node based on the occupancy information on the neighboring node calculated by geometry information calculator 2702. For example, encoding table selector 2703 may generate a bit sequence based on the occupancy information on the neighboring node and select an encoding table of an index number generated from the bit sequence.

Entropy encoder 2704 generates encoded geometry information and metadata by entropy-encoding the occupancy code of the current node using the encoding table of the selected index number. Entropy encoder may add, to the encoded geometry information, information that indicates the selected encoding table.

Figure 10:
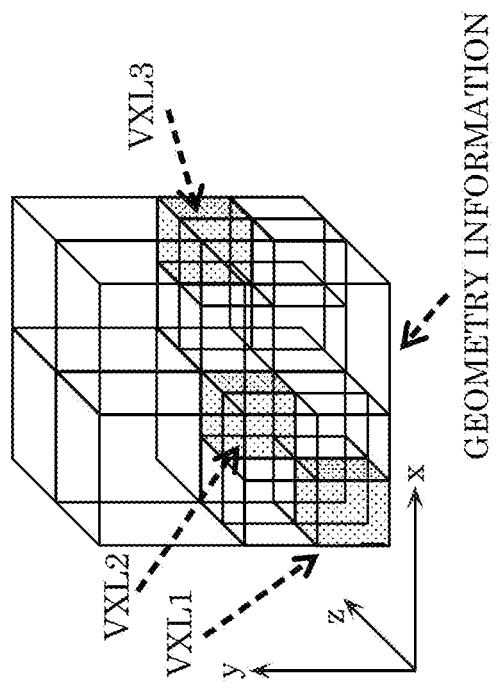
FIG. 10 is a diagram showing an example of geometry information according to Embodiment 1.
Figure 11:
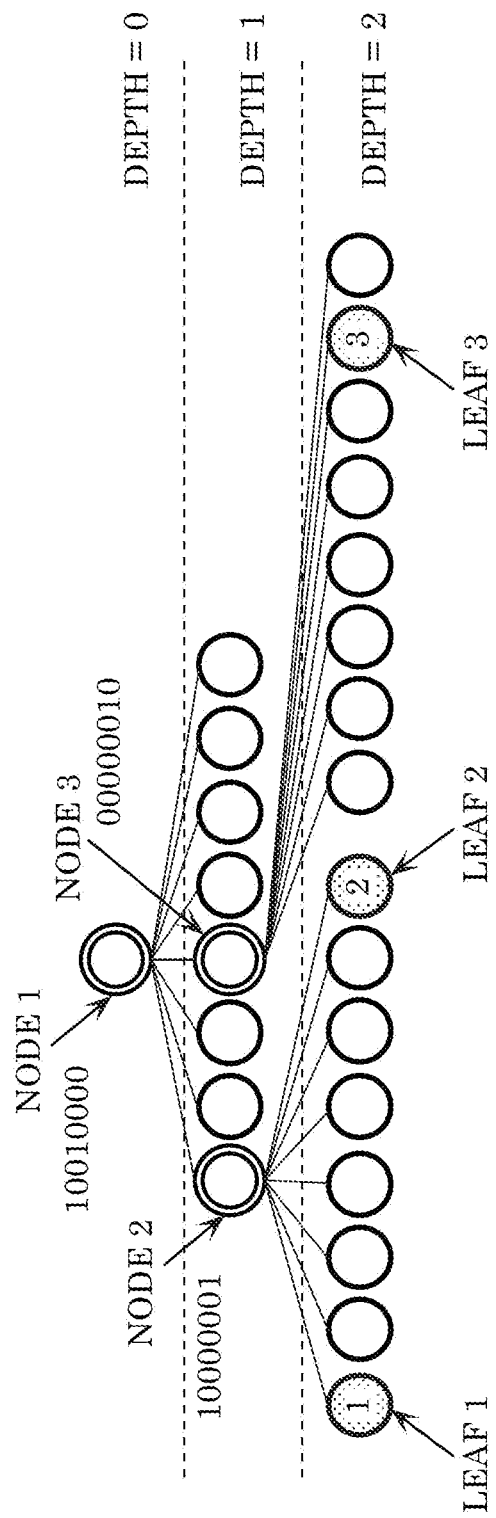
FIG. 11 is a diagram showing an example of an octree representation of geometry information according to Embodiment 1.

In the following, an octree representation and a scan order for geometry information will be described. Geometry information (geometry data) is transformed into an octree structure (octree transform) and then encoded. The octree structure includes nodes and leaves. Each node has eight nodes or leaves, and each leaf has voxel (VXL) information. FIG. 10 is a diagram showing an example structure of geometry information including a plurality of voxels. FIG. 11 is a diagram showing an example in which the geometry information shown in FIG. 10 is transformed into an octree structure. Here, of leaves shown in FIG. 11, leaves 1, 2, and 3 represent voxels VXL1, VXL2, and VXL3 shown in FIG. 10, respectively, and each represent VXL containing a point cloud (referred to as a valid VXL, hereinafter).

Specifically, node 1 corresponds to the entire space comprising the geometry information in FIG. 10. The entire space corresponding to node 1 is divided into eight nodes, and among the eight nodes, a node containing valid VXL is further divided into eight nodes or leaves. This process is repeated for every layer of the tree structure. Here, each node corresponds to a subspace, and has information (occupancy code) that indicates where the next node or leaf is located after division as node information. A block in the bottom layer is designated as a leaf and retains the number of the points contained in the leaf as leaf information.

Figure 12:
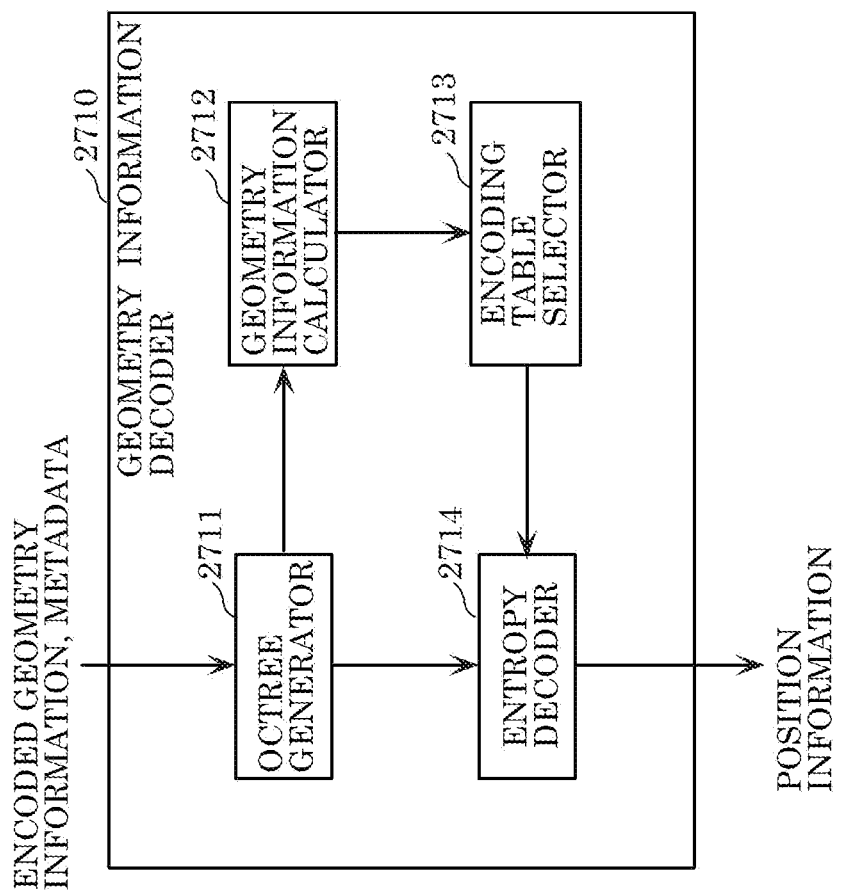
FIG. 12 is a block diagram of a three-dimensional data decoding device according to Embodiment 1.

Next, an example configuration of a geometry information decoder will be described. FIG. 12 is a block diagram of geometry information decoder 2710 according to this embodiment. Geometry information decoder 2710 includes octree generator 2711, geometry information calculator 2712, encoding table selector 2713, and entropy decoder 2714.

Octree generator 2711 generates an octree of a space (node) based on header information, metadata or the like of a bitstream. For example, octree generator 2711 generates an octree by generating a large space (root node) based on the sizes of a space in an x-axis direction, a y-axis direction, and a z-axis direction added to the header information and dividing the space into two parts in the x-axis direction, the y-axis direction, and the z-axis direction to generate eight small spaces A (nodes A0 to A7). Nodes A0 to A7 are sequentially designated as a current node.

Geometry information calculator 2712 obtains occupancy information that indicates whether a neighboring node of a current node is an occupied node or not. For example, geometry information calculator 2712 calculates occupancy information on a neighboring node from an occupancy code of a parent node to which a current node belongs. Geometry information calculator 2712 may save a decoded node in a list and search the list for a neighboring node. Note that geometry information calculator 2712 may change neighboring nodes in accordance with the position of the current node in the parent node.

Encoding table selector 2713 selects an encoding table (decoding table) used for entropy decoding of the current node based on the occupancy information on the neighboring node calculated by geometry information calculator 2712. For example, encoding table selector 2713 may generate a bit sequence based on the occupancy information on the neighboring node and select an encoding table of an index number generated from the bit sequence. Entropy decoder 2714 generates position information by entropy-decoding the occupancy code of the current node using the selected encoding table. Note that entropy decoder 2714 may obtain information on the selected encoding table by decoding the bitstream, and entropy-decode the occupancy code of the current node using the encoding table indicated by the information.

Figure 13:
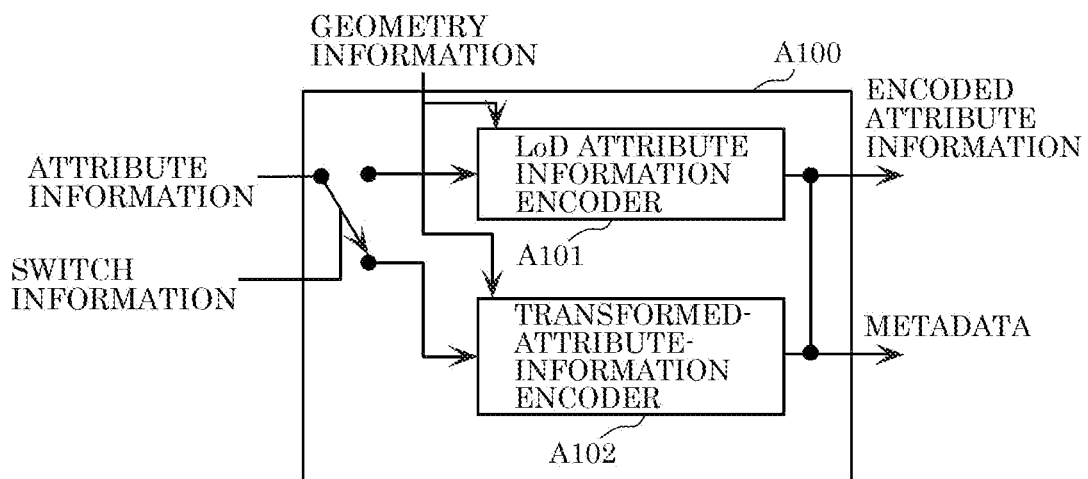
FIG. 13 is a block diagram of an attribute information encoder according to Embodiment 1.

In the following, configurations of an attribute information encoder and an attribute information decoder will be described. FIG. 13 is a block diagram showing an example configuration of attribute information encoder A100. The attribute information encoder may include a plurality of encoders that perform different encoding methods. For example, the attribute information encoder may selectively use any of the two methods described below in accordance with the use case.

Attribute information encoder A100 includes LoD attribute information encoder A101 and transformed-attribute-information encoder A102. LoD attribute information encoder A101 classifies three-dimensional points into a plurality of layers based on geometry information on the three-dimensional points, predicts attribute information on three-dimensional points belonging to each layer, and encodes a prediction residual therefor. Here, each layer into which a three-dimensional point is classified is referred to as a level of detail (LoD).

Transformed-attribute-information encoder A102 encodes attribute information using region adaptive hierarchical transform (RAHT). Specifically, transformed-attribute-information encoder A102 generates a high frequency component and a low frequency component for each layer by applying RAHT or Haar transform to each item of attribute information based on the geometry information on three-dimensional points, and encodes the values by quantization, entropy encoding or the like.

Figure 14:
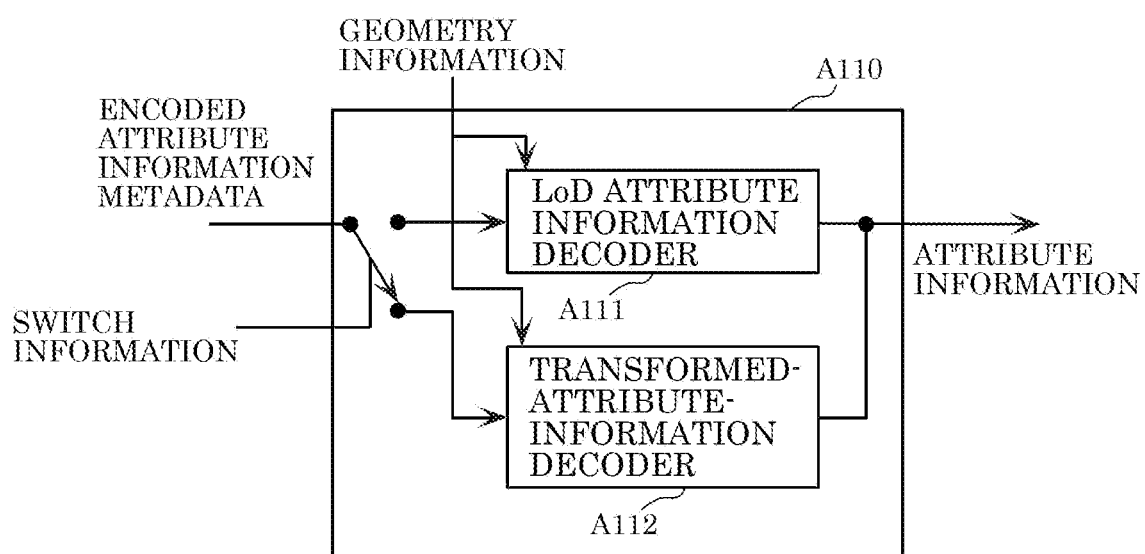
FIG. 14 is a block diagram of an attribute information decoder according to Embodiment 1.

FIG. 14 is a block diagram showing an example configuration of attribute information decoder A110. The attribute information decoder may include a plurality of decoders that perform different decoding methods. For example, the attribute information decoder may selectively use any of the two methods described below for decoding based on the information included in the header or metadata.

Attribute information decoder A110 includes LoD attribute information decoder A111 and transformed-attribute-information decoder A112. LoD attribute information decoder A111 classifies three-dimensional points into a plurality of layers based on the geometry information on the three-dimensional points, predicts attribute information on three-dimensional points belonging to each layer, and decodes attribute values thereof.

Transformed-attribute-information decoder A112 decodes attribute information using region adaptive hierarchical transform (RAHT). Specifically, transformed-attribute-information decoder A112 decodes each attribute value by applying inverse RAHT or inverse Haar transform to the high frequency component and the low frequency component of the attribute value based on the geometry information on the three-dimensional point.

Figure 15:
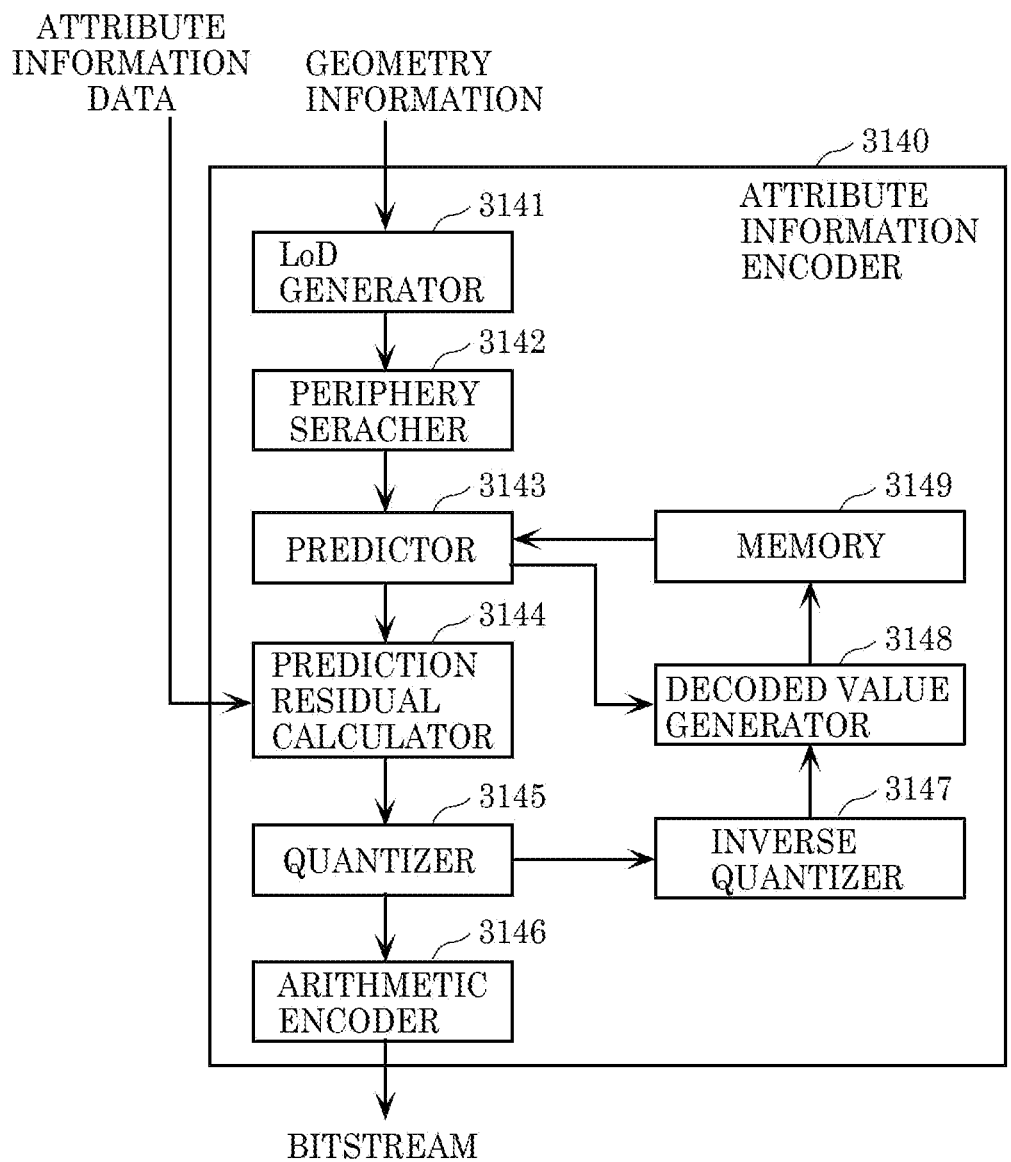
FIG. 15 is a block diagram showing a configuration of the attribute information encoder according to the variation of Embodiment 1.

FIG. 15 is a block diagram showing a configuration of attribute information encoder 3140 that is an example of LoD attribute information encoder A101.

Attribute information encoder 3140 includes LoD generator 3141, periphery searcher 3142, predictor 3143, prediction residual calculator 3144, quantizer 3145, arithmetic encoder 3146, inverse quantizer 3147, decoded value generator 3148, and memory 3149.

LoD generator 3141 generates an LoD using geometry information on a three-dimensional point.

Periphery searcher 3142 searches for a neighboring three-dimensional point neighboring each three-dimensional point using a result of LoD generation by LoD generator 3141 and distance information indicating distances between three-dimensional points.

Predictor 3143 generates a predicted value of an item of attribute information on a current (target) three-dimensional point to be encoded.

Prediction residual calculator 3144 calculates (generates) a prediction residual of the predicted value of the item of the attribute information generated by predictor 3143.

Quantizer 3145 quantizes the prediction residual of the item of attribute information calculated by prediction residual calculator 3144.

Arithmetic encoder 3146 arithmetically encodes the prediction residual quantized by quantizer 3145. Arithmetic encoder 3146 outputs a bitstream including the arithmetically encoded prediction residual to the three-dimensional data decoding device, for example.

The prediction residual may be binarized by quantizer 3145 before being arithmetically encoded by arithmetic encoder 3146.

Arithmetic encoder 3146 may initialize the encoding table used for the arithmetic encoding before performing the arithmetic encoding. Arithmetic encoder 3146 may initialize the encoding table used for the arithmetic encoding for each layer. Arithmetic encoder 3146 may output a bitstream including information that indicates the position of the layer at which the encoding table is initialized.

Inverse quantizer 3147 inverse-quantizes the prediction residual quantized by quantizer 3145.

Decoded value generator 3148 generates a decoded value by adding the predicted value of the item of attribute information generated by predictor 3143 and the prediction residual inverse-quantized by inverse quantizer 3147 together.

Memory 3149 is a memory that stores a decoded value of an item of attribute information on each three-dimensional point decoded by decoded value generator 3148. For example, when generating a predicted value of a three-dimensional point yet to be encoded, predictor 3143 may generate the predicted value using a decoded value of an item of attribute information on each three-dimensional point stored in memory 3149.

Figure 16:
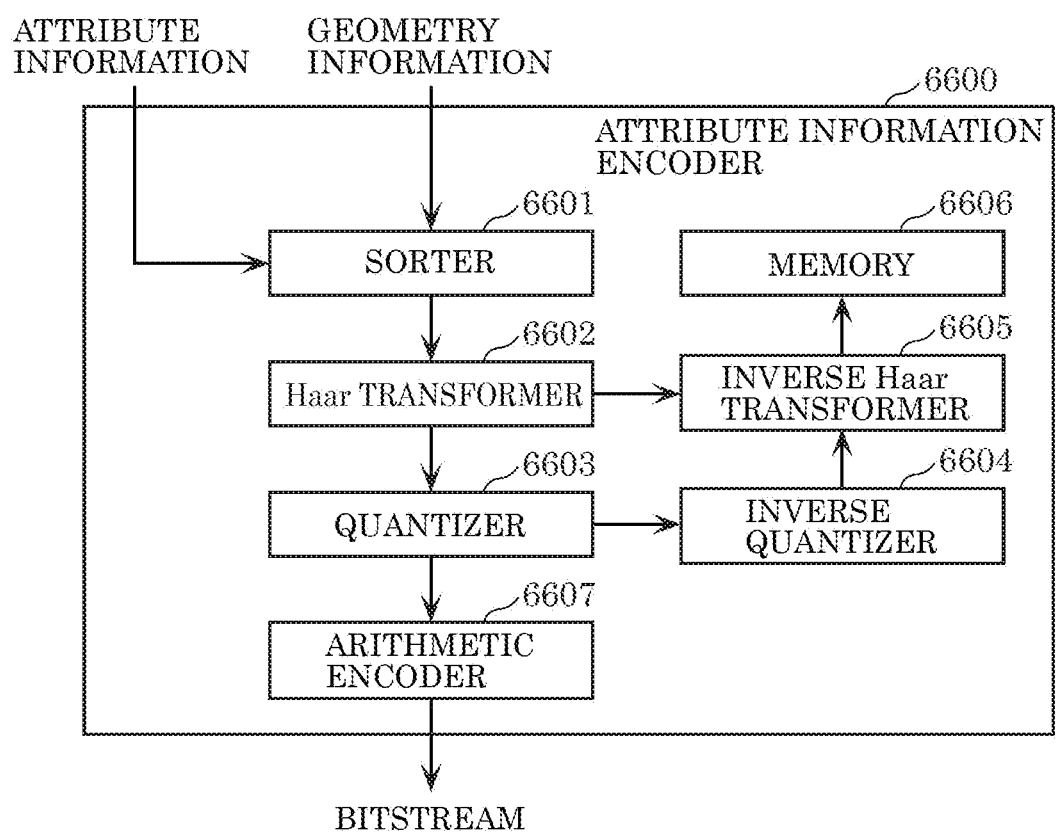
FIG. 16 is a block diagram of the attribute information encoder according to Embodiment 1.

FIG. 16 is a block diagram of attribute information encoder 6600 that is an example of transformation attribute information encoder A102. Attribute information encoder 6600 includes sorter 6601, Haar transformer 6602, quantizer 6603, inverse quantizer 6604, inverse Haar transformer 6605, memory 6606, and arithmetic encoder 6607.

Sorter 6601 generates the Morton codes by using the geometry information of three-dimensional points, and sorts the plurality of three-dimensional points in the order of the Morton codes. Haar transformer 6602 generates the coding coefficient by applying the Haar transform to the attribute information. Quantizer 6603 quantizes the coding coefficient of the attribute information.

Inverse quantizer 6604 inverse quantizes the coding coefficient after the quantization. Inverse Haar transformer 6605 applies the inverse Haar transform to the coding coefficient. Memory 6606 stores the values of items of attribute information of a plurality of decoded three-dimensional points. For example, the attribute information of the decoded three-dimensional points stored in memory 6606 may be utilized for prediction and the like of an unencoded three-dimensional point.

Arithmetic encoder 6607 calculates ZeroCnt from the coding coefficient after the quantization, and arithmetically encodes ZeroCnt. Additionally, arithmetic encoder 6607 arithmetically encodes the non-zero coding coefficient after the quantization. Arithmetic encoder 6607 may binarize the coding coefficient before the arithmetic encoding. In addition, arithmetic encoder 6607 may generate and encode various kinds of header information.

Figure 17:
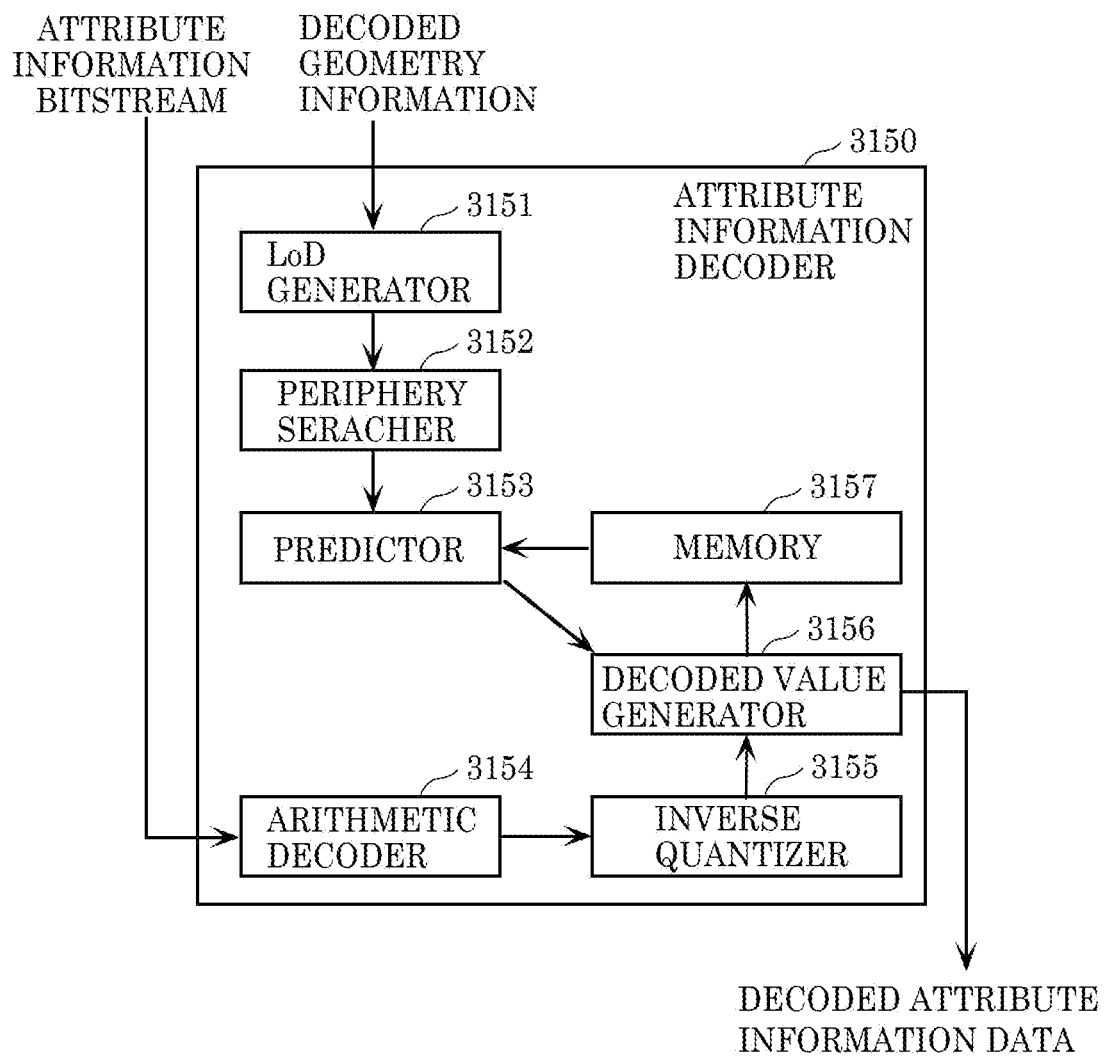
FIG. 17 is a block diagram showing a configuration of the attribute information decoder according to the variation of Embodiment 1.

FIG. 17 is a block diagram showing a configuration of attribute information decoder 3150 that is an example of LoD attribute information decoder A111.

Attribute information decoder 3150 includes LoD generator 3151, periphery searcher 3152, predictor 3153, arithmetic decoder 3154, inverse quantizer 3155, decoded value generator 3156, and memory 3157.

LoD generator 3151 generates an LoD using geometry information on a three-dimensional point decoded by the geometry information decoder (not shown in FIG. 17).

Periphery searcher 3152 searches for a neighboring three-dimensional point neighboring each three-dimensional point using a result of LoD generation by LoD generator 3151 and distance information indicating distances between three-dimensional points.

Predictor 3153 generates a predicted value of attribute information item on a current three-dimensional point to be decoded.

Arithmetic decoder 3154 arithmetically decodes the prediction residual in the bitstream obtained from attribute information encoder 3140 shown in FIG. 15. Note that arithmetic decoder 3154 may initialize the decoding table used for the arithmetic decoding. Arithmetic decoder 3154 initializes the decoding table used for the arithmetic decoding for the layer for which the encoding process has been performed by arithmetic encoder 3146 shown in FIG. 15. Arithmetic decoder 3154 may initialize the decoding table used for the arithmetic decoding for each layer. Arithmetic decoder 3154 may initialize the decoding table based on the information included in the bitstream that indicates the position of the layer for which the encoding table has been initialized.

Inverse quantizer 3155 inverse-quantizes the prediction residual arithmetically decoded by arithmetic decoder 3154.

Decoded value generator 3156 generates a decoded value by adding the predicted value generated by predictor 3153 and the prediction residual inverse-quantized by inverse quantizer 3155 together. Decoded value generator 3156 outputs the decoded attribute information data to another device.

Memory 3157 is a memory that stores a decoded value of an item of attribute information on each three-dimensional point decoded by decoded value generator 3156. For example, when generating a predicted value of a three-dimensional point yet to be decoded, predictor 3153 generates the predicted value using a decoded value of an item of attribute information on each three-dimensional point stored in memory 3157.

Figure 18:
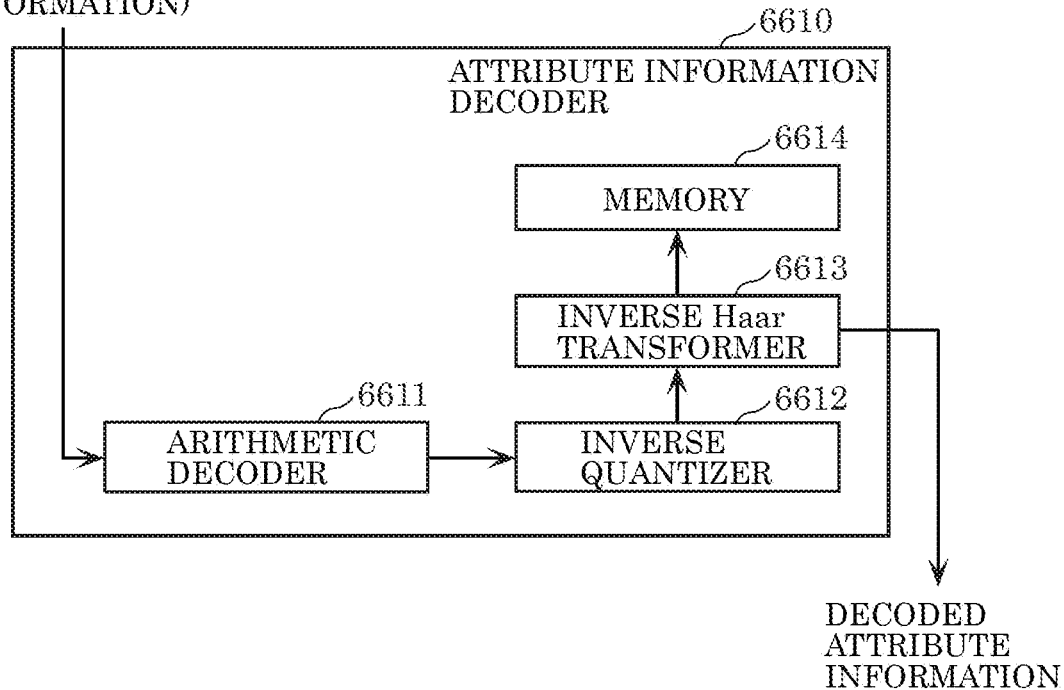
FIG. 18 is a block diagram of the attribute information decoder according to Embodiment 1.

FIG. 18 is a block diagram of attribute information decoder 6610 that is an example of transformation attribute information decoder A112. Attribute information decoder 6610 includes arithmetic decoder 6611, inverse quantizer 6612, inverse Haar transformer 6613, and memory 6614.

Arithmetic decoder 6611 arithmetically decodes ZeroCnt and the coding coefficient included in a bitstream. Note that arithmetic decoder 6611 may decode various kinds of header information.

Inverse quantizer 6612 inverse quantizes the arithmetically decoded coding coefficient. Inverse Haar transformer 6613 applies the inverse Haar transform to the coding coefficient after the inverse quantization. Memory 6614 stores the values of items of attribute information of a plurality of decoded three-dimensional points. For example, the attribute information of the decoded three-dimensional points stored in memory 6614 may be utilized for prediction of an undecoded three-dimensional point.

Figure 19:
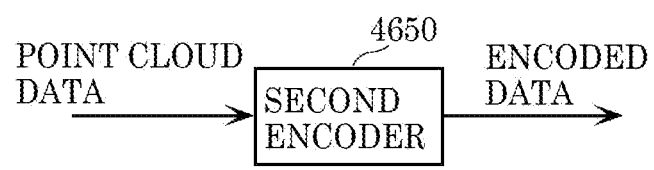
FIG. 19 is a diagram illustrating a structure of a second encoder according to Embodiment 1.
Figure 20:
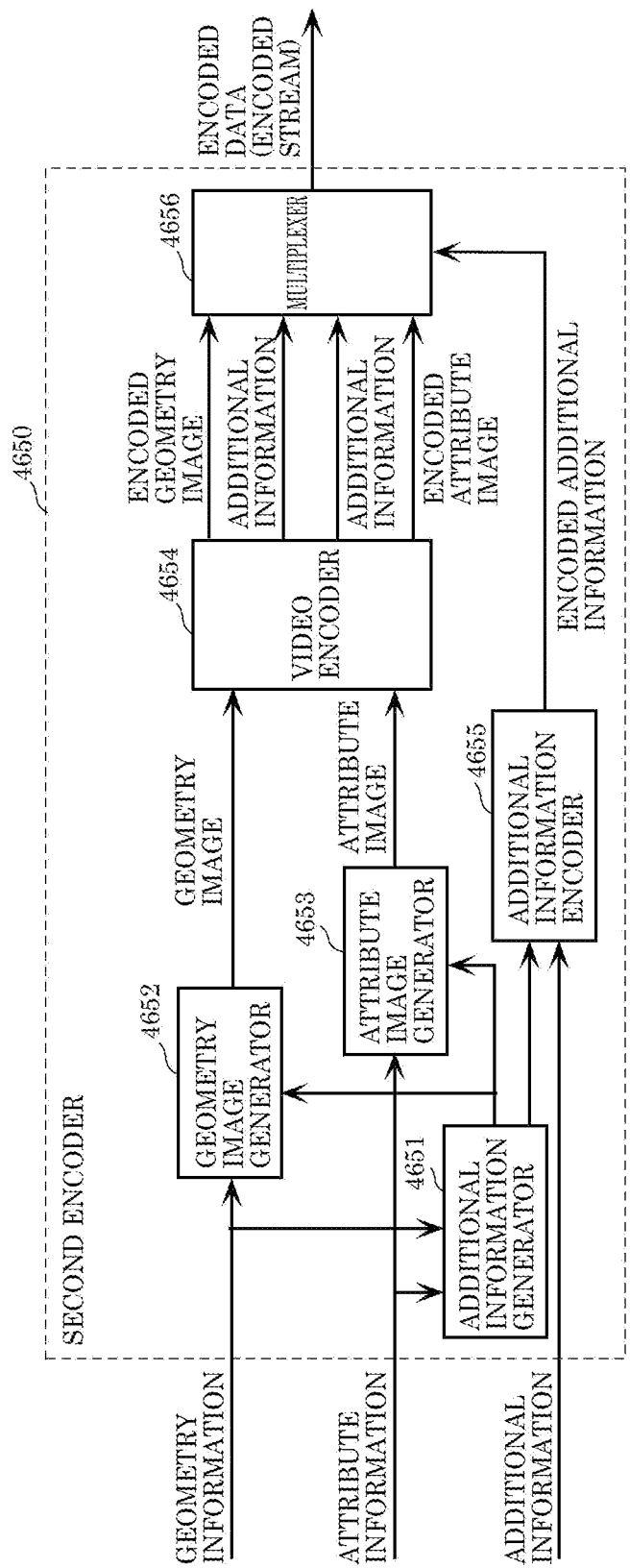
FIG. 20 is a block diagram illustrating the second encoder according to Embodiment 1.

Next, second encoder 4650, which is an example of encoder 4613 that performs encoding in the second encoding method, will be described. FIG. 19 is a diagram showing a configuration of second encoder 4650. FIG. 20 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 21:
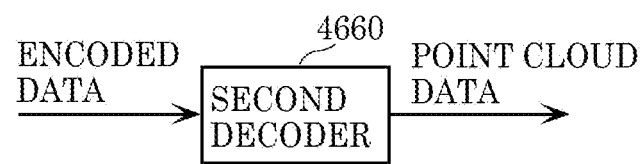
FIG. 21 is a diagram illustrating a structure of a second decoder according to Embodiment 1.
Figure 22:
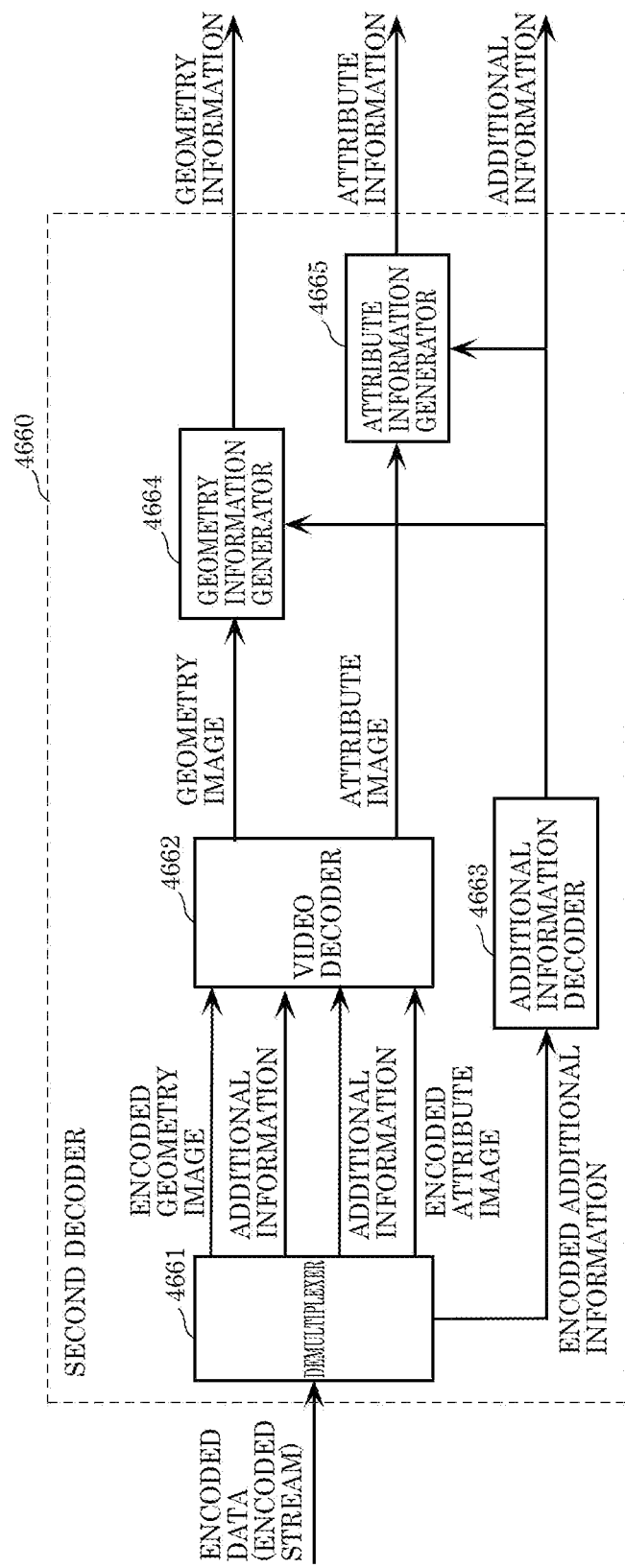
FIG. 22 is a block diagram illustrating the second decoder according to Embodiment 1.

Next, second decoder 4660, which is an example of decoder 4624 that performs decoding in the second encoding method, will be described. FIG. 21 is a diagram showing a configuration of second decoder 4660. FIG. 22 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 23:
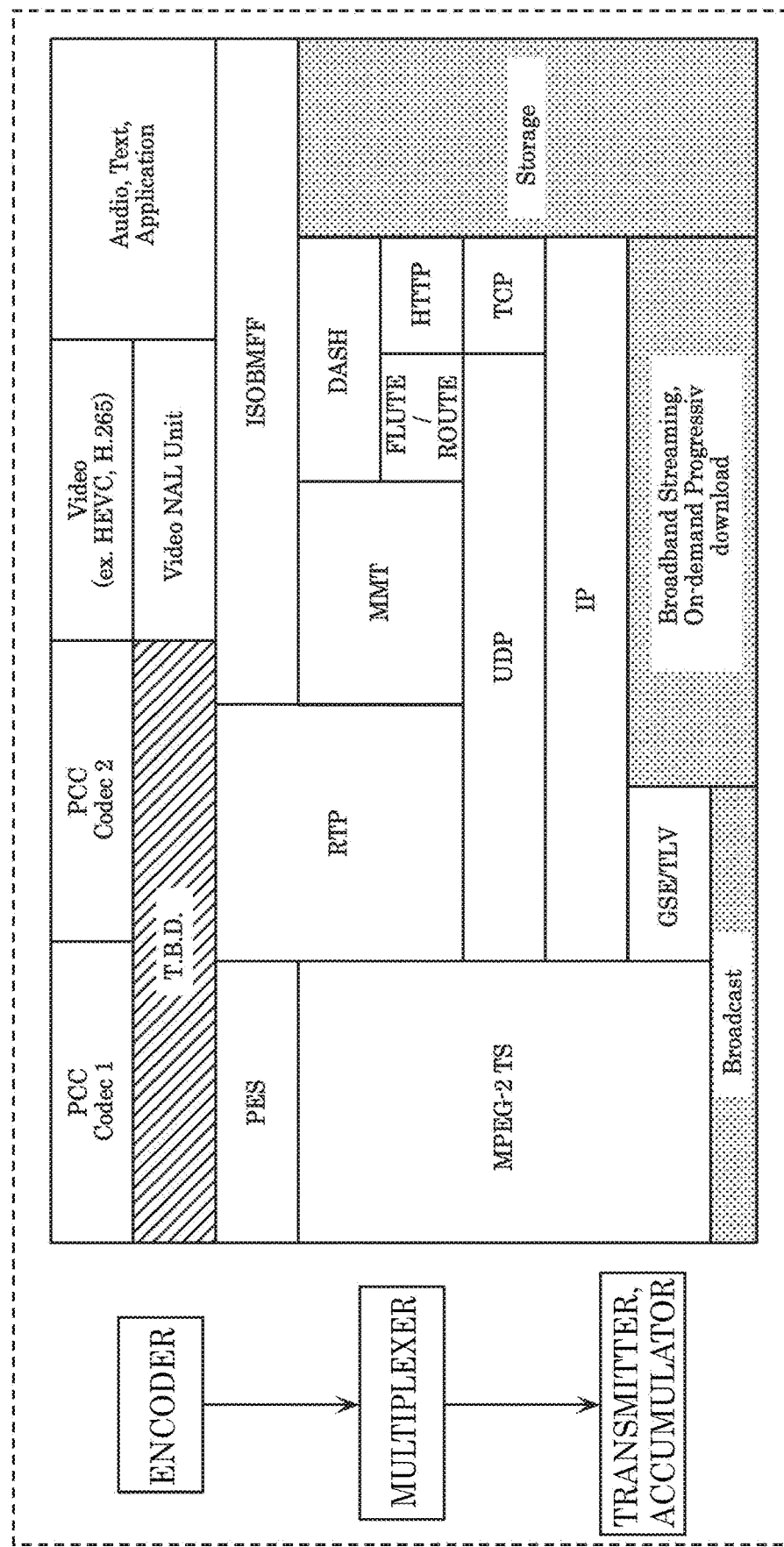
FIG. 23 is a diagram illustrating a protocol stack related to PCC encoded data according to Embodiment 1.

In the following, a problem with the PCC encoding scheme will be described. FIG. 23 is a diagram showing a protocol stack relating to PCC-encoded data. FIG. 23 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Codec1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

Embodiment 2

In this embodiment, types of the encoded data (geometry information (geometry), attribute information (attribute), and additional information (metadata)) generated by first encoder 4630 or second encoder 4650 described above, a method of generating additional information (metadata), and a multiplexing process in the multiplexer will be described. The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 24:
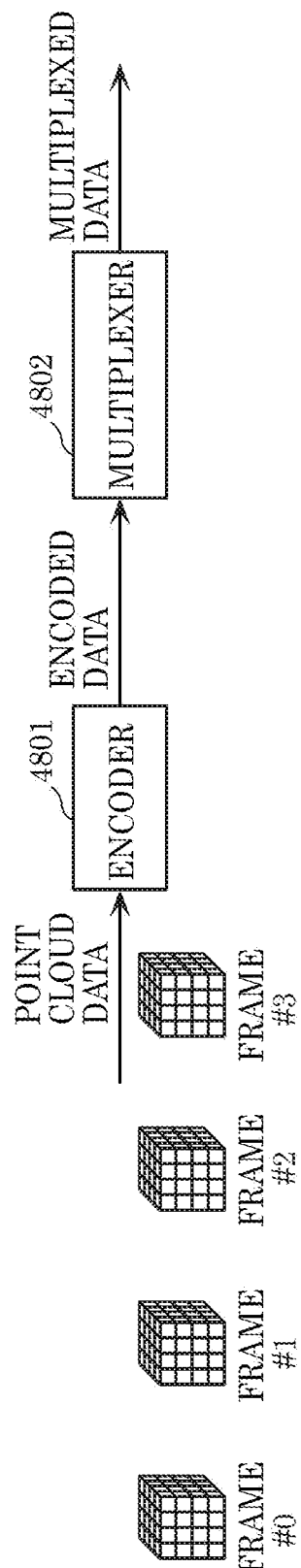
FIG. 24 is a diagram illustrating structures of an encoder and a multiplexer according to Embodiment 2.

FIG. 24 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 25:
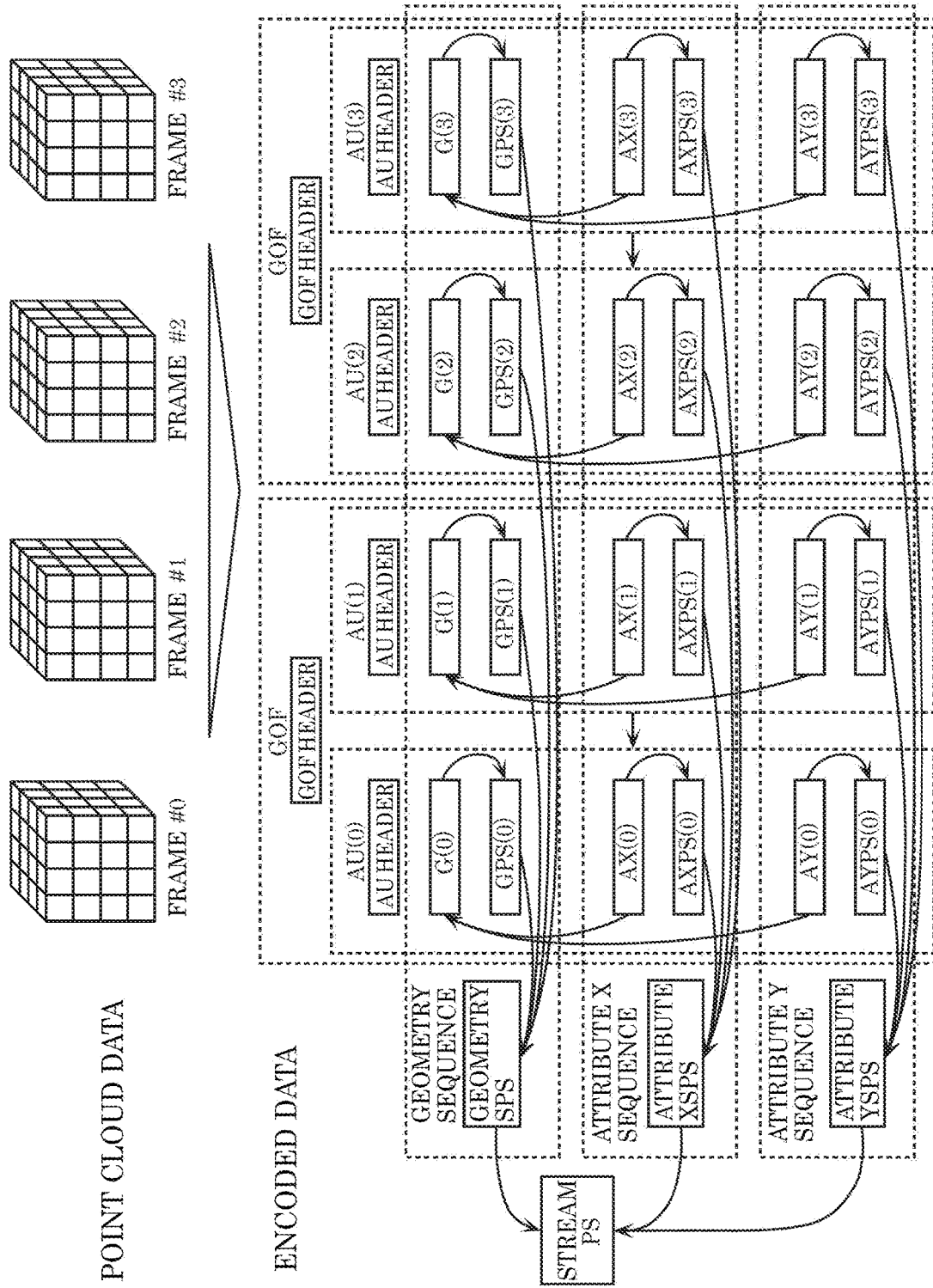
FIG. 25 is a diagram illustrating a structure example of encoded data according to Embodiment 2.

FIG. 25 is a diagram showing a configuration example of the encoded data generated by encoder 4801. Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described. Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described. Encoder 4801 encodes attribute information of each frame to generate encoded attribute data (compressed attribute data) for each frame. The encoded attribute data is denoted by A(i). FIG. 25 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i). The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 25 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 25 shows an example in which there is one type of geometry information, and there are two types of attribute information, the present disclosure is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (metadata) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header. Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF. The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF. For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 26:
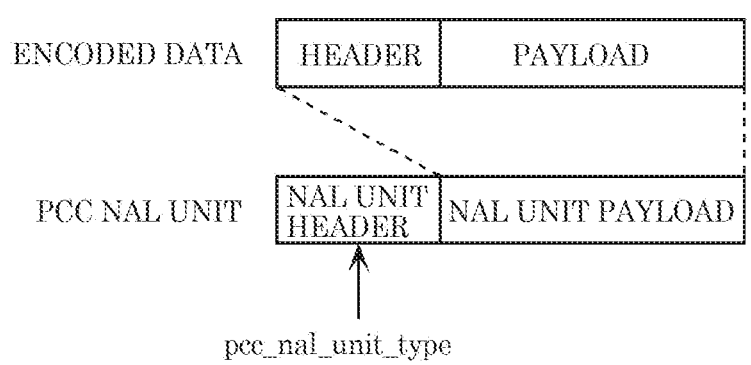
FIG. 26 is a diagram illustrating a structure example of encoded data and a NAL unit according to Embodiment 2.

For example, a data format is defined for each type of encoded data. FIG. 26 is a diagram showing an example of encoded data and a NAL unit.

For example, as shown in FIG. 26, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pcc_nal_unit_type, which is identification information for the encoded data. FIG. 27 is a diagram showing a semantics example of pcc_nal_unit_type.

As shown in FIG. 27, when pcc_codec_type is codec 1 (Codec1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX. S), attribute YPS (AttrY. PS), geometry SPS (Geometry Sequence PS), attribute X SPS (AttributeX Sequence PS), attribute Y SPS (AttributeY Sequence PS), AU header (AU Header), and GOF header (GOF Header) in codec 1. Values of 11 and greater are reserved in codec 1.

When pcc_codec_type is codec 2 (Codec2: second encoding method), values of 0 to 2 of pcc_nal_unit_type are assigned to data A (DataA), metadata A (MetaDataA), and metadata B (MetaDataB) in the codec. Values of 3 and greater are reserved in codec 2.

Next, an order of transmission of data will be described. In the following, restrictions on the order of transmission of NAL units will be described.

Multiplexer 4802 transmits NAL units on a GOF basis or on an AU basis. Multiplexer 4802 arranges the GOF header at the top of a GOF, and arranges the AU header at the top of an AU.

In order to allow the decoding device to decode the next AU and the following AUs even when data is lost because of a packet loss or the like, multiplexer 4802 may arrange a sequence parameter set (SPS) in each AU.

When there is a dependence relationship for decoding between encoded data, the decoding device decodes the data of the entity to be referred to and then decodes the data of the referring entity. In order to allow the decoding device to perform decoding in the order of reception without rearranging the data, multiplexer 4802 first transmits the data of the entity to be referred to.

Figure 28:
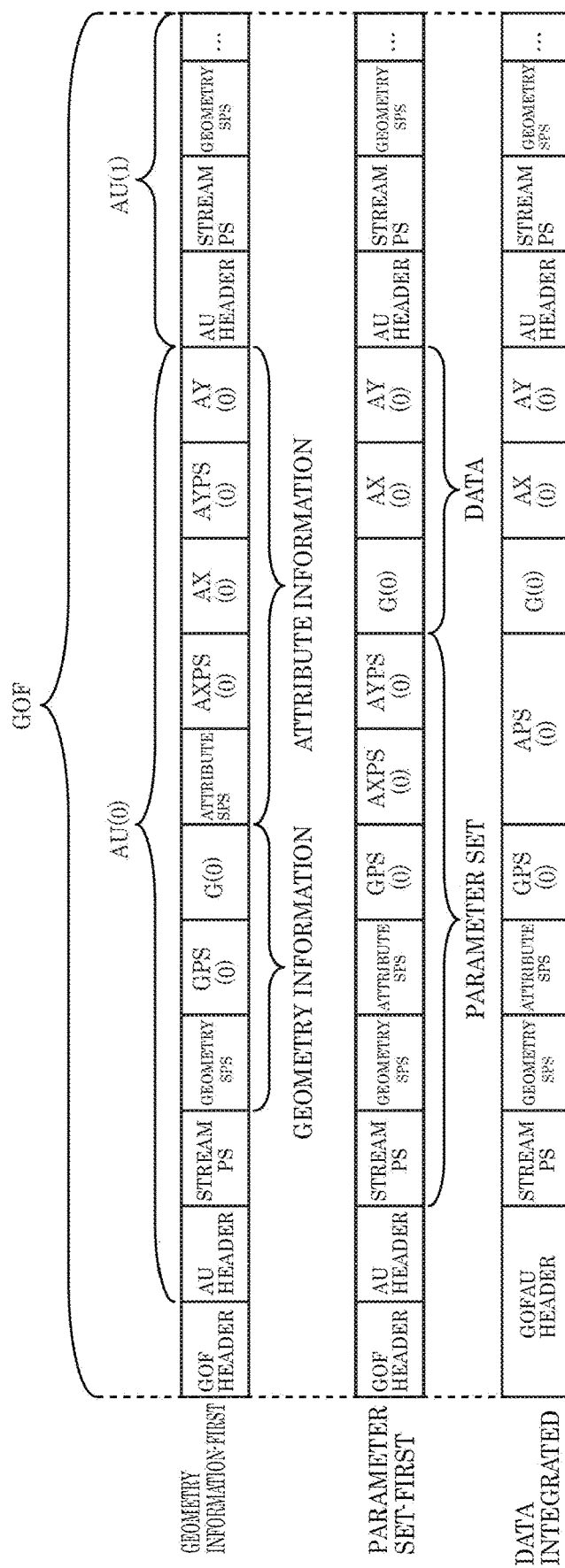
FIG. 28 is a diagram illustrating an example of a transmitting order of NAL units according to Embodiment 2.

FIG. 28 is a diagram showing examples of the order of transmission of NAL units. FIG. 28 shows three examples, that is, geometry information-first order, parameter-first order, and data-integrated order.

The geometry information-first order of transmission is an example in which information relating to geometry information is transmitted together, and information relating to attribute information is transmitted together. In the case of this order of transmission, the transmission of the information relating to the geometry information ends earlier than the transmission of the information relating to the attribute information.

For example, according to this order of transmission is used, when the decoding device does not decode attribute information, the decoding device may be able to have an idle time since the decoding device can omit decoding of attribute information. When the decoding device is required to decode geometry information early, the decoding device may be able to decode geometry information earlier since the decoding device obtains encoded data of the geometry information earlier.

Note that, although in FIG. 28 the attribute X SPS and the attribute Y SPS are integrated and shown as the attribute SPS, the attribute X SPS and the attribute Y SPS may be separately arranged.

In the parameter set-first order of transmission, a parameter set is first transmitted, and data is then transmitted.

As described above, as far as the restrictions on the order of transmission of NAL units are met, multiplexer 4802 can transmit NAL units in any order. For example, order identification information may be defined, and multiplexer 4802 may have a function of transmitting NAL units in a plurality of orders. For example, the order identification information for NAL units is stored in the stream PS.

The three-dimensional data decoding device may perform decoding based on the order identification information. The three-dimensional data decoding device may indicate a desired order of transmission to the three-dimensional data encoding device, and the three-dimensional data encoding device (multiplexer 4802) may control the order of transmission according to the indicated order of transmission.

Note that multiplexer 4802 can generate encoded data having a plurality of functions merged to each other as in the case of the data-integrated order of transmission, as far as the restrictions on the order of transmission are met. For example, as shown in FIG. 28, the GOF header and the AU header may be integrated, or AXPS and AYPS may be integrated. In such a case, an identifier that indicates data having a plurality of functions is defined in pcc_nal_unit_type.

In the following, variations of this embodiment will be described. There are levels of PSs, such as a frame-level PS, a sequence-level PS, and a PCC sequence-level PS. Provided that the PCC sequence level is a higher level, and the frame level is a lower level, parameters can be stored in the manner described below.

The value of a default PS is indicated in a PS at a higher level. If the value of a PS at a lower level differs from the value of the PS at a higher level, the value of the PS is indicated in the PS at the lower level. Alternatively, the value of the PS is not described in the PS at the higher level but is described in the PS at the lower level. Alternatively, information indicating whether the value of the PS is indicated in the PS at the lower level, at the higher level, or at both the levels is indicated in both or one of the PS at the lower level and the PS at the higher level. Alternatively, the PS at the lower level may be merged with the PS at the higher level. If the PS at the lower level and the PS at the higher level overlap with each other, multiplexer 4802 may omit transmission of one of the PSs.

Note that encoder 4801 or multiplexer 4802 may divide data into slices or tiles and transmit each of the divided slices or tiles as divided data. The divided data includes information for identifying the divided data, and a parameter used for decoding of the divided data is included in the parameter set. In this case, an identifier that indicates that the data is data relating to a tile or slice or data storing a parameter is defined in pcc_nal_unit_type.

Figure 29:
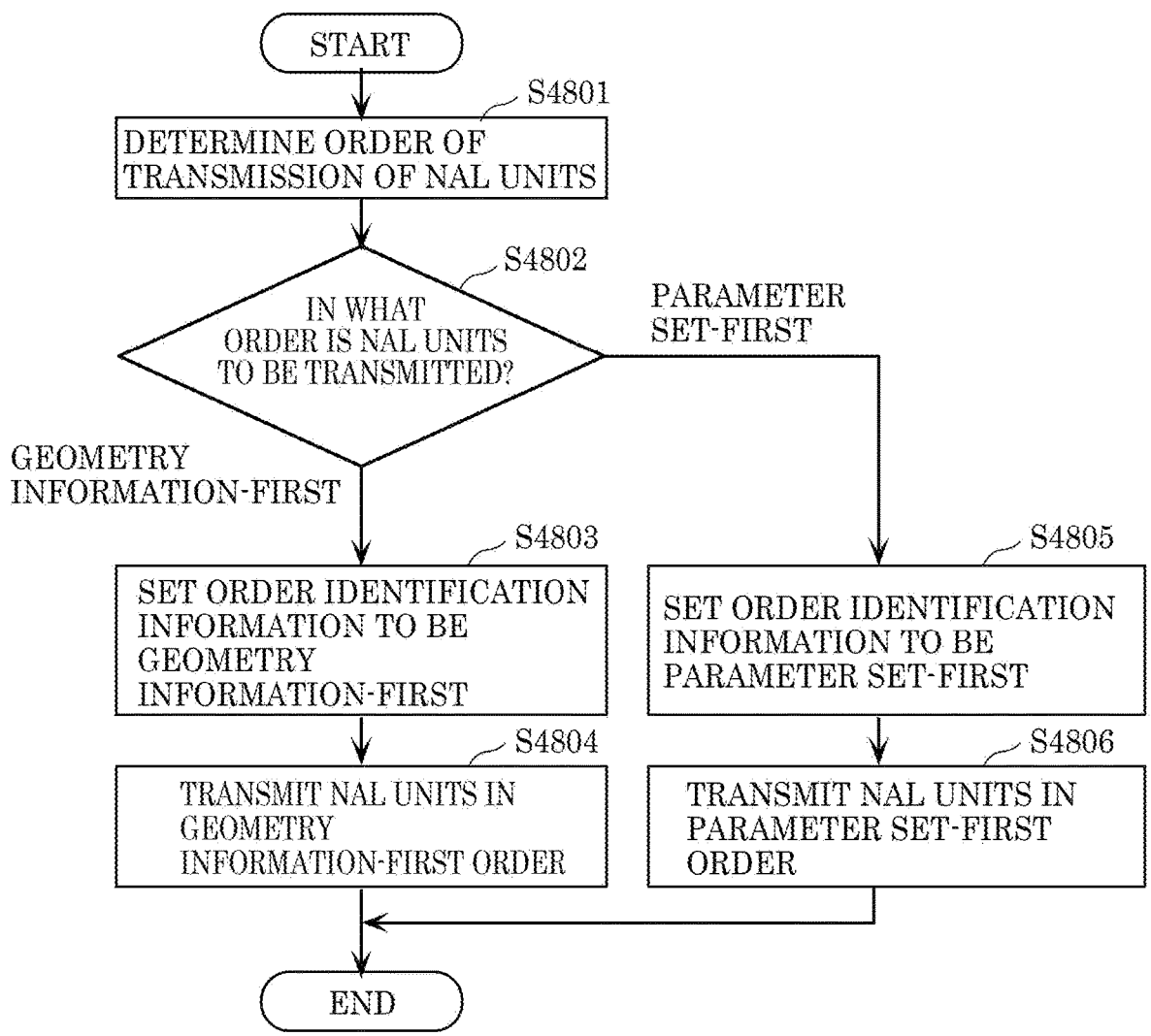
FIG. 29 is a flowchart of processing performed by a three-dimensional data encoding device according to Embodiment 2.

In the following, a process relating to order identification information will be described. FIG. 29 is a flowchart showing a process performed by the three-dimensional data encoding device (encoder 4801 and multiplexer 4802) that involves the order of transmission of NAL units.

First, the three-dimensional data encoding device determines the order of transmission of NAL units (geometry information-first or parameter set-first) (S4801). For example, the three-dimensional data encoding device determines the order of transmission based on a specification from a user or an external device (the three-dimensional data decoding device, for example).

If the determined order of transmission is geometry information-first (if "geometry information-first" in S4802), the three-dimensional data encoding device sets the order identification information included in the stream PS to geometry information-first (S4803). That is, in this case, the order identification information indicates that the NAL units are transmitted in the geometry information-first order. The three-dimensional data encoding device then transmits the NAL units in the geometry information-first order (S4804).

On the other hand, if the determined order of transmission is parameter set-first (if "parameter set-first" in S4802), the three-dimensional data encoding device sets the order identification information included in the stream PS to parameter set-first (S4805). That is, in this case, the order identification information indicates that the NAL units are transmitted in the parameter set-first order. The three-dimensional data encoding device then transmits the NAL units in the parameter set-first order (S4806).

Figure 30:
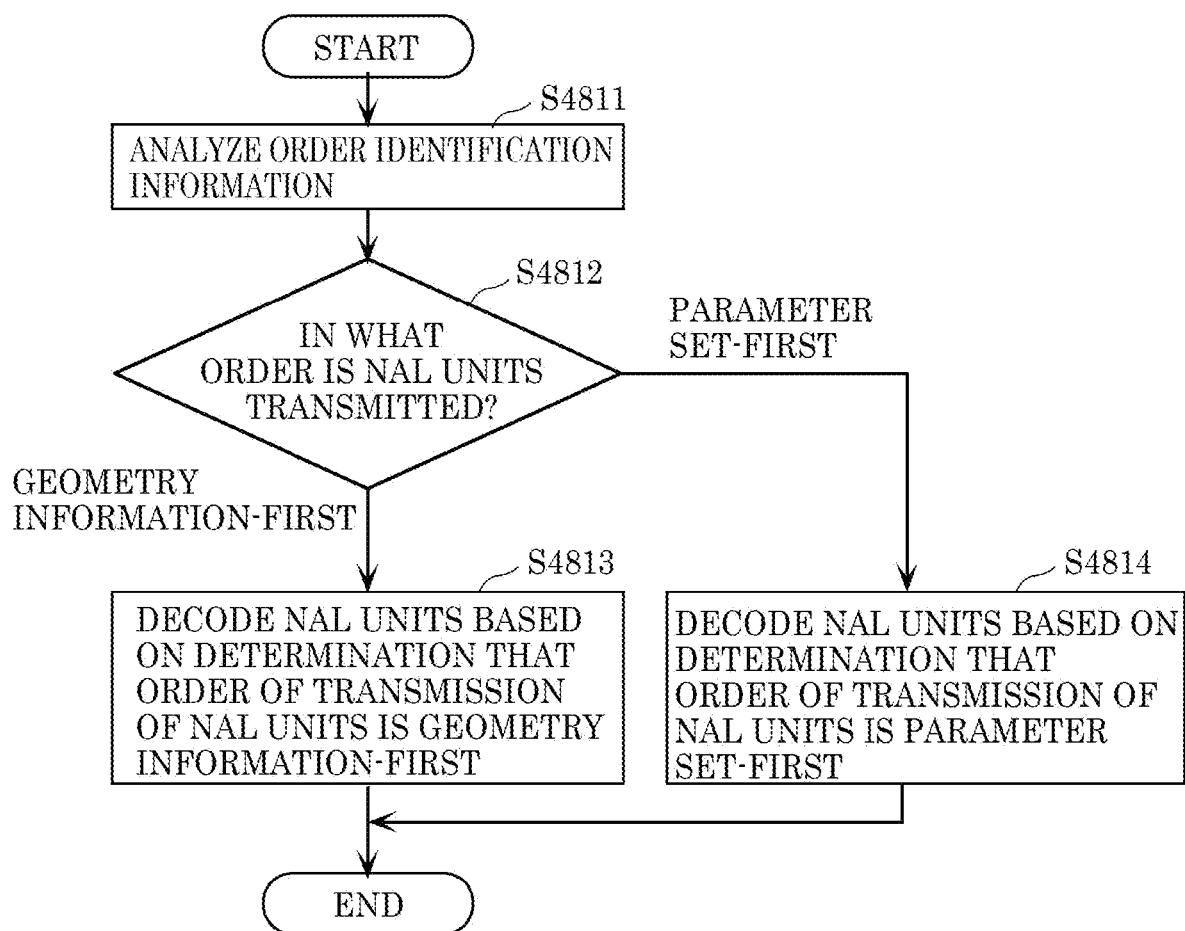
FIG. 30 is a flowchart of processing performed by a three-dimensional data decoding device according to Embodiment 2.

FIG. 30 is a flowchart showing a process performed by the three-dimensional data decoding device that involves the order of transmission of NAL units. First, the three-dimensional data decoding device analyzes the order identification information included in the stream PS (S4811).

If the order of transmission indicated by the order identification information is geometry information-first (if "geometry information-first" in S4812), the three-dimensional data decoding device decodes the NAL units based on the determination that the order of transmission of the NAL units is geometry information-first (S4813).

On the other hand, if the order of transmission indicated by the order identification information is parameter set-first (if "parameter set-first" in S4812), the three-dimensional data decoding device decodes the NAL units based on the determination that the order of transmission of the NAL units is parameter set-first (S4814).

For example, if the three-dimensional data decoding device does not decode attribute information, in step S4813, the three-dimensional data decoding device does not obtain the entire NAL units but can obtain a part of a NAL unit relating to the geometry information and decode the obtained NAL unit to obtain the geometry information.

Figure 31:
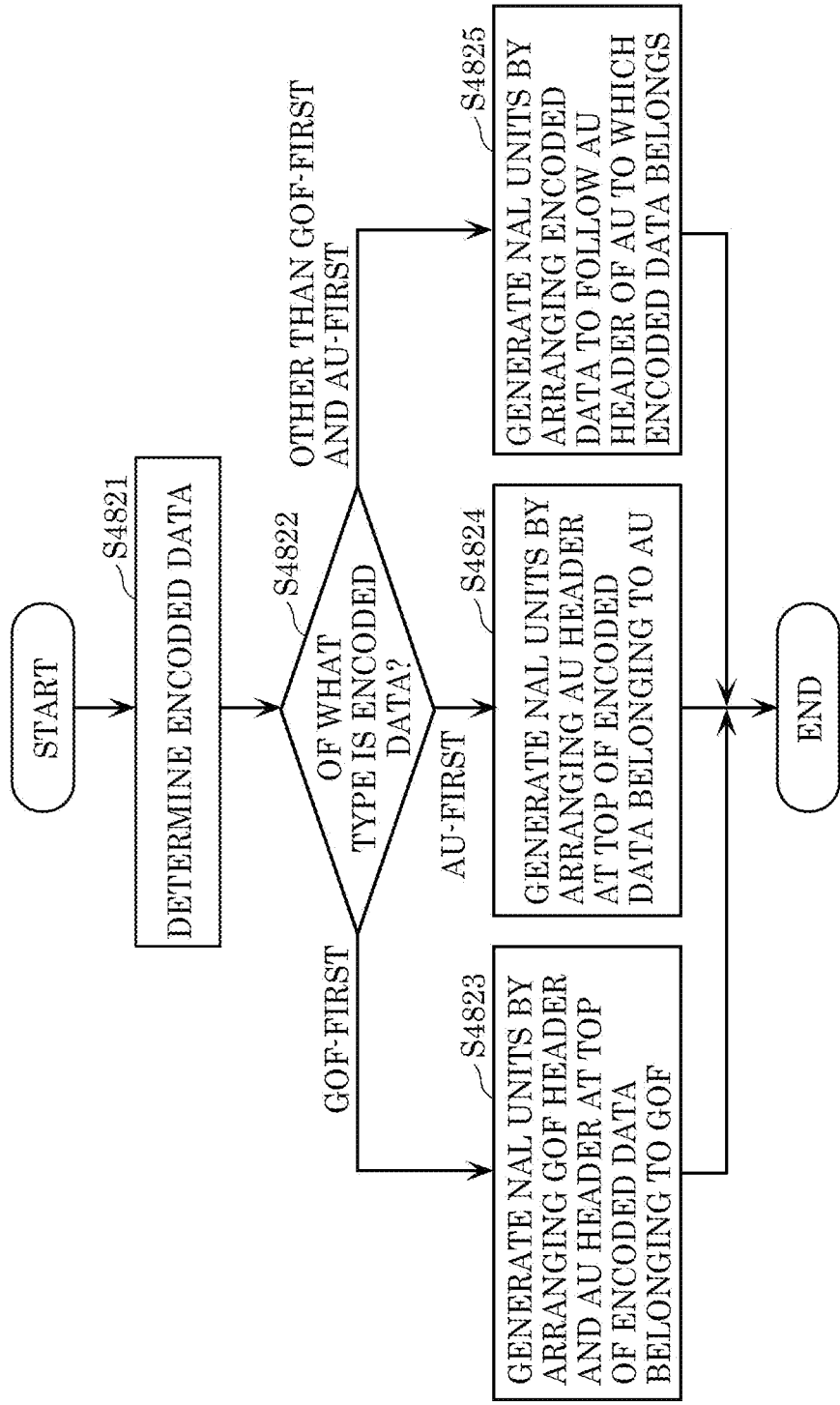
FIG. 31 is a flowchart of multiplexing processing according to Embodiment 2.

Next, a process relating to generation of an AU and a GOF will be described. FIG. 31 is a flowchart showing a process performed by the three-dimensional data encoding device (multiplexer 4802) that relates to generation of an AU and a GOF in multiplexing of NAL units.

First, the three-dimensional data encoding device determines the type of the encoded data (S4821). Specifically, the three-dimensional data encoding device determines whether the encoded data to be processed is AU-first data, GOF-first data, or other data.

If the encoded data is GOF-first data (if "GOF-first" in S4822), the three-dimensional data encoding device generates NAL units by arranging a GOF header and an AU header at the top of the encoded data belonging to the GOF (S4823).

If the encoded data is AU-first data (if "AU-first" in S4822), the three-dimensional data encoding device generates NAL units by arranging an AU header at the top of the encoded data belonging to the AU (S4824).

If the encoded data is neither GOF-first data nor AU-first data (if "other than GOF-first and AU-first" in S4822), the three-dimensional data encoding device generates NAL units by arranging the encoded data to follow the AU header of the AU to which the encoded data belongs (S4825).

Figure 32:
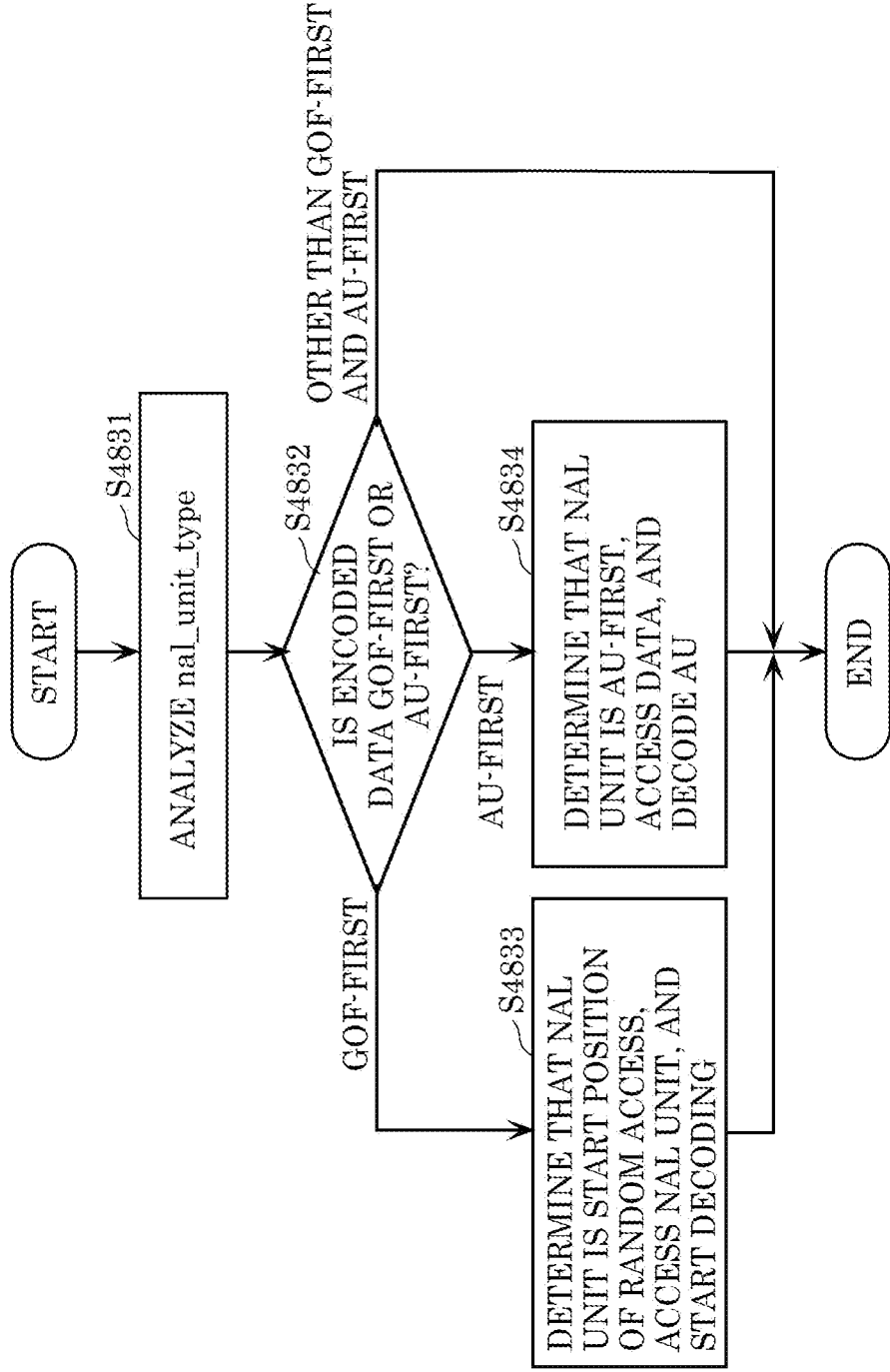
FIG. 32 is a flowchart of demultiplexing processing according to Embodiment 2.

Next, a process relating to access to an AU and a GOF will be described. FIG. 32 is a flowchart showing a process performed by the three-dimensional data decoding device that involves accessing to an AU and a GOF in demultiplexing of a NAL unit.

First, the three-dimensional data decoding device determines the type of the encoded data included in the NAL unit by analyzing nal_unit_type in the NAL unit (S4831). Specifically, the three-dimensional data decoding device determines whether the encoded data included in the NAL unit is AU-first data, GOF-first data, or other data.

If the encoded data included in the NAL unit is GOF-first data (if "GOF-first" in S4832), the three-dimensional data decoding device determines that the NAL unit is a start position of random access, accesses the NAL unit, and starts the decoding process (S4833).

If the encoded data included in the NAL unit is AU-first data (if "AU-first" in S4832), the three-dimensional data decoding device determines that the NAL unit is AU-first, accesses the data included in the NAL unit, and decodes the AU (S4834).

If the encoded data included in the NAL unit is neither GOF-first data nor AU-first data (if "other than GOF-first and AU-first" in S4832), the three-dimensional data decoding device does not process the NAL unit.

Embodiment 3

Information of a three-dimensional point cloud includes geometry information (geometry) and attribute information (attribute). Geometry information includes coordinates (x-coordinate, y-coordinate, z-coordinate) with respect to a certain point. When geometry information is encoded, a method of representing the position of each of three-dimensional points in octree representation and encoding the octree information to reduce a code amount is used instead of directly encoding the coordinates of the three-dimensional point.

On the other hand, attribute information includes information indicating, for example, color information (RGB, YUV, etc.) of each three-dimensional point, a reflectance, and a normal vector. For example, a three-dimensional data encoding device is capable of encoding attribute information using an encoding method different from a method used to encode geometry information.

In the present embodiment, a method of encoding attribute information is explained. It is to be noted that, in the present embodiment, the method is explained based on an example case using integer values as values of attribute information. For example, when each of RGB or YUV color components is of an 8-bit accuracy, the color component is an integer value in a range from 0 to 255. When a reflectance value is of 10-bit accuracy, the reflectance value is an integer in a range from 0 to 1023. It is to be noted that, when the bit accuracy of attribute information is a decimal accuracy, the three-dimensional data encoding device may multiply the value by a scale value to round it to an integer value so that the value of the attribute information becomes an integer value. It is to be noted that the three-dimensional data encoding device may add the scale value to, for example, a header of a bitstream.

As a method of encoding attribute information of a three-dimensional point, it is conceivable to calculate a predicted value of the attribute information of the three-dimensional point and encode a difference (prediction residual) between the original value of the attribute information and the predicted value. For example, when the value of attribute information at three-dimensional point p is Ap and a predicted value is Pp, the three-dimensional data encoding device encodes differential absolute value Diffp=|Ap−Pp|. In this case, when highly-accurate predicted value Pp can be generated, differential absolute value Diffp is small. Thus, for example, it is possible to reduce the code amount by entropy encoding differential absolute value Diffp using a coding table that reduces an occurrence bit count more when differential absolute value Diffp is smaller.

As a method of generating a prediction value of attribute information, it is conceivable to use attribute information of a reference three-dimensional point that is another three-dimensional point which neighbors a current three-dimensional point to be encoded. Here, a reference three-dimensional point is a three-dimensional point in a range of a predetermined distance from the current three-dimensional point. For example, when there are current three-dimensional point p=(x1, y1, z1) and three-dimensional point q=(x2, y2, z2), the three-dimensional data encoding device calculates Euclidean distance d (p, q) between three-dimensional point p and three-dimensional point q represented by (Equation A1).

[Math. 1]

$$d(p,q) = \sqrt{(x1-y1)^2 + (x2-y2)^2 + (x3-y3)^2} \quad \text{(Equation A1)}$$

The three-dimensional data encoding device determines that the position of three-dimensional point q is closer to the position of current three-dimensional point p when Euclidean distance d (p, q) is smaller than predetermined threshold value THd, and determines to use the value of the attribute information of three-dimensional point q to generate a predicted value of the attribute information of current three-dimensional point p. It is to be noted that the method of calculating the distance may be another method, and a Mahalanobis distance or the like may be used. In addition, the three-dimensional data encoding device may determine not to use, in prediction processing, any three-dimensional point outside the predetermined range of distance from the current three-dimensional point. For example, when three-dimensional point r is present, and distance d (p, r) between current three-dimensional point p and three-dimensional point r is larger than or equal to threshold value THd, the three-dimensional data encoding device may determine not to use three-dimensional point r for prediction. It is to be noted that the three-dimensional data encoding device may add the information indicating threshold value THd to, for example, a header of a bitstream.

Figure 33:
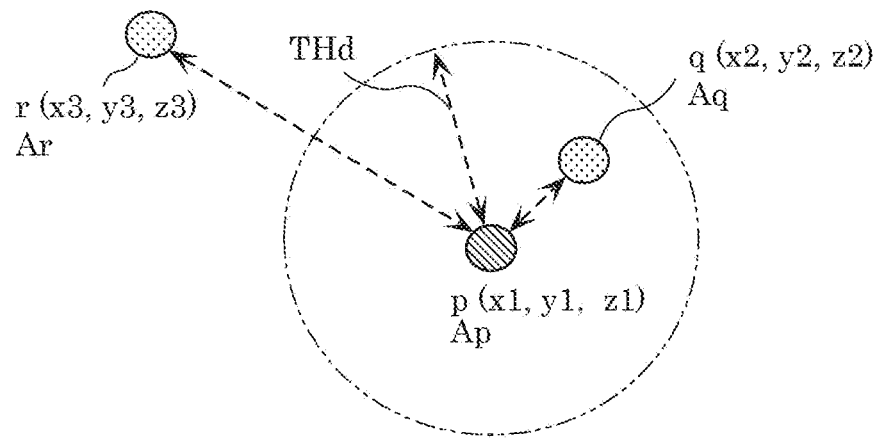
FIG. 33 is a diagram illustrating an example of three-dimensional points according to Embodiment 3.

FIG. 33 is a diagram illustrating an example of three-dimensional points. In this example, distance d (p, q) between current three-dimensional point p and three-dimensional point q is smaller than threshold value THd. Thus, the three-dimensional data encoding device determines that three-dimensional point q is a reference three-dimensional point of current three-dimensional point p, and determines to use the value of attribute information Aq of three-dimensional point q to generate predicted value Pp of attribute information Ap of current three-dimensional point p.

In contrast, distance d (p, r) between current three-dimensional point p and three-dimensional point r is larger than or equal to threshold value THd. Thus, the three-dimensional data encoding device determines that three-dimensional point r is not any reference three-dimensional point of current three-dimensional point p, and determines not to use the value of attribute information Ar of three-dimensional point r to generate predicted value Pp of attribute information Ap of current three-dimensional point p.

In addition, when encoding the attribute information of the current three-dimensional point using a predicted value, the three-dimensional data encoding device uses a three-dimensional point whose attribute information has already been encoded and decoded, as a reference three-dimensional point. Likewise, when decoding the attribute information of a current three-dimensional point to be decoded, the three-dimensional data decoding device uses a three-dimensional point whose attribute information has already been decoded, as a reference three-dimensional point. In this way, it is possible to generate the same predicted value at the time of encoding and decoding. Thus, a bitstream of the three-dimensional point generated by the encoding can be decoded correctly at the decoding side.

Figure 34:
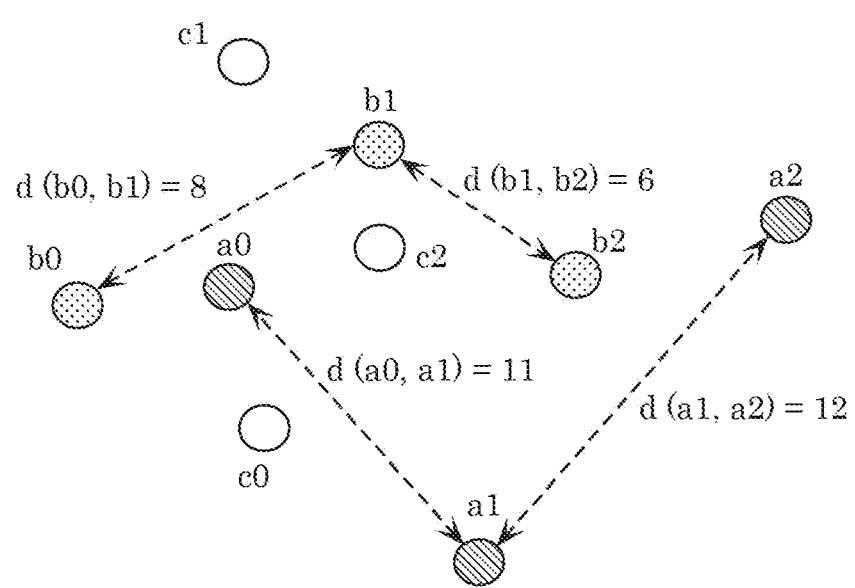
FIG. 34 is a diagram illustrating an example of setting LoDs according to Embodiment 3.

Furthermore, when encoding attribute information of each of three-dimensional points, it is conceivable to classify the three-dimensional point into one of a plurality of layers using geometry information of the three-dimensional point and then encode the attribute information. Here, each of the layers classified is referred to as a Level of Detail (LoD). A method of generating LoDs is explained with reference to FIG. 34.

First, the three-dimensional data encoding device selects initial point a0 and assigns initial point a0 to LoD0. Next, the three-dimensional data encoding device extracts point a1 distant from point a0 more than threshold value Thres_LoD[0] of LoD0 and assigns point a1 to LoD0. Next, the three-dimensional data encoding device extracts point a2 distant from point a1 more than threshold value Thres_LoD[0] of LoD0 and assigns point a2 to LoD0. In this way, the three-dimensional data encoding device configures LoD0 in such a manner that the distance between the points in LoD0 is larger than threshold value Thres_LoD[0].

Next, the three-dimensional data encoding device selects point b0 which has not yet been assigned to any LoD and assigns point b0 to LoD1. Next, the three-dimensional data encoding device extracts point b1 which is distant from point b0 more than threshold value Thres_LoD[1] of LoD1 and which has not yet been assigned to any LoD, and assigns point b1 to LoD1. Next, the three-dimensional data encoding device extracts point b2 which is distant from point b1 more than threshold value Thres_LoD[1] of LoD1 and which has not yet been assigned to any LoD, and assigns point b2 to LoD1. In this way, the three-dimensional data encoding device configures LoD1 in such a manner that the distance between the points in LoD1 is larger than threshold value Thres_LoD[1].

Figure 35:
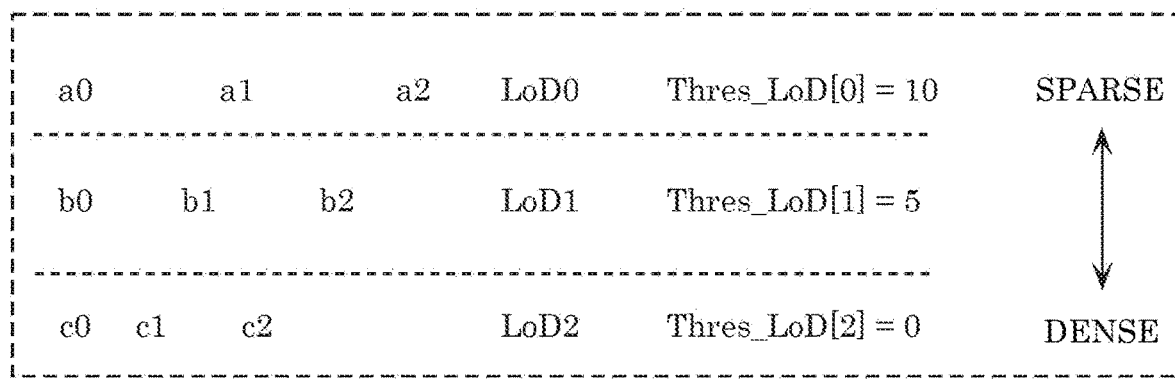
FIG. 35 is a diagram illustrating an example of setting LoDs according to Embodiment 3.

Next, the three-dimensional data encoding device selects point c0 which has not yet been assigned to any LoD and assigns point c0 to LoD2. Next, the three-dimensional data encoding device extracts point c1 which is distant from point c0 more than threshold value Thres_LoD[2] of LoD2 and which has not yet been assigned to any LoD, and assigns point c1 to LoD2. Next, the three-dimensional data encoding device extracts point c2 which is distant from point c1 more than threshold value Thres_LoD[2] of LoD2 and which has not yet been assigned to any LoD, and assigns point c2 to LoD2. In this way, the three-dimensional data encoding device configures LoD2 in such a manner that the distance between the points in LoD2 is larger than threshold value Thres_LoD[2]. For example, as illustrated in FIG. 35, threshold values Thres_LoD[0], Thres_LoD[1], and Thres_LoD[2] of respective LoDs are set.

In addition, the three-dimensional data encoding device may add the information indicating the threshold value of each LoD to, for example, a header of a bitstream. For example, in the case of the example illustrated in FIG. 35, the three-dimensional data encoding device may add threshold values Thres_LoD[0], Thres_LoD[1], and Thres_LoD[2] of respective LoDs to a header.

Alternatively, the three-dimensional data encoding device may assign all three-dimensional points which have not yet been assigned to any LoD in the lowermost-layer LoD. In this case, the three-dimensional data encoding device is capable of reducing the code amount of the header by not assigning the threshold value of the lowermost-layer LoD to the header. For example, in the case of the example illustrated in FIG. 35, the three-dimensional data encoding device assigns threshold values Thres_LoD[0] and Thres_LoD[1] to the header, and does not assign Thres_LoD[2] to the header. In this case, the three-dimensional data encoding device may estimate value 0 of Thres_LoD[2]. In addition, the three-dimensional data encoding device may add the number of LoDs to a header. In this way, the three-dimensional data encoding device is capable of determining the lowermost-layer LoD using the number of LoDs.

In addition, setting threshold values for the respective layers LoDs in such a manner that a larger threshold value is set to a higher layer makes a higher layer (layer closer to LoD0) to have a sparse point cloud (sparse) in which three-dimensional points are more distant and makes a lower layer to have a dense point cloud (dense) in which three-dimensional points are closer. It is to be noted that, in an example illustrated in FIG. 35, LoD0 is the uppermost layer.

In addition, the method of selecting an initial three-dimensional point at the time of setting each LoD may depend on an encoding order at the time of geometry information encoding. For example, the three-dimensional data encoding device configures LoD0 by selecting the three-dimensional point encoded first at the time of the geometry information encoding as initial point a0 of LoD0, and selecting point a1 and point a2 from initial point a0 as the origin. The three-dimensional data encoding device then may select the three-dimensional point whose geometry information has been encoded at the earliest time among three-dimensional points which do not belong to LoD0, as initial point b0 of LoD1. In other words, the three-dimensional data encoding device may select the three-dimensional point whose geometry information has been encoded at the earliest time among three-dimensional points which do not belong to layers (LoD0 to LoDn−1) above LoDn, as initial point n0 of LoDn. In this way, the three-dimensional data encoding device is capable of configuring the same LoD as in encoding by using, in decoding, the initial point selecting method similar to the one used in the encoding, which enables appropriate decoding of a bitstream. More specifically, the three-dimensional data encoding device selects the three-dimensional point whose geometry information has been decoded at the earliest time among three-dimensional points which do not belong to layers above LoDn, as initial point n0 of LoDn.

Hereinafter, a description is given of a method of generating the predicted value of the attribute information of each three-dimensional point using information of LoDs. For example, when encoding three-dimensional points starting with the three-dimensional points included in LoD0, the three-dimensional data encoding device generates current three-dimensional points which are included in LoD1 using encoded and decoded (hereinafter also simply referred to as "encoded") attribute information included in LoD0 and LoD1. In this way, the three-dimensional data encoding device generates a predicted value of attribute information of each three-dimensional point included in LoDn using encoded attribute information included in LoDn' (n'≤n). In other words, the three-dimensional data encoding device does not use attribute information of each of three-dimensional points included in any layer below LoDn to calculate a predicted value of attribute information of each of the three-dimensional points included in LoDn.

For example, the three-dimensional data encoding device calculates an average of attribute information of N or less three-dimensional points among encoded three-dimensional points surrounding a current three-dimensional point to be encoded, to generate a predicted value of attribute information of the current three-dimensional point. In addition, the three-dimensional data encoding device may add value N to, for example, a header of a bitstream. It is to be noted that the three-dimensional data encoding device may change value N for each three-dimensional point, and may add value N for each three-dimensional point. This enables selection of appropriate N for each three-dimensional point, which makes it possible to increase the accuracy of the predicted value. Accordingly, it is possible to reduce the prediction residual. Alternatively, the three-dimensional data encoding device may add value N to a header of a bitstream, and may fix the value indicating N in the bitstream. This eliminates the need to encode or decode value N for each three-dimensional point, which makes it possible to reduce the processing amount. In addition, the three-dimensional data encoding device may encode the values of N separately for each LoD. In this way, it is possible to increase the coding efficiency by selecting appropriate N for each LoD.

Alternatively, the three-dimensional data encoding device may calculate a predicted value of attribute information of three-dimensional point based on weighted average values of attribute information of encoded N neighbor three-dimensional points. For example, the three-dimensional data encoding device calculates weights using distance information between a current three-dimensional point and each of N neighbor three-dimensional points.

When encoding value N for each LoD, for example, the three-dimensional data encoding device sets larger value N to a higher layer LoD, and sets smaller value N to a lower layer LoD. The distance between three-dimensional points belonging to a higher layer LoD is large, there is a possibility that it is possible to increase the prediction accuracy by setting large value N, selecting a plurality of neighbor three-dimensional points, and averaging the values. Furthermore, the distance between three-dimensional points belonging to a lower layer LoD is small, it is possible to perform efficient prediction while reducing the processing amount by setting smaller value N.

Figure 36:
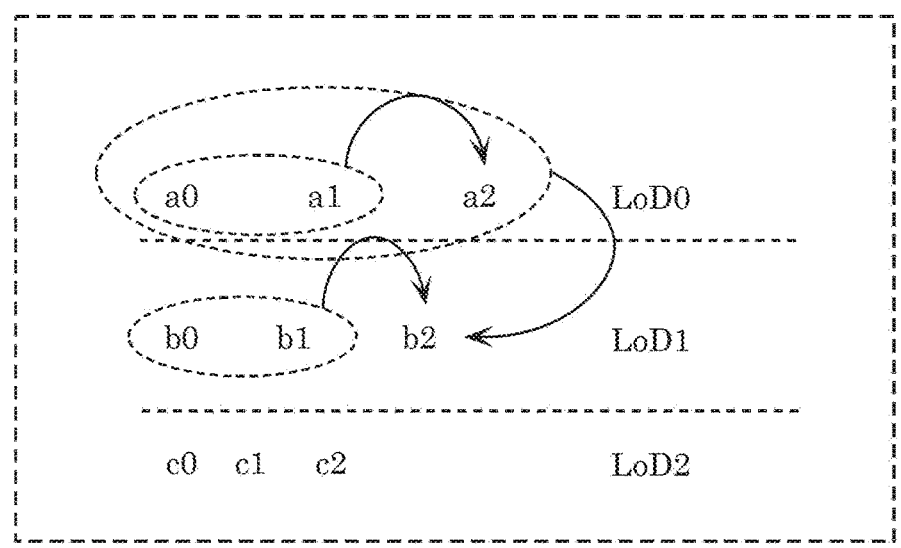
FIG. 36 is a diagram illustrating an example of attribute information to be used for predicted values according to Embodiment 3.

FIG. 36 is a diagram illustrating an example of attribute information to be used for predicted values. As described above, the predicted value of point P included in LoDN is generated using encoded neighbor point P' included in LoDN' (N'≤N). Here, neighbor point P' is selected based on the distance from point P. For example, the predicted value of attribute information of point b2 illustrated in FIG. 36 is generated using attribute information of each of points a0, a1, b0, and b1.

Neighbor points to be selected vary depending on the values of N described above. For example, in the case of N=5, a0, a1, a2, b0, and b1 are selected as neighbor points. In the case of N=4, a0, a1, a2, and b1 are selected based on distance information.

The predicted value is calculated by distance-dependent weighted averaging. For example, in the example illustrated in FIG. 36, predicted value a2$p$ of point a2 is calculated by weighted averaging of attribute information of each of point a0 and a1, as represented by (Equation A2) and (Equation A3). It is to be noted that $A_i$ is an attribute information value of ai.

[Math. 2]

$$a2p = \sum_{i=0}^{1} w_i \times A_i \quad \text{(Equation A2)}$$

$$w_i = \frac{\frac{1}{d(a2, ai)}}{\sum_{j=0}^{1} \frac{1}{d(a2, aj)}} \quad \text{(Equation A3)}$$

In addition, predicted value b2$p$ of point b2 is calculated by weighted averaging of attribute information of each of point a0, a1, a2, b0, and b1, as represented by (Equation A4) and (Equation A6). It is to be noted that $B_i$ is an attribute information value of bi.

[Math. 3]

$$b2p = \sum_{k=0}^{2} wa_i \times A_i + \sum_{k=0}^{1} wb_i \times B_i \quad \text{(Equation A4)}$$

$$wa_i = \frac{\frac{1}{d(b2, ai)}}{\sum_{j=0}^{2} \frac{1}{d(b2, aj)} + \sum_{j=0}^{1} \frac{1}{d(b2, bj)}} \quad \text{(Equation A5)}$$

$$wb_i = \frac{\frac{1}{d(b2, bi)}}{\sum_{j=0}^{2} \frac{1}{d(b2, aj)} + \sum_{j=0}^{1} \frac{1}{d(b2, bj)}} \quad \text{(Equation A6)}$$

In addition, the three-dimensional data encoding device may calculate a difference value (prediction residual) generated from the value of attribute information of a three-dimensional point and neighbor points, and may quantize the calculated prediction residual. For example, the three-dimensional data encoding device performs quantization by dividing the prediction residual by a quantization scale (also referred to as a quantization step). In this case, an error (quantization error) which may be generated by quantization reduces as the quantization scale is smaller. In the other case where the quantization scale is larger, the resulting quantization error is larger.

It is to be noted that the three-dimensional data encoding device may change the quantization scale to be used for each LoD. For example, the three-dimensional data encoding device reduces the quantization scale more for a higher layer, and increases the quantization scale more for a lower layer. The value of attribute information of a three-dimensional point belonging to a higher layer may be used as a predicted value of attribute information of a three-dimensional point belonging to a lower layer. Thus, it is possible to increase the coding efficiency by reducing the quantization scale for the higher layer to reduce the quantization error that can be generated in the higher layer and to increase the prediction accuracy of the predicted value. It is to be noted that the three-dimensional data encoding device may add the quantization scale to be used for each LoD to, for example, a header. In this way, the three-dimensional data encoding device can decode the quantization scale correctly, thereby appropriately decoding the bitstream.

In addition, the three-dimensional data encoding device may convert a signed integer value (signed quantized value) which is a quantized prediction residual into an unsigned integer value (unsigned quantized value). This eliminates the need to consider occurrence of a negative integer when entropy encoding the prediction residual. It is to be noted that the three-dimensional data encoding device does not always need to convert a signed integer value into an unsigned integer value, and, for example, that the three-dimensional data encoding device may entropy encode a sign bit separately.

The prediction residual is calculated by subtracting a prediction value from the original value. For example, as represented by (Equation A7), prediction residual a2r of point a2 is calculated by subtracting predicted value a2p of point a2 from value $A_2$ of attribute information of point a2. As represented by (Equation A8), prediction residual b2r of point b2 is calculated by subtracting predicted value b2p of point b2 from value $B_2$ of attribute information of point b2.

$$a2r = A_2 - a2p \qquad \text{(Equation A7)}$$

$$b2r = B_2 - b2p \qquad \text{(Equation A8)}$$

In addition, the prediction residual is quantized by being divided by a Quantization Step (QS). For example, quantized value a2q of point a2 is calculated according to (Equation A9). Quantized value b2q of point b2 is calculated according to (Equation A10). Here, QS_LoD0 is a QS for LoD0, and QS_LoD1 is a QS for LoD1. In other words, a QS may be changed according to an LoD.

$$a2q = a2r / QS\_LoD0 \qquad \text{(Equation A9)}$$

$$b2q = b2r / QS\_LoD1 \qquad \text{(Equation A10)}$$

In addition, the three-dimensional data encoding device converts signed integer values which are quantized values as indicated below into unsigned integer values as indicated below. When signed integer value a2q is smaller than 0, the three-dimensional data encoding device sets unsigned integer value a2u to $-1-(2 \times a2q)$. When signed integer value a2q is 0 or more, the three-dimensional data encoding device sets unsigned integer value a2u to $2 \times a2q$.

Likewise, when signed integer value b2q is smaller than 0, the three-dimensional data encoding device sets unsigned integer value b2u to $(2 \times b2q)$. When signed integer value b2q is 0 or more, the three-dimensional data encoding device sets unsigned integer value b2u to $2 \times b2q$.

In addition, the three-dimensional data encoding device may encode the quantized prediction residual (unsigned integer value) by entropy encoding. For example, the three-dimensional data encoding device may binarize the unsigned integer value and then apply binary arithmetic encoding to the binary value.

It is to be noted that, in this case, the three-dimensional data encoding device may switch binarization methods according to the value of a prediction residual. For example, when prediction residual pu is smaller than threshold value R_TH, the three-dimensional data encoding device binarizes prediction residual pu using a fixed bit count required for representing threshold value R_TH. In addition, when prediction residual pu is larger than or equal to threshold value R_TH, the three-dimensional data encoding device binarizes the binary data of threshold value R_TH and the value of (pu−R_TH), using exponential-Golomb coding, or the like.

For example, when threshold value R_TH is 63 and prediction residual pu is smaller than 63, the three-dimensional data encoding device binarizes prediction residual pu using 6 bits. When prediction residual pu is larger than or equal to 63, the three-dimensional data encoding device performs arithmetic encoding by binarizing the binary data (111111) of threshold value R_TH and (pu−63) using exponential-Golomb coding.

In a more specific example, when prediction residual pu is 32, the three-dimensional data encoding device generates 6-bit binary data (100000), and arithmetic encodes the bit sequence. In addition, when prediction residual pu is 66, the three-dimensional data encoding device generates binary data (111111) of threshold value R_TH and a bit sequence (00100) representing value 3 (66−63) using exponential-Golomb coding, and arithmetic encodes the bit sequence (111111+00100).

In this way, the three-dimensional data encoding device can perform encoding while preventing a binary bit count from increasing abruptly in the case where a prediction residual becomes large by switching binarization methods according to the magnitude of the prediction residual. It is to be noted that the three-dimensional data encoding device may add threshold value R_TH to, for example, a header of a bitstream.

For example, in the case where encoding is performed at a high bit rate, that is, when a quantization scale is small, a small quantization error and a high prediction accuracy are obtained. As a result, a prediction residual may not be large. Thus, in this case, the three-dimensional data encoding device sets large threshold value R_TH. This reduces the possibility that the binary data of threshold value R_TH is encoded, which increases the coding efficiency. In the opposite case where encoding is performed at a low bit rate, that is, when a quantization scale is large, a large quantization error and a low prediction accuracy are obtained. As a result, a prediction residual may be large. Thus, in this case, the three-dimensional data encoding device sets small threshold value R_TH. In this way, it is possible to prevent abrupt increase in bit length of binary data.

In addition, the three-dimensional data encoding device may switch threshold value R_TH for each LoD, and may add threshold value R_TH for each LoD to, for example, a header. In other words, the three-dimensional data encoding device may switch binarization methods for each LoD. For example, since distances between three-dimensional points are large in a higher layer, a prediction accuracy is low, which may increase a prediction residual. Thus, the three-dimensional data encoding device prevents abrupt increase in bit length of binary data by setting small threshold value R_TH to the higher layer. In addition, since distances between three-dimensional points are small in a lower layer, a prediction accuracy is high, which may reduce a prediction residual. Thus, the three-dimensional data encoding device increases the coding efficiency by setting large threshold value R_TH to the lower layer.

FIG. 37 is a diagram indicating examples of exponential-Golomb codes. The diagram indicates the relationships between pre-binarization values (non-binary values) and post-binarization bits (codes). It is to be noted that 0 and 1 indicated in FIG. 37 may be inverted.

The three-dimensional data encoding device applies arithmetic encoding to the binary data of prediction residuals. In this way, the coding efficiency can be increased. It is to be noted that, in the application of the arithmetic encoding, there is a possibility that occurrence probability tendencies of 0 and 1 in each bit vary, in binary data, between an n-bit code which is a part binarized by n bits and a remaining code which is a part binarized using exponential-Golomb coding. Thus, the three-dimensional data encoding device may switch methods of applying arithmetic encoding between the n-bit code and the remaining code.

For example, the three-dimensional data encoding device performs arithmetic encoding on the n-bit code using one or more coding tables (probability tables) different for each bit.

At this time, the three-dimensional data encoding device may change the number of coding tables to be used for each bit. For example, the three-dimensional data encoding device performs arithmetic encoding using one coding table for first bit b0 in an n-bit code. The three-dimensional data encoding device uses two coding tables for the next bit b1. The three-dimensional data encoding device switches coding tables to be used for arithmetic encoding of bit b1 according to the value (0 or 1) of b0. Likewise, the three-dimensional data encoding device uses four coding tables for the next bit b2. The three-dimensional data encoding device switches coding tables to be used for arithmetic encoding of bit b2 according to the values (in a range from 0 to 3) of b0 and b1.

In this way, the three-dimensional data encoding device uses $2^{n-1}$ coding tables when arithmetic encoding each bit bn−1 in n-bit code. The three-dimensional data encoding device switches coding tables to be used according to the values (occurrence patterns) of bits before bn−1. In this way, the three-dimensional data encoding device can use coding tables appropriate for each bit, and thus can increase the coding efficiency.

It is to be noted that the three-dimensional data encoding device may reduce the number of coding tables to be used for each bit. For example, the three-dimensional data encoding device may switch $2^m$ coding tables according to the values (occurrence patterns) of m bits (m<n−1) before bn−1 when arithmetic encoding each bit bn−1. In this way, it is possible to increase the coding efficiency while reducing the number of coding tables to be used for each bit. It is to be noted that the three-dimensional data encoding device may update the occurrence probabilities of 0 and 1 in each coding table according to the values of binary data occurred actually. In addition, the three-dimensional data encoding device may fix the occurrence probabilities of 0 and 1 in coding tables for some bit(s). In this way, it is possible to reduce the number of updates of occurrence probabilities, and thus to reduce the processing amount.

For example, when an n-bit code is b0, b1, b2, ..., bn−1, the coding table for b0 is one table (CTb0). Coding tables for b1 are two tables (CTb10 and CTb11). Coding tables to be used are switched according to the value (0 or 1) of b0. Coding tables for b2 are four tables (CTb20, CTb21, CTb22, and CTb23). Coding tables to be used are switched according to the values (in the range from 0 to 3) of b0 and b1. Coding tables for bn−1 are $2^{n-1}$ tables (CTbn0, CTbn1, ..., CTbn ($2^{n-1}-1$)). Coding tables to be used are switched according to the values (in a range from 0 to $2^{n-1}-1$) of b0, b1, ..., bn−2.

It is to be noted that the three-dimensional data encoding device may apply, to an n-bit code, arithmetic encoding (m=$2^n$) by m-ary that sets the value in the range from 0 to $2^n-1$ without binarization. When the three-dimensional data encoding device arithmetic encodes an n-bit code by an m-ary, the three-dimensional data decoding device may reconstruct the n-bit code by arithmetic decoding the m-ary.

FIG. 38 is a diagram for illustrating processing in the case where remaining codes are exponential-Golomb codes. As indicated in FIG. 38, each remaining code which is a part binarized using exponential-Golomb coding includes a prefix and a suffix. For example, the three-dimensional data encoding device switches coding tables between the prefix and the suffix. In other words, the three-dimensional data encoding device arithmetic encodes each of bits included in the prefix using coding tables for the prefix, and arithmetic encodes each of bits included in the suffix using coding tables for the suffix.

It is to be noted that the three-dimensional data encoding device may update the occurrence probabilities of 0 and 1 in each coding table according to the values of binary data occurred actually. In addition, the three-dimensional data encoding device may fix the occurrence probabilities of 0 and 1 in one of coding tables. In this way, it is possible to reduce the number of updates of occurrence probabilities, and thus to reduce the processing amount. For example, the three-dimensional data encoding device may update the occurrence probabilities for the prefix, and may fix the occurrence probabilities for the suffix.

In addition, the three-dimensional data encoding device decodes a quantized prediction residual by inverse quantization and reconstruction, and uses a decoded value which is the decoded prediction residual for prediction of a current three-dimensional point to be encoded and the following three-dimensional point(s). More specifically, the three-dimensional data encoding device calculates an inverse quantized value by multiplying the quantized prediction residual (quantized value) with a quantization scale, and adds the inverse quantized value and a prediction value to obtain the decoded value (reconstructed value).

For example, quantized value a2$iq$ of point a2 is calculated using quantized value a2$q$ of point a2 according to (Equation A11). Inverse quantized value b2$iq$ of point b2$q$ is calculated using quantized value b2$q$ of point b2 according to (Equation A12). Here, QS_LoD0 is a QS for LoD0, and QS_LoD1 is a QS for LoD1. In other words, a QS may be changed according to an LoD.

$$a2iq = a2q \times QS\_LoD0 \quad \text{(Equation A11)}$$

$$b2iq = b2q \times QS\_LoD1 \quad \text{(Equation A12)}$$

For example, as represented by (Equation A13), decoded value a2$rec$ of point a2 is calculated by adding inverse quantization value a2$iq$ of point a2 to predicted value a2$p$ of point a2. As represented by (Equation A14), decoded value b2$rec$ of point b2 is calculated by adding inverse quantized value b2$iq$ of point b2 to predicted value b2$p$ of point b2.

$$a2rec = a2iq + a2p \quad \text{(Equation A13)}$$

$$b2rec = b2iq + b2p \quad \text{(Equation A14)}$$

Hereinafter, a syntax example of a bitstream according to the present embodiment is described. FIG. 39 is a diagram indicating the syntax example of an attribute header (attribute_header) according to the present embodiment. The attribute header is header information of attribute information. As indicated in FIG. 39, the attribute header includes the number of layers information (NumLoD), the number of three-dimensional points information (NumOfPoint[i]), a layer threshold value (Thres_LoD[i]), the number of neighbor points information (NumNeighborPoint[i]), a prediction threshold value (THd[i]), a quantization scale (QS[i]), and a binarization threshold value (R_TH[i]).

The number of layers information (NumLoD) indicates the number of LoDs to be used.

The number of three-dimensional points information (NumOfPoint[i]) indicates the number of three-dimensional points belonging to layer i. It is to be noted that the three-dimensional data encoding device may add, to another header, the number of three-dimensional points information indicating the total number of three-dimensional points. In this case, the three-dimensional data encoding device does not need to add, to a header, NumOfPoint[NumLoD−1] indicating the number of three-dimensional points belonging to the lowermost layer. In this case, the three-dimensional data decoding device is capable of calculating NumOfPoint [NumLoD−1] according to (Equation A15). In this case, it is possible to reduce the code amount of the header.

[Math. 4]

$$NumOfPoint[NumLoD-1] = \\ AllNumOfPoint - \sum_{j=0}^{NumLoD-2} NumOfPoint[j]$$

(Equation A15)

The layer threshold value (Thres_LoD[i]) is a threshold value to be used to set layer i. The three-dimensional data encoding device and the three-dimensional data decoding device configure LoDi in such a manner that the distance between points in LoDi becomes larger than threshold value Thres_LoD[i]. The three-dimensional data encoding device does not need to add the value of Thres_LoD [NumLoD−1] (lowermost layer) to a header. In this case, the three-dimensional data decoding device may estimate 0 as the value of Thres_LoD [NumLoD−1]. In this case, it is possible to reduce the code amount of the header.

The number of neighbor points information (NumNeighborPoint[i]) indicates the upper limit value of the number of neighbor points to be used to generate a predicted value of a three-dimensional point belonging to layer i. The three-dimensional data encoding device may calculate a predicted value using the number of neighbor points M when the number of neighbor points M is smaller than NumNeighborPoint[i] (M<NumNeighborPoint[i]). Furthermore, when there is no need to differentiate the values of NumNeighborPoint[i] for respective LoDs, the three-dimensional data encoding device may add a piece of the number of neighbor points information (NumNeighborPoint) to be used in all LoDs to a header.

The prediction threshold value (THd[i]) indicates the upper limit value of the distance between a current three-dimensional point to be encoded or decoded in layer i and each of neighbor three-dimensional points to be used to predict the current three-dimensional point. The three-dimensional data encoding device and the three-dimensional data decoding device do not use, for prediction, any three-dimensional point distant from the current three-dimensional point over THd[i]. It is to be noted that, when there is no need to differentiate the values of THd[i] for respective LoDs, the three-dimensional data encoding device may add a single prediction threshold value (THd) to be used in all LoDs to a header.

The quantization scale (QS[i]) indicates a quantization scale to be used for quantization and inverse quantization in layer i.

The binarization threshold value (R_TH[i]) is a threshold value for switching binarization methods of prediction residuals of three-dimensional points belonging to layer i. For example, the three-dimensional data encoding device binarizes prediction residual pu using a fixed bit count when a prediction residual is smaller than threshold value R_TH, and binarizes the binary data of threshold value R_TH and the value of (pu−R_TH) using exponential-Golomb coding when a prediction residual is larger than or equal to threshold value R_TH. It is to be noted that, when there is no need to switch the values of R_TH[i] between LoDs, the three-dimensional data encoding device may add a single binarization threshold value (R_TH) to be used in all LoDs to a header.

It is to be noted that R_TH[i] may be the maximum value which can be represented by n bits. For example, R_TH is 63 in the case of 6 bits, and R_TH is 255 in the case of 8 bits. Alternatively, the three-dimensional data encoding device may encode a bit count instead of encoding the maximum value which can be represented by n bits as a binarization threshold value. For example, the three-dimensional data encoding device may add value 6 in the case of R_TH[i]=63 to a header, and may add value 8 in the case of R_TH[i]=255 to a header. Alternatively, the three-dimensional data encoding device may define the minimum value (minimum bit count) representing R_TH[i], and add a relative bit count from the minimum value to a header. For example, the three-dimensional data encoding device may add value 0 to a header when R_TH[i]=63 is satisfied and the minimum bit count is 6, and may add value 2 to a header when R_TH[i]=255 is satisfied and the minimum bit count is 6.

Alternatively, the three-dimensional data encoding device may entropy encode at least one of NumLoD, Thres_LoD[i], NumNeighborPoint[i], THd[i], QS[i], and R_TH[i], and add the entropy encoded one to a header. For example, the three-dimensional data encoding device may binarize each value and perform arithmetic encoding on the binary value. In addition, the three-dimensional data encoding device may encode each value using a fixed length in order to reduce the processing amount.

Alternatively, the three-dimensional data encoding device does not always need to add at least one of NumLoD, Thres_LoD[i], NumNeighborPoint[i], THd[i], QS[i], and R_TH[i] to a header. For example, at least one of these values may be defined by a profile or a level in a standard, or the like. In this way, it is possible to reduce the bit amount of the header.

FIG. 40 is a diagram indicating the syntax example of attribute data (attribute_data) according to the present embodiment. The attribute data includes encoded data of the attribute information of a plurality of three-dimensional points. As indicated in FIG. 40, the attribute data includes an n-bit code and a remaining code.

The n-bit code is encoded data of a prediction residual of a value of attribute information or a part of the encoded data. The bit length of the n-bit code depends on value R_TH[i]. For example, the bit length of the n-bit code is 6 bits when the value indicated by R_TH[i] is 63, the bit length of the n-bit code is 8 bits when the value indicated by R_TH[i] is 255.

The remaining code is encoded data encoded using exponential-Golomb coding among encoded data of the prediction residual of the value of the attribute information. The remaining code is encoded or decoded when the value of the n-bit code is equal to R_TH[i]. The three-dimensional data decoding device decodes the prediction residual by adding the value of the n-bit code and the value of the remaining code. It is to be noted that the remaining code does not always need to be encoded or decoded when the value of the n-bit code is not equal to R_TH[i].

Figure 41:
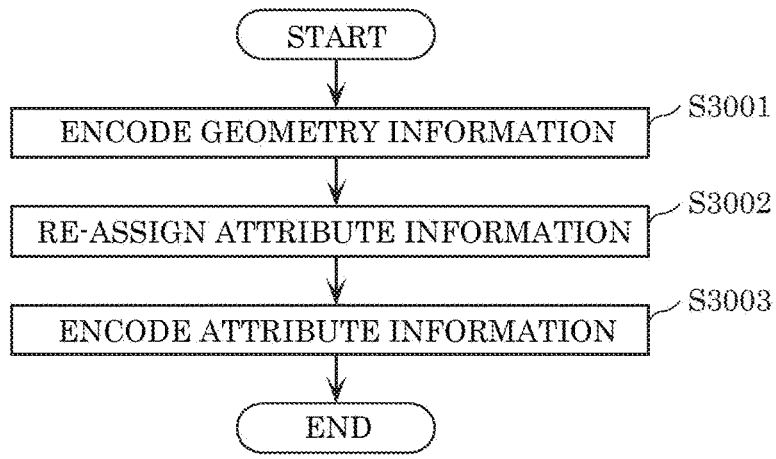
FIG. 41 is a flowchart of a three-dimensional data encoding process according to Embodiment 3.

Hereinafter, a description is given of a flow of processing in the three-dimensional data encoding device. FIG. 41 is a flowchart of a three-dimensional data encoding process performed by the three-dimensional data encoding device.

First, the three-dimensional data encoding device encodes geometry information (geometry) (S3001). For example, the three-dimensional data encoding is performed using octree representation.

When the positions of three-dimensional points changed by quantization, etc, after the encoding of the geometry information, the three-dimensional data encoding device re-assigns attribute information of the original three-dimensional points to the post-change three-dimensional points (S3002). For example, the three-dimensional data encoding device interpolates values of attribute information according to the amounts of change in position to re-assign the attribute information. For example, the three-dimensional data encoding device detects pre-change N three-dimensional points closer to the post-change three-dimensional positions, and performs weighted averaging of the values of attribute information of the N three-dimensional points. For example, the three-dimensional data encoding device determines weights based on distances from the post-change three-dimensional positions to the respective N three-dimensional positions in weighted averaging. The three-dimensional data encoding device then determines the values obtained through the weighted averaging to be the values of the attribute information of the post-change three-dimensional points. When two or more of the three-dimensional points are changed to the same three-dimensional position through quantization, etc., the three-dimensional data encoding device may assign the average value of the attribute information of the pre-change two or more three-dimensional points as the values of the attribute information of the post-change three-dimensional points.

Next, the three-dimensional data encoding device encodes the attribute information (attribute) re-assigned (S3003). For example, when encoding a plurality of kinds of attribute information, the three-dimensional data encoding device may encode the plurality of kinds of attribute information in order. For example, when encoding colors and reflectances as attribute information, the three-dimensional data encoding device may generate a bitstream added with the color encoding results and the reflectance encoding results after the color encoding results. It is to be noted that the order of the plurality of encoding results of attribute information to be added to a bitstream is not limited to the order, and may be any order.

Alternatively, the three-dimensional data encoding device may add, to a header for example, information indicating the start location of encoded data of each attribute information in a bitstream. In this way, the three-dimensional data decoding device is capable of selectively decoding attribute information required to be decoded, and thus is capable of skipping the decoding process of the attribute information not required to be decoded. Accordingly, it is possible to reduce the amount of processing by the three-dimensional data decoding device. Alternatively, the three-dimensional data encoding device may encode a plurality of kinds of attribute information in parallel, and may integrate the encoding results into a single bitstream. In this way, the three-dimensional data encoding device is capable of encoding the plurality of kinds of attribute information at high speed.

Figure 42:
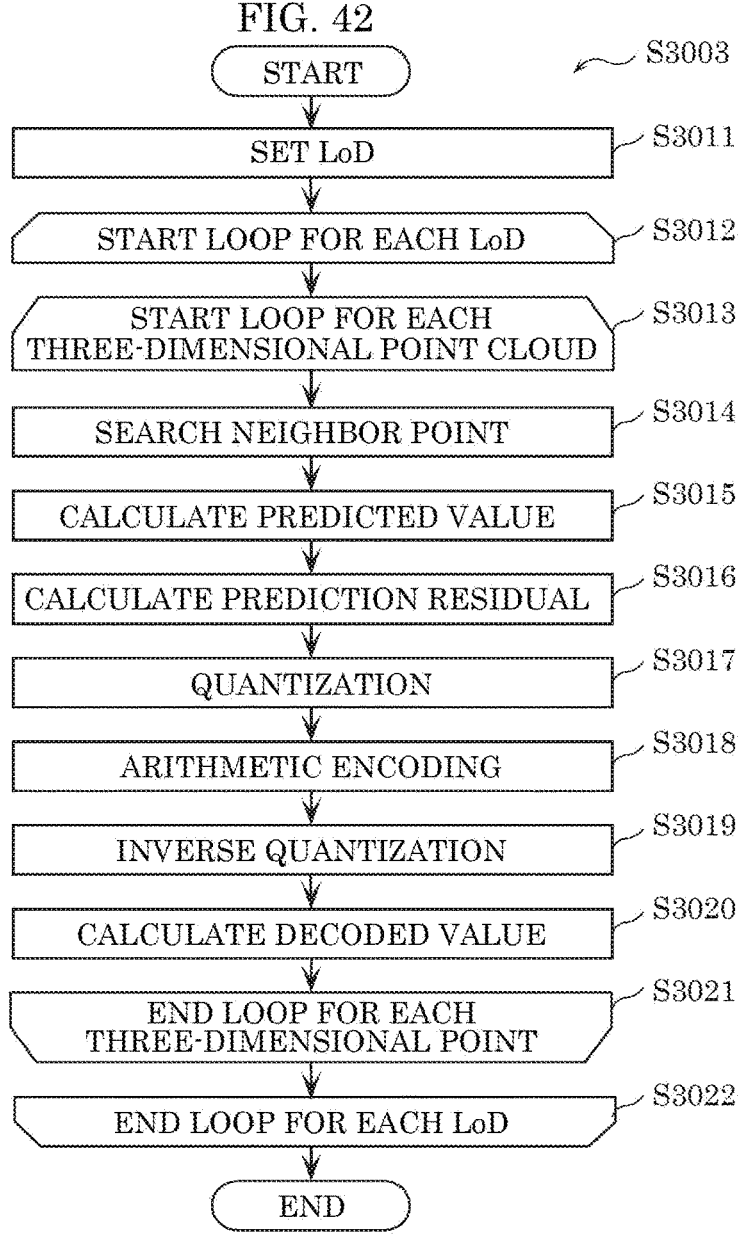
FIG. 42 is a flowchart of an attribute information encoding process according to Embodiment 3.

FIG. 42 is a flowchart of an attribute information encoding process (S3003). First, the three-dimensional data encoding device sets LoDs (S3011). In other words, the three-dimensional data encoding device assigns each of three-dimensional points to any one of the plurality of LoDs.

Next, the three-dimensional data encoding device starts a loop for each LoD (S3012). In other words, the three-dimensional data encoding device iteratively performs the processes of Steps from S3013 to S3021 for each LoD.

Next, the three-dimensional data encoding device starts a loop for each three-dimensional point (S3013). In other words, the three-dimensional data encoding device iteratively performs the processes of Steps from S3014 to S3020 for each three-dimensional point.

First, the three-dimensional data encoding device searches a plurality of neighbor points which are three-dimensional points present in the neighborhood of a current three-dimensional point to be processed and are to be used to calculate a predicted value of the current three-dimensional point (S3014). Next, the three-dimensional data encoding device calculates the weighted average of the values of attribute information of the plurality of neighbor points, and sets the resulting value to predicted value P (S3015). Next, the three-dimensional data encoding device calculates a prediction residual which is the difference between the attribute information of the current three-dimensional point and the predicted value (S3016). Next, the three-dimensional data encoding device quantizes the prediction residual to calculate a quantized value (S3017). Next, the three-dimensional data encoding device arithmetic encodes the quantized value (S3018).

Next, the three-dimensional data encoding device inverse quantizes the quantized value to calculate an inverse quantized value (S3019). Next, the three-dimensional data encoding device adds a prediction value to the inverse quantized value to generate a decoded value (S3020). Next, the three-dimensional data encoding device ends the loop for each three-dimensional point (S3021). Next, the three-dimensional data encoding device ends the loop for each LoD (S3022).

Hereinafter, a description is given of a three-dimensional data decoding process in the three-dimensional data decoding device which decodes a bitstream generated by the three-dimensional data encoding device.

The three-dimensional data decoding device generates decoded binary data by arithmetic decoding the binary data of the attribute information in the bitstream generated by the three-dimensional data encoding device, according to the method similar to the one performed by the three-dimensional data encoding device. It is to be noted that when methods of applying arithmetic encoding are switched between the part (n-bit code) binarized using n bits and the part (remaining code) binarized using exponential-Golomb coding in the three-dimensional data encoding device, the three-dimensional data decoding device performs decoding in conformity with the arithmetic encoding, when applying arithmetic decoding.

For example, the three-dimensional data decoding device performs arithmetic decoding using coding tables (decoding tables) different for each bit in the arithmetic decoding of the n-bit code. At this time, the three-dimensional data decoding device may change the number of coding tables to be used for each bit. For example, the three-dimensional data decoding device performs arithmetic decoding using one coding table for first bit b0 in the n-bit code. The three-dimensional data decoding device uses two coding tables for the next bit b1. The three-dimensional data decoding device switches coding tables to be used for arithmetic decoding of bit b1 according to the value (0 or 1) of b0. Likewise, the three-dimensional data decoding device uses four coding tables for the next bit b2. The three-dimensional data decoding device switches coding tables to be used for arithmetic decoding of bit b2 according to the values (in the range from 0 to 3) of b0 and b1.

In this way, the three-dimensional data decoding device uses $2^{n-1}$ coding tables when arithmetic decoding each bit bn−1 in the n-bit code. The three-dimensional data decoding device switches coding tables to be used according to the values (occurrence patterns) of bits before bn−1. In this way, the three-dimensional data decoding device is capable of appropriately decoding a bitstream encoded at an increased coding efficiency using the coding tables appropriate for each bit.

It is to be noted that the three-dimensional data decoding device may reduce the number of coding tables to be used for each bit. For example, the three-dimensional data decoding device may switch $2^m$ coding tables according to the values (occurrence patterns) of m bits (m<n−1) before bn−1 when arithmetic decoding each bit bn−1. In this way, the three-dimensional data decoding device is capable of appropriately decoding the bitstream encoded at the increased coding efficiency while reducing the number of coding tables to be used for each bit. It is to be noted that the three-dimensional data decoding device may update the occurrence probabilities of 0 and 1 in each coding table according to the values of binary data occurred actually. In addition, the three-dimensional data decoding device may fix the occurrence probabilities of 0 and 1 in coding tables for some bit(s). In this way, it is possible to reduce the number of updates of occurrence probabilities, and thus to reduce the processing amount.

For example, when an n-bit code is b0, b1, b2, . . . , bn−1, the coding table for b0 is one (CTb0). Coding tables for b1 are two tables (CTb10 and CTb11). Coding tables to be used are switched according to the value (0 or 1) of b0. Coding tables for b2 are four tables (CTb20, CTb21, CTb22, and CTb23). Coding tables to be used according to the values (in the range from 0 to 3) of b0 and b1. Coding tables for bn−1 are $2^{n-1}$ tables (CTbn0, CTbn1, . . . , CTbn ($2^{n-1}$−1)). Coding tables to be used are switched according to the values (in the range from 0 to $2^{n-1}$−1) of b0, b1, . . . , bn−2.

FIG. 43 is a diagram for illustrating processing in the case where remaining codes are exponential-Golomb codes. As indicated in FIG. 43, the part (remaining part) binarized and encoded by the three-dimensional data encoding device using exponential-Golomb coding includes a prefix and a suffix. For example, the three-dimensional data decoding device switches coding tables between the prefix and the suffix. In other words, the three-dimensional data decoding device arithmetic decodes each of bits included in the prefix using coding tables for the prefix, and arithmetic decodes each of bits included in the suffix using coding tables for the suffix.

It is to be noted that the three-dimensional data decoding device may update the occurrence probabilities of 0 and 1 in each coding table according to the values of binary data occurred at the time of decoding. In addition, the three-dimensional data decoding device may fix the occurrence probabilities of 0 and 1 in one of coding tables. In this way, it is possible to reduce the number of updates of occurrence probabilities, and thus to reduce the processing amount. For example, the three-dimensional data decoding device may update the occurrence probabilities for the prefix, and may fix the occurrence probabilities for the suffix.

Furthermore, the three-dimensional data decoding device decodes the quantized prediction residual (unsigned integer value) by debinarizing the binary data of the prediction residual arithmetic decoded according to a method in conformity with the encoding method used by the three-dimensional data encoding device. The three-dimensional data decoding device first arithmetic decodes the binary data of an n-bit code to calculate a value of the n-bit code. Next, the three-dimensional data decoding device compares the value of the n-bit code with threshold value R_TH.

In the case where the value of the n-bit code and threshold value R_TH match, the three-dimensional data decoding device determines that a bit encoded using exponential-Golomb coding is present next, and arithmetic decodes the remaining code which is the binary data encoded using exponential-Golomb coding. The three-dimensional data decoding device then calculates, from the decoded remaining code, a value of the remaining code using a reverse lookup table indicating the relationship between the remaining code and the value. FIG. 44 is a diagram indicating an example of a reverse lookup table indicating relationships between remaining codes and the values thereof. Next, the three-dimensional data decoding device adds the obtained value of the remaining code to R_TH, thereby obtaining a debinarized quantized prediction residual.

In the opposite case where the value of the n-bit code and threshold value R_TH do not match (the value of the n-bit code is smaller than value R_TH), the three-dimensional data decoding device determines the value of the n-bit code to be the debinarized quantized prediction residual as it is. In this way, the three-dimensional data decoding device is capable of appropriately decoding the bitstream generated while switching the binarization methods according to the values of the prediction residuals by the three-dimensional data encoding device.

It is to be noted that, when threshold value R_TH is added to, for example, a header of a bitstream, the three-dimensional data decoding device may decode threshold value R_TH from the header, and may switch decoding methods using decoded threshold value R_TH. When threshold value R_TH is added to, for example, a header for each LoD, the three-dimensional data decoding device switch decoding methods using threshold value R_TH decoded for each LoD.

For example, when threshold value R_TH is 63 and the value of the decoded n-bit code is 63, the three-dimensional data decoding device decodes the remaining code using exponential-Golomb coding, thereby obtaining the value of the remaining code. For example, in the example indicated in FIG. 44, the remaining code is 00100, and 3 is obtained as the value of the remaining code. Next, the three-dimensional data decoding device adds 63 that is threshold value R_TH and 3 that is the value of the remaining code, thereby obtaining 66 that is the value of the prediction residual.

In addition, when the value of the decoded n-bit code is 32, the three-dimensional data decoding device sets 32 that is the value of the n-bit code to the value of the prediction residual.

In addition, the three-dimensional data decoding device converts the decoded quantized prediction residual, for example, from an unsigned integer value to a signed integer value, through processing inverse to the processing in the three-dimensional data encoding device. In this way, when entropy decoding the prediction residual, the three-dimensional data decoding device is capable of appropriately decoding the bitstream generated without considering occurrence of a negative integer. It is to be noted that the three-dimensional data decoding device does not always need to convert an unsigned integer value to a signed integer value, and that, for example, the three-dimensional data decoding device may decode a sign bit when decoding a bitstream generated by separately entropy encoding the sign bit.

The three-dimensional data decoding device performs decoding by inverse quantizing and reconstructing the quantized prediction residual after being converted to the signed integer value, to obtain a decoded value. The three-dimensional data decoding device uses the generated decoded value for prediction of a current three-dimensional point to be decoded and the following three-dimensional point(s). More specifically, the three-dimensional data decoding device multiplies the quantized prediction residual by a decoded quantization scale to calculate an inverse quantized value and adds the inverse quantized value and the predicted value to obtain the decoded value.

The decoded unsigned integer value (unsigned quantized value) is converted into a signed integer value through the processing indicated below. When the least significant bit (LSB) of decoded unsigned integer value a2$u$ is 1, the three-dimensional data decoding device sets signed integer value a2$q$ to −((a2$u$+1)>>1). When the LSB of unsigned integer value a2$u$ is not 1, the three-dimensional data decoding device sets signed integer value a2$q$ to ((a2$u$>>1).

Likewise, when an LSB of decoded unsigned integer value b2$u$ is 1, the three-dimensional data decoding device sets signed integer value b2$q$ to −((b2$u$+1)>>1). When the LSB of decoded unsigned integer value n2$u$ is not 1, the three-dimensional data decoding device sets signed integer value b2$q$ to ((b2$u$>>1).

Details of the inverse quantization and reconstruction processing by the three-dimensional data decoding device are similar to the inverse quantization and reconstruction processing in the three-dimensional data encoding device.

Figure 45:
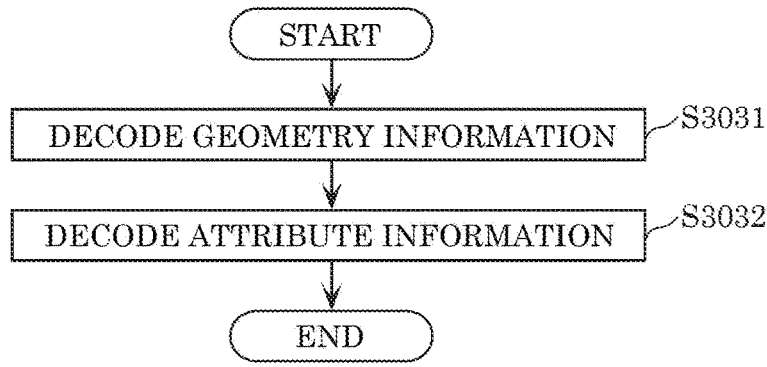
FIG. 45 is a flowchart of a three-dimensional data decoding process according to Embodiment 3.

Hereinafter, a description is given of a flow of processing in the three-dimensional data decoding device. FIG. 45 is a flowchart of a three-dimensional data decoding process performed by the three-dimensional data decoding device. First, the three-dimensional data decoding device decodes geometry information (geometry) from a bitstream (S3031). For example, the three-dimensional data decoding device performs decoding using octree representation.

Next, the three-dimensional data decoding device decodes attribute information (attribute) from the bitstream (S3032). For example, when decoding a plurality of kinds of attribute information, the three-dimensional data decoding device may decode the plurality of kinds of attribute information in order. For example, when decoding colors and reflectances as attribute information, the three-dimensional data decoding device decodes the color encoding results and the reflectance encoding results in order of assignment in the bitstream. For example, when the reflectance encoding results are added after the color encoding results in a bitstream, the three-dimensional data decoding device decodes the color encoding results, and then decodes the reflectance encoding results. It is to be noted that the three-dimensional data decoding device may decode, in any order, the encoding results of the attribute information added to the bitstream.

Alternatively, the three-dimensional data encoding device may add, to a header for example, information indicating the start location of encoded data of each attribute information in a bitstream. In this way, the three-dimensional data decoding device is capable of selectively decoding attribute information required to be decoded, and thus is capable of skipping the decoding process of the attribute information not required to be decoded. Accordingly, it is possible to reduce the amount of processing by the three-dimensional data decoding device. In addition, the three-dimensional data decoding device may decode a plurality of kinds of attribute information in parallel, and may integrate the decoding results into a single three-dimensional point cloud. In this way, the three-dimensional data decoding device is capable of decoding the plurality of kinds of attribute information at high speed.

Figure 46:
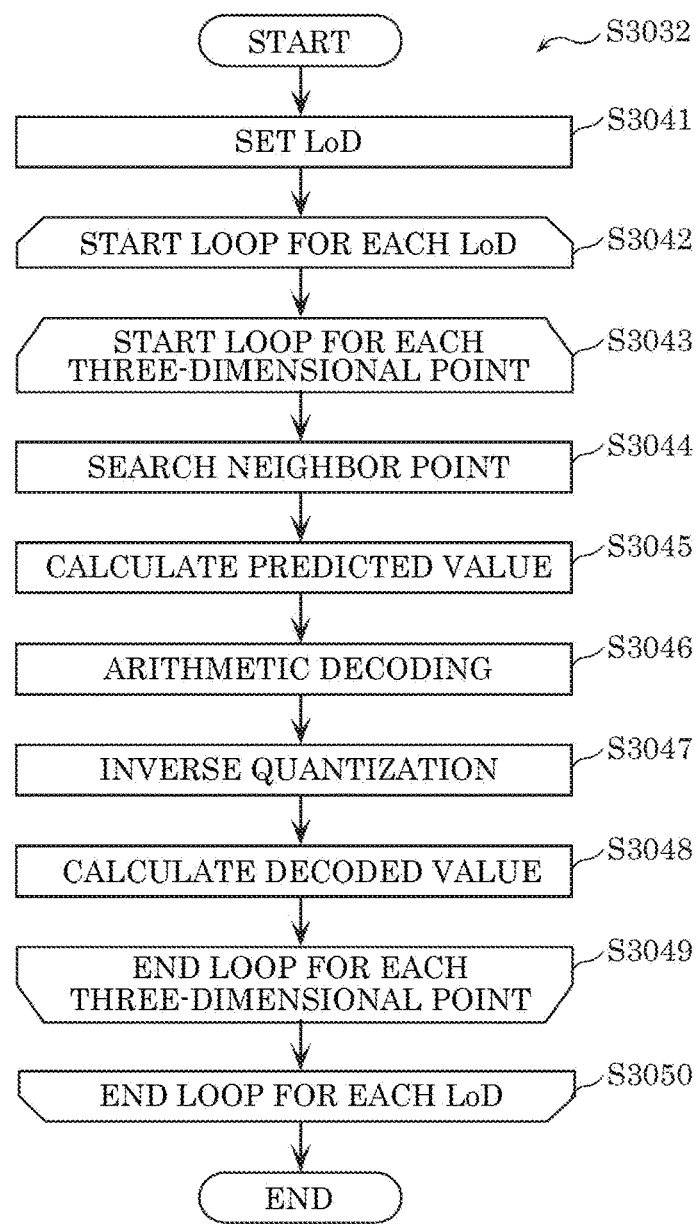
FIG. 46 is a flowchart of an attribute information decoding process according to Embodiment 3.

FIG. 46 is a flowchart of an attribute information decoding process (S3032). First, the three-dimensional data decoding device sets LoDs (S3041). In other words, the three-dimensional data decoding device assigns each of three-dimensional points having the decoded geometry information to any one of the plurality of LoDs. For example, this assignment method is the same as the assignment method used in the three-dimensional data encoding device.

Next, the three-dimensional data decoding device starts a loop for each LoD (S3042). In other words, the three-dimensional data decoding device iteratively performs the processes of Steps from S3043 to S3049 for each LoD.

Next, the three-dimensional data decoding device starts a loop for each three-dimensional point (S3043). In other words, the three-dimensional data decoding device iteratively performs the processes of Steps from S3044 to S3048 for each three-dimensional point.

First, the three-dimensional data decoding device searches a plurality of neighbor points which are three-dimensional points present in the neighborhood of a current three-dimensional point to be processed and are to be used to calculate a predicted value of the current three-dimensional point to be processed (S3044). Next, the three-dimensional data decoding device calculates the weighted average of the values of attribute information of the plurality of neighbor points, and sets the resulting value to predicted value P (S3045). It is to be noted that these processes are similar to the processes in the three-dimensional data encoding device.

Next, the three-dimensional data decoding device arithmetic decodes the quantized value from the bitstream (S3046). The three-dimensional data decoding device inverse quantizes the decoded quantized value to calculate an inverse quantized value (S3047). Next, the three-dimensional data decoding device adds a predicted value to the inverse quantized value to generate a decoded value (S3048). Next, the three-dimensional data decoding device ends the loop for each three-dimensional point (S3049). Next, the three-dimensional data encoding device ends the loop for each LoD (S3050).

Figure 47:
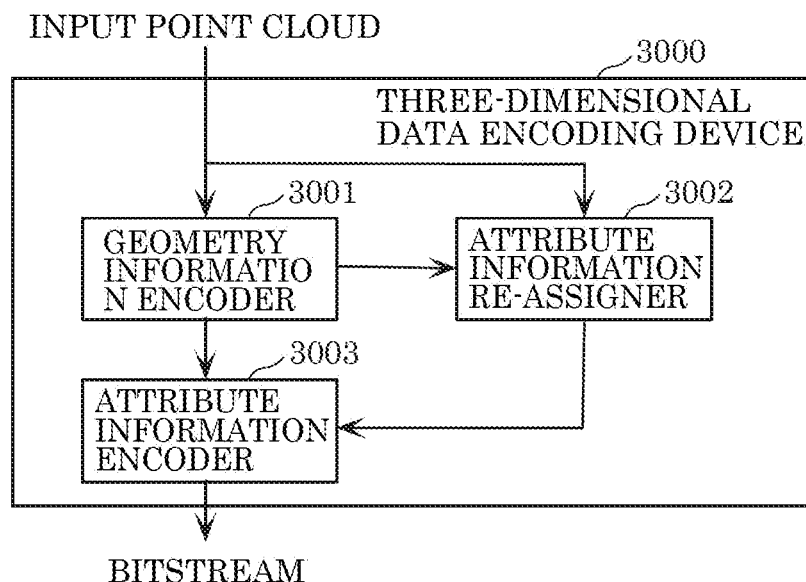
FIG. 47 is a block diagram of a three-dimensional data encoding device according to Embodiment 3.

The following describes configurations of the three-dimensional data encoding device and three-dimensional data decoding device according to the present embodiment. FIG. 47 is a block diagram illustrating a configuration of three-dimensional data encoding device 3000 according to the present embodiment. Three-dimensional data encoding device 3000 includes geometry information encoder 3001, attribute information re-assigner 3002, and attribute information encoder 3003.

Attribute information encoder 3003 encodes geometry information (geometry) of a plurality of three-dimensional points included in an input point cloud. Attribute information re-assigner 3002 re-assigns the values of attribute information of the plurality of three-dimensional points included in the input point cloud, using the encoding and decoding results of the geometry information. Attribute information encoder 3003 encodes the re-assigned attribute information (attribute). Furthermore, three-dimensional data encoding device 3000 generates a bitstream including the encoded geometry information and the encoded attribute information.

Figure 48:
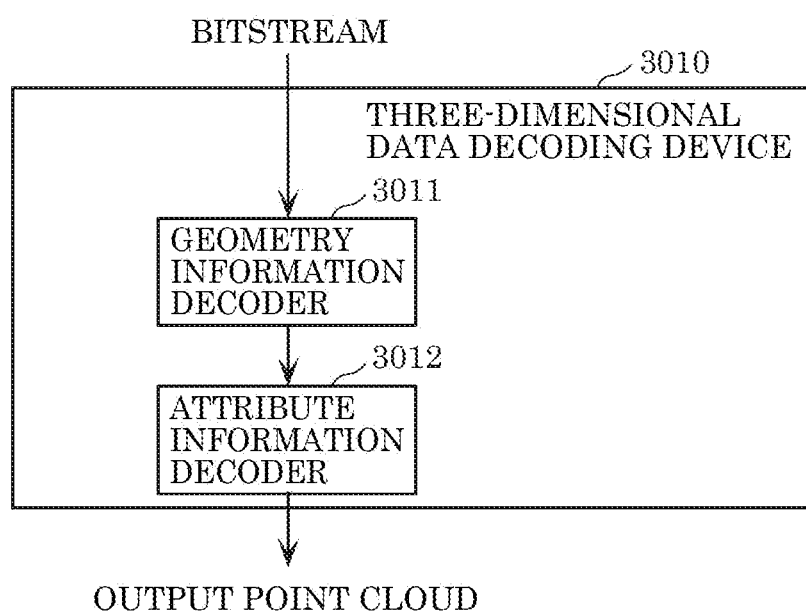
FIG. 48 is a block diagram of a three-dimensional data decoding device according to Embodiment 3.

FIG. 48 is a block diagram illustrating a configuration of three-dimensional data decoding device 3010 according to the present embodiment. Three-dimensional data decoding device 3010 includes geometry information decoder 3011 and attribute information decoder 3012.

Geometry information decoder 3011 decodes the geometry information (geometry) of a plurality of three-dimensional points from a bitstream. Attribute information decoder 3012 decodes the attribute information (attribute) of the plurality of three-dimensional points from the bitstream. Furthermore, three-dimensional data decoding device 3010 integrates the decoded geometry information and the decoded attribute information to generate an output point cloud.

Embodiment 4

As another example of encoding the attribute information of a three-dimensional point by using the information on the LoDs, a method will be described that encodes a plurality of three-dimensional points in order from the three-dimensional points included in the higher layers of the LoDs. For example, when calculating the predicted value of the attribute value (attribute information) of a three-dimensional point included in the LoDn, the three-dimensional data encoding device may switch the attribute value of a three-dimensional point included in which LoD may be referred to, by using a flag or the like. For example, the three-dimensional data encoding device generates EnableReferringSameLoD (the same layer reference permission flag), which is the information indicating whether or not to permit referring to the other three-dimensional points in the same LoD as a current three-dimensional point to be encoded. For example, when EnableReferringSameLoD is the value 1, reference in the same LoD is permitted, and when EnableReferringSameLoD is the value 0, reference in the same LoD is prohibited.

For example, the three-dimensional data encoding device generates the predicted value of the attribute information of a current three-dimensional point by selecting three-dimensional points around the current three-dimensional point based on EnableReferringSameLoD, and calculating the average of the attribute values of predefined N or less three-dimensional points among the selected surrounding three-dimensional points. Additionally, the three-dimensional data encoding device adds the value of N to the header of a bitstream or the like. Note that the three-dimensional data encoding device may add the value of N for each three-dimensional point for which the predicted value is generated. Accordingly, since an appropriate N can be selected for each three-dimensional point for which the predicted value is generated, the accuracy of the predicted value can be improved to reduce the predicted residual.

Alternatively, the three-dimensional data encoding device may add the value of N to the header of a bitstream, and may fix the value of N within the bitstream. Accordingly, it becomes unnecessary to encode or decode the value of N for each three-dimensional point, and the processing amount can be reduced.

Alternatively, the three-dimensional data encoding device may separately encode the information indicating the value of N for each LoD. Accordingly, the coding efficiency can be improved by selecting an appropriate value of N for each LoD. Note that the three-dimensional data encoding device may calculate the predicted value of the attribute information of a three-dimensional point from the weighted average value of the attribute information of N surrounding three-dimensional points. For example, the three-dimensional data encoding device calculates the weight by using respective distance information of the current three-dimensional point and N three-dimensional points.

As described above, EnableReferringSameLoD is the information indicating whether or not to permit referring to the three-dimensional points in the same LoD. For example, the value 1 indicates referable, and the value 0 indicates not referable. Note that, in the case of the value 1, among the three-dimensional points in the same LoD, the three-dimensional points that are already encoded or decoded may be referable.

Figure 49:
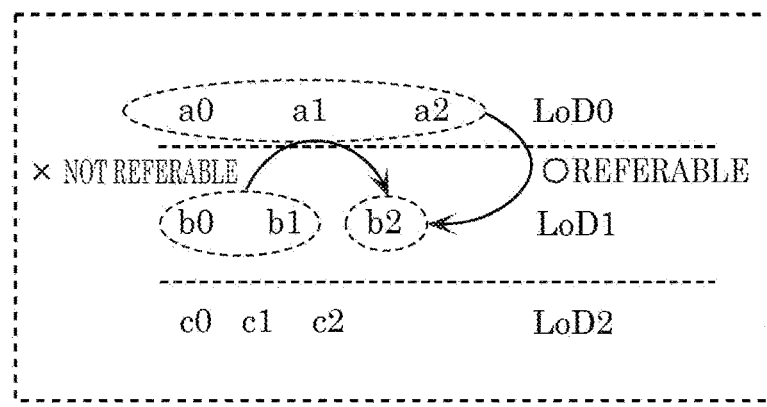
FIG. 49 is a diagram showing an example of the reference relationship according to Embodiment 4.

FIG. 49 is a diagram showing an example of the reference relationship in the case where EnableReferringSameLoD=0. The predicted value of the point P included in the LoDN is generated by using a reconstruction value P' included in the LoDN' (N'<N) that is higher than the LoDN. Here, the reconstruction value P' is the encoded and decoded attribute value (attribute information). For example, the reconstruction value P' of an adjacent point based on the distance is used.

Additionally, in the example shown in FIG. 49, for example, the predicted value of b2 is generated by using any of the attribute values of a0, a1, and a2. Even when b0 and b1 are already encoded and decoded, reference to b0 and b1 is prohibited.

Accordingly, the three-dimensional data encoding device and the three-dimensional decoding device can generate the predicted value of b2, without waiting for the encoding or decoding processing of b0 and b1 to be completed. That is, since the three-dimensional point data encoding device and the three-dimensional decoding device can calculate in parallel a plurality of predicted values for the attribute values of a plurality of three-dimensional points in the same LoD, the processing time can be reduced.

Figure 50:
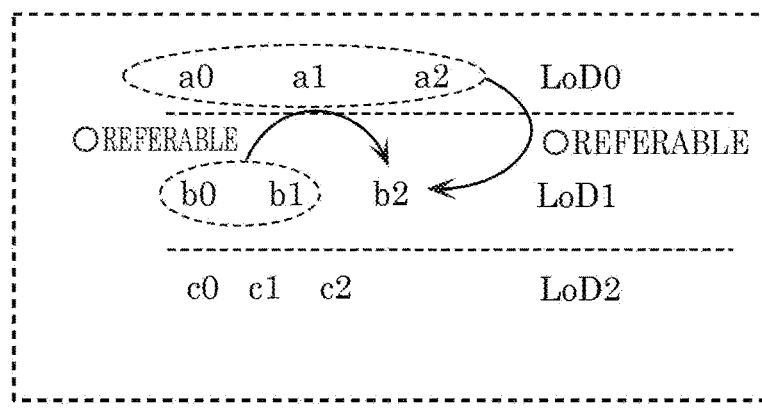
FIG. 50 is a diagram showing an example of the reference relationship according to Embodiment 4.

FIG. 50 is a diagram showing an example of the reference relationship in the case where EnableReferringSameLoD=1. The predicted value of the point P included in the LoDN is generated by using the reconstruction value P' included in the LoDN' (N'≤N) that is the same layer as or a layer higher than the LoDN. Here, the reconstruction value P' is the encoded and decoded attribute value (attribute information). For example, the reconstruction value P' of an adjacent point based on the distance is used.

Additionally, in the example shown in FIG. 50, for example, the predicted value of b2 is generated by using any of the attribute values of a0, a1, a2, b0, and b1. That is, b0 and b1 are referable when b0 and b1 are already encoded and decoded.

Accordingly, the three-dimensional data encoding device can generate the predicted value of b2 by using the attribute information of a lot of neighboring three-dimensional points. Therefore, the prediction accuracy is improved, and the coding efficiency is improved.

Hereinafter, a technique will be described that limits the number of times of searching when selecting N three-dimensional points that are used for the predicted value generation of the attribute information of a three-dimensional point. Accordingly, the processing amount can be reduced.

For example, SearchNumPoint (search point number information) is defined. SearchNumPoint indicates the number of times of searching at the time of selecting N three-dimensional points used for prediction from the three-dimensional point cloud in the LoD. For example, the three-dimensional data encoding device may select the same number of three-dimensional points as the number indicated by SearchNumPoint from a total of T three-dimensional points included in the LoD, and may select N three-dimensional points used for prediction from the selected three-dimensional points. Accordingly, since it becomes unnecessary for the three-dimensional data encoding device to search for all of the T three-dimensional points included in the LoD, the processing amount can be reduced.

Note that the three-dimensional data encoding device may switch the selection method of the value of SearchNumPoint according to the geometry of the LoD to be referred to. An example will be shown below.

For example, when a reference LoD, which is a LoD to be referred to, is a layer higher than the LoD to which a current three-dimensional point belongs, the three-dimensional data encoding device searches for a three-dimensional point A with the closest distance to the current three-dimensional point among the three-dimensional points included in the reference LoD. Next, the three-dimensional data encoding device selects the number of three-dimensional points indicated by SearchNumPoint that are adjacent to the front and rear of the three-dimensional point A. Accordingly, since the three-dimensional data encoding device can efficiently search for three-dimensional points of the higher layers with a close distance to the current three-dimensional point, the prediction efficiency can be improved.

For example, when the reference LoD is the same layer as the LoD to which the current three-dimensional point belongs, the three-dimensional data encoding device selects the number of three-dimensional points indicated by SearchNumPoint that have been encoded and decoded earlier than the current three-dimensional point. For example, the three-dimensional data encoding device selects the number of three-dimensional points indicated by SearchNumPoint that have been encoded and decoded immediately before the current three-dimensional point.

Accordingly, the three-dimensional data encoding device can select the number of three-dimensional points indicated by SearchNumPoint with a low processing amount. Note that the three-dimensional data encoding device may select a three-dimensional point B with a close distance to the current three-dimensional point from the three-dimensional points that have been encoded and decoded earlier than the current three-dimensional point, and may select the number of three-dimensional points indicated by SearchNumPoint that are adjacent to the front and rear of the three-dimensional point B. Accordingly, since the three-dimensional data encoding device can efficiently search for the three-dimensional points of the same layer with a close distance to the current three-dimensional point, the prediction efficiency can be improved.

Additionally, when selecting N three-dimensional points utilized for prediction from the number of three-dimensional points indicated by SearchNumPoint, the three-dimensional data encoding device may select, for example, the top N three-dimensional points with a close distance to the current three-dimensional point. Accordingly, since the prediction accuracy can be improved, the coding efficiency can be improved.

Figure 51:
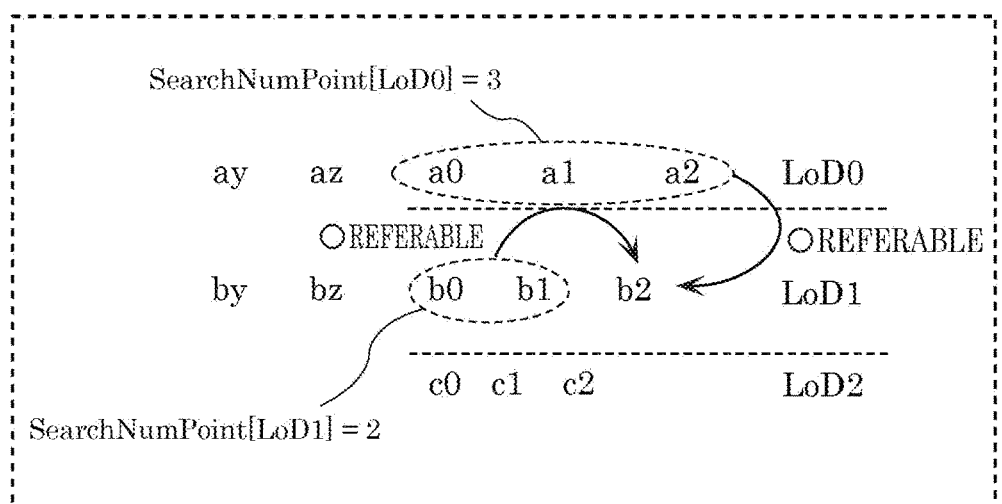
FIG. 51 is a diagram showing an example of setting the number of times of searching for each LoD according to Embodiment 4.

Note that SearchNumPoint may be prepared for each LoD, and the number of times of searching may be changed for each LoD. FIG. 51 is a diagram showing an example of setting the number of times of searching for each LoD. For example, as shown in FIG. 51, SearchNumPoint[LoD0]=3 for the LoD0 and SearchNumPoint[LoD1]=2 for the LoD1 are defined. In this manner, the processing amount and the coding efficiency can be balanced by switching the number of times of searching for each LoD.

In the example shown in FIG. 51, as the three-dimensional points used for prediction of b2, a0, a1, and a2 are selected from the LoD0, and b0 and b1 are selected from the LoD1. N three-dimensional points are selected from the selected a0, a1, a2, b0, and b1, and the predicted value is generated by using the N selected three-dimensional points.

Additionally, the predicted value of the point P included in the LoDN is generated by using the reconstruction value P' included in the LoDN' (N'≤N) that is the same layer as or a layer higher than the LoDN. Here, the reconstruction value P' is the encoded and decoded attribute value (attribute information). For example, the reconstruction value P' of an adjacent point based on the distance is used.

Additionally, SearchNumPoint may indicate the total number of the numbers of times of searching of all the LoDs. For example, when SearchNumPoint=5, and when searching has been performed three times in the LoD0, searching can be performed for the remaining twice in the LoD1. Accordingly, since the worst number of times for the number of times of searching can be guaranteed, the processing time can be stabilized.

The three-dimensional data encoding device may add SearchNumPoint to a header or the like. Accordingly, the three-dimensional decoding device can generate the same predicted value as the three-dimensional data encoding device by decoding SearchNumPoint from the header, and can appropriately decode a bitstream. Additionally, SearchNumPoint need not necessarily be added to the header, and for example, the value of SearchNumPoint may be specified by the profile, layer, or the like of a standard or the like. Accordingly, the amount of bits of a header can be reduced.

When calculating the predicted value of the attribute value of a three-dimensional point included in the LoDn, the following EnableReferenceLoD may be defined. Accordingly, the three-dimensional data encoding device and the three-dimensional decoding device can determine the attribute value of a three-dimensional point included in which LoD may be referred to, by referring to EnableReferenceLoD (reference permitted layer information)

EnableReferenceLoD is the information indicating whether or not it is permitted for a current three-dimensional point to refer to the three-dimensional points of the layer higher than or equal to the LoD (n−EnableReferenceLoD), when the current three-dimensional point belongs to the LoDn. For example, when EnableReferenceLoD=0, reference to the three-dimensional points included in the LoDn and in the layers higher than the LoDn is permitted. When EnableReferenceLoD=1, reference to the three-dimensional points included in the layers higher than the LoDn−1 is permitted. Additionally, when EnableReferenceLoD=2, reference to the three-dimensional points included in the layers higher than the LoDn−2 is permitted. In this manner, since the layers of the LoD that can be referred to can be set according to the set value of EnableReferenceLoD, it becomes possible to balance the coding efficiency and the processing time by controlling the layers that can be processed in parallel. Note that three-dimensional points that are included in each layer and that have already been encoded or decoded may be referable.

Figure 52:
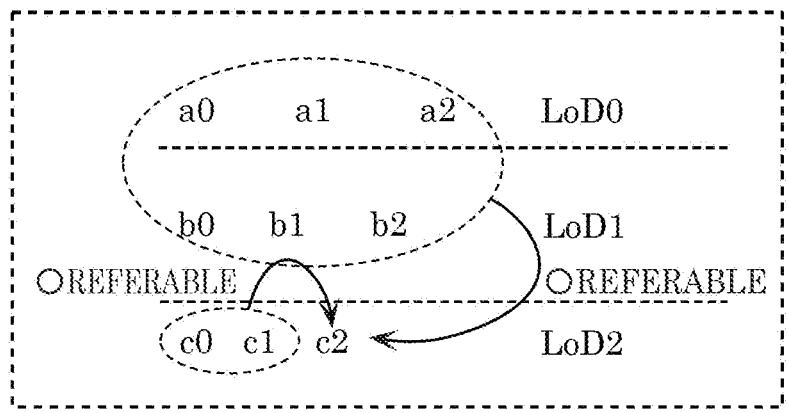
FIG. 52 is a diagram showing an example of the reference relationship according to Embodiment 4.

FIG. 52 is a diagram showing the reference relationship in the case where EnableReferenceLoD=0. As shown in FIG. 52, for example, the predicted value of c2 is generated by using any of the attribute values of a0, a1, a2, b0, b1, b2, c0, and c1. Each three-dimensional point may be referable when each three-dimensional point has already been encoded or decoded. Accordingly, since the predicted value of c2 is generated by using the attribute information of more adjacent three-dimensional points, the prediction accuracy is improved, and the coding efficiency can be improved.

Figure 53:
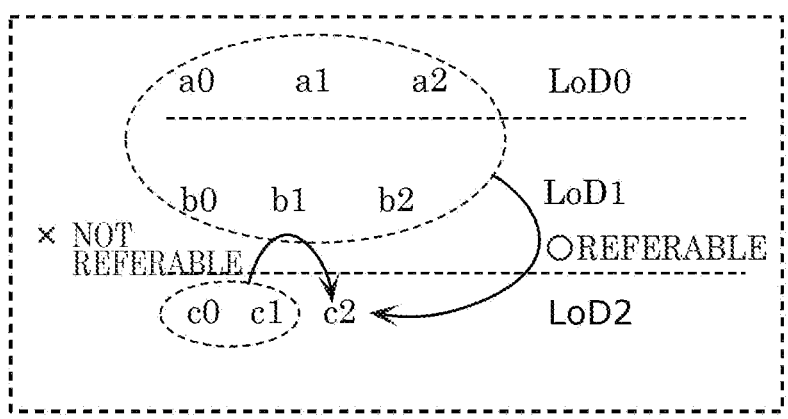
FIG. 53 is a diagram showing an example of the reference relationship according to Embodiment 4.

FIG. 53 is a diagram showing the reference relationship in the case where EnableReferenceLoD=1. As shown in FIG. 53, for example, the predicted value of c2 is generated by using any of the attribute values of a0, a1, a2, b0, b1, and b2. Reference to c0 and c1 is prohibited even when c0 and c1 have been already encoded or decoded. Accordingly, the three-dimensional data encoding device and the three-dimensional decoding device can generate the predicted value of c2, without waiting for the encoding or decoding processing of c0 and c1 to be completed. That is, since the three-dimensional data encoding device and the three-dimensional decoding device can calculate in parallel the predicted values for the attribute values of three-dimensional points in the same LoD, the processing time can be reduced.

Figure 54:
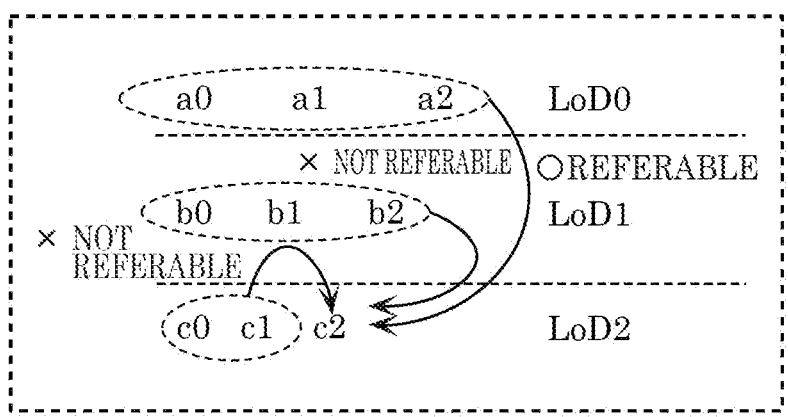
FIG. 54 is a diagram showing an example of the reference relationship according to Embodiment 4.

FIG. 54 is a diagram showing the reference relationship in the case where EnableReferenceLoD=2. As shown in FIG. 54, for example, the predicted value of c2 is generated by using any of the attribute values of a0, a1, and a2. Even when c0, c1, b0, b1, and b2 are already encoded or decoded, reference to c0, c1, b0, b1, and b2 is prohibited. Accordingly, the three-dimensional data encoding device and the three-dimensional decoding device can generate the predicted value of c2, without waiting for the encoding or decoding processing of c0, c1, b0, b1, and b2 to be completed. That is, since the three-dimensional data encoding device and the three-dimensional decoding device can calculate in parallel the predicted values for the attribute values of the three-dimensional points of the LoD1 and LoD2, the processing time can be reduced.

FIG. 55 is a diagram showing a syntax example of an attribute information header (attribute_header) according to the present embodiment. The attribute information header is the header information of the attribute information. As shown in FIG. 55, the attribute information header includes a same layer reference permission flag (EnableReferringSameLoD), layer number information (NumLoD), search point number information (SearchNumPoint[i]), and surrounding point number information (NumNeighborPoint[i]).

EnableReferringSameLoD is the information indicating whether or not to permit referring to the three-dimensional points in the same LoD as a current three-dimensional point. For example, the value 1 indicates referable, and the value 0 indicates not referable (reference is prohibited). Note that, in the case of the value 1, among the three-dimensional points in the same LoD, the three-dimensional points that are already encoded or decoded may be referable. NumLoD shows the number of layers of the LoDs to be used.

SearchNumPoint[i] indicates the number of times of searching at the time of selecting N three-dimensional points used for prediction from the three-dimensional point cloud in the i-th LoD. For example, the three-dimensional data encoding device may select the same number of three-dimensional points as the number indicated by SearchNumPoint from a total of T three-dimensional points included in the LoD, and may select N three-dimensional points used for prediction from the selected three-dimensional points. Accordingly, since it becomes unnecessary for the three-dimensional data encoding device to search for all of the T three-dimensional points included in the LoD, the processing amount can be reduced.

NumNeighborPoint[i] indicates the upper limit N of the number of surrounding points used for generation of the predicted value of a three-dimensional point belonging to the layer i. When the number M of surrounding three-dimensional points is less than NumNeighborPoint[i] (M<NumNeighborPoint[i]), the three-dimensional data encoding device may calculate the predicted value by using M surrounding three-dimensional points. Additionally, when it is unnecessary to separate the value of NumNeighborPoint[i] for each LoD, the three-dimensional data encoding device may add one NumNeighborPoint used by all of the LoDs to a header.

The three-dimensional data encoding device may entropy encode EnableReferringSameLoD and SearchNumPoint, and may add them to a header. For example, the three-dimensional data encoding device arithmetically encodes each value after binarizing each value. Additionally, the three-dimensional data encoding device may perform encoding with a fixed length in order to suppress the processing amount.

Additionally, EnableReferringSameLoD and SearchNumPoint need not necessarily be added to a header, and for example, these values may be specified by the profile, layer or the like of a standard or the like. Accordingly, the amount of bits of a header can be reduced.

Additionally, the three-dimensional data encoding device may add EnableReferringSameLoD and SearchNumPoint to the header of WLD, SPC, or volume, in order to switch per WLD, SPC, or volume. In addition, the three-dimensional data encoding device may add the information indicating whether or not to permit referring to the same layer according to the layer to a bitstream, and may switch whether or not to permit referring to the same layer according to the layer.

Restrictions may be provided for the set value of EnableReferringSameLoD depending on the encoding scheme of the attribute value. For example, when an encoding scheme L is used in which all the predicted residuals of the attribute values of the three-dimensional points included in the lower layers of the LoD are once calculated, and the predicted residuals are fed back to the higher layers, the three-dimensional points included in the same layer cannot be referred to for generation of the predicted value, since the encoding or decoding processing is not completed. When using the encoding scheme L as such, the value of EnableReferringSameLoD may be restricted to be 0. Additionally, in the case where the encoding scheme L as such is used, when the value of EnableReferringSameLoD is 1, the three-dimensional decoding device may determine that it is a conformance error of a standard.

Additionally, the three-dimensional data encoding device may add the information indicating whether or not encoding has been performed with the encoding scheme L to a bitstream, may add the value of EnableReferringSameLoD to the bitstream when encoding has not been performed with the encoding scheme L, and need not add EnableReferringSameLoD to the bitstream when encoding has been performed with the encoding scheme L. Accordingly, the three-dimensional decoding device can determine whether or not EnableReferringSameLoD is added to the bitstream by decoding the information indicating whether or not encoding has been performed with the encoding scheme L from the header, and can correctly decode the bitstream. Note that the three-dimensional decoding device may decode EnableReferringSameLoD of the header when encoding has not been performed with the encoding scheme L, and may estimate the value of EnableReferringSameLoD to be 0 when encoding has been performed with the encoding scheme L.

Note that the three-dimensional data encoding device need not add EnableReferringSameLoD to a header. In this case, when a bitstream to be processed is the bitstream whose encoding has been performed with the encoding scheme L, the three-dimensional decoding device may estimate the value of EnableReferringSameLoD to be 0, and otherwise, the three-dimensional decoding device may estimate the value of EnableReferringSameLoD to be 1 and perform decoding processing.

FIG. 56 is a diagram showing another syntax example of the attribute information header (attribute_header) according to the present embodiment. Compared with the attribute information header shown in FIG. 55, the attribute information header shown in FIG. 56 includes reference permission layer information (EnableReferenceLoD), instead of the same layer reference permission flag (EnableReferringSameLoD). Note that the meaning of the other information is the same as that in FIG. 55.

EnableReferenceLoD is the information indicating whether or not to permit referring to the three-dimensional points of the layers higher than or equal to the LoD (n−EnableReferenceLoD), when a current three-dimensional point belongs to the LoDn. For example, when EnableReferenceLoD=0, reference to the three-dimensional points included in the LoDn and in the layers higher than the LoDn is permitted. When EnableReferenceLoD=1, reference to the three-dimensional points included in the layers higher than or equal to LoDn−1 is permitted. Additionally, when EnableReferenceLoD=2, reference to the three-dimensional points included in the layers higher than or equal to LoDn−2 is permitted. In this manner, since the layers of the LoD that can be referred to can be set according to the set value of EnableReferenceLoD, it becomes possible to balance the coding efficiency and the processing time by controlling the layers that can be processed in parallel. Note that three-dimensional points that are included in each layer and that have already been encoded or decoded may be referable.

The three-dimensional data encoding device may entropy encode EnableReferenceLoD and SearchNumPoint, and may add them to a header. For example, the three-dimensional data encoding device arithmetically encodes each value after binarizing each value. Additionally, the three-dimensional data encoding device may perform encoding with a fixed length in order to suppress the processing amount.

Additionally, EnableReferenceLoD and SearchNumPoint need not necessarily be added to a header, and for example, these values may be specified by the profile, layer, or the like of a standard or the like. Accordingly, the amount of bits of a header can be reduced.

Additionally, the three-dimensional data encoding device may add EnableReferenceLoD and SearchNumPoint to the header of WLD, SPC, or volume, in order to switch per WLD, SPC, or volume.

Restrictions may be provided for the set value of EnableReferenceLoD depending on the encoding scheme of the attribute value. For example, when using the above-described encoding scheme L, the value of EnableReferenceLoD may be restricted to be 1 or more. Additionally, in the case where the encoding scheme L is used, when the value of EnableReferenceLoD is 0, the three-dimensional data decoding device may determine that it is a conformance error of a standard.

Figure 57:
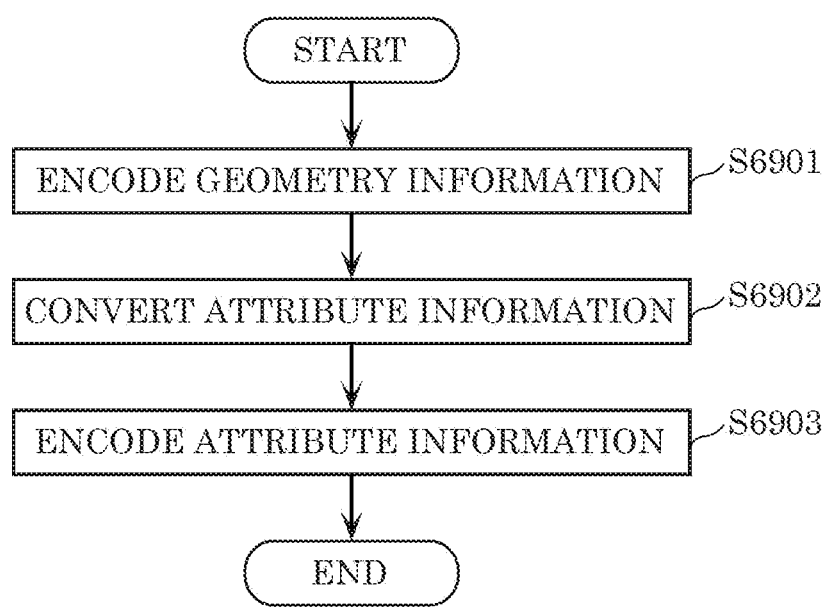
FIG. 57 is a flowchart of the three-dimensional data encoding processing according to Embodiment 4.

FIG. 57 is a flowchart of the three-dimensional data encoding processing according to the present embodiment. First, the three-dimensional data encoding device encodes geometry information (geometry) (S6901). For example, the three-dimensional data encoding device performs encoding by using an octree representation.

Next, the three-dimensional data encoding device converts the attribute information (S6902). For example, after the encoding of the geometry information, when the position of a three-dimensional point is changed due to quantization or the like, the three-dimensional data encoding device reassigns the attribute information of the original three-dimensional point to the three-dimensional point after the change. Note that the three-dimensional data encoding device may interpolate the value of the attribute information according to the amount of change of the position to perform the reassignment. For example, the three-dimensional data encoding device detects N three-dimensional points before the change near the three dimensional position after the change, performs the weighted averaging of the value of the attribute information of the N three-dimensional points based on the distance from the three-dimensional position after the change to each of the N three dimensional points, and sets the obtained value to the value of the attribute information of the three-dimensional point after the change. Additionally, when two or more three-dimensional points are changed to the same three-dimensional position due to quantization or the like, the three-dimensional data encoding device may assign the average value of the attribute information in the two or more three-dimensional points before the change as the value of the attribute information after the change.

Next, the three-dimensional data encoding device encodes the attribute information (S6903). For example, when encoding a plurality of pieces of attribute information, the three-dimensional data encoding device may encode the plurality of pieces of attribute information in order. For example, when encoding the color and the reflectance as the attribute information, the three-dimensional data encoding device generates a bitstream to which the encoding result of the reflectance is added after the encoding result of the color. Note that a plurality of encoding results of the attribute information added to a bitstream may be in any order.

Additionally, the three-dimensional data encoding device may add the information indicating the start location of the encoded data of each attribute information in a bitstream to a header or the like. Accordingly, since the three-dimensional data decoding device can selectively decode the attribute information that needs to be decoded, the decoding processing of the attribute information that does not need to be decoded can be omitted. Therefore, the processing amount for the three-dimensional data decoding device can be reduced. Additionally, the three-dimensional data encoding device may encode a plurality of pieces of attribute information in parallel, and may integrate the encoding results into one bitstream. Accordingly, the three-dimensional data encoding device can encode a plurality of pieces of attribute information at high speed.

Figure 58:
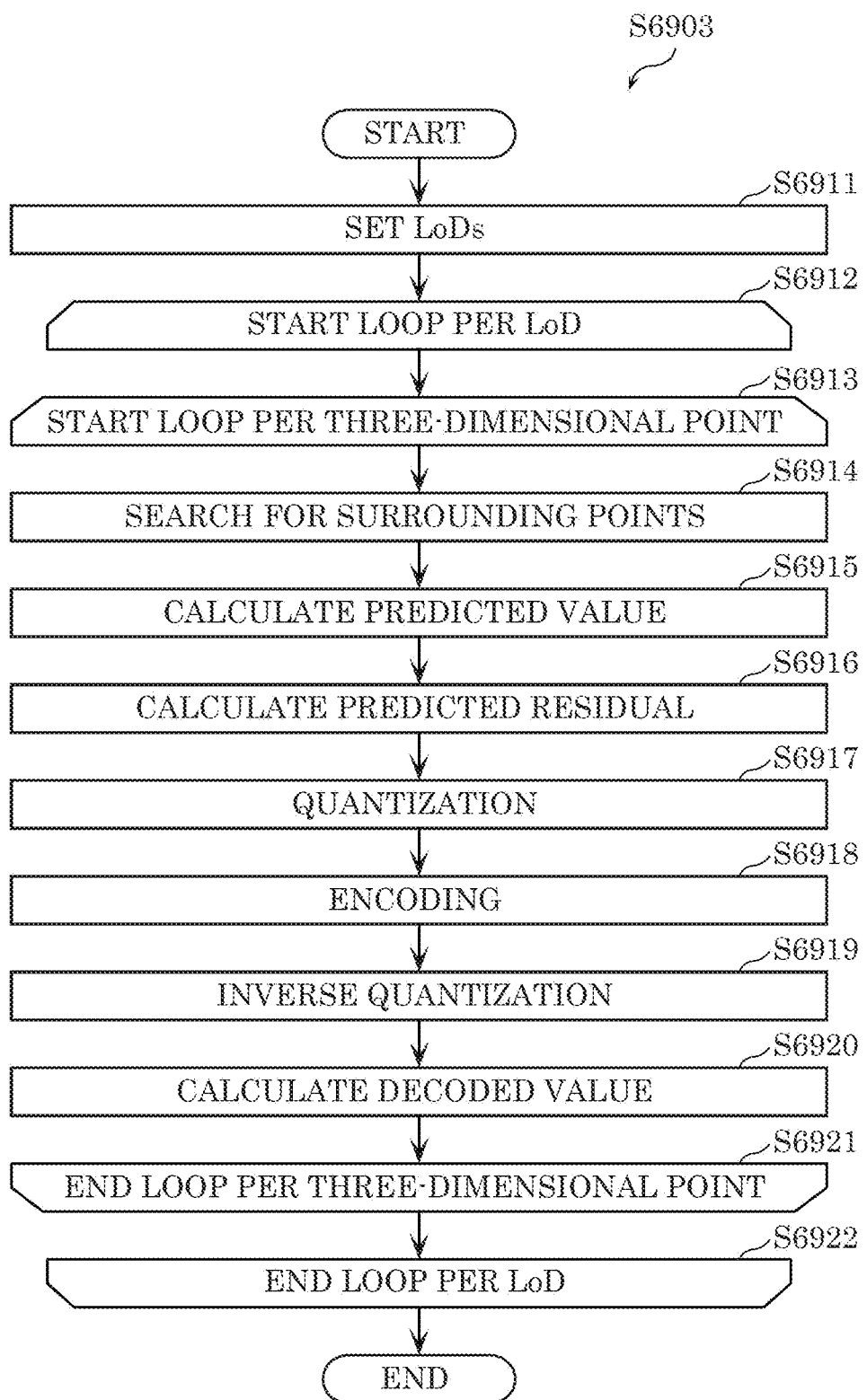
FIG. 58 is a flowchart of the attribute information encoding processing according to Embodiment 4.

FIG. 58 is a flowchart of the attribute information encoding processing (S6903). First, the three-dimensional data encoding device sets LoDs (S6911). That is, the three-dimensional data encoding device assigns each three-dimensional point to any of the plurality of LoDs.

Next, the three-dimensional data encoding device starts a loop per LoD (S6912). That is, the three-dimensional data encoding device repeatedly performs the processing of steps S6913 to S6921 for each LoD.

Next, the three-dimensional data encoding device starts a loop per three-dimensional point (S6913). That is, the three-dimensional data encoding device repeatedly performs the processing of steps S6914 to S6920 for each three-dimensional point.

First, the three-dimensional data encoding device searches for a plurality of surrounding points, which are three-dimensional points that exist in the surroundings of a current three-dimensional point, and that are used for calculation of the predicted value of the current three-dimensional point (S6914). Next, the three-dimensional data encoding device calculates the weighted average of the value of the attribute information of the plurality of surrounding points, and sets the obtained value to the predicted value P (S6915). Next, the three-dimensional data encoding device calculates the predicted residual, which is the difference between the attribute information of the current three-dimensional point and the predicted value (S6916). Next, the three-dimensional data encoding device calculates the quantized value by quantizing the predicted residual (S6917). Next, the three-dimensional data encoding device arithmetically encode the quantized value (S6918).

Additionally, the three-dimensional data encoding device calculates the inverse quantized value by inverse quantizing the quantized value (S6919). Next, the three-dimensional data encoding device generates the decoded value by adding the predicted value to the inverse quantized value (S6920). Next, the three-dimensional data encoding device ends the loop per three-dimensional point (S6921). Additionally, the three-dimensional data encoding device ends the loop per LoD (S6922).

Figure 59:
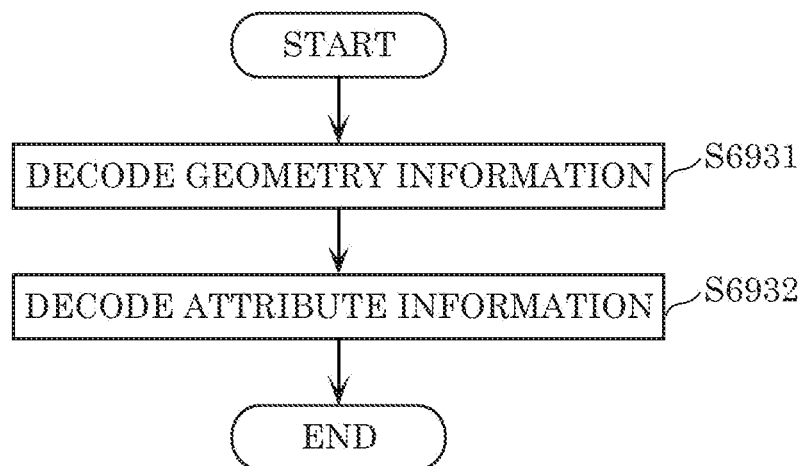
FIG. 59 is a flowchart of the three-dimensional data decoding processing according to Embodiment 4.

FIG. 59 is a flowchart of the three-dimensional data decoding processing according to the present embodiment. First, the three-dimensional decoding device decodes the geometry information (geometry) from a bitstream (S6931). For example, the three-dimensional data decoding device performs decoding by using an octree representation.

Next, the three-dimensional decoding device decodes the attribute information from the bitstream (S6932). For example, when decoding a plurality of pieces of attribute information, the three-dimensional data decoding device may decode the plurality of pieces of attribute information in order. For example, when decoding the color and the reflectance as the attribute information, the three-dimensional data decoding device decodes the encoding result of the color and the encoding result of the reflectance according to the order in which they are added to the bitstream. For example, when the encoding result of the reflectance is added after the encoding result of the color in a bitstream, the three-dimensional data decoding device decodes the encoding result of the color, and thereafter decodes the encoding result of the reflectance. Note that the three-dimensional data decoding device may decode the encoding results of the attribute information added to a bitstream in any order.

Additionally, the three-dimensional data decoding device may obtain the information indicating the start location of the encoded data of each attribute information in a bitstream by decoding a header or the like. Accordingly, since the three-dimensional data decoding device can selectively decode the attribute information that needs to be decoded, the decoding processing of the attribute information that does not need to be decoded can be omitted. Therefore, the processing amount for the three-dimensional data decoding device can be reduced. Additionally, the three-dimensional data decoding device may decode a plurality of pieces of attribute information in parallel, and may integrate the decoding results into one three-dimensional point cloud. Accordingly, the three-dimensional data decoding device can decode a plurality of pieces of attribute information at high speed.

Figure 60:
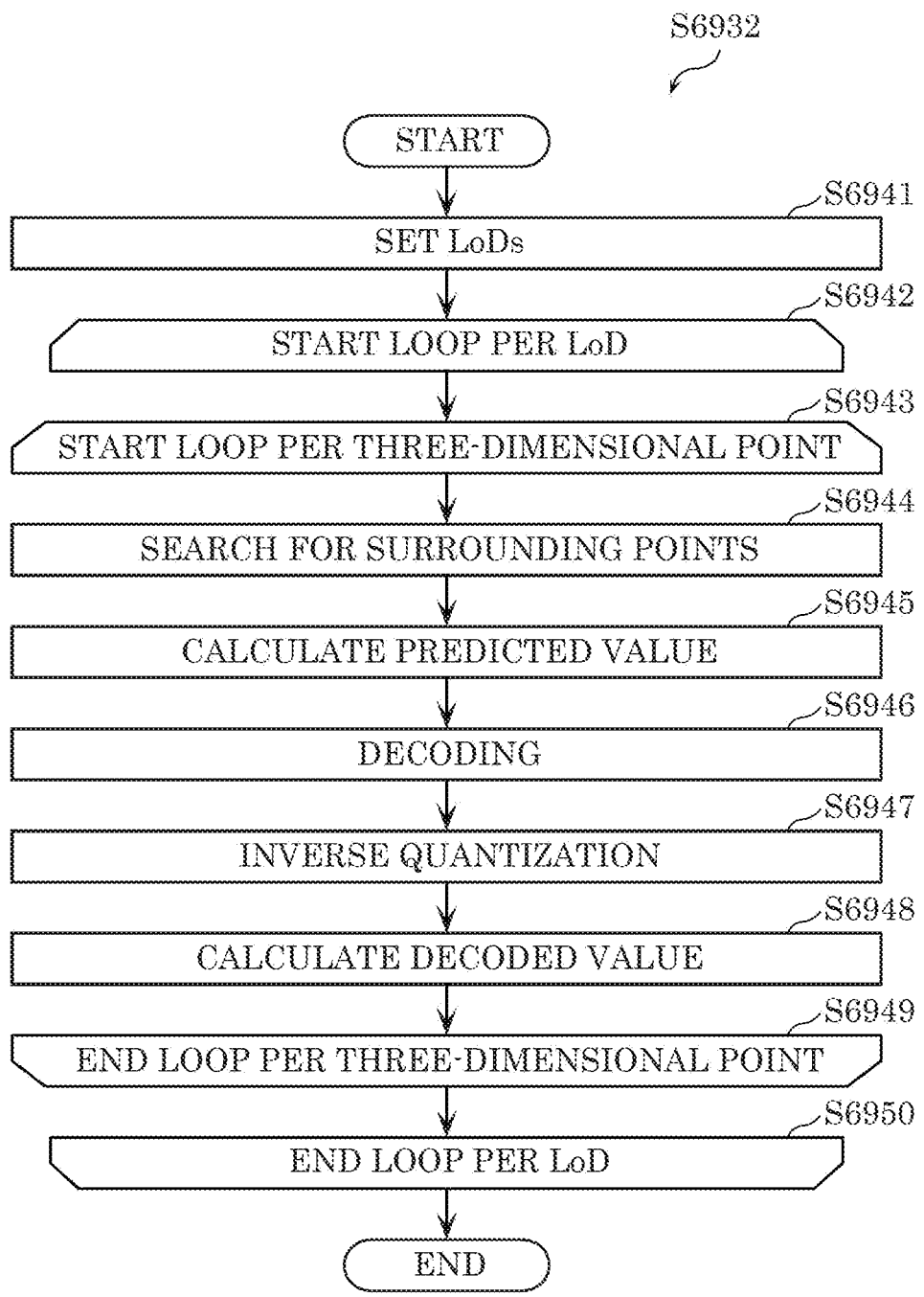
FIG. 60 is a flowchart of the attribute information decoding processing according to Embodiment 4.

FIG. 60 is a flowchart of the attribute information decoding processing (S6932). First, the three-dimensional decoding device sets LoDs (S6941). That is, the three-dimensional data decoding device assigns each of a plurality of three-dimensional points having the decoded geometry information to any of the plurality of LoDs. For example, this assigning method is the same method as the assigning method used by the three-dimensional data encoding device.

Next, the three-dimensional decoding device starts a loop per LoD (S6942). That is, the three-dimensional data decoding device repeatedly performs the processing of steps S6943 to S6949 for each LoD.

Next, the three-dimensional decoding device starts a loop per three-dimensional point (S6943). That is, the three-dimensional data decoding device repeatedly performs the processing of steps S6944 to S6948 for each three-dimensional point.

First, the three-dimensional data decoding device searches for a plurality of surrounding points, which are three-dimensional points that exist in the surroundings of a current three-dimensional point, and that are used for calculation of the predicted value of the current three-dimensional point (S6944). Next, the three-dimensional data decoding device calculates the weighted average of the value of the attribute information of the plurality of surrounding points, and sets the obtained value to the predicted value P (S6945). Note that these processings are the same as the processings in the three-dimensional data encoding device.

Next, the three-dimensional data decoding device arithmetically decodes the quantized value from a bitstream (S6946). Additionally, the three-dimensional data decoding device calculates the inverse quantized value by performing inverse quantization of the decoded quantized value (S6947). Next, the three-dimensional data decoding device generates the decoded value by adding the predicted value to the inverse quantized value (S6948). Next, the three-dimensional data decoding device ends the loop per three-dimensional point (S6949). Additionally, the three-dimensional data decoding device ends the loop per LoD (S6950).

Figure 61:
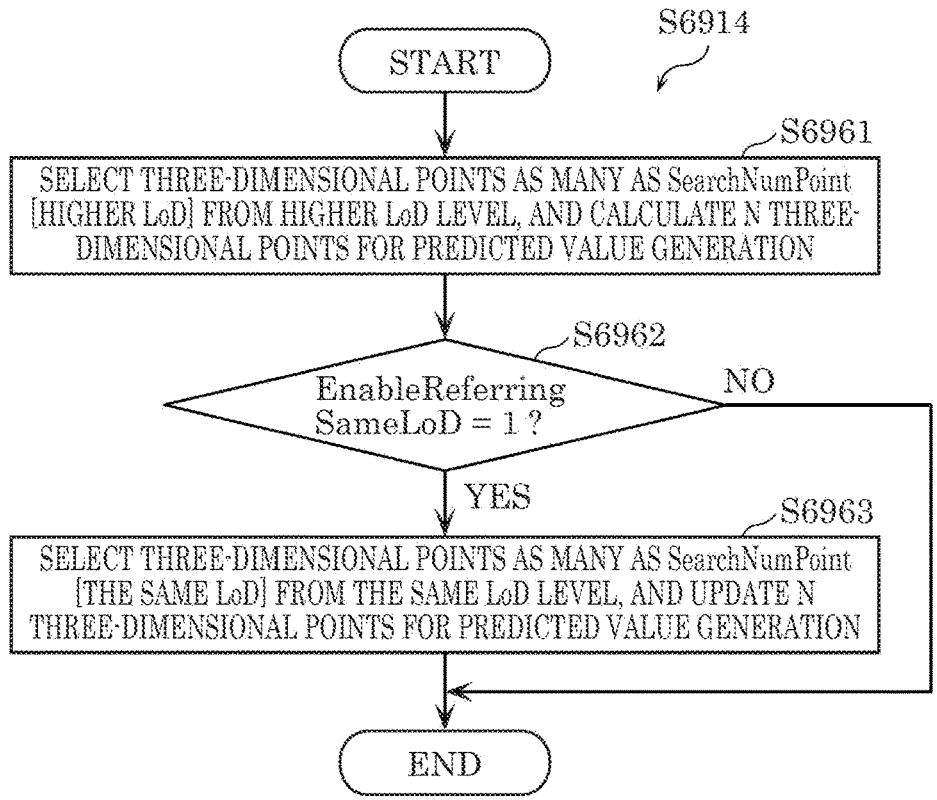
FIG. 61 is a flowchart of the surrounding point searching processing according to Embodiment 4.

FIG. 61 is a flowchart of the surrounding point searching processing (S6914). First, the three-dimensional data encoding device selects as many three-dimensional points as SearchNumPoint[higher LoD] and are included in a higher LoD layer than the layer to which a current three-dimensional point belongs, and calculates N three-dimensional points for predicted value generation from the selected three-dimensional points (S6961). Next, the three-dimensional data encoding device determines whether EnableReferringSameLoD is 1 (S6962). When EnableReferringSameLoD is 1 (Yes in S6962), the three-dimensional data encoding device selects as many three-dimensional points as SearchNumPoint[the same LoD] that are included in the same LoD layer as the layer to which the current three-dimensional point belongs, and updates N three-dimensional points for predicted value generation (S6963). For example, the three-dimensional data encoding device calculates N three-dimensional points from as many three-dimensional points as SearchNumPoint[higher LoD] that are selected in step S6961, and as many three-dimensional points as SearchNumPoint[the same LoD] that are selected in step S6963.

On the other hand, when EnableReferringSameLoD is 0 (No in S6962), N three-dimensional points selected in step S6961 are used as they are.

Figure 62:
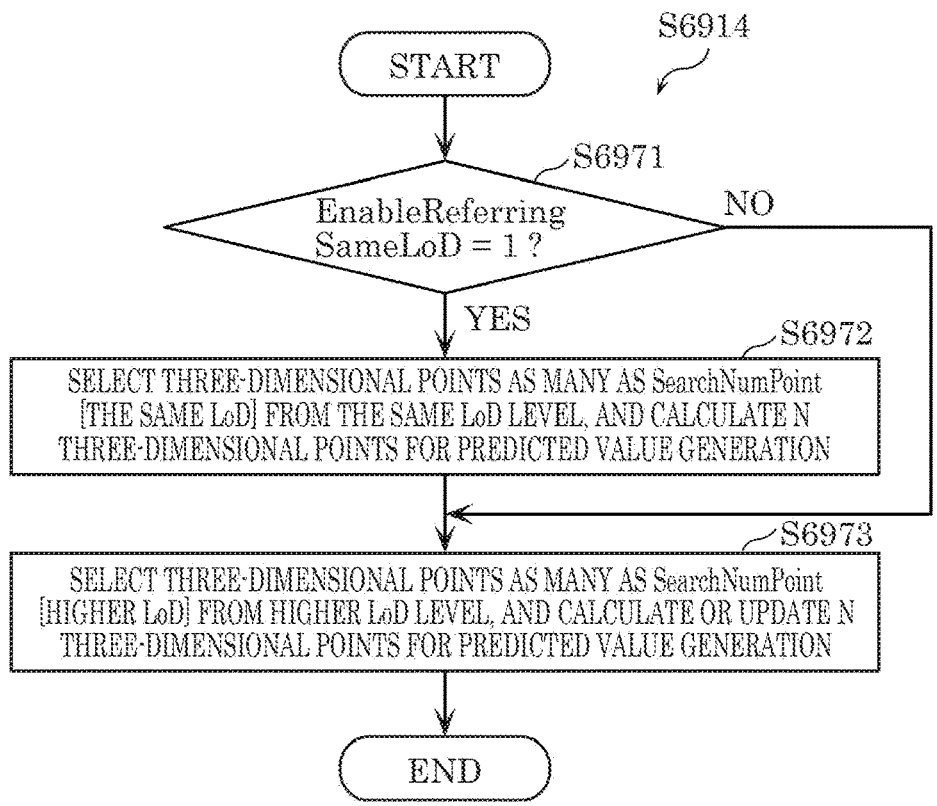
FIG. 62 is a flowchart of the surrounding point searching processing according to Embodiment 4.

FIG. 62 is a flowchart showing another example of the surrounding point searching processing (S6914). First, the three-dimensional data encoding device determines whether EnableReferringSameLoD is 1 (S6971). When EnableReferringSameLoD is 1 (Yes in S6971), the three-dimensional data encoding device selects as many three-dimensional points as SearchNumPoint[the same LoD] that are included in the same LoD layer as the layer to which a current three-dimensional point belongs, and calculates N three-dimensional points for predicted value generation from the selected three-dimensional points (S6972). Next, the three-dimensional data encoding device selects as many three-dimensional points as SearchNumPoint[higher LoD] that are included in a higher LoD layer than the layer to which the current three-dimensional point belongs, and updates N three-dimensional points for predicted value generation (S6973). For example, the three-dimensional data encoding device calculates N three-dimensional points from as many three-dimensional points as SearchNumPoint[the same LoD] that are selected in step S6972, and as many three-dimensional points as SearchNumPoint[higher LoD] that are selected in step S6973.

On the other hand, when EnableReferringSameLoD is 0 (No in S6971), the three-dimensional data encoding device selects as many three-dimensional points as SearchNumPoint[higher LoD] that are included in a higher LoD layer than the layer to which the current three-dimensional point belongs, and calculates N three-dimensional points for predicted value generation from the selected three-dimensional points (S6973).

Figure 63:
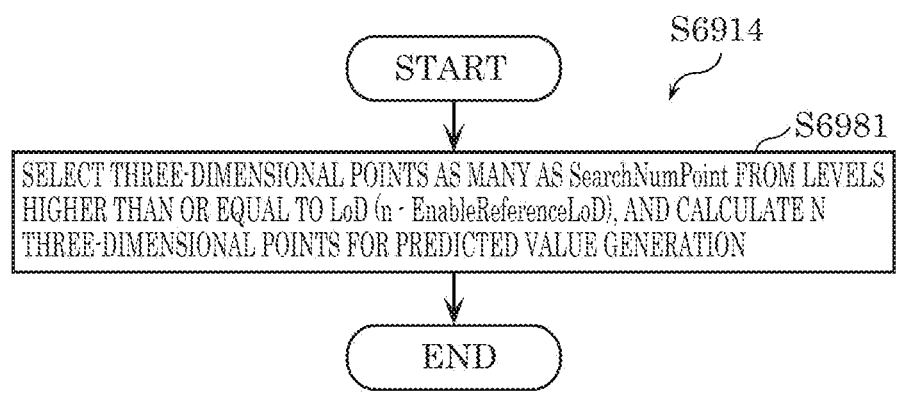
FIG. 63 is a flowchart of the surrounding point searching processing according to Embodiment 4.

FIG. 63 is a flowchart showing another example of the surrounding point searching processing (S6914). First, the three-dimensional data encoding device selects as many three-dimensional points as SearchNumPoint that are included in the layer higher than or equal to the LoD (n−EnableReferenceLoD), and calculates N three-dimensional points for predicted value generation from the selected three-dimensional points (S6981).

Note that the surrounding point searching processing (S6944) in the three-dimensional decoding device is the same as the surrounding point searching processing (S6914) in the three-dimensional data encoding device.

Embodiment 5

In the present embodiment, another example of the encoding of attribute information on a three-dimensional point using Level of Detail (LoD) will be described. In the present embodiment, a method will be described which uses EnableReferringSameLoD (a same-layer reference permission flag), which is information that indicates whether or not to refer to a three-dimensional point belonging to the same LoD layer as a current three-dimensional point to be encoded, and ReferringSameLoDminLayer (information indicating the lowermost layer for which the same-layer reference is permitted), which is information that indicates a LoD layer for which EnableReferringSameLoD is valid. Note that, in the following description, referring to another three-dimensional point belonging to the same LoD layer as the current three-dimensional point will be referred to also as "same-layer reference".

EnableReferringSameLoD is information that indicates whether or not to permit referring to a three-dimensional point in the same LoD. A value of 1 indicates that referring is permitted, and a value of 0 indicates that referring is not permitted. Note that, when the value is 1, only a three-dimensional point already encoded or decoded may be able to be referred to among the three-dimensional points in the same LoD.

ReferringSameLoDminLayer indicates a threshold (lowermost layer) of LoD layers for which information of EnableReferringSameLoD is valid (that is, the same-layer reference is permitted). For example, when the bottom LoD layer is LoD0, and there are LoD1 and LoD2 above LoD0, the information of EnableReferringSameLoD is valid for layer LoD0 and higher layers if ReferringSameLoDminLayer=0, the information of EnableReferringSameLoD is valid for layer LoD1 and higher layers if ReferringSameLoDminLayer=1, and the information of EnableReferringSameLoD is valid for layer LoD2 and higher layers if ReferringSameLoDminLayer=2.

That is, when ReferringSameLoDminLayer=N, the information of EnableReferringSameLoD is valid for layer LoDN and higher layers. Therefore, when EnableReferringSameLoD=1, the information of EnableReferringSameLoD is invalid (that is, the same-layer reference is prohibited) for layer LoDN−1 and lower layers, and predicted values of attribute information (referred to also as attribute values) on a plurality of three-dimensional points belonging to layer LoDN−1 and lower layers can be calculated in parallel. For layer LoDN and higher layers, the information of EnableReferringSameLoD is valid, and predicted values of attribute information on three-dimensional points belonging to layer LoDN and higher layers can be calculated based on attribute information on a large number of neighboring three-dimensional points including those in layer LoDN. As a result, the reduction of the processing time and the improvement of the encoding efficiency can be balanced.

Note that when EnableReferringSameLoD=0, the three-dimensional data encoding device need not add ReferringSameLoDminLayer to the header. This allows reduction of the code amount of the header.

Note that although an example has been shown above in which the information of EnableReferringSameLoD is valid for layer LoDN and higher layers when ReferringSameLoDminLayer=N, the present disclosure is not limited thereto. For example, it is also possible that when ReferringSameLoDminLayer=N, the information of EnableReferringSameLoD is valid for layer LoDN and lower layers and is invalid for layer LoDN+1 and higher layers. In that case, predicted values of attribute information on three-dimensional points belonging to layer LoDN+1 and higher layers can be calculated in parallel, and predicted values of attribute information on three-dimensional points belonging to layer LoDN and lower layers can be calculated based on attribute information on a large number of neighboring three-dimensional points including those in layer LoDN, so that the encoding efficiency can be improved.

Note that the range of values of ReferringSameLoDminLayer may be equal to or greater than 0 and equal to or smaller than maxLoD−1, provided that the maximum number of LoD layers is maxLoD. When ReferringSameLoDminLayer=0, the information of EnableReferringSameLoD may be valid for all LoD layers. When ReferringSameLoDminLayer=maxLoD−1, the information of EnableReferringSameLoD may be valid for the uppermost LoD layer generated.

Figure 64:
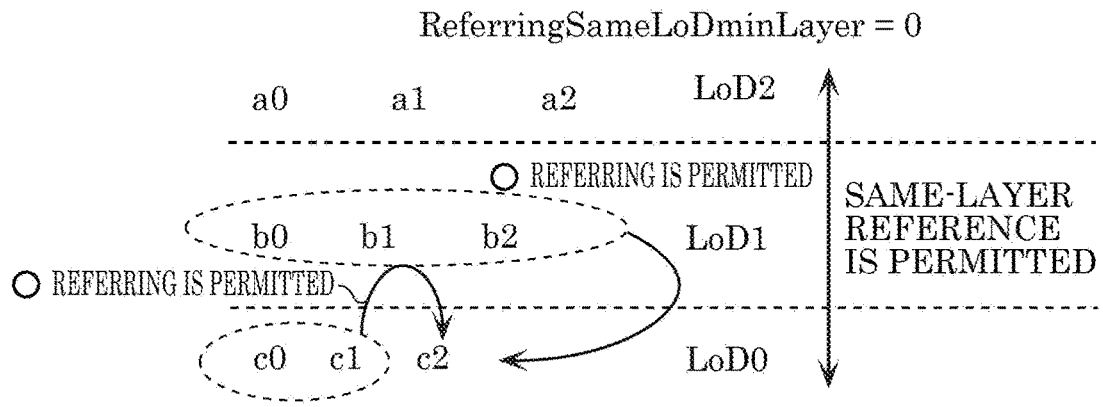
FIG. 64 is a diagram showing a reference relationship according to Embodiment 5.

FIG. 64 is a diagram showing a reference relationship in a case where EnableReferringSameLoD=1 and ReferringSameLoDminLayer=0. In this case, EnableReferringSameLoD=1 is valid for layer LoD0 and higher layers, and the same-layer reference is permitted for the attribute information on the three-dimensional points included in all layers. For example, a predicted value of three-dimensional point c2 is generated based on attribute information on any of three-dimensional points b0, b1, and b2 belonging to an upper layer (higher layer) and three-dimensional points c0 and c1 belonging to the same layer. Note that three-dimensional points c0 and c1 may be able to be referred to when three-dimensional points c0 and c1 are already encoded or decoded. This allows the predicted value of three-dimensional point c2 to be generated based on attribute information on more neighboring three-dimensional points, so that the prediction precision and the encoding efficiency can be improved.

Figure 65:
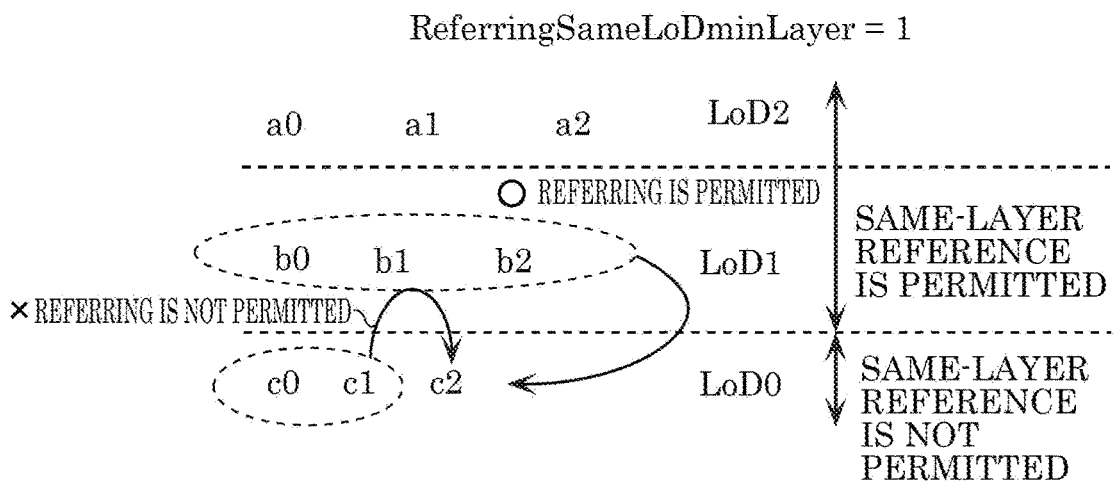
FIG. 65 is a diagram showing a reference relationship according to Embodiment 5.

FIG. 65 is a diagram showing a reference relationship in a case where EnableReferringSameLoD=1 and ReferringSameLoDminLayer=1. In this case, EnableReferringSameLoD=1 is valid for layer LoD1 and upper layers, and the same-layer reference is permitted for LoD1 and LoD2. For example, a predicted value of three-dimensional point b2 is generated based on attribute information on any of three-dimensional points a0 and a1 belonging to an upper layer and three-dimensional points b0 and b1 belonging to the same layer. Note that three-dimensional points b0 and b1 may be able to be referred to when three-dimensional points b0 and b1 are already encoded or decoded. This allows the predicted value of three-dimensional point b2 to be generated based on attribute information on more neighboring three-dimensional points, so that the prediction precision and the encoding efficiency can be improved.

On the other hand, the same-layer reference is prohibited for LoD0. For example, a predicted value of three-dimensional point c2 is generated based on attribute information on any of three-dimensional points b0, b1, and b2 belonging to an upper layer. In addition, referring to three-dimensional points c0 and c1 is also prohibited if three-dimensional points c0 and c1 are already encoded or decoded. Therefore, the three-dimensional data encoding device or the three-dimensional data decoding device can generate a predicted value of three-dimensional point c2 without waiting until encoding or decoding of three-dimensional points c0 and c1 is completed. That is, the three-dimensional data encoding device or the three-dimensional data decoding device can calculate predicted values of attribute information on a plurality of three-dimensional points in the same LoD in parallel, so that the processing time can be reduced.

The three-dimensional data encoding device or the three-dimensional data decoding device can set the information of EnableReferringSameLoD to be valid for the uppermost LoD layer regardless of the value of ReferringSameLoDminLayer. That is, when EnableReferringSameLoD=1, the three-dimensional data encoding device or the three-dimensional data decoding device can permit the same-layer reference for the uppermost LoD layer regardless of the value of ReferringSameLoDminLayer. For example, the three-dimensional data encoding device or the three-dimensional data decoding device may determine whether to permit the same-layer reference or not in the calculation of a predicted value of attribute information on a three-dimensional point belonging to layer LoDN on the conditions described below.

The same-layer reference is permitted when (1) EnableReferringSameLoD==1 and LoDN is the uppermost layer or (2) EnableReferringSameLoD==1 and LoDN>=ReferringSameLoDminLayer, and is prohibited otherwise.

Figure 66:
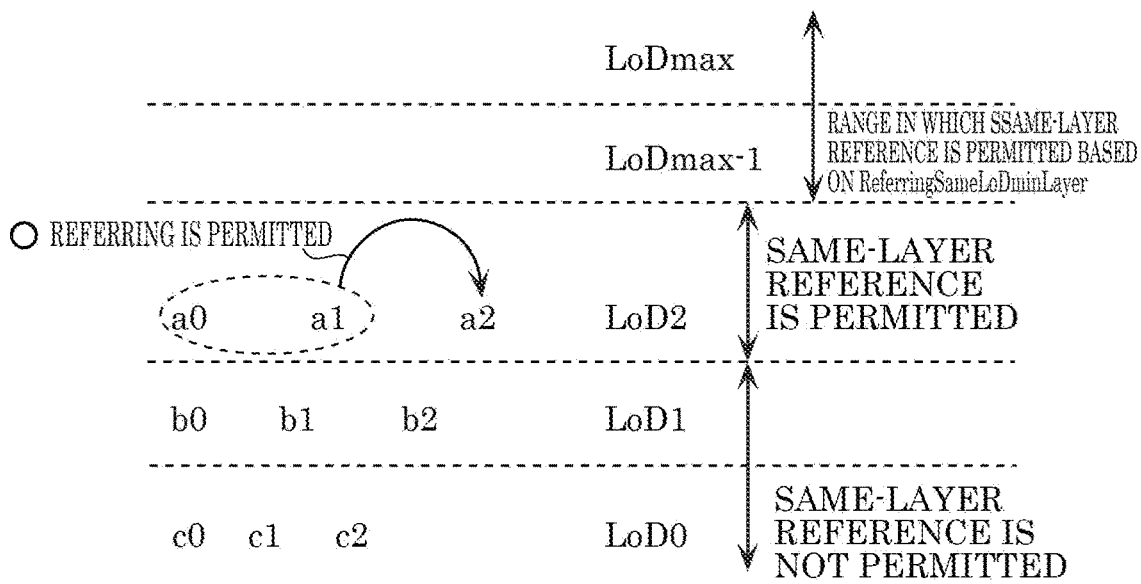
FIG. 66 is a diagram showing a reference relationship according to Embodiment 5.

FIG. 66 is a diagram showing a reference relationship in a case where EnableReferringSameLoD=1 and ReferringSameLoDminLayer=LoDmax−1.

For the uppermost LoD layer, the information of EnableReferringSameLoD is valid regardless of the value of ReferringSameLoDminLayer. In the example shown in FIG. 66, the maximum number of LoD layers is LoDmax, and the uppermost layer generated in the generation of a LoD hierarchy is LoD2, which is lower than LoDmax−1. Here, the "maximum number of LoD layers" means the maximum value of LoD that can be set, and the "uppermost layer" means the uppermost layer in the LoD hierarchy actually generated.

In this case, for LoD2, which is the uppermost layer, the information of EnableReferringSameLoD is valid, and the same-layer reference is permitted. Therefore, when EnableReferringSameLoD=1, the information of EnableReferringSameLoD is valid for at least one layer, so that the encoding efficiency can be improved.

In the example in FIG. 66, a predicted value of three-dimensional point a2 is generated based on attribute information on any of three-dimensional points a0 and a1. Three-dimensional points a0 and a1 may be able to be referred to when three-dimensional points a0 and a1 are already encoded or decoded. This allows the predicted value of three-dimensional point a2 to be generated based on attribute information on more neighboring three-dimensional points, so that the prediction precision and the encoding efficiency can be improved. For the uppermost layer, in particular, since there is no three-dimensional point in an upper layer, no three-dimensional point in an upper layer can be referred to. Therefore, the encoding efficiency is likely to be improved by permitting the same-layer reference.

Note that a restriction may be imposed on the value of EnableReferringSameLoD and ReferringSameLoDminLayer depending on the type of attribute information encoding. For example, when an encoding type (such as a Lifting type) that performs encoding by calculating a prediction residual for attribute information on a three-dimensional point included in a lower LoD layer and feeding the prediction residual back to an upper layer is used, the three-dimensional data encoding device cannot refer to a three-dimensional point included in the same layer for generation of a predicted value because encoding or decoding of the three-dimensional point is not completed. When such an encoding type is used, the value of EnableReferringSameLoD may be limited to 0.

Note that although an example has been shown above in which the value of EnableReferringSameLoD is limited to 0 when the Lifting type is used, the present disclosure is not limited thereto. For example, when the Lifting type is used, a three-dimensional point included in the same layer may be able to be referred to in the uppermost LoD layer, and therefore, the information of EnableReferringSameLoD may be set to be valid for the uppermost layer. For example, when the Lifting type is used, and EnableReferringSameLoD=1, if LoDN is the uppermost layer, the same-layer reference may be permitted for LoDN.

Note that when the Lifting type is used, the value of ReferringSameLoDminLayer may be limited to maxLoD−1. In that case, when the Lifting type is used, the information of EnableReferringSameLoD is valid for the uppermost layer generated. By limiting the value of ReferringSameLoDminLayer to maxLoD−1 when the Lifting type is used, the information of EnableReferringSameLoD is invalid for the other layers than the uppermost layer. That is, when the Lifting type is used, and EnableReferringSameLoD=1, the same-layer reference is prohibited for the other layers than the uppermost layer, and is permitted for the uppermost layer.

That is, the following conditions may be applied to the Lifting and other types. That is, the same-layer reference is permitted when (1) EnableReferringSameLoD==1 and LoDN is the uppermost layer or (2) EnableReferringSameLoD==1 and LoDN>=ReferringSameLoDminLayer, and is prohibited otherwise. In this way, the common conditions described above can be used for the Lifting and other types, so that a conditional branching or other processing can be shared between a plurality of types, and the processing amount can be reduced.

FIG. 67 is a diagram showing a syntax example of an attribute information header (Attribute header). Here, the attribute information header is a header on a frame, slice or tile basis, and is a header of attribute information. The attribute information header shown in FIG. 67 includes EnableReferringSameLoD, maxLoD (information indicating the maximum number of layers), and ReferringSameLoDminLayer.

EnableReferringSameLoD is information that indicates whether or not to permit referring to a three-dimensional point in the same LoD. A value of 1 indicates that referring is permitted, and a value of 0 indicates that referring is not permitted. Note that, when the value is 1, a three-dimensional point already encoded or decoded may be able to be referred to among the three-dimensional points in the same LoD.

maxLoD indicates the maximum number of LoD layers. In encoding or decoding, LoDs are generated in such a manner that the number of LoD layers is equal to or smaller than the maximum number of layers indicated by maxLoD. For example, when the number of the LoD layers generated in generation of LoDs is smaller than maxLoD, the uppermost layer LoDN (N<maxLoD−1) generated in the generation of LoDs may be set to be the uppermost layer in the LoD hierarchy used for encoding or decoding.

ReferringSameLoDminLayer indicates a threshold of LoD layers for which information of EnableReferringSameLoD is valid. When EnableReferringSameLoD=N, the information of EnableReferringSameLoD is valid for layer LoDN and higher layers. Therefore, when EnableReferringSameLoD=1, the information of EnableReferringSameLoD is invalid for layer LoDN−1 and lower layers, and predicted values of attribute information on three-dimensional points belonging to layer LoDN−1 and lower layers can be calculated in parallel. For layer LoDN and higher layers, the information of EnableReferringSameLoD is valid, and predicted values of attribute information on three-dimensional points belonging to layer LoDN and higher layers can be calculated based on attribute information on a large number of neighboring three-dimensional points including those in layer LoDN.

FIG. 68 is a diagram showing another syntax example of the attribute information header (Attribute header). The attribute information header shown in FIG. 68 includes CodingType (encoding type information), in addition to the same pieces of information as those included in the attribute information header shown in FIG. 67.

CodingType indicates the encoding method (encoding type) applied to the encoding of attribute information. For example, the encoding method includes an encoding type (such as the Lifting type) that performs encoding by calculating a prediction residual for attribute information on a three-dimensional point included in a lower LoD layer and feeding the prediction residual back to an upper layer. The encoding method may include an encoding type (such as a Predicting type) that does not feed a prediction residual back to an upper layer.

When CodingType indicates the Lifting type, the value of ReferringSameLoDminLayer may be limited to maxLoD−1. When CodingType indicates the Lifting type, the three-dimensional data encoding device need not add ReferringSameLoDminLayer to the header. When CodingType indicates the Lifting type, the three-dimensional data encoding device need not add ReferringSameLoDminLayer to the header, and may perform the encoding by setting the value of ReferringSameLoDminLayer to be maxLoD−1. When ReferringSameLoDminLayer is not added to the header, the three-dimensional data decoding device may perform the decoding by setting the value of ReferringSameLoDminLayer to be maxLoD−1.

The three-dimensional data encoding device may entropy-encode EnableReferringSameLoD, maxLoD, and ReferringSameLoDminLayer described above and add the entropy-encoded information to the header. For example, the three-dimensional data encoding device binarizes and arithmetically encodes each value. The three-dimensional data encoding device may also perform the encoding with a fixed length in order to reduce the processing amount.

The three-dimensional data encoding device need not add EnableReferringSameLoD, maxLoD, and ReferringSameLoDminLayer described above to the header. For example, each value may be defined by a profile or a level in a standard, or the like. In this way, the bit amount of the header can be reduced.

The three-dimensional data encoding device may change EnableReferringSameLoD, maxLoD, and ReferringSameLoDminLayer described above on a WLD, SPC or volume basis, and add these pieces of information to the header on a WLD, SPC or volume basis.

The three-dimensional data encoding device may generate EnableReferringSameLoD for each LoD layer, in order to change whether to permit the same-layer reference or not between a plurality of LoD layers. For example, when the maximum number of layers is maxLoD, the three-dimensional data encoding device may add as many pieces of EnableReferringSameLoD as maxLoD to the header. In this way, whether to permit the same-layer reference or not can be changed for each layer, the improvement of the encoding efficiency and the reduction of the processing amount can be balanced. In addition, when CodingType indicates the Lifting type, the three-dimensional data encoding device may add EnableReferringSameLoD for the uppermost layer to the header.

Figure 69:
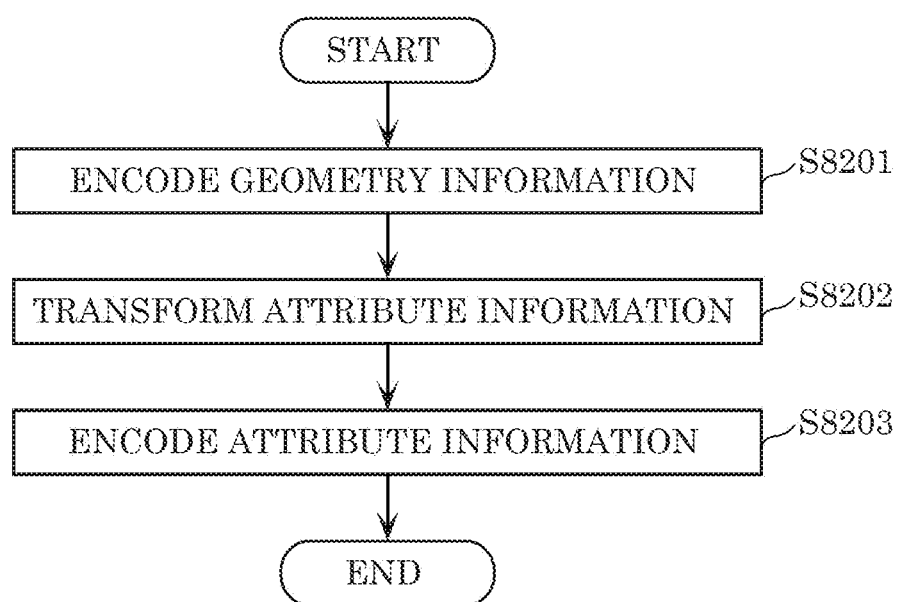
FIG. 69 is a flowchart of a three-dimensional data encoding processing according to Embodiment 5.

FIG. 69 is a flowchart of a three-dimensional data encoding processing according to the present embodiment. First, the three-dimensional data encoding device encodes geometry information (geometry) (S8201). For example, the three-dimensional data encoding device performs the encoding using an octree representation.

The three-dimensional data encoding device then transforms attribute information (S8202). For example, after the encoding of geometry information, if the position of a three-dimensional point is changed due to quantization or the like, the three-dimensional data encoding device reassigns attribute information of the original three-dimensional point to the three-dimensional point after the change. Note that the three-dimensional data encoding device may interpolate values of attribute information according to the amount of change in position to re-assign the attribute information. For example, the three-dimensional data encoding device detects N pre-change three-dimensional points close to the three-dimensional position of the three-dimensional point changed in position, performs weighted averaging of the values of attribute information on the N three-dimensional points based on the distances from the position of the three-dimensional point changed in position to the respective positions of the N three-dimensional points, and determines the resulting value to be the value of the attribute information on the three-dimensional point changed in position. When the positions of two or more three-dimensional points are changed to the same three-dimensional position through quantization or the like, the three-dimensional data encoding device may assign the average value of the attribute information on the pre-change two or more three-dimensional points as the values of the attribute information on the post-change three-dimensional points.

The three-dimensional data encoding device then encodes the attribute information (S8203). When the three-dimensional data encoding device encodes a plurality of pieces of attribute information, for example, the three-dimensional data encoding device may sequentially encode the plurality of pieces of attribute information. For example, when the three-dimensional data encoding device encodes color and reflectance as attribute information, the three-dimensional data encoding device generates a bitstream including the result of encoding of color followed by the result of encoding of reflectance. Note that the plurality of results of encoding of attribute information can be included in the bitstream in any order.

The three-dimensional data encoding device may add information indicating a starting point of the encoded data of each attribute information in the bitstream to the header or the like. This allows the three-dimensional data decoding device to selectively decode attribute information that needs to be decoded and therefore omit the decoding processing for attribute information that does not need to be decoded. Therefore, the processing amount of the three-dimensional data decoding device can be reduced. The three-dimensional data encoding device may encode a plurality of pieces of attribute information in parallel, and integrate the results of the encoding into one bitstream. In this way, the three-dimensional data encoding device can encode a plurality of pieces of attribute information at a high speed.

Figure 70:
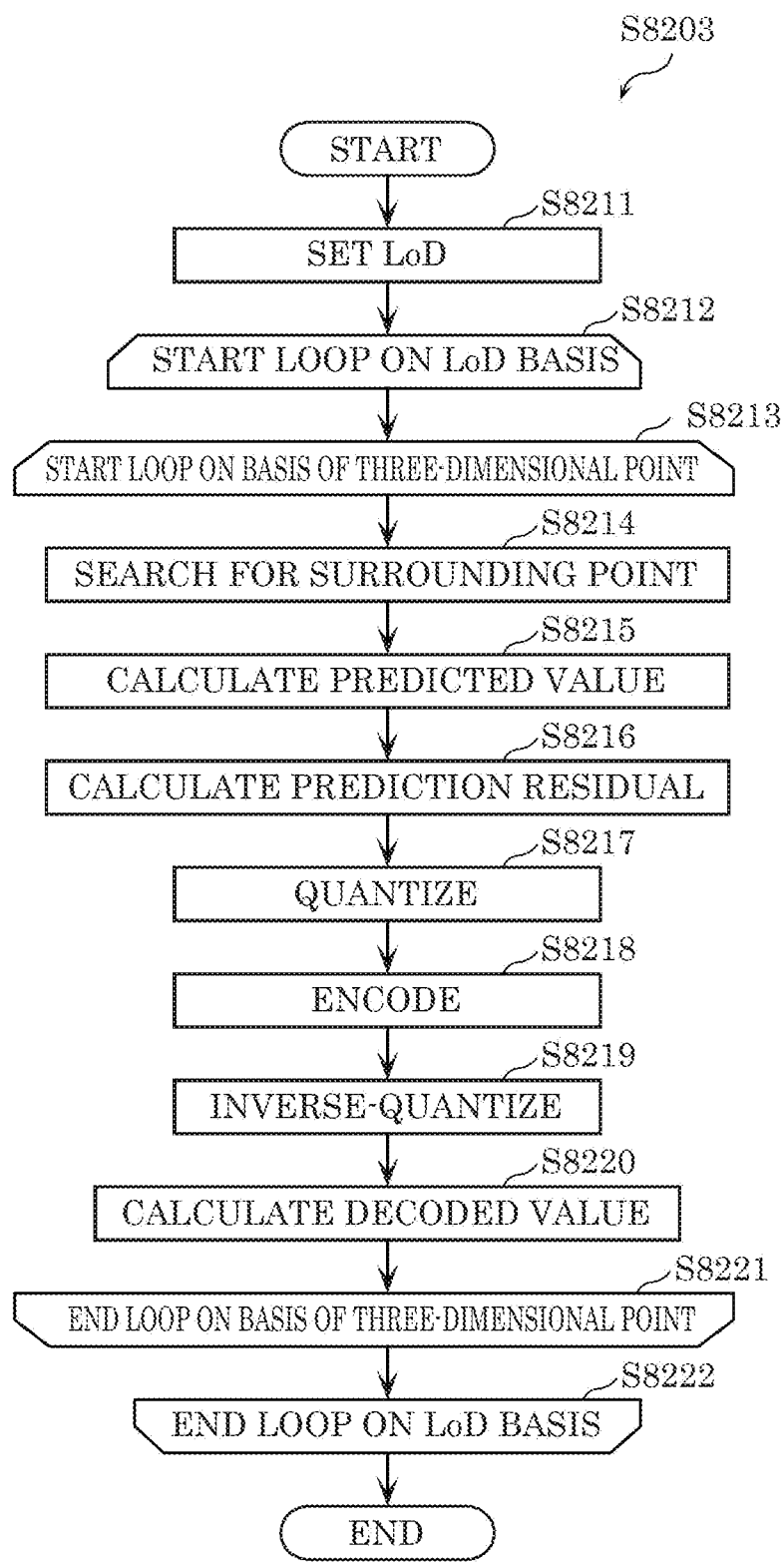
FIG. 70 is a flowchart of an attribute information encoding processing according to Embodiment 5.

FIG. 70 is a flowchart of the attribute information encoding processing (S8203). First, the three-dimensional data encoding device sets an LoD (S8211). That is, the three-dimensional data encoding device assigns each three-dimensional point to any of a plurality of LoDs.

The three-dimensional data encoding device then starts a loop on an LoD basis (S8212). That is, the three-dimensional data encoding device repeatedly performs the processings from step S8213 to step S8221 for each LoD.

The three-dimensional data encoding device then starts a loop on a basis of a three-dimensional point (S8213). That is, the three-dimensional data encoding device repeatedly performs the processings from step S8214 to step S8220 for each three-dimensional point.

First, the three-dimensional data encoding device searches for a plurality of surrounding points, which are three-dimensional points present in the periphery of the current three-dimensional point, that are to be used for calculation of a predicted value of the current three-dimensional point to be processed (S8214). The three-dimensional data encoding device then calculates a weighted average of values of the attribute information on the plurality of surrounding points, and sets the obtained value as predicted value P (S8215). The three-dimensional data encoding device then calculates a prediction residual, which is the difference between the attribute information and the predicted value of the current three-dimensional point (S8216). The three-dimensional data encoding device then calculates a quantized value by quantizing the prediction residual (S8217). The three-dimensional data encoding device then arithmetically encodes the quantized value (S8218).

The three-dimensional data encoding device then calculates an inverse-quantized value by inverse-quantizing the quantized value (S8219). The three-dimensional data encoding device then generates a decoded value by adding the predicted value to the inverse-quantized value (S8220). The three-dimensional data encoding device then ends the loop on a basis of a three-dimensional point (S8221). The three-dimensional data encoding device also ends the loop on a LoD basis (S8222).

Figure 71:
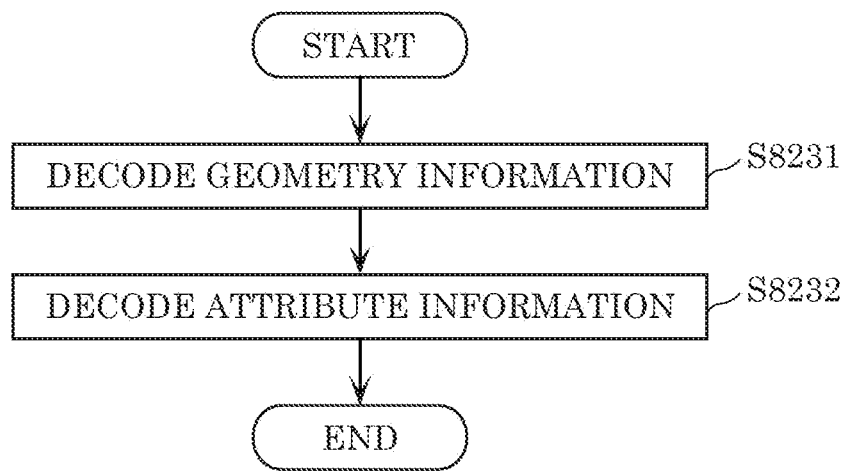
FIG. 71 is a flowchart of a three-dimensional data decoding processing according to Embodiment 5.

FIG. 71 is a flowchart of a three-dimensional data decoding processing according to the present embodiment. First, the three-dimensional data decoding device decodes geometry information (geometry) from the bitstream (S8231). For example, the three-dimensional data decoding device performs the decoding using an octree representation.

The three-dimensional data decoding device then decodes attribute information from the bitstream (S8232). For example, when the three-dimensional data decoding device decodes a plurality of pieces of attribute information, the three-dimensional data decoding device may sequentially decode the plurality of pieces of attribute information. For example, when the three-dimensional data decoding device decodes color and reflectance as attribute information, the three-dimensional data decoding device may decode the result of encoding of color and the result of encoding of reflectance in the order thereof in the bitstream. For example, if the result of encoding of color is followed by the result of encoding of reflectance in the bitstream, the three-dimensional data decoding device first decodes the result of encoding of color and then decodes the result of encoding of reflectance. Note that the three-dimensional data decoding device can decode the result of encoding of attribute information in the bitstream in any order.

The three-dimensional data decoding device may obtain the information indicating the starting point of the encoded data of each piece of attribute information in the bitstream by decoding the header or the like. In this way, the three-dimensional data decoding device can selectively decode attribute information that needs to be decoded, and therefore can omit the decoding processing for attribute information that does not need to be decoded. Therefore, the processing amount of the three-dimensional data decoding device can be reduced. The three-dimensional data decoding device may decode a plurality of pieces of attribute information in parallel, and integrate the results of the decoding into one three-dimensional point cloud. In this way, the three-dimensional data decoding device can decode a plurality of pieces of attribute information at a high speed.

Figure 72:
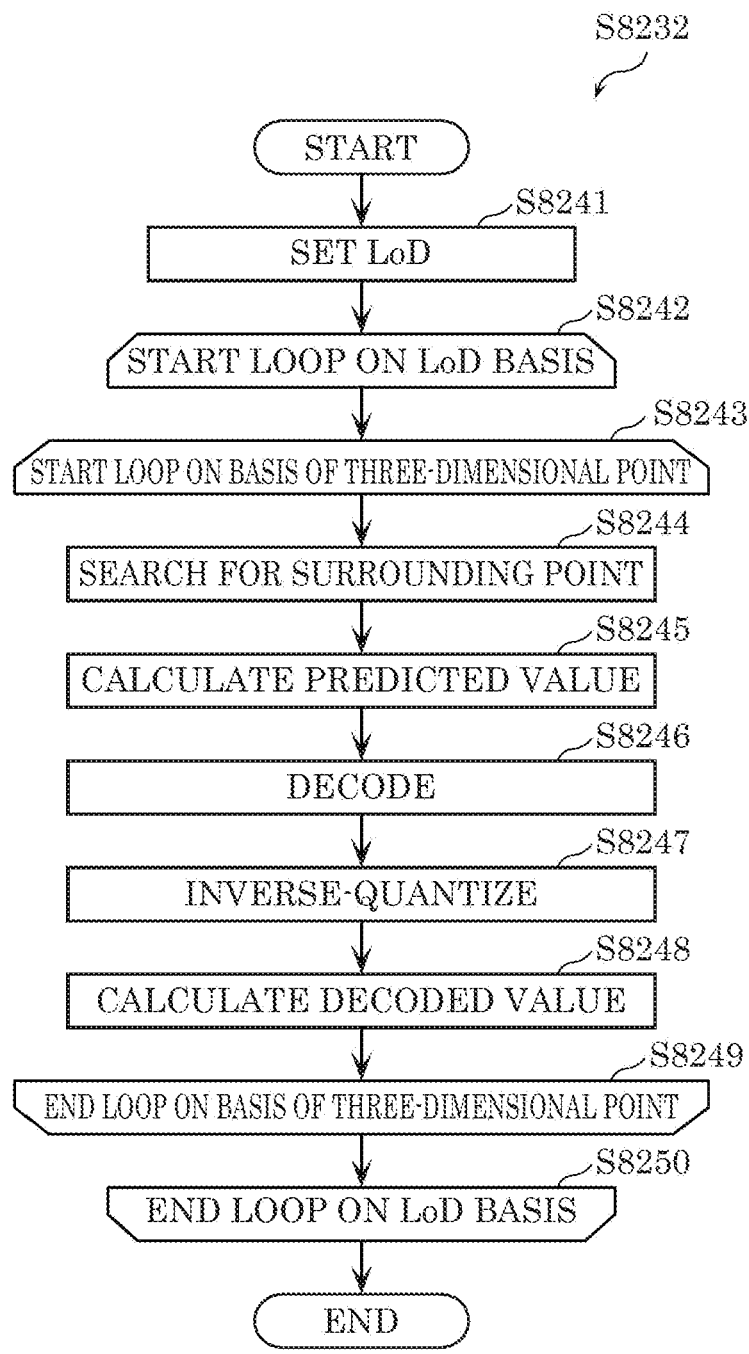
FIG. 72 is a flowchart of an attribute information decoding processing according to Embodiment 5.

FIG. 72 is a flowchart of the attribute information decoding processing (S8232). First, the three-dimensional data decoding device sets an LoD (S8241). That is, the three-dimensional data decoding device assigns each of a plurality of three-dimensional points having decoded geometry information to any of a plurality of LoDs. For example, the method of the assignment is the same as the method of assignment used in the three-dimensional data encoding device shown in FIG. 70.

The three-dimensional data decoding device then starts a loop on an LoD basis (S8242). That is, the three-dimensional data decoding device repeatedly performs the processings from step S8243 to step S8249 for each LoD.

The three-dimensional data decoding device then starts a loop on a basis of a three-dimensional point (S8243). That is, the three-dimensional data decoding device repeatedly performs the processings from step S8244 to step S8248 for each three-dimensional point.

First, the three-dimensional data decoding device searches for a plurality of surrounding points, which are three-dimensional points present in the periphery of the current three-dimensional point, that are to be used for calculation of a predicted value of the current three-dimensional point to be processed (S8244). The three-dimensional data decoding device then calculates a weighted average of values of the attribute information on the plurality of surrounding points, and sets the obtained value as predicted value P (S8245). Note that these processings are the same as those in the three-dimensional data encoding device.

The three-dimensional data decoding device then arithmetically decodes the quantized value from the bitstream (S8246). The three-dimensional data decoding device then calculates an inverse-quantized value by inverse-quantizing the decoded quantized value (S8247). The three-dimensional data decoding device then generates a decoded value by adding the predicted value to the inverse-quantized value (S8248). The three-dimensional data decoding device then ends the loop on a basis of a three-dimensional point (S8249). The three-dimensional data decoding device also ends the loop on a LoD basis (S8250).

Figure 73:
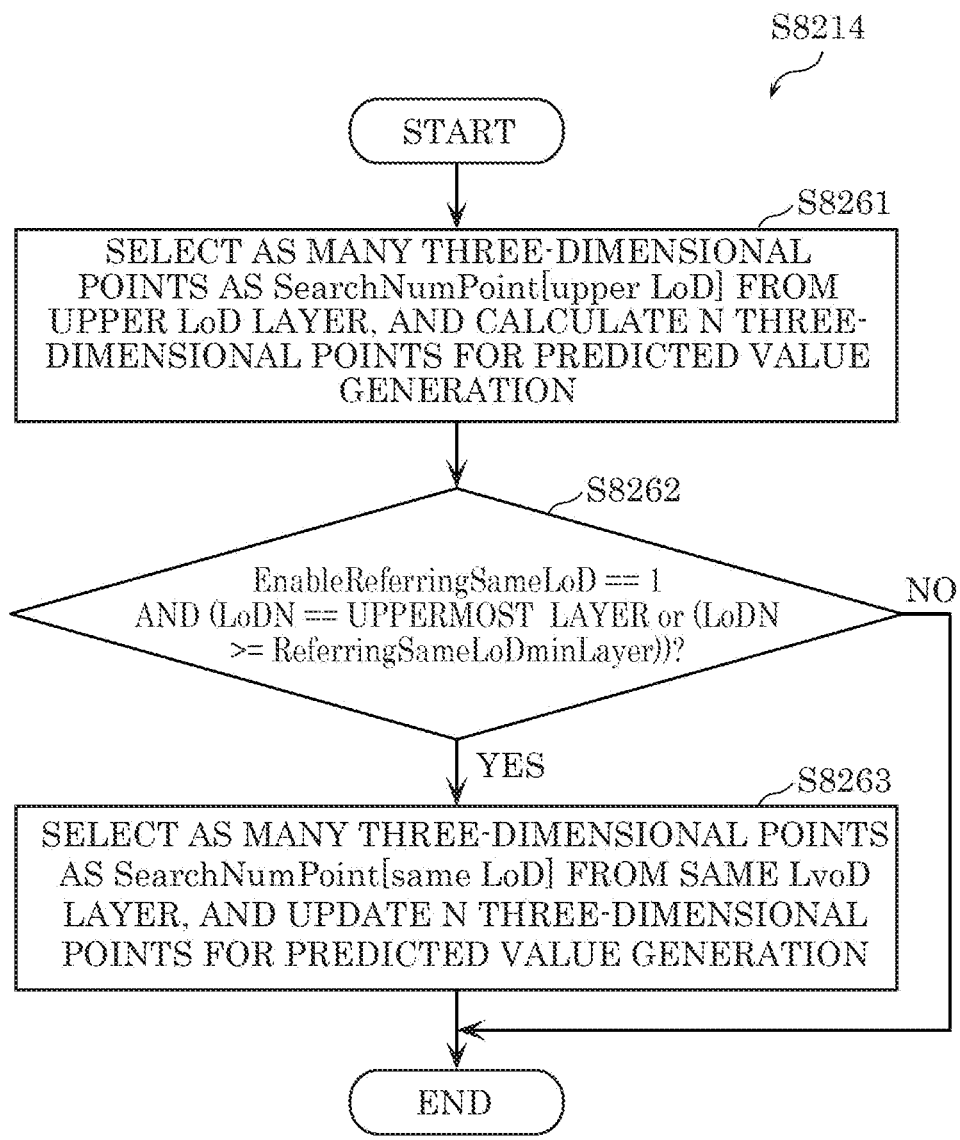
FIG. 73 is a flowchart of a surrounding point searching processing according to Embodiment 5.

FIG. 73 is a flowchart of the surrounding point searching processing (S8214). Note that the processing of S8244 is the same as the processing of S8214.

First, the three-dimensional data encoding device selects as many three-dimensional points as SearchNumPoint [higher LoD] from a higher LoD layer than the layer to which a current three-dimensional point belongs, and calculates N three-dimensional points for predicted value generation using the selected three-dimensional points (S8261). Here, SearchNumPoint indicates the number of times of searching in selecting N three-dimensional points used for prediction from a three-dimensional point cloud in a LoD. SearchNumPoint[higher LoD] indicates the number of times of searching of a higher layer than the current three-dimensional point.

The three-dimensional data encoding device then determines whether any of the conditions (1) EnableReferringSameLoD==1 and LoDN is the uppermost layer and (2) EnableReferringSameLoD==1 and LoDN>=ReferringSameLoDminLayer is satisfied or not (S8262).

When any of the conditions (1) EnableReferringSameLoD==1 and LoDN is the uppermost layer and (2) EnableReferringSameLoD==1 and LoDN>=ReferringSameLoDminLayer is satisfied (if Yes in S8262), the three-dimensional data encoding device selects as many three-dimensional points as SearchNumPoint[same LoD] from the same LoD layer, and updates the N three-dimensional points for predicted value generation using the selected three-dimensional points (S8263). Here, SearchNumPoint[same LoD] indicates the number of times of searching of the layer to which the current three-dimensional point belongs.

On the other hand, when any of the conditions (1) EnableReferringSameLoD==1 and LoDN is the uppermost layer and (2) EnableReferringSameLoD==1 and LoDN>=ReferringSameLoDminLayer is not satisfied (if No in S8262), no update is performed, and the N three-dimensional points calculated in S8261 are determined to be the three-dimensional points for predicted value generation.

Note that although in the example shown in FIG. 73, the three-dimensional data encoding device selects three-dimensional points for predicted value generation from the same LoD and updates the three-dimensional points after calculating N three-dimensional points for predicted value for a higher LoD layer, three-dimensional points for predicted value generation may be selected from a higher LoD and updated after N three-dimensional points for predicted value generation are calculated for the same LoD layer.

Embodiment 6

Description is given of another example of encoding attribute information (attribute information) of three-dimensional points using information on Level of Detail (LoD). Specifically, description is given of a method using ReferringSameLoDNumLayer that is information indicating a range of layers for which a same layer reference is permitted. In the same layer reference, referred to are three-dimensional points included in the same LoD layer as a current three-dimensional point that is a three-dimensional point as the encoding target.

ReferringSameLoDNumLayer is information indicating a range of LoD layers for which reference to three-dimensional points in same LoD is made possible. That is, ReferringSameLoDNumLayer indicates the range of LoD layers for which the same layer reference is permitted. For example, for layers from the uppermost layer of LoD and of a number indicated by a value of ReferringSameLoDNumLayer, the reference to the three-dimensional points in same LoD is possible (the same layer reference is possible). For the other layers, the reference to the three-dimensional points in same LoD is impossible (the same layer reference is impossible). Note that "the same layer reference is possible" means that the same layer reference is permitted. "The same layer reference is impossible" means that the same layer reference is prohibited (is not permitted).

For example, in the case where the maximum LoD layer number=3, where the lowermost layer is LoD0, where the layer above LoD0 is LoD1, and where the uppermost layer above LoD1 is LoD2, if ReferringSameLoDNumLayer=1, the same layer reference is possible for the LoD2 layer (uppermost layer). Moreover, if ReferringSameLoDNumLayer=2, the same layer reference is possible for the LoD2 and LoD1 layers. Moreover, if ReferringSameLoDNumLayer=3 (maximum LoD layer number), the same layer reference is possible for all the layers (LoD0, LoD1, and LoD2).

That is, if ReferringSameLoDNumLayer=N, the same layer reference is possible for N layers from the uppermost layer, and the same layer reference is impossible for layers lower than N layers. In this way, the same layer reference is made impossible for the layers lower than N layers from the uppermost layer, whereby prediction values of attribute information of the three-dimensional points included in these layers can be calculated in parallel. Moreover, the same layer reference is made possible for N layers from the uppermost layer, whereby prediction values of attribute information of the three-dimensional points included in N layers from the uppermost layer can be calculated using attribute information of a large number of neighboring three-dimensional points included in N layers from the uppermost layer. As a result, a balance between reduction in processing time and improvement in coding efficiency can be maintained.

Note that description is given above of the example in which, if ReferringSameLoDNumLayer=N, the same layer reference is made possible for N layers from the uppermost layer, but the present disclosure is not necessarily limited thereto. For example, if ReferringSameLoDNumLayer=N, the reference to the three-dimensional points in same LoD may be possible (the same layer reference may be possible) for N layers from the lowermost layer, and the reference to the three-dimensional points in same LoD may be impossible for layers higher than N layers. In this way, the same layer reference is made possible for N layers from the lowermost layer, whereby the coding efficiency can be improved. Moreover, prediction values of attribute information of the three-dimensional points included in the layers higher than N layers can be calculated in parallel.

Moreover, ReferringSameLoDNumLayer may indicate a range of layers for which the same layer reference is possible, and may indicate a range of layers for which the same layer reference is impossible. For example, if ReferringSameLoDNumLayer=N, the same layer reference may be impossible for N layers from the lowermost layer, and the same layer reference may be possible for the layers higher than N layers. Alternatively, for example, if ReferringSameLoDNumLayer=N, the same layer reference may be impossible for N layers from the uppermost layer, and the same layer reference may be possible for the layers lower than N layers.

Note that, in the case where the maximum LoD layer number is maxLoD, a value range of ReferringSameLoDNumLayer may be limited to 1 or more and maxLoD or less. That is, the minimum value of ReferringSameLoDNumLayer is limited to 1, whereby the same layer reference may be inevitably possible for the uppermost layer. In this manner, the three-dimensional points in same LoD can be referred to for a three-dimensional point included in the uppermost layer for which the other layers are not referred to, and hence decrease in coding efficiency can be suppressed. Moreover, in the case where ReferringSameLoDNumLayer=maxLoD, the same layer reference may be possible for all the LoD layers. In this manner, the coding efficiency of the three-dimensional points included in all the LoD layers can be increased.

Figure 74:
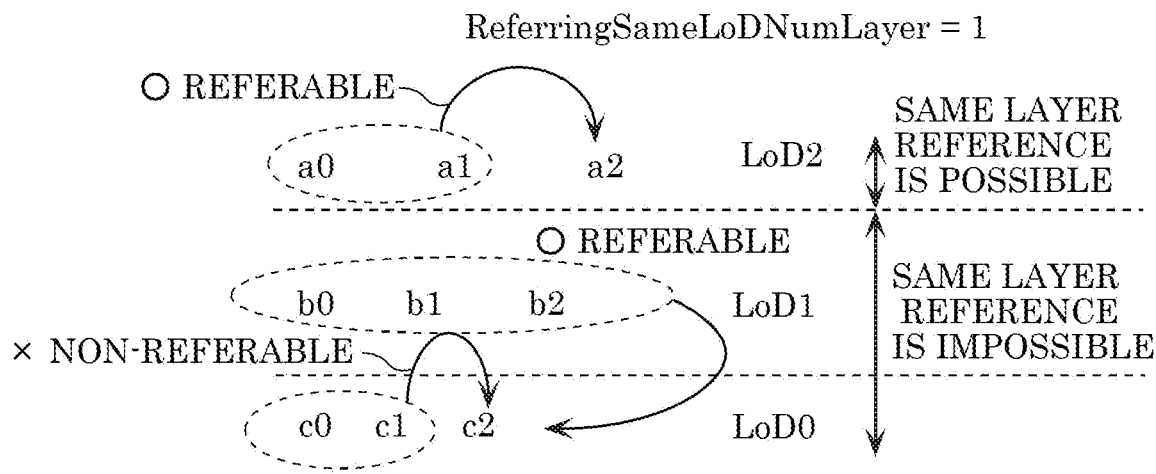
FIG. 74 is a diagram illustrating a reference relation example according to Embodiment 6.

FIG. 74 is a diagram illustrating a reference relation example in the case where ReferringSameLoDNumLayer=1 (minimum value). In this case, the same layer reference is possible for the LoD2 layer. That is, for generating prediction values of attribute information of the three-dimensional points included in LoD2, the three-dimensional points included in the same layer are referable. For example, a prediction value of a2 is generated using any of pieces of attribute information of a0 and a1. In the case where a0 and a1 have already been encoded or decoded, a0 and a1 may be referable. In this manner, the prediction value of a2 is generated using the attribute information of the larger number of neighboring three-dimensional points in same LoD. Hence, the prediction accuracy can be enhanced, and the coding efficiency can be improved.

On the other hand, for generating prediction values of attribute information of the three-dimensional points included in LoD0, the reference to the three-dimensional points in the same layer is prohibited. For example, a prediction value of c2 is generated using any of pieces of attribute information of b0, b1, and b2. Even if c0 and c1 have already been encoded or decoded, the reference to c0 and c1 is prohibited. In this manner, the prediction value of c2 can be generated without waiting for completion of the encoding or decoding process of c0 and c1. That is, the three-dimensional data encoding device or the three-dimensional data decoding device can calculate the prediction values of the attribute information of the three-dimensional points in same LoD in parallel, and hence the processing time can be reduced.

Figure 75:
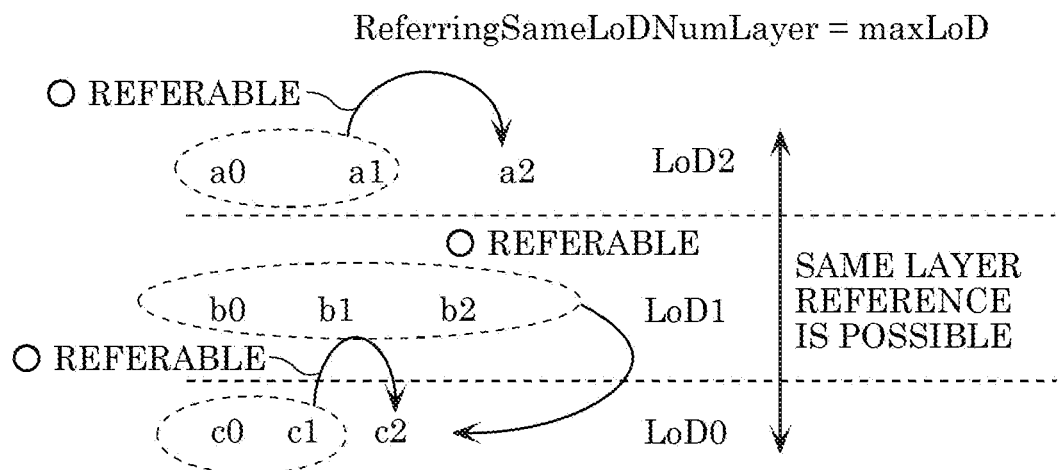
FIG. 75 is a diagram illustrating a reference relation example according to Embodiment 6.

FIG. 75 is a diagram illustrating a reference relation example in the case where ReferringSameLoDNumLayer=maxLoD (maximum value). In this case, the same layer reference is possible for all the layers (LoD0, LoD1, and LoD2). That is, for generating prediction values of attribute information of all the three-dimensional points, the three-dimensional points included in the same layer are referable. For example, the prediction value of c2 is generated using any of pieces of attribute information of b0, b1, b2, c0, and c1. In the case where c0 and c1 have already been encoded or decoded, c0 and c1 may be referable. In this manner, the prediction value of c2 is generated using the attribute information of the larger number of neighboring three-dimensional points. Hence, the prediction accuracy can be enhanced, and the coding efficiency can be improved.

FIG. 76 is a diagram illustrating a syntax example of an attribute information header (attribute header). Here, the attribute information header is, for example, a header in units of a frame, a slice, or a tile, and is a header of attribute information. The attribute information header illustrated in FIG. 76 includes maxLoD (maximum layer number information) and ReferringSameLoDNumLayer_minus1.

maxLoD indicates a maximum LoD layer number. In encoding or decoding, LoD is generated such that the LoD layer number is equal to or less than the maximum layer number indicated by maxLoD. For example, in the case where the LoD layer number does not reach maxLoD as a result of generating LoD, uppermost layer LoDN (N<maxLoD−1) obtained as the result of generating may be set to the uppermost layer of the LoD layers at the time of encoding or decoding. Note that, instead of maxLoD, maxLoD_minus1 (=maxLoD−1) may be added to the bitstream. In this manner, the header amount can be reduced.

ReferringSameLoDNumLayer_minus1 is information indicating a range of LoD layers for which the reference to the three-dimensional points in same LoD is made possible. That is, ReferringSameLoDNumLayer_minus1 indicates the range of LoD layers for which the same layer reference is permitted (or is not permitted). Note that ReferringSameLoDNumLayer_minus1 indicates a value obtained by subtracting 1 from above-mentioned ReferringSameLoDNumLayer. In the three-dimensional data decoding device, ReferringSameLoDNumLayer is calculated based on the fact that ReferringSameLoDNumLayer=ReferringSameLoDNumLayer_minus1+1.

The value of ReferringSameLoDNumLayer may indicate that the same layer reference is possible (permitted) for layers from the uppermost layer of LoD indicated by maxLoD and of a number indicated by the value of ReferringSameLoDNumLayer and that the same layer reference is impossible (prohibited) for the other layers. For example, in the case where ReferringSameLoDNumLayer=1 (minimum value), the same layer reference is possible for one layer from the uppermost layer of LoD indicated by maxLoD, that is, for the uppermost layer, and the same layer reference is impossible for the other layers, that is, for the layers other than the uppermost layer.

Moreover, for example, in the case where ReferringSameLoDNumLayer=2, the same layer reference is possible for two layers from the uppermost layer of LoD indicated by maxLoD, that is, for the uppermost layer and the layer lower immediately below the uppermost layer, and the same layer reference is impossible for the other layers, that is, for the layers other than the uppermost layer and the layer immediately below the uppermost layer.

Moreover, for example, in the case where ReferringSameLoDNumLayer=N, the same layer reference is possible for N layers from the uppermost layer of LoD indicated by maxLoD, that is, for N layers including the uppermost layer, and the same layer reference is impossible for the other layers, that is, for the layers other than N layers including the uppermost layer.

Moreover, for example, in the case where ReferringSameLoDNumLayer=maxLoD (maximum value), the same layer reference is possible for layers from the uppermost layer of LoD indicated by maxLoD and of a number indicated by maxLoD, that is, for all the layers.

Note that the minimum value of ReferringSameLoDNumLayer_minus1 is 0, and the maximum value thereof is maxLoD−1. That is, the minimum value of ReferringSameLoDNumLayer is 1, and the maximum value thereof is maxLoD. In this manner, the same layer reference is always possible for the uppermost layer of LoD for which other layers cannot be referred to. Accordingly, decrease in coding efficiency can be suppressed.

Moreover, in the same layer reference, among three-dimensional points in same LoD, three-dimensional points that have already been encoded or decoded may be referable, and three-dimensional points that have not been encoded or decoded yet may be non-referable Moreover, in the case where maxLoD=1, that is, the LoD layer number=1, the three-dimensional data encoding device may perform encoding by making such setting that ReferringSameLoDNumLayer_minus1=0, that is, ReferringSameLoDNumLayer=1 and such setting that the same layer reference is possible. Moreover, as illustrated in FIG. 76, in the case where maxLoD=1, the three-dimensional data encoding device need not add ReferringSameLoDNumLayer_minus1 to the bitstream. In this manner, in the case where the number of layers is 1, the header amount can be reduced while the coding efficiency can be enhanced by using the same layer reference.

Note that, in the case where maxLoD=1, the three-dimensional data decoding device may estimate the value of ReferringSameLoDNumLayer_minus1 to be 0, that is, the value of ReferringSameLoDNumLayer to be 1. In this manner, in the case where maxLoD=1, the three-dimensional data decoding device can determine that ReferringSameLoDNumLayer_minus1=0, that is, ReferringSameLoDNumLayer=1, and can appropriately decode an encoded bitstream by using the same layer reference.

FIG. 77 is a diagram illustrating another syntax example of the attribute information header. As illustrated in FIG. 77, even in the case where maxLoD is 1, ReferringSameLoDNumLayer_minus1 may be added to the bitstream. In this case, in the case where maxLoD=1, it may be defined by a profile, a level, or the like such as standards that ReferringSameLoDNumLayer_minus1=0.

Moreover, in the case where maxLoD=1, unless ReferringSameLoDNumLayer_minus1=0, the three-dimensional data decoding device may determine that the bitstream is not compliant with specifications (is not compliant with predetermined standards or violates the standards).

In this way, in the case where the number of layers is 1, the same layer reference is made possible for the one layer, whereby the header amount can be reduced while the coding efficiency can be enhanced.

Note that the three-dimensional data encoding device may entropically encode maxLoD or ReferringSameLoDNumLayer_minus1 and then may add entropically encoded maxLoD or ReferringSameLoDNumLayer_minus1 to the header. For example, the three-dimensional data encoding device binarizes each value and arithmetically encodes the binarized value. Moreover, the three-dimensional data encoding device may perform encoding at a fixed length in order to suppress the amount of processing.

Moreover, the three-dimensional data encoding device does not necessarily need to add maxLoD or ReferringSameLoDNumLayer_minus1 to the header. For example, each value may be defined by a profile, a level, or the like such as standards. In this manner, the bit amount of the header can be reduced.

Moreover, the three-dimensional data encoding device may switch maxLoD or ReferringSameLoDNumLayer_minus1 in units of WLD, SPC, or a volume, and may add the same to the header in units of WLD, SPC, or a volume.

Moreover, the value of ReferringSameLoDNumLayer_minus1 may be restricted by an encoding scheme of attribute information. For example, the case where an encoding scheme (lifting scheme) is used is considered. In the lifting scheme, a predicted residual of attribute information of three-dimensional points included in lower layers of LoD is calculated, the predicted residual is fed back to upper layers, and encoding is thus performed. In this case, the same layer reference is set to be possible for the uppermost layer of LoD in some cases, and hence the value of ReferringSameLoDNumLayer_minus1 may be restricted to 0 (always set to 0). In this manner, the coding efficiency in the case of the lifting scheme can be enhanced.

Note that the same layer reference may be made possible for a layer that has become the uppermost layer as a result of generating LoD, regardless of the value of ReferringSameLoDNumLayer. For example, at the time of calculating the prediction values of the attribute information of the three-dimensional points included in the LoDN layer, whether or not the three-dimensional points in same LoD are referable may be determined according to the following conditional expression.

"If (LoDN==the layer that has become the uppermost layer as a result of generating LoD or (N>=maxLoD−ReferringSameLoDNumLayer)) then the three-dimensional points in same LoD are made referable Otherwise the reference to the three-dimensional points in same LoD is prohibited"

That is, in the case where LoDN (N is an integer that is from 0 to maxLoD−1) as the processing target (determination target) is the uppermost layer, the same layer reference is permitted. Moreover, in the case where LoDN is a layer that is indicated by ReferringSameLoDNumLayer as the layer for which the same layer reference is possible, the same layer reference is permitted. In the case where LoDN is not the uppermost layer and is not the layer that is indicated by ReferringSameLoDNumLayer as the layer for which the same layer reference is possible, the same layer reference is prohibited.

Figure 78:
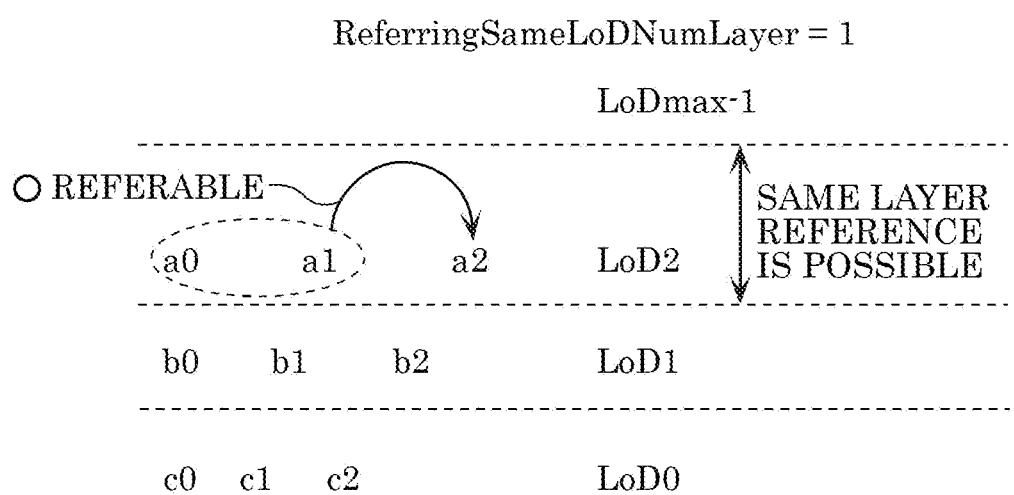
FIG. 78 is a diagram illustrating a reference relation example according to Embodiment 6.

FIG. 78 is a diagram illustrating a reference relation example in the case where the above is applied and where ReferringSameLoDNumLayer=1.

For example, in the example illustrated in FIG. 78, the maximum LoD layer number is maxLoD, and the uppermost layer doesn't reach maxLoD−1 and is LoD2 as a result of generating LoD. Here, because ReferringSameLoDNumLayer=1, the layer that is defined by ReferringSameLoDNumLayer as the layer for which the same layer reference is possible is maxLoD−1. In this case, although LoD2 is not included in a range of the layer that is defined by ReferringSameLoDNumLayer as the layer for which the same layer reference is possible, the same layer reference is permitted for LoD2 that is the uppermost layer. That is, the same layer reference is permitted for the layer that has become the uppermost layer as a result of generating LoD, regardless of the value of ReferringSameLoDNumLayer. In this manner, the same layer reference can be made possible for at least one layer, and hence the coding efficiency can be enhanced.

In the above-mentioned case, for generating prediction values of attribute information of the three-dimensional points included in LoD2 that has become the uppermost layer, the reference to the three-dimensional points included in the same layer is permitted. For example, the prediction value of a2 is generated using any of the pieces of attribute information of a0 and a1. Note that, in the case where a0 and a1 have already been encoded or decoded, a0 and a1 may be referable. In this manner, the prediction value of a2 is generated using the attribute information of the larger number of neighboring three-dimensional points. Hence, the prediction accuracy can be enhanced, and the coding efficiency can be improved.

Note that whether or not LoDN is the uppermost layer may be determined on the basis of, for example, whether or not a three-dimensional point to be allocated to a layer higher than LoDN remains in a buffer or the like. That is, in the case where no three-dimensional point to be allocated to the layer higher than LoDN remains in the buffer or the like, LoDN may be determined to be the uppermost layer. Otherwise, LoDN may be determined not to be the uppermost layer. In this manner, the three-dimensional data encoding device can determine whether or not LoDN is the uppermost layer. In accordance with the determination result, the three-dimensional data encoding device can switch whether or not the same layer reference is possible.

Note that the value of ReferringSameLoDNumLayer may be restricted by the encoding scheme of the attribute information. For example, the case where an encoding scheme (lifting scheme) is used is considered. In the lifting scheme, a predicted residual of attribute information of three-dimensional points included in lower layers of LoD is calculated, the predicted residual is fed back to upper layers, and encoding is thus performed. In this case, the encoding or decoding process on the three-dimensional points included in the same layer has not been completed, and hence these three-dimensional points cannot be referred to for generating the prediction value. In the case of using such an encoding scheme as described above, the same layer reference may be set to be impossible, regardless of the value of ReferringSameLoDNumLayer. Moreover, in the case of the lifting scheme, the three-dimensional data encoding device need not add ReferringSameLoDNumLayer to the header. In this manner, the header amount can be reduced.

Moreover, the following conditional expression may be introduced, and, in the case where the encoding scheme is the lifting scheme, the same layer reference may be set to be impossible.

"If (the encoding scheme is not the lifting scheme and (LoDN==the layer that has become the uppermost layer as a result of generating LoD or (N>=maxLoD−ReferringSameLoDNumLayer))) then the three-dimensional points in same LoD are made referable Otherwise the reference to the three-dimensional points in same LoD is prohibited"

Note that description is given here of the example in which, in the case of using the lifting scheme, the same layer reference is set to be impossible, but the present disclosure is not limited thereto. For example, in the case of using the lifting scheme, the three-dimensional points included in the same layer are referable for the uppermost layer of LoD in some cases, and hence the same layer reference may be set to be possible for the uppermost layer of LoD. For example, in the case of using the lifting scheme, in the case where LoDN is the uppermost layer, the same layer reference may be set to be possible for LoDN.

Note that, in the case of using the lifting scheme, the value of ReferringSameLoDNumLayer may be restricted to 1. In this manner, in the case of the lifting scheme, the same layer reference can be made possible for the uppermost layer of generated LoD, and the same layer reference can be prohibited for layers other than the uppermost layer. That is, the following conditional expression may be applied to the lifting scheme and other schemes.

"If (LoDN==the layer that has become the uppermost layer as a result of generating LoD or (N>=maxLoD−ReferringSameLoDNumLayer)) then the three-dimensional points in same LoD are made referable Otherwise the reference to the three-dimensional points in same LoD is prohibited"

In this manner, the above-mentioned expression common to the lifting scheme and other schemes can be used, and hence processing such as conditional branching due to a plurality of schemes can be reduced.

Figure 79:
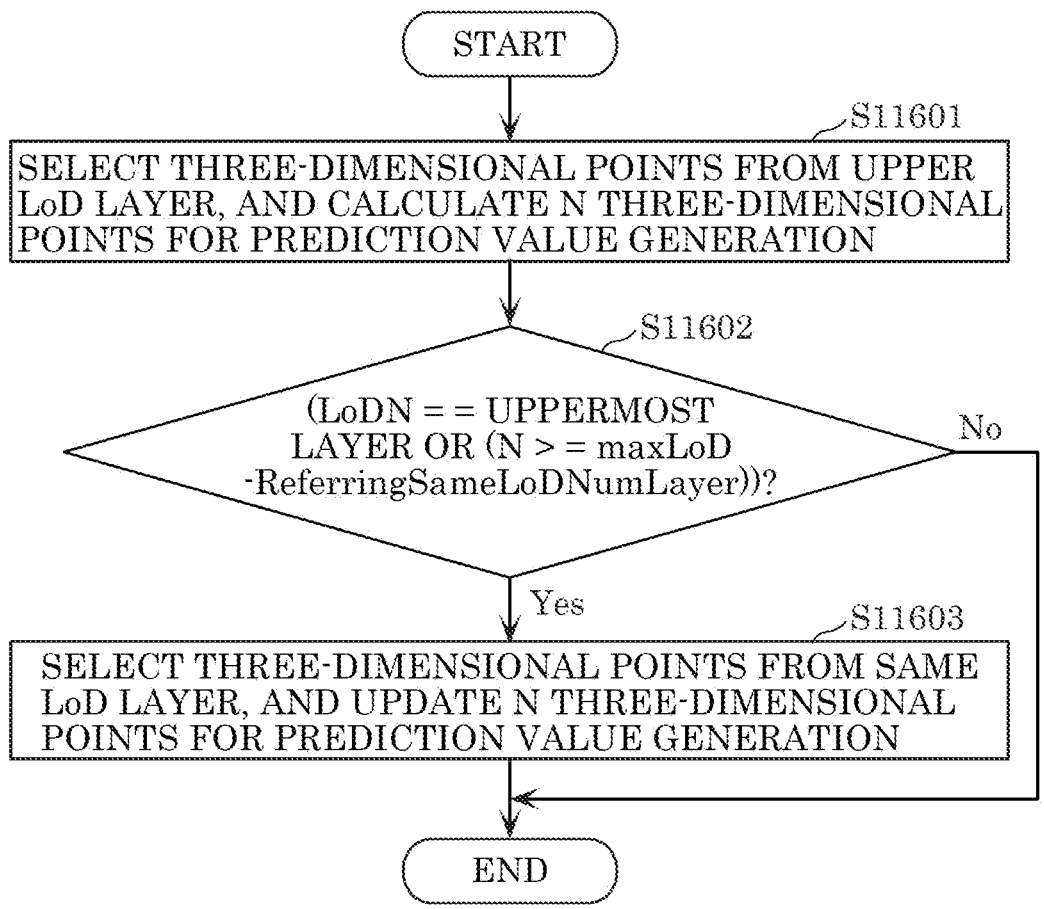
FIG. 79 is a flowchart of a surrounding point searching process according to Embodiment 6.

FIG. 79 is a flowchart of a surrounding point searching process of searching for a plurality of surrounding points that are three-dimensional points existing around a current three-dimensional point. The surrounding points are used to calculate a prediction value of the current three-dimensional point to be processed.

First, the three-dimensional data encoding device selects a number of three-dimensional points from an upper LoD layer higher than a layer in which the current three-dimensional point is included, the number corresponding to SearchNumPoint[upper LoD]. The three-dimensional data encoding device calculates N three-dimensional points for prediction value generation, using the selected three-dimensional points (S11601). Here, SearchNumPoint indicates the number of searches when the N three-dimensional points to be used for prediction are selected from the three-dimensional point cloud in LoD. Moreover, SearchNumPoint[upper LoD] indicates the number of searches of a layer higher than the current three-dimensional point.

Next, if at least one of (1) the case where LoDN as the processing target is the uppermost layer (the layer that has become the uppermost layer as a result of generating LoD) and (2) the case where N>=maxLoD−ReferringSameLoDNumLayer is satisfied (Yes in S11602), the three-dimensional data encoding device selects a number of three-dimensional points from the same LoD layer, the number corresponding to SearchNumPoint[same LoD]. The three-dimensional data encoding device updates the N three-dimensional points for prediction value generation, using the selected three-dimensional points (S11603). Here, SearchNumPoint[same LoD] indicates the number of searches of the layer in which the current three-dimensional point is included.

On the other hand, if both of (1) the case where LoDN as the processing target is the uppermost layer and (2) the case where N>=maxLoD−ReferringSameLoDNumLayer are not satisfied (No in S11602), the update is not performed, and the N three-dimensional points calculated in S11601 are determined as the three-dimensional points for prediction value generation.

Note that, in the example illustrated in FIG. 79, the three-dimensional data encoding device calculates the N three-dimensional points for prediction value generation from the upper LoD layer, and then selects and updates the three-dimensional points for prediction value generation from same LoD. Alternatively, the three-dimensional data encoding device may calculate the N three-dimensional points for prediction value generation from the same LoD layer, and then may select and update the three-dimensional points for prediction value generation from the upper LoD.

Moreover, the three-dimensional data encoding device calculates, for example, a weighted average of values of attribute information of the N three-dimensional points (surrounding points) obtained through the above-mentioned processing, and sets the obtained value to prediction value P.

Next, the three-dimensional data encoding device calculates a predicted residual that is a difference between the attribute information of the current three-dimensional point and the prediction value thereof. Next, the three-dimensional data encoding device quantizes the predicted residual to thereby calculate a quantized value. Next, the three-dimensional data encoding device arithmetically encodes the quantized value.

Note that, here, the three-dimensional data decoding device also performs a similar surrounding point searching process. In this case, the three-dimensional data decoding device calculates the weighted average of the values of the attribute information of the obtained N three-dimensional points (surrounding points), and sets the obtained value to prediction value P. Next, the three-dimensional data decoding device arithmetically decodes the quantized value from the bitstream. Moreover, the three-dimensional data decoding device inversely quantizes the decoded quantized value to thereby calculate an inversely quantized value. Next, the three-dimensional data decoding device adds the prediction value to the inversely quantized value to thereby generate a decoded value (attribute information).

Figure 80:
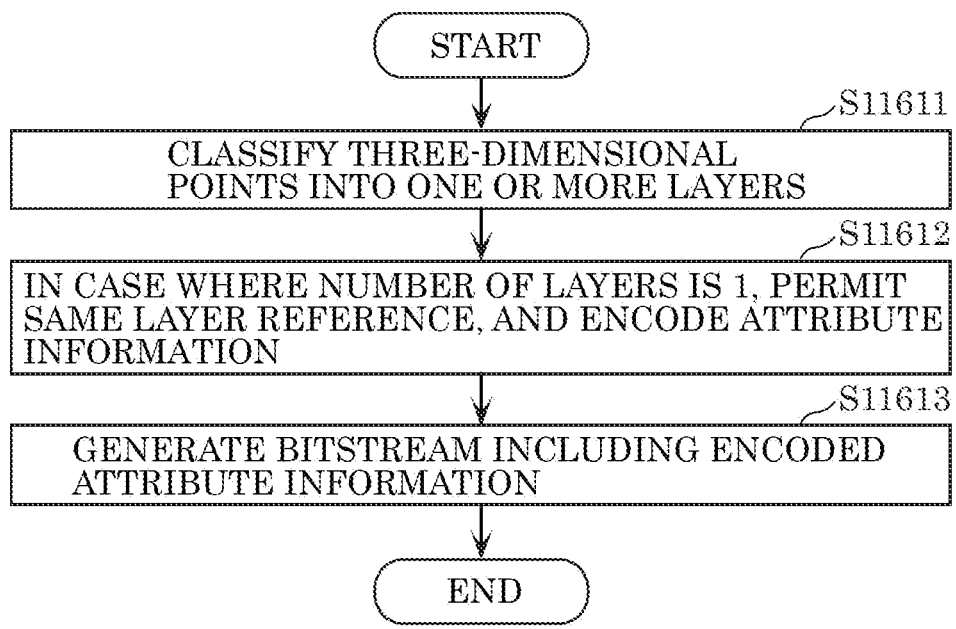
FIG. 80 is a flowchart of a three-dimensional data encoding process according to Embodiment 6.

As stated above, the three-dimensional data encoding device according to the present embodiment performs the process shown in FIG. 80. The three-dimensional data encoding device classifies three-dimensional points included in point cloud data into one or more layers (e.g., LoD), based on geometry information of the three-dimensional points (S11611). The three-dimensional data encoding device permits same layer reference when a total number of the one or more layers is one, and generates encoded attribute information by encoding attribute information of the three-dimensional points, the same layer reference including generating a prediction value of attribute information of a current three-dimensional point by reference to attribute information of an other three-dimensional point included in a same layer as the current three-dimensional point (S11612). For example, the three-dimensional data encoding device always permits the same layer reference when the number of the one or more layers is one. Next, the three-dimensional data encoding device generates a bitstream including the encoded attribute information (S11613).

According to this feature, the three-dimensional data encoding device permits the same layer reference when the number of the layers is one, whereby the coding efficiency can be increased.

For example, the three-dimensional data encoding device determines, from among two or more layers, a layer for which the same layer reference is permitted and a layer for which the same layer reference is prohibited, when the total number of the one or more layers is two or more; and permits or prohibits the same layer reference, based on a result of the determining, and generates the encoded attribute information by encoding the attribute information.

According to this feature, the three-dimensional data encoding device can select whether to permit or prohibit same layer reference when the number of layers is two or more. Accordingly, it is possible to set a balance between the parallel processing and the coding efficiency appropriately.

For example, the three-dimensional data encoding device permits the same layer reference for, among the two or more layers, layers ranging from an uppermost layer to an N-th layer and prohibits the same layer reference for a layer lower than the N-th layer, and generates the encoded attribute information by encoding the attribute information, N being a natural number.

According to this feature, the three-dimensional data encoding device permits same layer reference from an upper layer, whereby the coding efficiency can be increased.

For example, the bitstream includes first information (e.g., ReferringSameLoDNumLayer_minus1) indicating a layer for which the same layer reference is permitted or a layer for which the same layer reference is prohibited. In other words, the three-dimensional data encoding device adds the first information to the bitstream.

For example, the bitstream includes second information (e.g., maxLoD) indicating the total number of the one or more layers. In other words, the three-dimensional data encoding device adds the second information to the bitstream.

For example, the three-dimensional data encoding device includes a processor and memory. Using the memory, the processor performs the above process.

Figure 81:
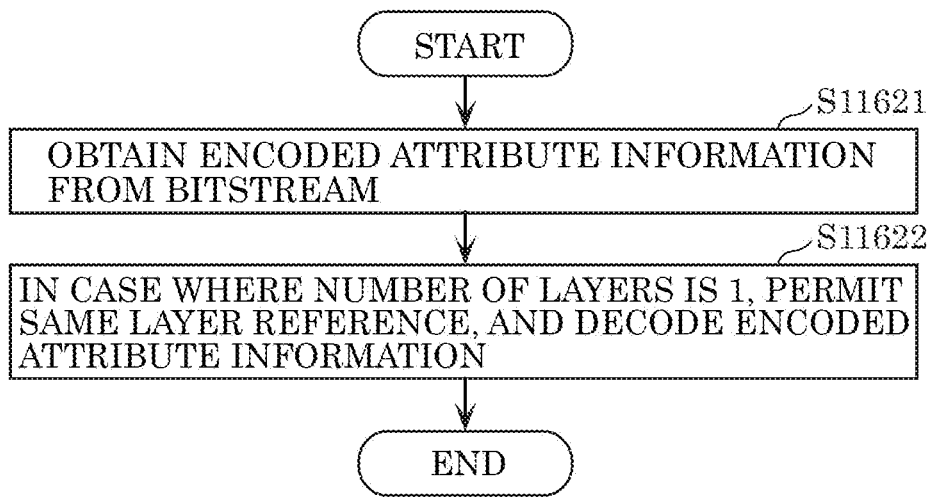
FIG. 81 is a flowchart of a three-dimensional data decoding process according to Embodiment 6.

The three-dimensional data decoding device according to the present embodiment performs the process shown in FIG. 81. The three-dimensional data decoding device obtains, from a bitstream, encoded attribute information of three-dimensional points included in point cloud data, the encoded attribute information being obtained by encoding attribute information of the three-dimensional points classified into one or more layers (e.g., LoD) based on geometry information of the three-dimensional points (S11621). The three-dimensional data decoding device permits same layer reference when a total number of the one or more layers is one, and decodes the encoded attribute information, the same layer reference including generating a prediction value of attribute information of a current three-dimensional point by reference to attribute information of an other three-dimensional point included in a same layer as the current three-dimensional point (S11622). For example, the three-dimensional data decoding device always permits the same layer reference when the number of the one or more layers is one.

According to this feature, the three-dimensional data encoding device permits the same layer reference when the number of the layers is one, whereby the coding efficiency can be increased.

For example, the three-dimensional data decoding device determines, from among two or more layers, a layer for which the same layer reference is permitted and a layer for which the same layer reference is prohibited, when the total number of the one or more layers is two or more; and permits or prohibits the same layer reference, based on a result of the determining, and decodes the encoded attribute information.

For example, the three-dimensional data decoding device permits the same layer reference for, among the two or more layers, layers ranging from an uppermost layer to an N-th layer and prohibits the same layer reference for a layer lower than the N-th layer, and decodes the encoded attribute information, N being a natural number.

For example, the three-dimensional data decoding device obtains, from the bitstream, first information (e.g., ReferringSameLoDNumLayer_minus1) indicating a layer for which the same layer reference is permitted or a layer for which the same layer reference is prohibited. For example, the three-dimensional data decoding device determines a layer for which the same layer reference is permitted and a layer for which the same layer reference is prohibited, based on the first information; and permits or prohibits the same layer reference, based on a result of the determining, and decodes the encoded attribute information.

For example, the three-dimensional data decoding device obtains, from the bitstream, second information (e.g., maxLoD) indicating the total number of the one or more layers. For example, the three-dimensional data decoding device determines whether the number of the one or more layers is one, based on the second information.

For example, the three-dimensional data decoding device obtains, from the bitstream, (1) the first information indicating the layer for which the same layer reference is permitted or the layer for which the same layer reference is prohibited and (2) the second information indicating the total number of the one or more layers; and determines that the bitstream is not compliant with standards, in a case where the first information indicates that the same layer reference is not permitted for one layer among the one or more layers when the total number of the one or more layers indicated in the second information is one.

For example, the three-dimensional data decoding device includes a processor and memory. Using the memory, the processor performs the above process.

Embodiment 7

Figure 82:
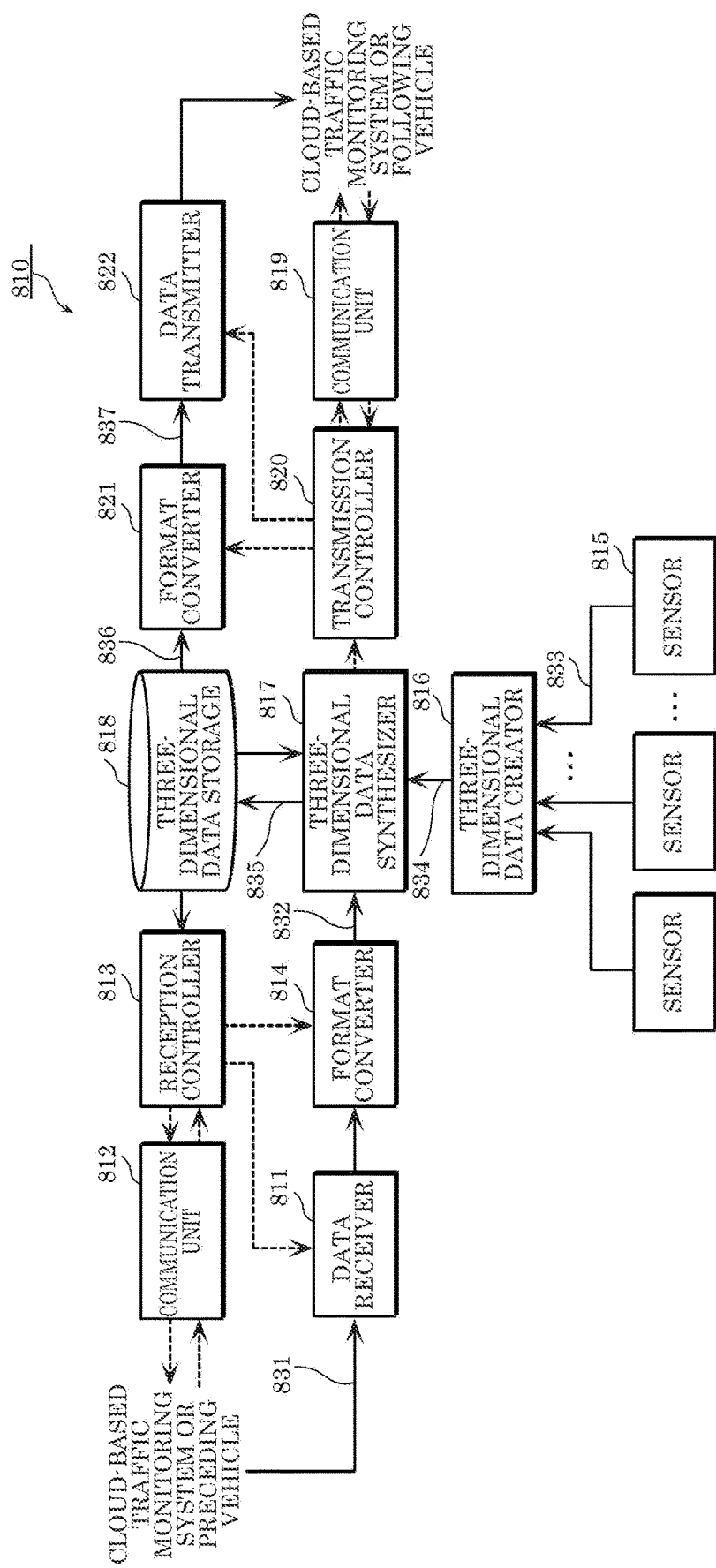
FIG. 82 is a block diagram of a three-dimensional data creation device according to Embodiment 7.

The following describes the structure of three-dimensional data creation device 810 according to the present embodiment. FIG. 82 is a block diagram of an exemplary structure of three-dimensional data creation device 810 according to the present embodiment. Such three-dimensional data creation device 810 is equipped, for example, in a vehicle. Three-dimensional data creation device 810 transmits and receives three-dimensional data to and from an external cloud-based traffic monitoring system, a preceding vehicle, or a following vehicle, and creates and stores three-dimensional data.

Three-dimensional data creation device 810 includes data receiver 811, communication unit 812, reception controller 813, format converter 814, a plurality of sensors 815, three-dimensional data creator 816, three-dimensional data synthesizer 817, three-dimensional data storage 818, communication unit 819, transmission controller 820, format converter 821, and data transmitter 822.

Data receiver 811 receives three-dimensional data 831 from a cloud-based traffic monitoring system or a preceding vehicle. Three-dimensional data 831 includes, for example, information on a region undetectable by sensors 815 of the own vehicle, such as a point cloud, visible light video, depth information, sensor position information, and speed information.

Communication unit 812 communicates with the cloud-based traffic monitoring system or the preceding vehicle to transmit a data transmission request, etc. to the cloud-based traffic monitoring system or the preceding vehicle.

Reception controller 813 exchanges information, such as information on supported formats, with a communications partner via communication unit 812 to establish communication with the communications partner.

Format converter 814 applies format conversion, etc. on three-dimensional data 831 received by data receiver 811 to generate three-dimensional data 832. Format converter 814 also decompresses or decodes three-dimensional data 831 when three-dimensional data 831 is compressed or encoded.

A plurality of sensors 815 are a group of sensors, such as visible light cameras and infrared cameras, that obtain information on the outside of the vehicle and generate sensor information 833. Sensor information 833 is, for example, three-dimensional data such as a point cloud (point group data), when sensors 815 are laser sensors such as LiDARs. Note that a single sensor may serve as a plurality of sensors 815.

Three-dimensional data creator 816 generates three-dimensional data 834 from sensor information 833. Three-dimensional data 834 includes, for example, information such as a point cloud, visible light video, depth information, sensor position information, and speed information.

Three-dimensional data synthesizer 817 synthesizes three-dimensional data 834 created on the basis of sensor information 833 of the own vehicle with three-dimensional data 832 created by the cloud-based traffic monitoring system or the preceding vehicle, etc., thereby forming three-dimensional data 835 of a space that includes the space ahead of the preceding vehicle undetectable by sensors 815 of the own vehicle.

Three-dimensional data storage 818 stores generated three-dimensional data 835, etc.

Communication unit 819 communicates with the cloud-based traffic monitoring system or the following vehicle to transmit a data transmission request, etc. to the cloud-based traffic monitoring system or the following vehicle.

Transmission controller 820 exchanges information such as information on supported formats with a communications partner via communication unit 819 to establish communication with the communications partner. Transmission controller 820 also determines a transmission region, which is a space of the three-dimensional data to be transmitted, on the basis of three-dimensional data formation information on three-dimensional data 832 generated by three-dimensional data synthesizer 817 and the data transmission request from the communications partner.

More specifically, transmission controller 820 determines a transmission region that includes the space ahead of the own vehicle undetectable by a sensor of the following vehicle, in response to the data transmission request from the cloud-based traffic monitoring system or the following vehicle. Transmission controller 820 judges, for example, whether a space is transmittable or whether the already transmitted space includes an update, on the basis of the three-dimensional data formation information to determine a transmission region. For example, transmission controller 820 determines, as a transmission region, a region that is: a region specified by the data transmission request; and a region, corresponding three-dimensional data 835 of which is present. Transmission controller 820 then notifies format converter 821 of the format supported by the communications partner and the transmission region.

Of three-dimensional data 835 stored in three-dimensional data storage 818, format converter 821 converts three-dimensional data 836 of the transmission region into the format supported by the receiver end to generate three-dimensional data 837. Note that format converter 821 may compress or encode three-dimensional data 837 to reduce the data amount.

Data transmitter 822 transmits three-dimensional data 837 to the cloud-based traffic monitoring system or the following vehicle. Such three-dimensional data 837 includes, for example, information on a blind spot, which is a region hidden from view of the following vehicle, such as a point cloud ahead of the own vehicle, visible light video, depth information, and sensor position information.

Note that an example has been described in which format converter 814 and format converter 821 perform format conversion, etc., but format conversion may not be performed.

With the above structure, three-dimensional data creation device 810 obtains, from an external device, three-dimensional data 831 of a region undetectable by sensors 815 of the own vehicle, and synthesizes three-dimensional data 831 with three-dimensional data 834 that is based on sensor information 833 detected by sensors 815 of the own vehicle, thereby generating three-dimensional data 835. Three-dimensional data creation device 810 is thus capable of generating three-dimensional data of a range undetectable by sensors 815 of the own vehicle.

Three-dimensional data creation device 810 is also capable of transmitting, to the cloud-based traffic monitoring system or the following vehicle, etc., three-dimensional data of a space that includes the space ahead of the own vehicle undetectable by a sensor of the following vehicle, in response to the data transmission request from the cloud-based traffic monitoring system or the following vehicle.

Figure 83:
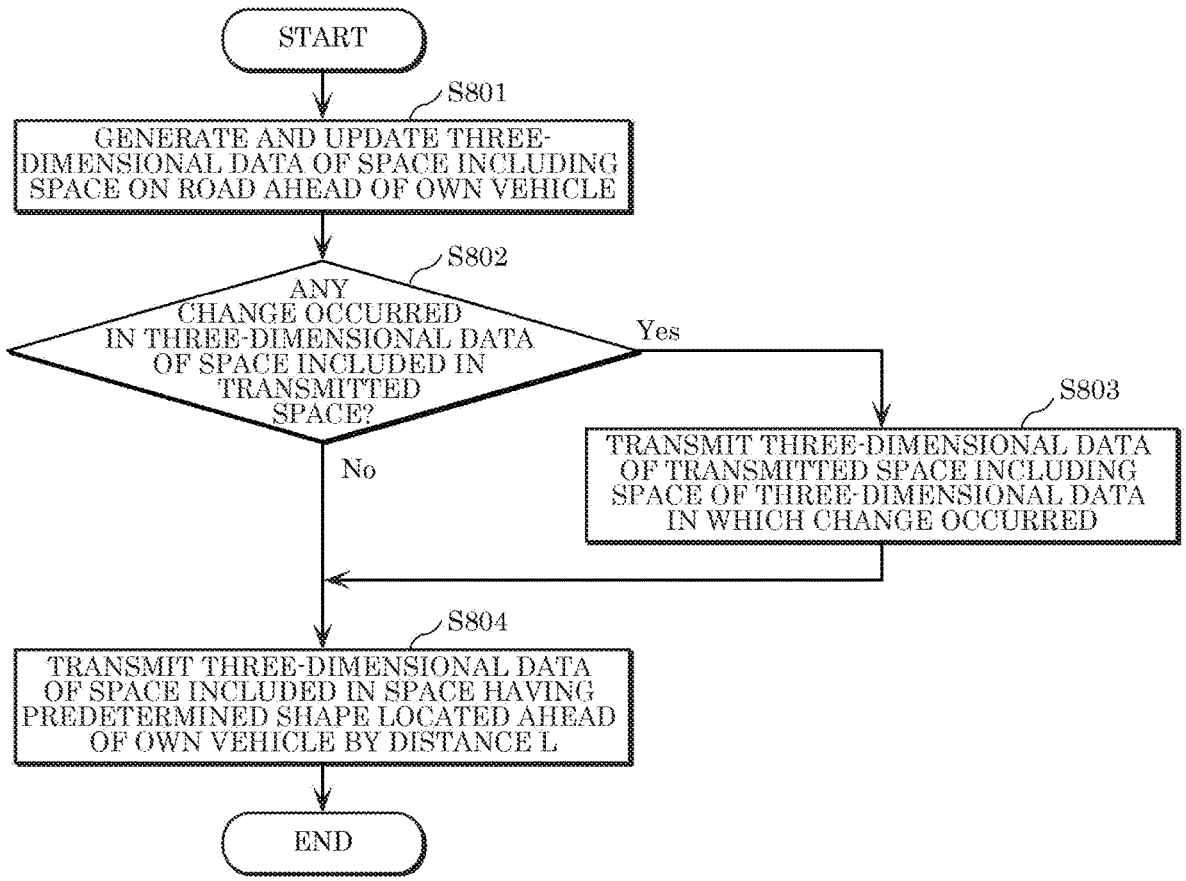
FIG. 83 is a flowchart of a three-dimensional data creation method according to Embodiment 7.

The following describes the steps performed by three-dimensional data creation device 810 of transmitting three-dimensional data to a following vehicle. FIG. 83 is a flowchart showing exemplary steps performed by three-dimensional data creation device 810 of transmitting three-dimensional data to a cloud-based traffic monitoring system or a following vehicle.

First, three-dimensional data creation device 810 generates and updates three-dimensional data 835 of a space that includes space on the road ahead of the own vehicle (S801). More specifically, three-dimensional data creation device 810 synthesizes three-dimensional data 834 created on the basis of sensor information 833 of the own vehicle with three-dimensional data 831 created by the cloud-based traffic monitoring system or the preceding vehicle, etc., for example, thereby forming three-dimensional data 835 of a space that also includes the space ahead of the preceding vehicle undetectable by sensors 815 of the own vehicle.

Three-dimensional data creation device 810 then judges whether any change has occurred in three-dimensional data 835 of the space included in the space already transmitted (S802).

When a change has occurred in three-dimensional data 835 of the space included in the space already transmitted due to, for example, a vehicle or a person entering such space from outside (Yes in S802), three-dimensional data creation device 810 transmits, to the cloud-based traffic monitoring system or the following vehicle, the three-dimensional data that includes three-dimensional data 835 of the space in which the change has occurred (S803).

Three-dimensional data creation device 810 may transmit three-dimensional data in which a change has occurred, at the same timing of transmitting three-dimensional data that is transmitted at a predetermined time interval, or may transmit three-dimensional data in which a change has occurred soon after the detection of such change. Stated differently, three-dimensional data creation device 810 may prioritize the transmission of three-dimensional data of the space in which a change has occurred to the transmission of three-dimensional data that is transmitted at a predetermined time interval.

Also, three-dimensional data creation device 810 may transmit, as three-dimensional data of a space in which a change has occurred, the whole three-dimensional data of the space in which such change has occurred, or may transmit only a difference in the three-dimensional data (e.g., information on three-dimensional points that have appeared or vanished, or information on the displacement of three-dimensional points).

Three-dimensional data creation device 810 may also transmit, to the following vehicle, meta-data on a risk avoidance behavior of the own vehicle such as hard breaking warning, before transmitting three-dimensional data of the space in which a change has occurred. This enables the following vehicle to recognize at an early stage that the preceding vehicle is to perform hard braking, etc., and thus to start performing a risk avoidance behavior at an early stage such as speed reduction.

When no change has occurred in three-dimensional data 835 of the space included in the space already transmitted (No in S802), or after step S803, three-dimensional data creation device 810 transmits, to the cloud-based traffic monitoring system or the following vehicle, three-dimensional data of the space included in the space having a predetermined shape and located ahead of the own vehicle by distance L (S804).

The processes of step S801 through step S804 are repeated, for example at a predetermined time interval.

When three-dimensional data 835 of the current space to be transmitted includes no difference from the three-dimensional map, three-dimensional data creation device 810 may not transmit three-dimensional data 837 of the space.

In the present embodiment, a client device transmits sensor information obtained through a sensor to a server or another client device.

Figure 84:
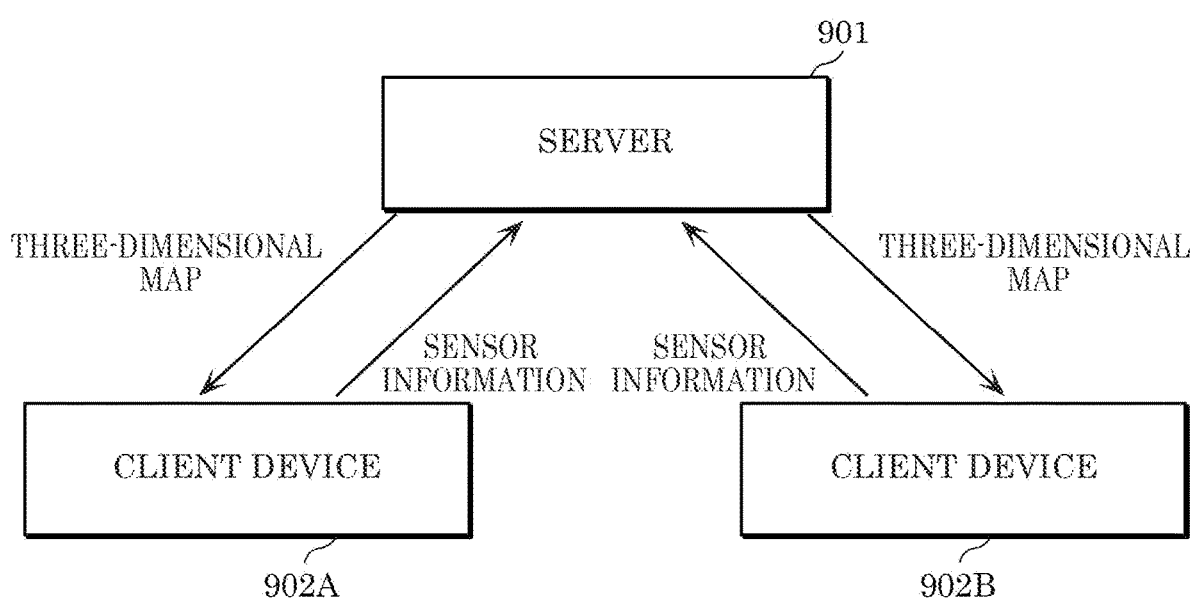
FIG. 84 is a diagram showing a structure of a system according to Embodiment 7.

A structure of a system according to the present embodiment will first be described. FIG. 84 is a diagram showing the structure of a transmission/reception system of a three-dimensional map and sensor information according to the present embodiment. This system includes server 901, and client devices 902A and 902B. Note that client devices 902A and 902B are also referred to as client device 902 when no particular distinction is made therebetween.

Client device 902 is, for example, a vehicle-mounted device equipped in a mobile object such as a vehicle. Server 901 is, for example, a cloud-based traffic monitoring system, and is capable of communicating with the plurality of client devices 902.

Server 901 transmits the three-dimensional map formed by a point cloud to client device 902. Note that a structure of the three-dimensional map is not limited to a point cloud, and may also be another structure expressing three-dimensional data such as a mesh structure.

Client device 902 transmits the sensor information obtained by client device 902 to server 901. The sensor information includes, for example, at least one of information obtained by LiDAR, a visible light image, an infrared image, a depth image, sensor position information, or sensor speed information.

The data to be transmitted and received between server 901 and client device 902 may be compressed in order to reduce data volume, and may also be transmitted uncompressed in order to maintain data precision. When compressing the data, it is possible to use a three-dimensional compression method on the point cloud based on, for example, an octree structure. It is possible to use a two-dimensional image compression method on the visible light image, the infrared image, and the depth image. The two-dimensional image compression method is, for example, MPEG-4 AVC or HEVC standardized by MPEG.

Server 901 transmits the three-dimensional map managed by server 901 to client device 902 in response to a transmission request for the three-dimensional map from client device 902. Note that server 901 may also transmit the three-dimensional map without waiting for the transmission request for the three-dimensional map from client device 902. For example, server 901 may broadcast the three-dimensional map to at least one client device 902 located in a predetermined space. Server 901 may also transmit the three-dimensional map suited to a position of client device 902 at fixed time intervals to client device 902 that has received the transmission request once. Server 901 may also transmit the three-dimensional map managed by server 901 to client device 902 every time the three-dimensional map is updated.

Client device 902 sends the transmission request for the three-dimensional map to server 901. For example, when client device 902 wants to perform the self-location estimation during traveling, client device 902 transmits the transmission request for the three-dimensional map to server 901.

Note that in the following cases, client device 902 may send the transmission request for the three-dimensional map to server 901. Client device 902 may send the transmission request for the three-dimensional map to server 901 when the three-dimensional map stored by client device 902 is old. For example, client device 902 may send the transmission request for the three-dimensional map to server 901 when a fixed period has passed since the three-dimensional map is obtained by client device 902.

Client device 902 may also send the transmission request for the three-dimensional map to server 901 before a fixed time when client device 902 exits a space shown in the three-dimensional map stored by client device 902. For example, client device 902 may send the transmission request for the three-dimensional map to server 901 when client device 902 is located within a predetermined distance from a boundary of the space shown in the three-dimensional map stored by client device 902. When a movement path and a movement speed of client device 902 are understood, a time when client device 902 exits the space shown in the three-dimensional map stored by client device 902 may be predicted based on the movement path and the movement speed of client device 902.

Client device 902 may also send the transmission request for the three-dimensional map to server 901 when an error during alignment of the three-dimensional data and the three-dimensional map created from the sensor information by client device 902 is at least at a fixed level.

Client device 902 transmits the sensor information to server 901 in response to a transmission request for the sensor information from server 901. Note that client device 902 may transmit the sensor information to server 901 without waiting for the transmission request for the sensor information from server 901. For example, client device 902 may periodically transmit the sensor information during a fixed period when client device 902 has received the transmission request for the sensor information from server 901 once. Client device 902 may determine that there is a possibility of a change in the three-dimensional map of a surrounding area of client device 902 having occurred, and transmit this information and the sensor information to server 901, when the error during alignment of the three-dimensional data created by client device 902 based on the sensor information and the three-dimensional map obtained from server 901 is at least at the fixed level.

Server 901 sends a transmission request for the sensor information to client device 902. For example, server 901 receives position information, such as GPS information, about client device 902 from client device 902. Server 901 sends the transmission request for the sensor information to client device 902 in order to generate a new three-dimensional map, when it is determined that client device 902 is approaching a space in which the three-dimensional map managed by server 901 contains little information, based on the position information about client device 902. Server 901 may also send the transmission request for the sensor information, when wanting to (i) update the three-dimensional map, (ii) check road conditions during snowfall, a disaster, or the like, or (iii) check traffic congestion conditions, accident/incident conditions, or the like.

Client device 902 may set an amount of data of the sensor information to be transmitted to server 901 in accordance with communication conditions or bandwidth during reception of the transmission request for the sensor information to be received from server 901. Setting the amount of data of the sensor information to be transmitted to server 901 is, for example, increasing/reducing the data itself or appropriately selecting a compression method.

Figure 85:
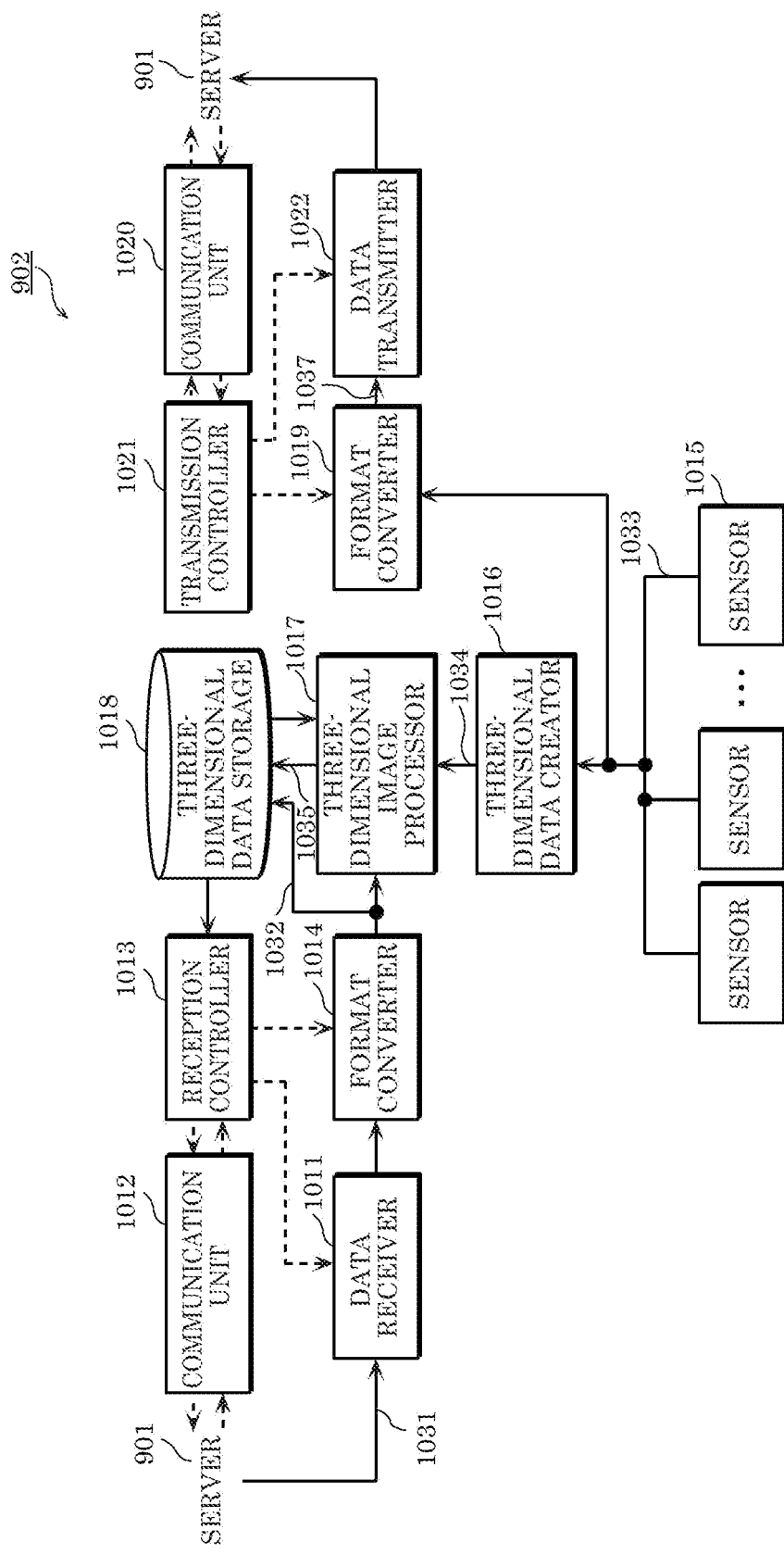
FIG. 85 is a block diagram of a client device according to Embodiment 7.

FIG. 85 is a block diagram showing an example structure of client device 902. Client device 902 receives the three-dimensional map formed by a point cloud and the like from server 901, and estimates a self-location of client device 902 using the three-dimensional map created based on the sensor information of client device 902. Client device 902 transmits the obtained sensor information to server 901.

Client device 902 includes data receiver 1011, communication unit 1012, reception controller 1013, format converter 1014, sensors 1015, three-dimensional data creator 1016, three-dimensional image processor 1017, three-dimensional data storage 1018, format converter 1019, communication unit 1020, transmission controller 1021, and data transmitter 1022.

Data receiver 1011 receives three-dimensional map 1031 from server 901. Three-dimensional map 1031 is data that includes a point cloud such as a WLD or a SWLD. Three-dimensional map 1031 may include compressed data or uncompressed data.

Communication unit 1012 communicates with server 901 and transmits a data transmission request (e.g., transmission request for three-dimensional map) to server 901.

Reception controller 1013 exchanges information, such as information on supported formats, with a communications partner via communication unit 1012 to establish communication with the communications partner.

Format converter 1014 performs a format conversion and the like on three-dimensional map 1031 received by data receiver 1011 to generate three-dimensional map 1032. Format converter 1014 also performs a decompression or decoding process when three-dimensional map 1031 is compressed or encoded. Note that format converter 1014 does not perform the decompression or decoding process when three-dimensional map 1031 is uncompressed data.

Sensors 1015 are a group of sensors, such as LiDARs, visible light cameras, infrared cameras, or depth sensors that obtain information about the outside of a vehicle equipped with client device 902, and generate sensor information 1033. Sensor information 1033 is, for example, three-dimensional data such as a point cloud (point group data) when sensors 1015 are laser sensors such as LiDARs. Note that a single sensor may serve as sensors 1015.

Three-dimensional data creator 1016 generates three-dimensional data 1034 of a surrounding area of the own vehicle based on sensor information 1033. For example, three-dimensional data creator 1016 generates point cloud data with color information on the surrounding area of the own vehicle using information obtained by LiDAR and visible light video obtained by a visible light camera.

Three-dimensional image processor 1017 performs a self-location estimation process and the like of the own vehicle, using (i) the received three-dimensional map 1032 such as a point cloud, and (ii) three-dimensional data 1034 of the surrounding area of the own vehicle generated using sensor information 1033. Note that three-dimensional image processor 1017 may generate three-dimensional data 1035 about the surroundings of the own vehicle by merging three-dimensional map 1032 and three-dimensional data 1034, and may perform the self-location estimation process using the created three-dimensional data 1035.

Three-dimensional data storage 1018 stores three-dimensional map 1032, three-dimensional data 1034, three-dimensional data 1035, and the like.

Format converter 1019 generates sensor information 1037 by converting sensor information 1033 to a format supported by a receiver end. Note that format converter 1019 may reduce the amount of data by compressing or encoding sensor information 1037. Format converter 1019 may omit this process when format conversion is not necessary. Format converter 1019 may also control the amount of data to be transmitted in accordance with a specified transmission range.

Communication unit 1020 communicates with server 901 and receives a data transmission request (transmission request for sensor information) and the like from server 901.

Transmission controller 1021 exchanges information, such as information on supported formats, with a communications partner via communication unit 1020 to establish communication with the communications partner.

Data transmitter 1022 transmits sensor information 1037 to server 901. Sensor information 1037 includes, for example, information obtained through sensors 1015, such as information obtained by LiDAR, a luminance image obtained by a visible light camera, an infrared image obtained by an infrared camera, a depth image obtained by a depth sensor, sensor position information, and sensor speed information.

Figure 86:
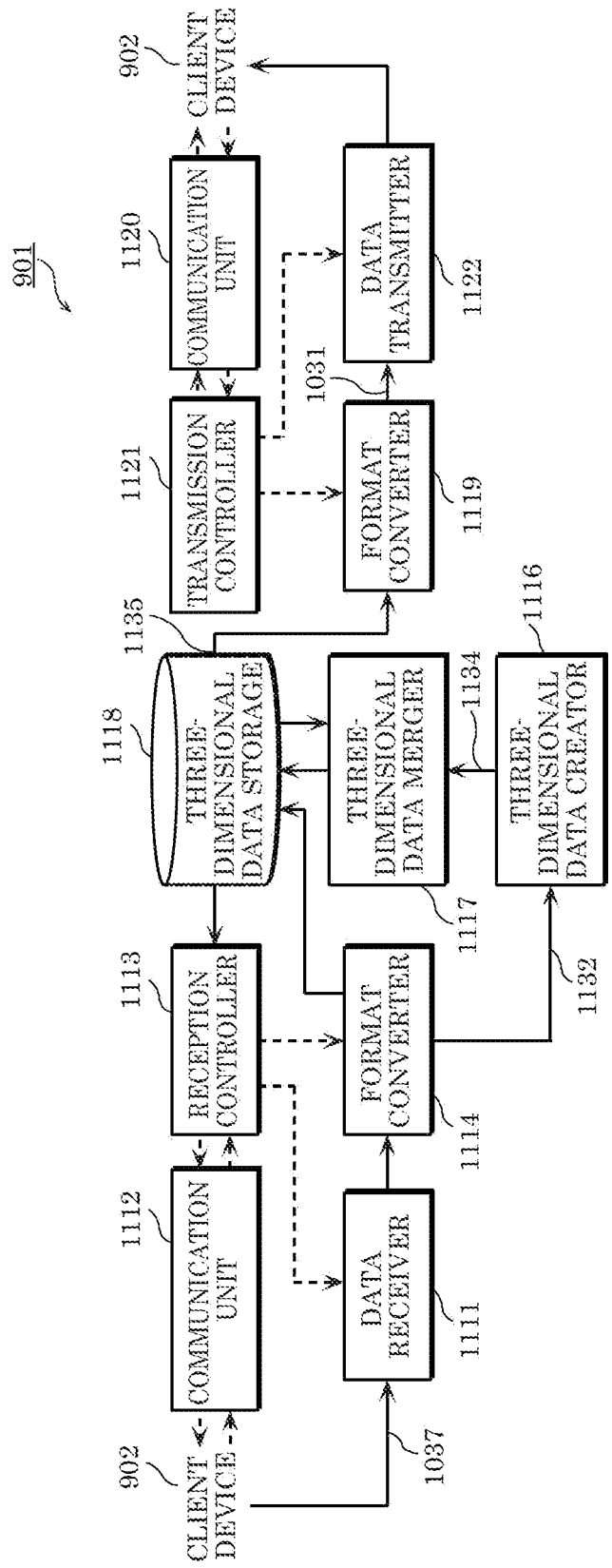
FIG. 86 is a block diagram of a server according to Embodiment 7.

A structure of server 901 will be described next. FIG. 86 is a block diagram showing an example structure of server 901. Server 901 transmits sensor information from client device 902 and creates three-dimensional data based on the received sensor information. Server 901 updates the three-dimensional map managed by server 901 using the created three-dimensional data. Server 901 transmits the updated three-dimensional map to client device 902 in response to a transmission request for the three-dimensional map from client device 902.

Server 901 includes data receiver 1111, communication unit 1112, reception controller 1113, format converter 1114, three-dimensional data creator 1116, three-dimensional data merger 1117, three-dimensional data storage 1118, format converter 1119, communication unit 1120, transmission controller 1121, and data transmitter 1122.

Data receiver 1111 receives sensor information 1037 from client device 902. Sensor information 1037 includes, for example, information obtained by LiDAR, a luminance image obtained by a visible light camera, an infrared image obtained by an infrared camera, a depth image obtained by a depth sensor, sensor position information, sensor speed information, and the like.

Communication unit 1112 communicates with client device 902 and transmits a data transmission request (e.g., transmission request for sensor information) and the like to client device 902.

Reception controller 1113 exchanges information, such as information on supported formats, with a communications partner via communication unit 1112 to establish communication with the communications partner.

Format converter 1114 generates sensor information 1132 by performing a decompression or decoding process when received sensor information 1037 is compressed or encoded. Note that format converter 1114 does not perform the decompression or decoding process when sensor information 1037 is uncompressed data.

Three-dimensional data creator 1116 generates three-dimensional data 1134 of a surrounding area of client device 902 based on sensor information 1132. For example, three-dimensional data creator 1116 generates point cloud data with color information on the surrounding area of client device 902 using information obtained by LiDAR and visible light video obtained by a visible light camera.

Three-dimensional data merger 1117 updates three-dimensional map 1135 by merging three-dimensional data 1134 created based on sensor information 1132 with three-dimensional map 1135 managed by server 901.

Three-dimensional data storage 1118 stores three-dimensional map 1135 and the like.

Format converter 1119 generates three-dimensional map 1031 by converting three-dimensional map 1135 to a format supported by the receiver end. Note that format converter 1119 may reduce the amount of data by compressing or encoding three-dimensional map 1135. Format converter 1119 may omit this process when format conversion is not necessary. Format converter 1119 may also control the amount of data to be transmitted in accordance with a specified transmission range.

Communication unit 1120 communicates with client device 902 and receives a data transmission request (transmission request for three-dimensional map) and the like from client device 902.

Transmission controller 1121 exchanges information, such as information on supported formats, with a communications partner via communication unit 1120 to establish communication with the communications partner.

Data transmitter 1122 transmits three-dimensional map 1031 to client device 902. Three-dimensional map 1031 is data that includes a point cloud such as a WLD or a SWLD. Three-dimensional map 1031 may include one of compressed data and uncompressed data.

Figure 87:
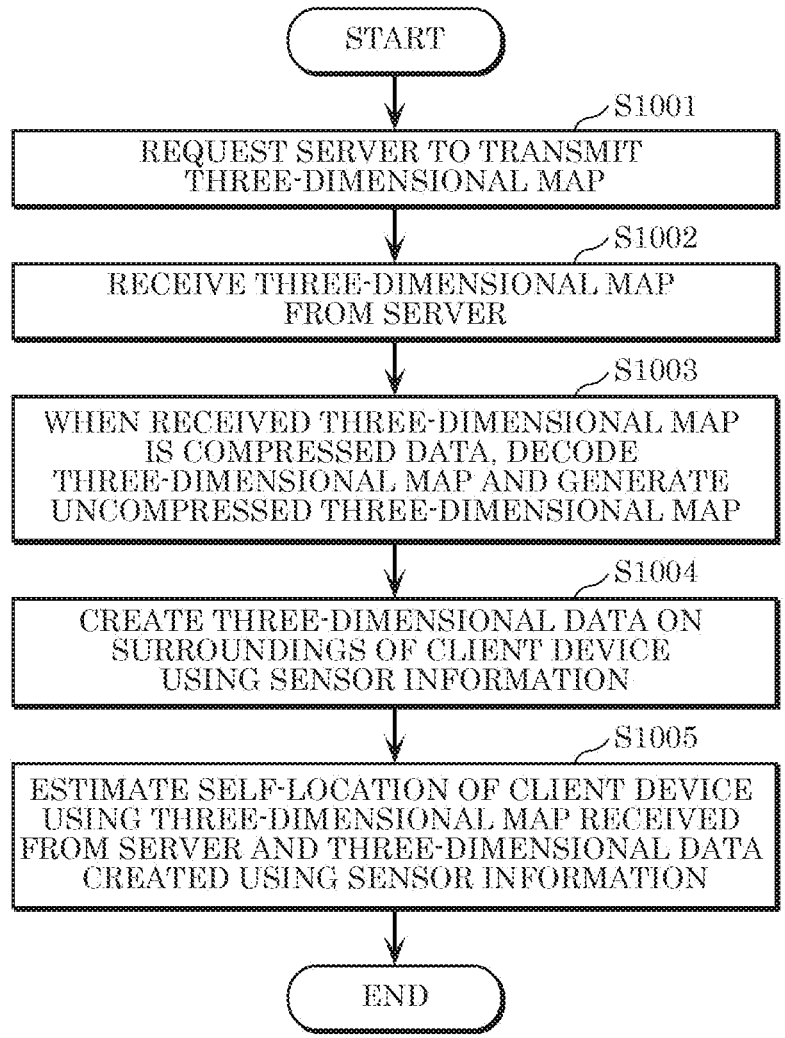
FIG. 87 is a flowchart of a three-dimensional data creation process performed by the client device according to Embodiment 7.

An operational flow of client device 902 will be described next. FIG. 87 is a flowchart of an operation when client device 902 obtains the three-dimensional map.

Client device 902 first requests server 901 to transmit the three-dimensional map (point cloud, etc.) (S1001). At this point, by also transmitting the position information about client device 902 obtained through GPS and the like, client device 902 may also request server 901 to transmit a three-dimensional map relating to this position information.

Client device 902 next receives the three-dimensional map from server 901 (S1002). When the received three-dimensional map is compressed data, client device 902 decodes the received three-dimensional map and generates an uncompressed three-dimensional map (S1003).

Client device 902 next creates three-dimensional data 1034 of the surrounding area of client device 902 using sensor information 1033 obtained by sensors 1015 (S1004). Client device 902 next estimates the self-location of client device 902 using three-dimensional map 1032 received from server 901 and three-dimensional data 1034 created using sensor information 1033 (S1005).

Figure 88:
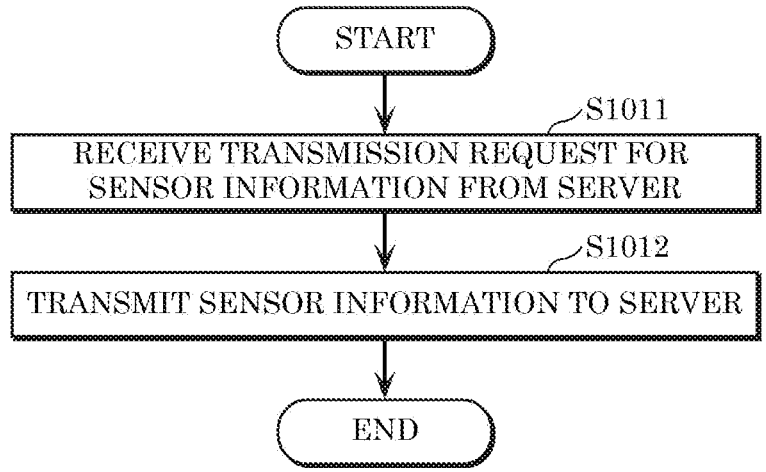
FIG. 88 is a flowchart of a sensor information transmission process performed by the client device according to Embodiment 7.

FIG. 88 is a flowchart of an operation when client device 902 transmits the sensor information. Client device 902 first receives a transmission request for the sensor information from server 901 (S1011). Client device 902 that has received the transmission request transmits sensor information 1037 to server 901 (S1012). Note that client device 902 may generate sensor information 1037 by compressing each piece of information using a compression method suited to each piece of information, when sensor information 1033 includes a plurality of pieces of information obtained by sensors 1015.

Figure 89:
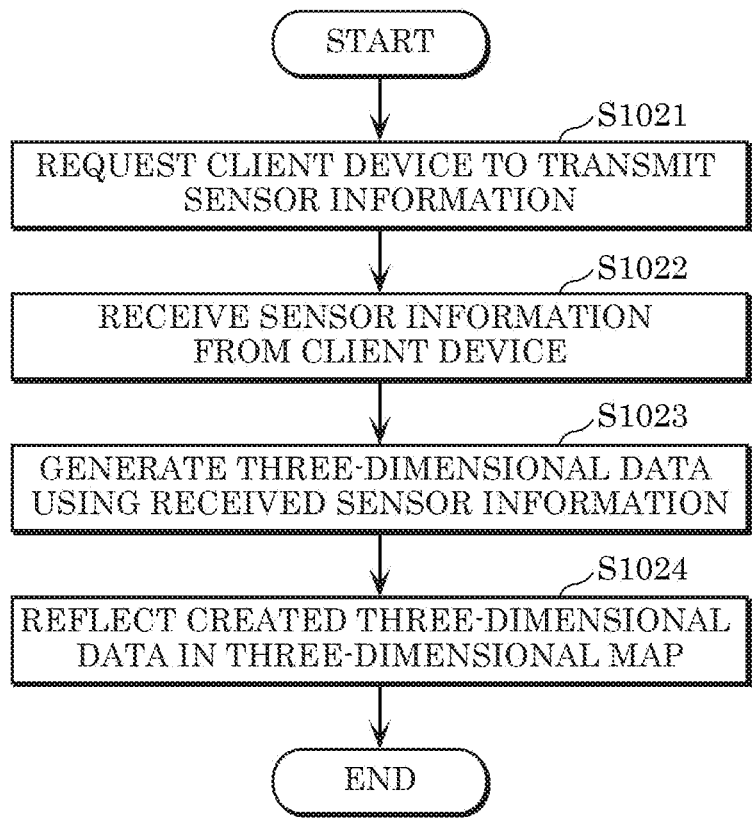
FIG. 89 is a flowchart of a three-dimensional data creation process performed by the server according to Embodiment 7.

An operational flow of server 901 will be described next. FIG. 89 is a flowchart of an operation when server 901 obtains the sensor information. Server 901 first requests client device 902 to transmit the sensor information (S1021). Server 901 next receives sensor information 1037 transmitted from client device 902 in accordance with the request (S1022). Server 901 next creates three-dimensional data 1134 using the received sensor information 1037 (S1023). Server 901 next reflects the created three-dimensional data 1134 in three-dimensional map 1135 (S1024).

Figure 90:
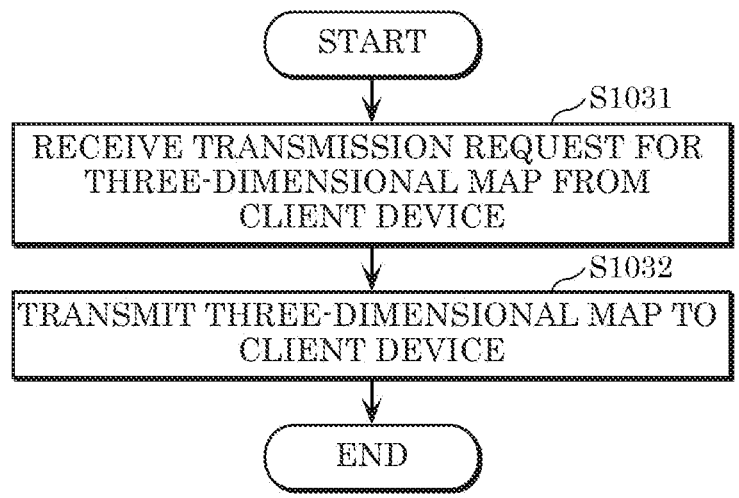
FIG. 90 is a flowchart of a three-dimensional map transmission process performed by the server according to Embodiment 7.

FIG. 90 is a flowchart of an operation when server 901 transmits the three-dimensional map. Server 901 first receives a transmission request for the three-dimensional map from client device 902 (S1031). Server 901 that has received the transmission request for the three-dimensional map transmits the three-dimensional map to client device 902 (S1032). At this point, server 901 may extract a three-dimensional map of a vicinity of client device 902 along with the position information about client device 902, and transmit the extracted three-dimensional map. Server 901 may compress the three-dimensional map formed by a point cloud using, for example, an octree structure compression method, and transmit the compressed three-dimensional map.

The following describes variations of the present embodiment.

Server 901 creates three-dimensional data 1134 of a vicinity of a position of client device 902 using sensor information 1037 received from client device 902. Server 901 next calculates a difference between three-dimensional data 1134 and three-dimensional map 1135, by matching the created three-dimensional data 1134 with three-dimensional map 1135 of the same area managed by server 901. Server 901 determines that a type of anomaly has occurred in the surrounding area of client device 902, when the difference is greater than or equal to a predetermined threshold. For example, it is conceivable that a large difference occurs between three-dimensional map 1135 managed by server 901 and three-dimensional data 1134 created based on sensor information 1037, when land subsidence and the like occurs due to a natural disaster such as an earthquake.

Sensor information 1037 may include information indicating at least one of a sensor type, a sensor performance, and a sensor model number. Sensor information 1037 may also be appended with a class ID and the like in accordance with the sensor performance. For example, when sensor information 1037 is obtained by LiDAR, it is conceivable to assign identifiers to the sensor performance. A sensor capable of obtaining information with precision in units of several millimeters is class 1, a sensor capable of obtaining information with precision in units of several centimeters is class 2, and a sensor capable of obtaining information with precision in units of several meters is class 3. Server 901 may estimate sensor performance information and the like from a model number of client device 902. For example, when client device 902 is equipped in a vehicle, server 901 may determine sensor specification information from a type of the vehicle. In this case, server 901 may obtain information on the type of the vehicle in advance, and the information may also be included in the sensor information. Server 901 may change a degree of correction with respect to three-dimensional data 1134 created using sensor information 1037, using obtained sensor information 1037. For example, when the sensor performance is high in precision (class 1), server 901 does not correct three-dimensional data 1134. When the sensor performance is low in precision (class 3), server 901 corrects three-dimensional data 1134 in accordance with the precision of the sensor. For example, server 901 increases the degree (intensity) of correction with a decrease in the precision of the sensor.

Server 901 may simultaneously send the transmission request for the sensor information to the plurality of client devices 902 in a certain space. Server 901 does not need to use all of the sensor information for creating three-dimensional data 1134 and may, for example, select sensor information to be used in accordance with the sensor performance, when having received a plurality of pieces of sensor information from the plurality of client devices 902. For example, when updating three-dimensional map 1135, server 901 may select high-precision sensor information (class 1) from among the received plurality of pieces of sensor information, and create three-dimensional data 1134 using the selected sensor information.

Figure 91:
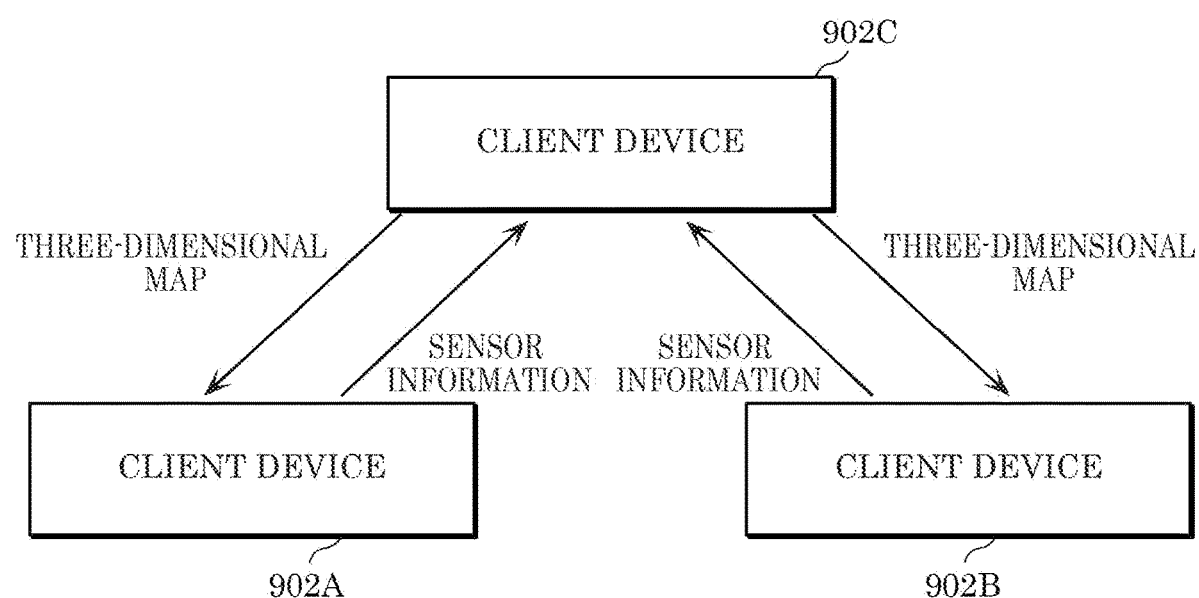
FIG. 91 is a diagram showing a structure of a variation of the system according to Embodiment 7.

Server 901 is not limited to only being a server such as a cloud-based traffic monitoring system, and may also be another (vehicle-mounted) client device. FIG. 91 is a diagram of a system structure in this case.

For example, client device 902C sends a transmission request for sensor information to client device 902A located nearby, and obtains the sensor information from client device 902A. Client device 902C then creates three-dimensional data using the obtained sensor information of client device 902A, and updates a three-dimensional map of client device 902C. This enables client device 902C to generate a three-dimensional map of a space that can be obtained from client device 902A, and fully utilize the performance of client device 902C. For example, such a case is conceivable when client device 902C has high performance.

In this case, client device 902A that has provided the sensor information is given rights to obtain the high-precision three-dimensional map generated by client device 902C. Client device 902A receives the high-precision three-dimensional map from client device 902C in accordance with these rights.

Server 901 may send the transmission request for the sensor information to the plurality of client devices 902 (client device 902A and client device 902B) located nearby client device 902C. When a sensor of client device 902A or client device 902B has high performance, client device 902C is capable of creating the three-dimensional data using the sensor information obtained by this high-performance sensor.

Figure 92:
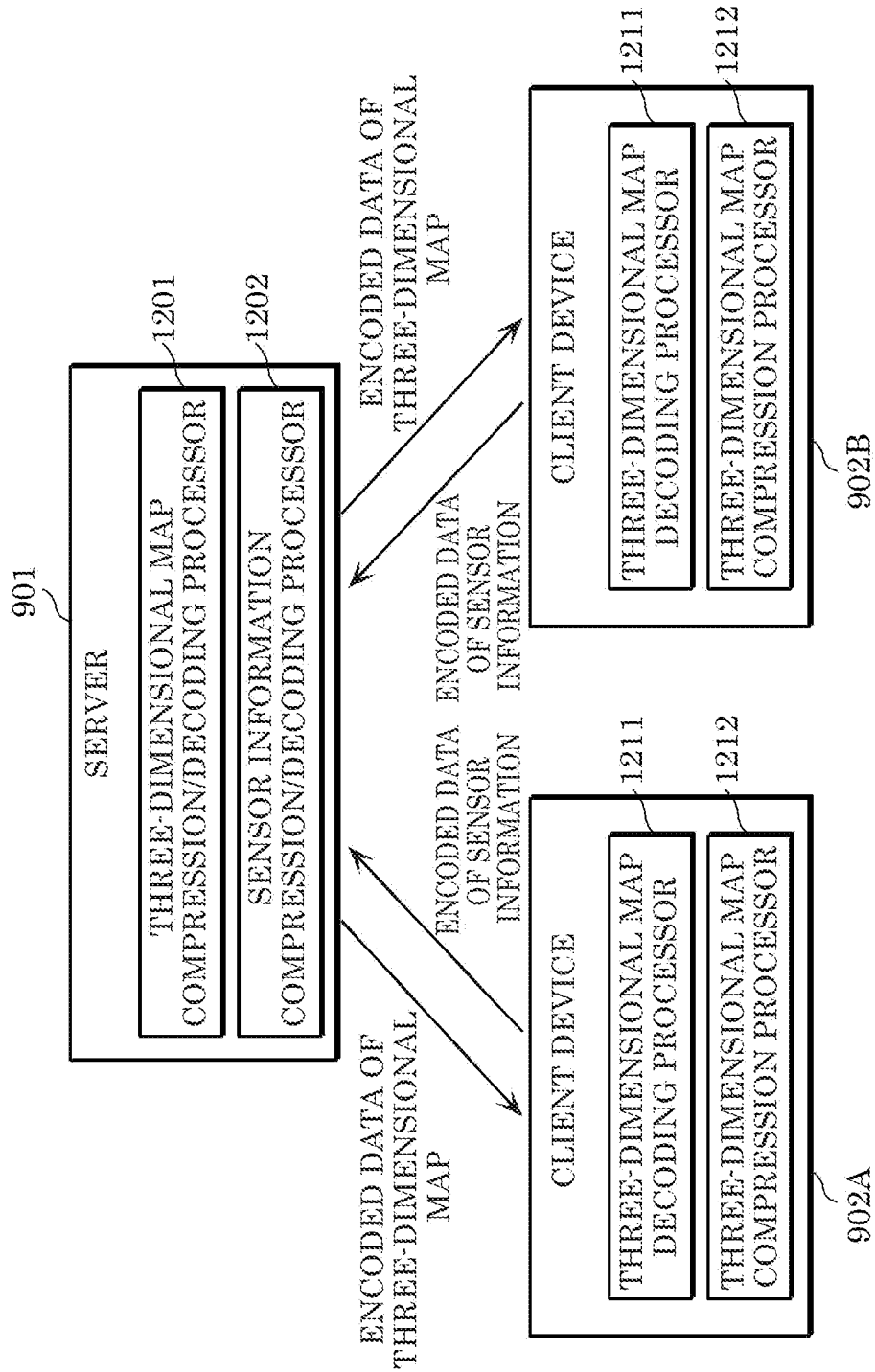
FIG. 92 is a diagram showing a structure of the server and client devices according to Embodiment 7.

FIG. 92 is a block diagram showing a functionality structure of server 901 and client device 902. Server 901 includes, for example, three-dimensional map compression/decoding processor 1201 that compresses and decodes the three-dimensional map and sensor information compression/decoding processor 1202 that compresses and decodes the sensor information.

Client device 902 includes three-dimensional map decoding processor 1211 and sensor information compression processor 1212. Three-dimensional map decoding processor 1211 receives encoded data of the compressed three-dimensional map, decodes the encoded data, and obtains the three-dimensional map. Sensor information compression processor 1212 compresses the sensor information itself instead of the three-dimensional data created using the obtained sensor information, and transmits the encoded data of the compressed sensor information to server 901. With this structure, client device 902 does not need to internally store a processor that performs a process for compressing the three-dimensional data of the three-dimensional map (point cloud, etc.), as long as client device 902 internally stores a processor that performs a process for decoding the three-dimensional map (point cloud, etc.). This makes it possible to limit costs, power consumption, and the like of client device 902.

As stated above, client device 902 according to the present embodiment is equipped in the mobile object, and creates three-dimensional data 1034 of a surrounding area of the mobile object using sensor information 1033 that is obtained through sensor 1015 equipped in the mobile object and indicates a surrounding condition of the mobile object. Client device 902 estimates a self-location of the mobile object using the created three-dimensional data 1034. Client device 902 transmits obtained sensor information 1033 to server 901 or another client device 902.

This enables client device 902 to transmit sensor information 1033 to server 901 or the like. This makes it possible to further reduce the amount of transmission data compared to when transmitting the three-dimensional data. Since there is no need for client device 902 to perform processes such as compressing or encoding the three-dimensional data, it is possible to reduce the processing amount of client device 902. As such, client device 902 is capable of reducing the amount of data to be transmitted or simplifying the structure of the device.

Client device 902 further transmits the transmission request for the three-dimensional map to server 901 and receives three-dimensional map 1031 from server 901. In the estimating of the self-location, client device 902 estimates the self-location using three-dimensional data 1034 and three-dimensional map 1032.

Sensor information 1033 includes at least one of information obtained by a laser sensor, a luminance image, an infrared image, a depth image, sensor position information, or sensor speed information.

Sensor information 1033 includes information that indicates a performance of the sensor.

Client device 902 encodes or compresses sensor information 1033, and in the transmitting of the sensor information, transmits sensor information 1037 that has been encoded or compressed to server 901 or another client device 902. This enables client device 902 to reduce the amount of data to be transmitted.

For example, client device 902 includes a processor and memory. The processor performs the above processes using the memory.

Server 901 according to the present embodiment is capable of communicating with client device 902 equipped in the mobile object, and receives sensor information 1037 that is obtained through sensor 1015 equipped in the mobile object and indicates a surrounding condition of the mobile object. Server 901 creates three-dimensional data 1134 of a surrounding area of the mobile object using received sensor information 1037.

With this, server 901 creates three-dimensional data 1134 using sensor information 1037 transmitted from client device 902. This makes it possible to further reduce the amount of transmission data compared to when client device 902 transmits the three-dimensional data. Since there is no need for client device 902 to perform processes such as compressing or encoding the three-dimensional data, it is possible to reduce the processing amount of client device 902. As such, server 901 is capable of reducing the amount of data to be transmitted or simplifying the structure of the device.

Server 901 further transmits a transmission request for the sensor information to client device 902.

Server 901 further updates three-dimensional map 1135 using the created three-dimensional data 1134, and transmits three-dimensional map 1135 to client device 902 in response to the transmission request for three-dimensional map 1135 from client device 902.

Sensor information 1037 includes at least one of information obtained by a laser sensor, a luminance image, an infrared image, a depth image, sensor position information, or sensor speed information.

Sensor information 1037 includes information that indicates a performance of the sensor.

Server 901 further corrects the three-dimensional data in accordance with the performance of the sensor. This enables the three-dimensional data creation method to improve the quality of the three-dimensional data.

In the receiving of the sensor information, server 901 receives a plurality of pieces of sensor information 1037 received from a plurality of client devices 902, and selects sensor information 1037 to be used in the creating of three-dimensional data 1134, based on a plurality of pieces of information that each indicates the performance of the sensor included in the plurality of pieces of sensor information 1037. This enables server 901 to improve the quality of three-dimensional data 1134.

Server 901 decodes or decompresses received sensor information 1037, and creates three-dimensional data 1134 using sensor information 1132 that has been decoded or decompressed. This enables server 901 to reduce the amount of data to be transmitted.

For example, server 901 includes a processor and memory. The processor performs the above processes using the memory.

Figure 93:
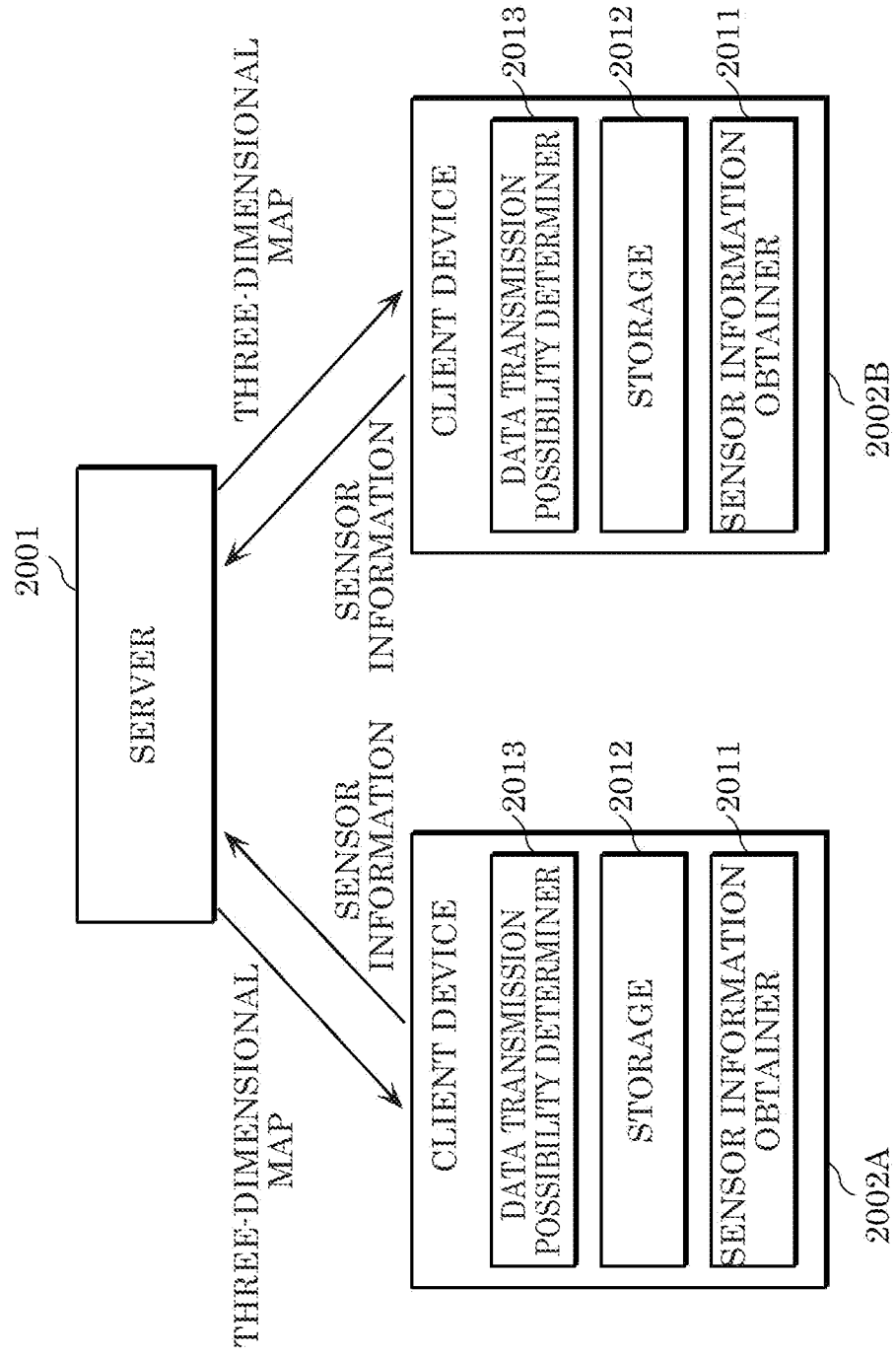
FIG. 93 is a diagram illustrating a configuration of a server and a client device according to Embodiment 7.

The following will describe a variation of the present embodiment. FIG. 93 is a diagram illustrating a configuration of a system according to the present embodiment. The system illustrated in FIG. 93 includes server 2001, client device 2002A, and client device 2002B.

Client device 2002A and client device 2002B are each provided in a mobile object such as a vehicle, and transmit sensor information to server 2001. Server 2001 transmits a three-dimensional map (a point cloud) to client device 2002A and client device 2002B.

Client device 2002A includes sensor information obtainer 2011, storage 2012, and data transmission possibility determiner 2013. It should be noted that client device 2002B has the same configuration. Additionally, when client device 2002A and client device 2002B are not particularly distinguished below, client device 2002A and client device 2002B are also referred to as client device 2002.

Figure 94:
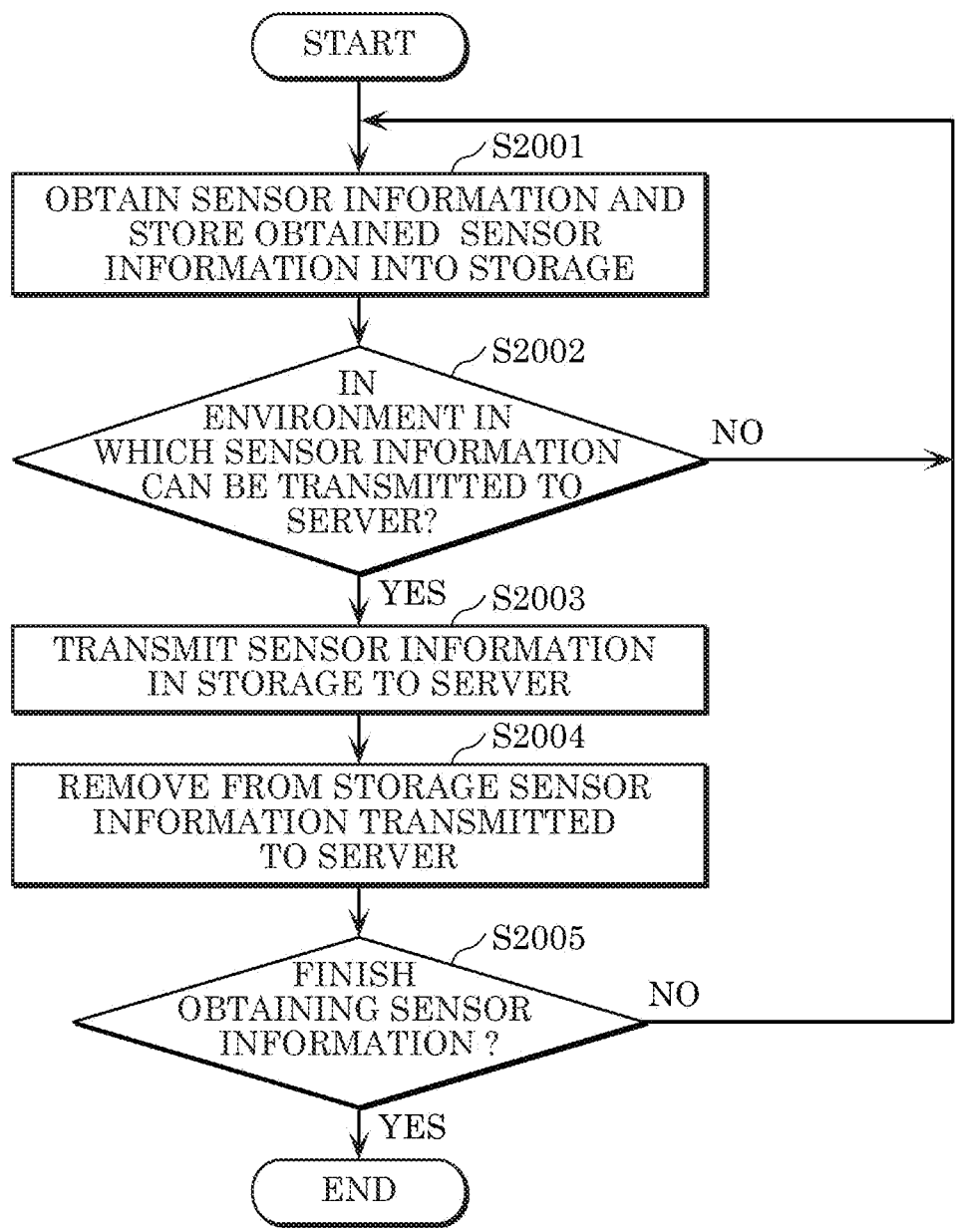
FIG. 94 is a flowchart of a process performed by the client device according to Embodiment 7.

FIG. 94 is a flowchart illustrating operation of client device 2002 according to the present embodiment.

Sensor information obtainer 2011 obtains a variety of sensor information using sensors (a group of sensors) provided in a mobile object. In other words, sensor information obtainer 2011 obtains sensor information obtained by the sensors (the group of sensors) provided in the mobile object and indicating a surrounding state of the mobile object. Sensor information obtainer 2011 also stores the obtained sensor information into storage 2012. This sensor information includes at least one of information obtained by LiDAR, a visible light image, an infrared image, or a depth image. Additionally, the sensor information may include at least one of sensor position information, speed information, obtainment time information, or obtainment location information. Sensor position information indicates a position of a sensor that has obtained sensor information. Speed information indicates a speed of the mobile object when a sensor obtained sensor information. Obtainment time information indicates a time when a sensor obtained sensor information.

Obtainment location information indicates a position of the mobile object or a sensor when the sensor obtained sensor information.

Next, data transmission possibility determiner 2013 determines whether the mobile object (client device 2002) is in an environment in which the mobile object can transmit sensor information to server 2001 (S2002). For example, data transmission possibility determiner 2013 may specify a location and a time at which client device 2002 is present using GPS information etc., and may determine whether data can be transmitted. Additionally, data transmission possibility determiner 2013 may determine whether data can be transmitted, depending on whether it is possible to connect to a specific access point.

When client device 2002 determines that the mobile object is in the environment in which the mobile object can transmit the sensor information to server 2001 (YES in S2002), client device 2002 transmits the sensor information to server 2001 (S2003). In other words, when client device 2002 becomes capable of transmitting sensor information to server 2001, client device 2002 transmits the sensor information held by client device 2002 to server 2001. For example, an access point that enables high-speed communication using millimeter waves is provided in an intersection or the like. When client device 2002 enters the intersection, client device 2002 transmits the sensor information held by client device 2002 to server 2001 at high speed using the millimeter-wave communication.

Next, client device 2002 deletes from storage 2012 the sensor information that has been transmitted to server 2001 (S2004). It should be noted that when sensor information that has not been transmitted to server 2001 meets predetermined conditions, client device 2002 may delete the sensor information. For example, when an obtainment time of sensor information held by client device 2002 precedes a current time by a certain time, client device 2002 may delete the sensor information from storage 2012. In other words, when a difference between the current time and a time when a sensor obtained sensor information exceeds a predetermined time, client device 2002 may delete the sensor information from storage 2012. Besides, when an obtainment location of sensor information held by client device 2002 is separated from a current location by a certain distance, client device 2002 may delete the sensor information from storage 2012. In other words, when a difference between a current position of the mobile object or a sensor and a position of the mobile object or the sensor when the sensor obtained sensor information exceeds a predetermined distance, client device 2002 may delete the sensor information from storage 2012. Accordingly, it is possible to reduce the capacity of storage 2012 of client device 2002.

When client device 2002 does not finish obtaining sensor information (NO in S2005), client device 2002 performs step S2001 and the subsequent steps again. Further, when client device 2002 finishes obtaining sensor information (YES in S2005), client device 2002 completes the process.

Client device 2002 may select sensor information to be transmitted to server 2001, in accordance with communication conditions. For example, when high-speed communication is available, client device 2002 preferentially transmits sensor information (e.g., information obtained by LiDAR) of which the data size held in storage 2012 is large. Additionally, when high-speed communication is not readily available, client device 2002 transmits sensor information (e.g., a visible light image) which has high priority and of which the data size held in storage 2012 is small. Accordingly, client device 2002 can efficiently transmit sensor information held in storage 2012, in accordance with network conditions Client device 2002 may obtain, from server 2001, time information indicating a current time and location information indicating a current location. Moreover, client device 2002 may determine an obtainment time and an obtainment location of sensor information based on the obtained time information and location information. In other words, client device 2002 may obtain time information from server 2001 and generate obtainment time information using the obtained time information. Client device 2002 may also obtain location information from server 2001 and generate obtainment location information using the obtained location information.

For example, regarding time information, server 2001 and client device 2002 perform clock synchronization using a means such as the Network Time Protocol (NTP) or the Precision Time Protocol (PTP). This enables client device 2002 to obtain accurate time information. What's more, since it is possible to synchronize clocks between server 2001 and client devices 2002, it is possible to synchronize times included in pieces of sensor information obtained by separate client devices 2002. As a result, server 2001 can handle sensor information indicating a synchronized time. It should be noted that a means of synchronizing clocks may be any means other than the NTP or PTP. In addition, GPS information may be used as the time information and the location information.

Server 2001 may specify a time or a location and obtain pieces of sensor information from client devices 2002. For example, when an accident occurs, in order to search for a client device in the vicinity of the accident, server 2001 specifies an accident occurrence time and an accident occurrence location and broadcasts sensor information transmission requests to client devices 2002. Then, client device 2002 having sensor information obtained at the corresponding time and location transmits the sensor information to server 2001. In other words, client device 2002 receives, from server 2001, a sensor information transmission request including specification information specifying a location and a time. When sensor information obtained at a location and a time indicated by the specification information is stored in storage 2012, and client device 2002 determines that the mobile object is present in the environment in which the mobile object can transmit the sensor information to server 2001, client device 2002 transmits, to server 2001, the sensor information obtained at the location and the time indicated by the specification information. Consequently, server 2001 can obtain the pieces of sensor information pertaining to the occurrence of the accident from client devices 2002, and use the pieces of sensor information for accident analysis etc.

It should be noted that when client device 2002 receives a sensor information transmission request from server 2001, client device 2002 may refuse to transmit sensor information. Additionally, client device 2002 may set in advance which pieces of sensor information can be transmitted. Alternatively, server 2001 may inquire of client device 2002 each time whether sensor information can be transmitted.

A point may be given to client device 2002 that has transmitted sensor information to server 2001. This point can be used in payment for, for example, gasoline expenses, electric vehicle (EV) charging expenses, a highway toll, or rental car expenses. After obtaining sensor information, server 2001 may delete information for specifying client device 2002 that has transmitted the sensor information. For example, this information is a network address of client device 2002. Since this enables the anonymization of sensor information, a user of client device 2002 can securely transmit sensor information from client device 2002 to server 2001. Server 2001 may include servers. For example, by servers sharing sensor information, even when one of the servers breaks down, the other servers can communicate with client device 2002. Accordingly, it is possible to avoid service outage due to a server breakdown.

A specified location specified by a sensor information transmission request indicates an accident occurrence location etc., and may be different from a position of client device 2002 at a specified time specified by the sensor information transmission request. For this reason, for example, by specifying, as a specified location, a range such as within XX meters of a surrounding area, server 2001 can request information from client device 2002 within the range. Similarly, server 2001 may also specify, as a specified time, a range such as within N seconds before and after a certain time. As a result, server 2001 can obtain sensor information from client device 2002 present for a time from t−N to t+N and in a location within XX meters from absolute position S. When client device 2002 transmits three-dimensional data such as LiDAR, client device 2002 may transmit data created immediately after time t.

Server 2001 may separately specify information indicating, as a specified location, a location of client device 2002 from which sensor information is to be obtained, and a location at which sensor information is desirably obtained. For example, server 2001 specifies that sensor information including at least a range within YY meters from absolute position S is to be obtained from client device 2002 present within XX meters from absolute position S. When client device 2002 selects three-dimensional data to be transmitted, client device 2002 selects one or more pieces of three-dimensional data so that the one or more pieces of three-dimensional data include at least the sensor information including the specified range. Each of the one or more pieces of three-dimensional data is a random-accessible unit of data. In addition, when client device 2002 transmits a visible light image, client device 2002 may transmit pieces of temporally continuous image data including at least a frame immediately before or immediately after time t.

When client device 2002 can use physical networks such as 5G, Wi-Fi, or modes in 5G for transmitting sensor information, client device 2002 may select a network to be used according to the order of priority notified by server 2001. Alternatively, client device 2002 may select a network that enables client device 2002 to ensure an appropriate bandwidth based on the size of transmit data. Alternatively, client device 2002 may select a network to be used, based on data transmission expenses etc. A transmission request from server 2001 may include information indicating a transmission deadline, for example, performing transmission when client device 2002 can start transmission by time t. When server 2001 cannot obtain sufficient sensor information within a time limit, server 2001 may issue a transmission request again.

Sensor information may include header information indicating characteristics of sensor data along with compressed or uncompressed sensor data. Client device 2002 may transmit header information to server 2001 via a physical network or a communication protocol that is different from a physical network or a communication protocol used for sensor data. For example, client device 2002 transmits header information to server 2001 prior to transmitting sensor data. Server 2001 determines whether to obtain the sensor data of client device 2002, based on a result of analysis of the header information. For example, header information may include information indicating a point cloud obtainment density, an elevation angle, or a frame rate of LiDAR, or information indicating, for example, a resolution, an SN ratio, or a frame rate of a visible light image. Accordingly, server 2001 can obtain the sensor information from client device 2002 having the sensor data of determined quality.

As stated above, client device 2002 is provided in the mobile object, obtains sensor information that has been obtained by a sensor provided in the mobile object and indicates a surrounding state of the mobile object, and stores the sensor information into storage 2012. Client device 2002 determines whether the mobile object is present in an environment in which the mobile object is capable of transmitting the sensor information to server 2001, and transmits the sensor information to server 2001 when the mobile object is determined to be present in the environment in which the mobile object is capable of transmitting the sensor information to server 2001.

Additionally, client device 2002 further creates, from the sensor information, three-dimensional data of a surrounding area of the mobile object, and estimates a self-location of the mobile object using the three-dimensional data created.

Besides, client device 2002 further transmits a transmission request for a three-dimensional map to server 2001, and receives the three-dimensional map from server 2001. In the estimating, client device 2002 estimates the self-location using the three-dimensional data and the three-dimensional map.

It should be noted that the above process performed by client device 2002 may be realized as an information transmission method for use in client device 2002.

In addition, client device 2002 may include a processor and memory. Using the memory, the processor may perform the above process.

Figure 95:
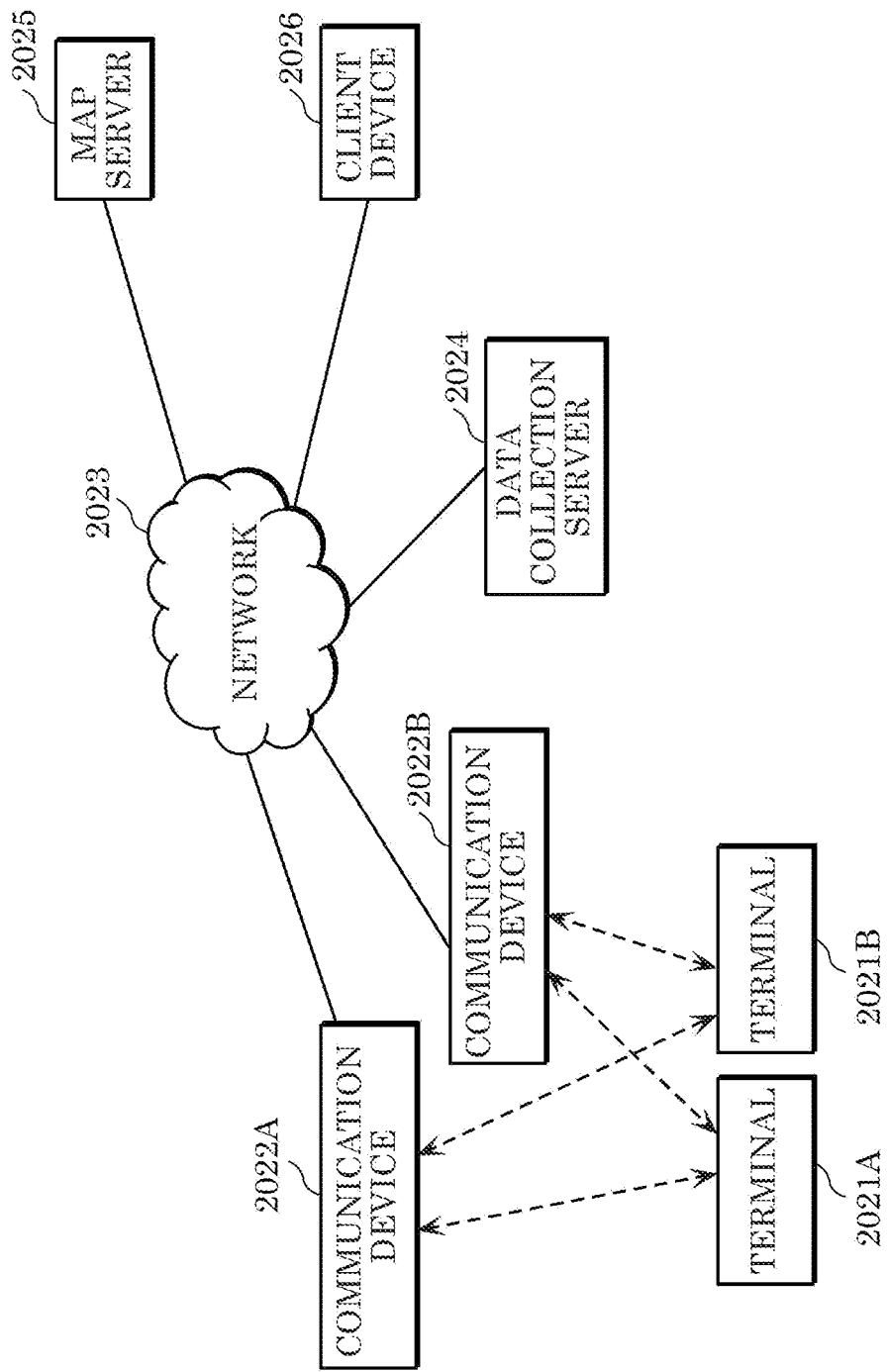
FIG. 95 is a diagram illustrating a configuration of a sensor information collection system according to Embodiment 7.

Next, a sensor information collection system according to the present embodiment will be described. FIG. 95 is a diagram illustrating a configuration of the sensor information collection system according to the present embodiment. As illustrated in FIG. 95, the sensor information collection system according to the present embodiment includes terminal 2021A, terminal 2021B, communication device 2022A, communication device 2022B, network 2023, data collection server 2024, map server 2025, and client device 2026. It should be noted that when terminal 2021A and terminal 2021B are not particularly distinguished, terminal 2021A and terminal 2021B are also referred to as terminal 2021. Additionally, when communication device 2022A and communication device 2022B are not particularly distinguished, communication device 2022A and communication device 2022B are also referred to as communication device 2022.

Data collection server 2024 collects data such as sensor data obtained by a sensor included in terminal 2021 as position-related data in which the data is associated with a position in a three-dimensional space.

Sensor data is data obtained by, for example, detecting a surrounding state of terminal 2021 or an internal state of terminal 2021 using a sensor included in terminal 2021. Terminal 2021 transmits, to data collection server 2024, one or more pieces of sensor data collected from one or more sensor devices in locations at which direct communication with terminal 2021 is possible or at which communication with terminal 2021 is possible by the same communication system or via one or more relay devices.

Data included in position-related data may include, for example, information indicating an operating state, an operating log, a service use state, etc. of a terminal or a device included in the terminal. In addition, the data include in the position-related data may include, for example, information in which an identifier of terminal 2021 is associated with a position or a movement path etc. of terminal 2021.

Information indicating a position included in position-related data is associated with, for example, information indicating a position in three-dimensional data such as three-dimensional map data. The details of information indicating a position will be described later.

Position-related data may include at least one of the above-described time information or information indicating an attribute of data included in the position-related data or a type (e.g., a model number) of a sensor that has created the data, in addition to position information that is information indicating a position. The position information and the time information may be stored in a header area of the position-related data or a header area of a frame that stores the position-related data. Further, the position information and the time information may be transmitted and/or stored as metadata associated with the position-related data, separately from the position-related data.

Map server 2025 is connected to, for example, network 2023, and transmits three-dimensional data such as three-dimensional map data in response to a request from another device such as terminal 2021. Besides, as described in the aforementioned embodiments, map server 2025 may have, for example, a function of updating three-dimensional data using sensor information transmitted from terminal 2021.

Data collection server 2024 is connected to, for example, network 2023, collects position-related data from another device such as terminal 2021, and stores the collected position-related data into a storage of data collection server 2024 or a storage of another server. In addition, data collection server 2024 transmits, for example, metadata of collected position-related data or three-dimensional data generated based on the position-related data, to terminal 2021 in response to a request from terminal 2021.

Network 2023 is, for example, a communication network such as the Internet. Terminal 2021 is connected to network 2023 via communication device 2022. Communication device 2022 communicates with terminal 2021 using one communication system or switching between communication systems. Communication device 2022 is a communication satellite that performs communication using, for example, (1) a base station compliant with Long-Term Evolution (LTE) etc., (2) an access point (AP) for Wi-Fi or millimeter-wave communication etc., (3) a low-power wide-area (LPWA) network gateway such as SIGFOX, LoRaWAN, or Wi-SUN, or (4) a satellite communication system such as DVB-S2.

It should be noted that a base station may communicate with terminal 2021 using a system classified as an LPWA network such as Narrowband Internet of Things (NB IoT) or LTE-M, or switching between these systems.

Here, although, in the example given, terminal 2021 has a function of communicating with communication device 2022 that uses two types of communication systems, and communicates with map server 2025 or data collection server 2024 using one of the communication systems or switching between the communication systems and between communication devices 2022 to be a direct communication partner; a configuration of the sensor information collection system and terminal 2021 is not limited to this. For example, terminal 2021 need not have a function of performing communication using communication systems, and may have a function of performing communication using one of the communication systems. Terminal 2021 may also support three or more communication systems. Additionally, each terminal 2021 may support a different communication system.

Terminal 2021 includes, for example, the configuration of client device 902 illustrated in FIG. 85. Terminal 2021 estimates a self-location etc. using received three-dimensional data. Besides, terminal 2021 associates sensor data obtained from a sensor and position information obtained by self-location estimation to generate position-related data.

Position information appended to position-related data indicates, for example, a position in a coordinate system used for three-dimensional data. For example, the position information is coordinate values represented using a value of a latitude and a value of a longitude. Here, terminal 2021 may include, in the position information, a coordinate system serving as a reference for the coordinate values and information indicating three-dimensional data used for location estimation, along with the coordinate values. Coordinate values may also include altitude information.

The position information may be associated with a data unit or a space unit usable for encoding the above three-dimensional data. Such a unit is, for example, WLD, GOS, SPC, VLM, or VXL. Here, the position information is represented by, for example, an identifier for identifying a data unit such as the SPC corresponding to position-related data. It should be noted that the position information may include, for example, information indicating three-dimensional data obtained by encoding a three-dimensional space including a data unit such as the SPC or information indicating a detailed position within the SPC, in addition to the identifier for identifying the data unit such as the SPC. The information indicating the three-dimensional data is, for example, a file name of the three-dimensional data.

As stated above, by generating position-related data associated with position information based on location estimation using three-dimensional data, the system can give more accurate position information to sensor information than when the system appends position information based on a self-location of a client device (terminal 2021) obtained using a GPS to sensor information. As a result, even when another device uses the position-related data in another service, there is a possibility of more accurately determining a position corresponding to the position-related data in an actual space, by performing location estimation based on the same three-dimensional data.

It should be noted that although the data transmitted from terminal 2021 is the position-related data in the example given in the present embodiment, the data transmitted from terminal 2021 may be data unassociated with position information. In other words, the transmission and reception of three-dimensional data or sensor data described in the other embodiments may be performed via network 2023 described in the present embodiment.

Next, a different example of position information indicating a position in a three-dimensional or two-dimensional actual space or in a map space will be described. The position information appended to position-related data may be information indicating a relative position relative to a keypoint in three-dimensional data. Here, the keypoint serving as a reference for the position information is encoded as, for example, SWLD, and notified to terminal 2021 as three-dimensional data.

The information indicating the relative position relative to the keypoint may be, for example, information that is represented by a vector from the keypoint to the point indicated by the position information, and indicates a direction and a distance from the keypoint to the point indicated by the position information. Alternatively, the information indicating the relative position relative to the keypoint may be information indicating an amount of displacement from the keypoint to the point indicated by the position information along each of the x axis, the y axis, and the z axis. Additionally, the information indicating the relative position relative to the keypoint may be information indicating a distance from each of three or more keypoints to the point indicated by the position information. It should be noted that the relative position need not be a relative position of the point indicated by the position information represented using each keypoint as a reference, and may be a relative position of each keypoint represented with respect to the point indicated by the position information. Examples of position information based on a relative position relative to a keypoint include information for identifying a keypoint to be a reference, and information indicating the relative position of the point indicated by the position information and relative to the keypoint. When the information indicating the relative position relative to the keypoint is provided separately from three-dimensional data, the information indicating the relative position relative to the keypoint may include, for example, coordinate axes used in deriving the relative position, information indicating a type of the three-dimensional data, and/or information indicating a magnitude per unit amount (e.g., a scale) of a value of the information indicating the relative position.

The position information may include, for each keypoint, information indicating a relative position relative to the keypoint. When the position information is represented by relative positions relative to keypoints, terminal 2021 that intends to identify a position in an actual space indicated by the position information may calculate candidate points of the position indicated by the position information from positions of the keypoints each estimated from sensor data, and may determine that a point obtained by averaging the calculated candidate points is the point indicated by the position information. Since this configuration reduces the effects of errors when the positions of the keypoints are estimated from the sensor data, it is possible to improve the estimation accuracy for the point in the actual space indicated by the position information. Besides, when the position information includes information indicating relative positions relative to keypoints, if it is possible to detect any one of the keypoints regardless of the presence of keypoints undetectable due to a limitation such as a type or performance of a sensor included in terminal 2021, it is possible to estimate a value of the point indicated by the position information.

A point identifiable from sensor data can be used as a keypoint. Examples of the point identifiable from the sensor data include a point or a point within a region that satisfies a predetermined keypoint detection condition, such as the above-described three-dimensional feature or feature of visible light data is greater than or equal to a threshold value.

Moreover, a marker etc. placed in an actual space may be used as a keypoint. In this case, the maker may be detected and located from data obtained using a sensor such as LiDAR or a camera. For example, the marker may be represented by a change in color or luminance value (degree of reflection), or a three-dimensional shape (e.g., unevenness). Coordinate values indicating a position of the marker, or a two-dimensional bar code or a bar code etc. generated from an identifier of the marker may be also used.

Furthermore, a light source that transmits an optical signal may be used as a marker. When a light source of an optical signal is used as a marker, not only information for obtaining a position such as coordinate values or an identifier but also other data may be transmitted using an optical signal. For example, an optical signal may include contents of service corresponding to the position of the marker, an address for obtaining contents such as a URL, or an identifier of a wireless communication device for receiving service, and information indicating a wireless communication system etc. for connecting to the wireless communication device. The use of an optical communication device (a light source) as a marker not only facilitates the transmission of data other than information indicating a position but also makes it possible to dynamically change the data.

Terminal 2021 finds out a correspondence relationship of keypoints between mutually different data using, for example, a common identifier used for the data, or information or a table indicating the correspondence relationship of the keypoints between the data. When there is no information indicating a correspondence relationship between keypoints, terminal 2021 may also determine that when coordinates of a keypoint in three-dimensional data are converted into a position in a space of another three-dimensional data, a keypoint closest to the position is a corresponding keypoint.

When the position information based on the relative position described above is used, terminal 2021 that uses mutually different three-dimensional data or services can identify or estimate a position indicated by the position information with respect to a common keypoint included in or associated with each three-dimensional data. As a result, terminal 2021 that uses the mutually different three-dimensional data or the services can identify or estimate the same position with higher accuracy.

Even when map data or three-dimensional data represented using mutually different coordinate systems are used, since it is possible to reduce the effects of errors caused by the conversion of a coordinate system, it is possible to coordinate services based on more accurate position information.

Hereinafter, an example of functions provided by data collection server 2024 will be described. Data collection server 2024 may transfer received position-related data to another data server. When there are data servers, data collection server 2024 determines to which data server received position-related data is to be transferred, and transfers the position-related data to a data server determined as a transfer destination.

Data collection server 2024 determines a transfer destination based on, for example, transfer destination server determination rules preset to data collection server 2024. The transfer destination server determination rules are set by, for example, a transfer destination table in which identifiers respectively associated with terminals 2021 are associated with transfer destination data servers.

Terminal 2021 appends an identifier associated with terminal 2021 to position-related data to be transmitted, and transmits the position-related data to data collection server 2024. Data collection server 2024 determines a transfer destination data server corresponding to the identifier appended to the position-related data, based on the transfer destination server determination rules set out using the transfer destination table etc.; and transmits the position-related data to the determined data server. The transfer destination server determination rules may be specified based on a determination condition set using a time, a place, etc. at which position-related data is obtained. Here, examples of the identifier associated with transmission source terminal 2021 include an identifier unique to each terminal 2021 or an identifier indicating a group to which terminal 2021 belongs.

The transfer destination table need not be a table in which identifiers associated with transmission source terminals are directly associated with transfer destination data servers. For example, data collection server 2024 holds a management table that stores tag information assigned to each identifier unique to terminal 2021, and a transfer destination table in which the pieces of tag information are associated with transfer destination data servers. Data collection server 2024 may determine a transfer destination data server based on tag information, using the management table and the transfer destination table. Here, the tag information is, for example, control information for management or control information for providing service assigned to a type, a model number, an owner of terminal 2021 corresponding to the identifier, a group to which terminal 2021 belongs, or another identifier. Moreover, in the transfer destination able, identifiers unique to respective sensors may be used instead of the identifiers associated with transmission source terminals 2021. Furthermore, the transfer destination server determination rules may be set by client device 2026.

Data collection server 2024 may determine data servers as transfer destinations, and transfer received position-related data to the data servers. According to this configuration, for example, when position-related data is automatically backed up or when, in order that position-related data is commonly used by different services, there is a need to transmit the position-related data to a data server for providing each service, it is possible to achieve data transfer as intended by changing a setting of data collection server 2024. As a result, it is possible to reduce the number of steps necessary for building and changing a system, compared to when a transmission destination of position-related data is set for each terminal 2021.

Data collection server 2024 may register, as a new transfer destination, a data server specified by a transfer request signal received from a data server; and transmit position-related data subsequently received to the data server, in response to the transfer request signal.

Data collection server 2024 may store position-related data received from terminal 2021 into a recording device, and transmit position-related data specified by a transmission request signal received from terminal 2021 or a data server to request source terminal 2021 or the data server in response to the transmission request signal.

Data collection server 2024 may determine whether position-related data is suppliable to a request source data server or terminal 2021, and transfer or transmit the position-related data to the request source data server or terminal 2021 when determining that the position-related data is suppliable.

When data collection server 2024 receives a request for current position-related data from client device 2026, even if it is not a timing for transmitting position-related data by terminal 2021, data collection server 2024 may send a transmission request for the current position-related data to terminal 2021, and terminal 2021 may transmit the current position-related data in response to the transmission request.

Although terminal 2021 transmits position information data to data collection server 2024 in the above description, data collection server 2024 may have a function of managing terminal 2021 such as a function necessary for collecting position-related data from terminal 2021 or a function used when collecting position-related data from terminal 2021.

Data collection server 2024 may have a function of transmitting, to terminal 2021, a data request signal for requesting transmission of position information data, and collecting position-related data.

Management information such as an address for communicating with terminal 2021 from which data is to be collected or an identifier unique to terminal 2021 is registered in advance in data collection server 2024. Data collection server 2024 collects position-related data from terminal 2021 based on the registered management information. Management information may include information such as types of sensors included in terminal 2021, the number of sensors included in terminal 2021, and communication systems supported by terminal 2021.

Data collection server 2024 may collect information such as an operating state or a current position of terminal 2021 from terminal 2021.

Registration of management information may be instructed by client device 2026, or a process for the registration may be started by terminal 2021 transmitting a registration request to data collection server 2024. Data collection server 2024 may have a function of controlling communication between data collection server 2024 and terminal 2021.

Communication between data collection server 2024 and terminal 2021 may be established using a dedicated line provided by a service provider such as a mobile network operator (MNO) or a mobile virtual network operator (MVNO), or a virtual dedicated line based on a virtual private network (VPN). According to this configuration, it is possible to perform secure communication between terminal 2021 and data collection server 2024.

Data collection server 2024 may have a function of authenticating terminal 2021 or a function of encrypting data to be transmitted and received between data collection server 2024 and terminal 2021. Here, the authentication of terminal 2021 or the encryption of data is performed using, for example, an identifier unique to terminal 2021 or an identifier unique to a terminal group including terminals 2021, which is shared in advance between data collection server 2024 and terminal 2021. Examples of the identifier include an international mobile subscriber identity (IMSI) that is a unique number stored in a subscriber identity module (SIM) card. An identifier for use in authentication and an identifier for use in encryption of data may be identical or different.

The authentication or the encryption of data between data collection server 2024 and terminal 2021 is feasible when both data collection server 2024 and terminal 2021 have a function of performing the process. The process does not depend on a communication system used by communication device 2022 that performs relay. Accordingly, since it is possible to perform the common authentication or encryption without considering whether terminal 2021 uses a communication system, the user's convenience of system architecture is increased. However, the expression "does not depend on a communication system used by communication device 2022 that performs relay" means a change according to a communication system is not essential. In other words, in order to improve the transfer efficiency or ensure security, the authentication or the encryption of data between data collection server 2024 and terminal 2021 may be changed according to a communication system used by a relay device.

Data collection server 2024 may provide client device 2026 with a User Interface (UI) that manages data collection rules such as types of position-related data collected from terminal 2021 and data collection schedules. Accordingly, a user can specify, for example, terminal 2021 from which data is to be collected using client device 2026, a data collection time, and a data collection frequency. Additionally, data collection server 2024 may specify, for example, a region on a map from which data is to be desirably collected, and collect position-related data from terminal 2021 included in the region.

When the data collection rules are managed on a per terminal 2021 basis, client device 2026 presents, on a screen, a list of terminals 2021 or sensors to be managed. The user sets, for example, a necessity for data collection or a collection schedule for each item in the list.

When a region on a map from which data is to be desirably collected is specified, client device 2026 presents, on a screen, a two-dimensional or three-dimensional map of a region to be managed. The user selects the region from which data is to be collected on the displayed map. Examples of the region selected on the map include a circular or rectangular region having a point specified on the map as the center, or a circular or rectangular region specifiable by a drag operation. Client device 2026 may also select a region in a preset unit such as a city, an area or a block in a city, or a main road, etc. Instead of specifying a region using a map, a region may be set by inputting values of a latitude and a longitude, or a region may be selected from a list of candidate regions derived based on inputted text information. Text information is, for example, a name of a region, a city, or a landmark.

Moreover, data may be collected while the user dynamically changes a specified region by specifying one or more terminals 2021 and setting a condition such as within 100 meters of one or more terminals 2021.

When client device 2026 includes a sensor such as a camera, a region on a map may be specified based on a position of client device 2026 in an actual space obtained from sensor data. For example, client device 2026 may estimate a self-location using sensor data, and specify, as a region from which data is to be collected, a region within a predetermined distance from a point on a map corresponding to the estimated location or a region within a distance specified by the user. Client device 2026 may also specify, as the region from which the data is to be collected, a sensing region of the sensor, that is, a region corresponding to obtained sensor data. Alternatively, client device 2026 may specify, as the region from which the data is to be collected, a region based on a location corresponding to sensor data specified by the user. Either client device 2026 or data collection server 2024 may estimate a region on a map or a location corresponding to sensor data.

When a region on a map is specified, data collection server 2024 may specify terminal 2021 within the specified region by collecting current position information of each terminal 2021, and may send a transmission request for position-related data to specified terminal 2021. When data collection server 2024 transmits information indicating a specified region to terminal 2021, determines whether terminal 2021 is present within the specified region, and determines that terminal 2021 is present within the specified region, rather than specifying terminal 2021 within the region, terminal 2021 may transmit position-related data.

Data collection server 2024 transmits, to client device 2026, data such as a list or a map for providing the above-described User Interface (UI) in an application executed by client device 2026. Data collection server 2024 may transmit, to client device 2026, not only the data such as the list or the map but also an application program. Additionally, the above UI may be provided as contents created using HTML displayable by a browser. It should be noted that part of data such as map data may be supplied from a server, such as map server 2025, other than data collection server 2024.

When client device 2026 receives an input for notifying the completion of an input such as pressing of a setup key by the user, client device 2026 transmits the inputted information as configuration information to data collection server 2024. Data collection server 2024 transmits, to each terminal 2021, a signal for requesting position-related data or notifying position-related data collection rules, based on the configuration information received from client device 2026, and collects the position-related data.

Next, an example of controlling operation of terminal 2021 based on additional information added to three-dimensional or two-dimensional map data will be described.

In the present configuration, object information that indicates a position of a power feeding part such as a feeder antenna or a feeder coil for wireless power feeding buried under a road or a parking lot is included in or associated with three-dimensional data, and such object information is provided to terminal 2021 that is a vehicle or a drone.

A vehicle or a drone that has obtained the object information to get charged automatically moves so that a position of a charging part such as a charging antenna or a charging coil included in the vehicle or the drone becomes opposite to a region indicated by the object information, and such vehicle or a drone starts to charge itself. It should be noted that when a vehicle or a drone has no automatic driving function, a direction to move in or an operation to perform is presented to a driver or an operator by using an image displayed on a screen, audio, etc. When a position of a charging part calculated based on an estimated self-location is determined to fall within the region indicated by the object information or a predetermined distance from the region, an image or audio to be presented is changed to a content that puts a stop to driving or operating, and the charging is started.

Object information need not be information indicating a position of a power feeding part, and may be information indicating a region within which placement of a charging part results in a charging efficiency greater than or equal to a predetermined threshold value. A position indicated by object information may be represented by, for example, the central point of a region indicated by the object information, a region or a line within a two-dimensional plane, or a region, a line, or a plane within a three-dimensional space.

According to this configuration, since it is possible to identify the position of the power feeding antenna unidentifiable by sensing data of LiDAR or an image captured by the camera, it is possible to highly accurately align a wireless charging antenna included in terminal 2021 such as a vehicle with a wireless power feeding antenna buried under a road. As a result, it is possible to increase a charging speed at the time of wireless charging and improve the charging efficiency.

Object information may be an object other than a power feeding antenna. For example, three-dimensional data includes, for example, a position of an AP for millimeter-wave wireless communication as object information. Accordingly, since terminal 2021 can identify the position of the AP in advance, terminal 2021 can steer a directivity of beam to a direction of the object information and start communication. As a result, it is possible to improve communication quality such as increasing transmission rates, reducing the duration of time before starting communication, and extending a communicable period.

Object information may include information indicating a type of an object corresponding to the object information. In addition, when terminal 2021 is present within a region in an actual space corresponding to a position in three-dimensional data of the object information or within a predetermined distance from the region, the object information may include information indicating a process to be performed by terminal 2021.

Object information may be provided by a server different from a server that provides three-dimensional data. When object information is provided separately from three-dimensional data, object groups in which object information used by the same service is stored may be each provided as separate data according to a type of a target service or a target device.

Three-dimensional data used in combination with object information may be point cloud data of WLD or keypoint data of SWLD.

In the three-dimensional data encoding device, when attribute information of a current three-dimensional point to be encoded is layer-encoded using Levels of Detail (LoDs), the three-dimensional data decoding device may decode the attribute information in layers down to LoD required by the three-dimensional data decoding device and need not decode the attribute information in layers not required. For example, when the total number of LoDs for the attribute information in a bitstream generated by the three-dimensional data encoding device is N, the three-dimensional data decoding device may decode M LoDs (M<N), i.e., layers from the uppermost layer LoD0 to LoD(M−1), and need not decode the remaining LoDs, i.e., layers down to LoD(N−1). With this, while reducing the processing load, the three-dimensional data decoding device can decode the attribute information in layers from LoD0 to LoD(M−1) required by the three-dimensional data decoding device.

Figure 96:
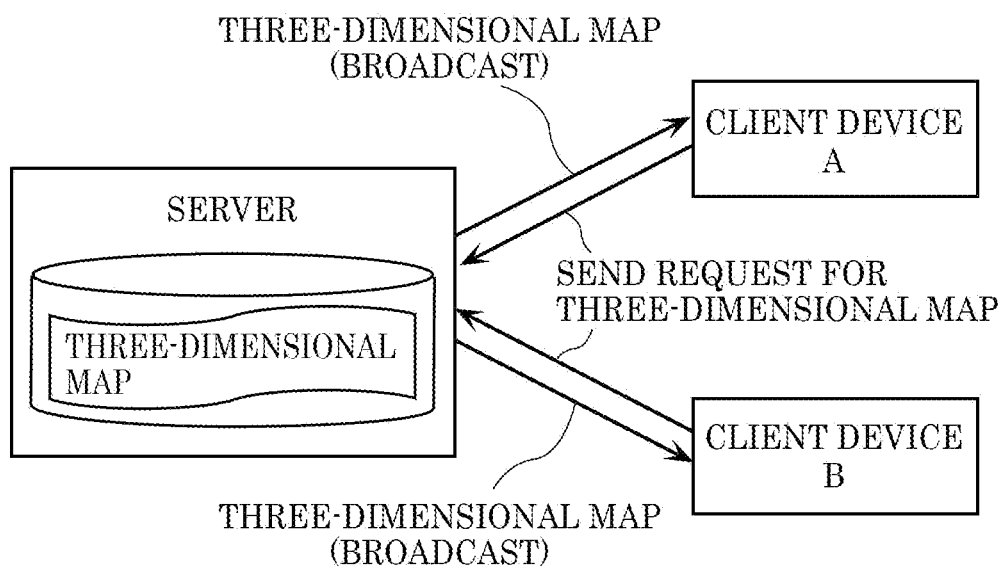
FIG. 96 is a diagram illustrating an example of a system according to Embodiment 7.

FIG. 96 is a diagram illustrating the foregoing use case. In the example shown in FIG. 96, a server stores a three-dimensional map obtained by encoding three-dimensional geometry information and attribute information. The server (the three-dimensional data encoding device) broadcasts the three-dimensional map to client devices (the three-dimensional data decoding devices: for example, vehicles, drones, etc.) in an area managed by the server, and each client device uses the three-dimensional map received from the server to perform a process for identifying the self-position of the client device or a process for displaying map information to a user or the like who operates the client device.

The following describes an example of the operation in this case. First, the server encodes the geometry information of the three-dimensional map using an octree structure or the like. Then, the sever layer-encodes the attribute information of the three-dimensional map using N LoDs established based on the geometry information. The server stores a bitstream of the three-dimensional map obtained by the layer-encoding.

Next, in response to a send request for the map information from the client device in the area managed by the server, the server sends the bitstream of the encoded three-dimensional map to the client device.

The client device receives the bitstream of the three-dimensional map sent from the server, and decodes the geometry information and the attribute information of the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and decodes all the information in the bitstream.

Moreover, when the client device displays the three-dimensional map information to a user or the like, the client device determines that a decoding result to the sparse three-dimensional points is necessary as the attribute information, and decodes the geometry information and the attribute information in M LoDs (M<N) starting from an upper layer LoD0.

In this way, the processing load of the client device can be reduced by changing LoDs for the attribute information to be decoded in accordance with the intended use of the client device.

In the example shown in FIG. 96, for example, the three-dimensional map includes geometry information and attribute information. The geometry information is encoded using the octree. The attribute information is encoded using N LoDs.

Client device A performs highly accurate estimation of the self-position. In this case, client device A determines that all the geometry information and all the attribute information are necessary, and decodes all the geometry information and all the attribute information constructed from N LoDs in the bitstream.

Client device B displays the three-dimensional map to a user. In this case, client device B determines that the geometry information and the attribute information in M LoDs (M<N) are necessary, and decodes the geometry information and the attribute information constructed from M LoDs in the bitstream.

It is to be noted that the server may broadcast the three-dimensional map to the client devices, or multicast or unicast the three-dimensional map to the client devices.

The following describes a variation of the system according to the present embodiment. In the three-dimensional data encoding device, when attribute information of a current three-dimensional point to be encoded is layer-encoded using LoDs, the three-dimensional data encoding device may encode the attribute information in layers down to LoD required by the three-dimensional data decoding device and need not encode the attribute information in layers not required. For example, when the total number of LoDs is N, the three-dimensional data encoding device may generate a bitstream by encoding M LoDs (M<N), i.e., layers from the uppermost layer LoD0 to LoD(M−1), and not encoding the remaining LoDs, i.e., layers down to LoD(N−1). With this, in response to a request from the three-dimensional data decoding device, the three-dimensional data encoding device can provide a bitstream in which the attribute information from LoD0 to LoD(M−1) required by the three-dimensional data decoding device is encoded.

Figure 97:
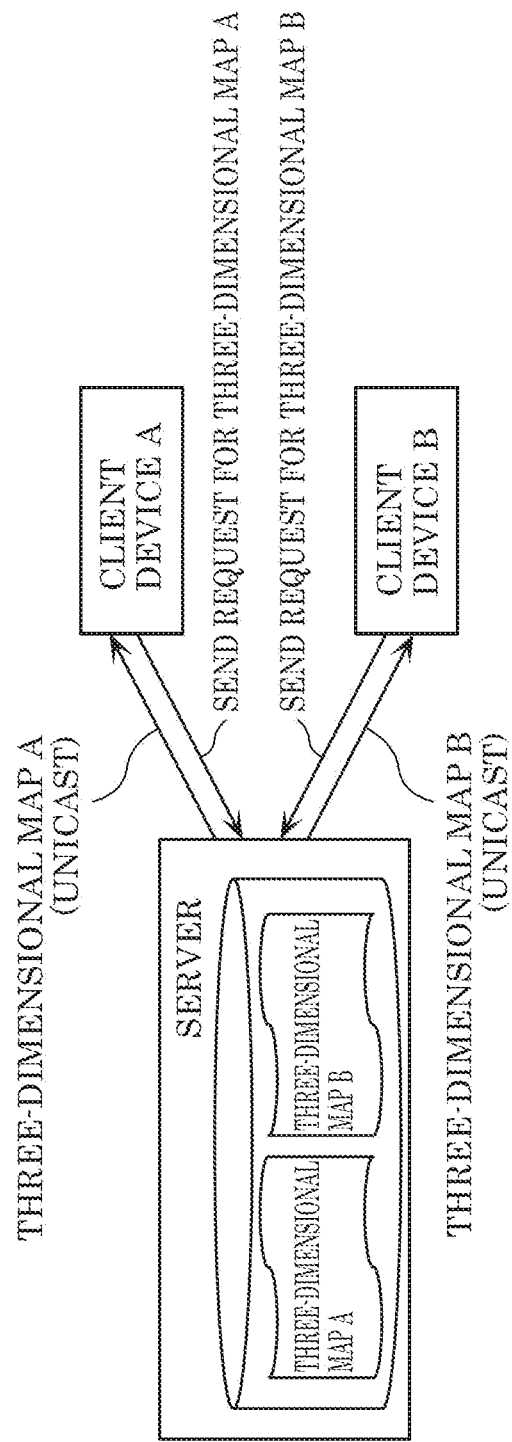
FIG. 97 is a diagram illustrating a variation of the system according to Embodiment 7.

FIG. 97 is a diagram illustrating the foregoing use case. In the example shown in FIG. 97, a server stores a three-dimensional map obtained by encoding three-dimensional geometry information and attribute information. The server (the three-dimensional data encoding device) unicasts, in response to a request from the client device, the three-dimensional map to a client device (the three-dimensional data decoding device: for example, a vehicle, a drone, etc.) in an area managed by the server, and the client device uses the three-dimensional map received from the server to perform a process for identifying the self-position of the client device or a process for displaying map information to a user or the like who operates the client device.

The following describes an example of the operation in this case. First, the server encodes the geometry information of the three-dimensional map using an octree structure, or the like. Then, the sever generates a bitstream of three-dimensional map A by layer-encoding the attribute information of the three-dimensional map using N LoDs established based on the geometry information, and stores the generated bitstream in the server. The sever also generates a bitstream of three-dimensional map B by layer-encoding the attribute information of the three-dimensional map using M LoDs (M<N) established based on the geometry information, and stores the generated bitstream in the server.

Next, the client device requests the server to send the three-dimensional map in accordance with the intended use of the client device. For example, when the client device performs highly accurate estimation of the self-position using the geometry information and the attribute information in N LoDs, the client device determines that a decoding result to the dense three-dimensional points is necessary as the attribute information, and requests the server to send the bitstream of three-dimensional map A. Moreover, when the client device displays the three-dimensional map information to a user or the like, the client device determines that a decoding result to the sparse three-dimensional points is necessary as the attribute information, and requests the server to send the bitstream of three-dimensional map B including the geometry information and the attribute information in M LoDs (M<N) starting from an upper layer LoD0. Then, in response to the send request for the map information from the client device, the server sends the bitstream of encoded three-dimensional map A or B to the client device.

The client device receives the bitstream of three-dimensional map A or B sent from the server in accordance with the intended use of the client device, and decodes the received bitstream. In this way, the server changes a bitstream to be sent, in accordance with the intended use of the client device. With this, it is possible to reduce the processing load of the client device.

In the example shown in FIG. 97, the server stores three-dimensional map A and three-dimensional map B. The server generates three-dimensional map A by encoding the geometry information of the three-dimensional map using, for example, an octree structure, and encoding the attribute information of the three-dimensional map using N LoDs. In other words, NumLoD included in the bitstream of three-dimensional map A indicates N.

The server also generates three-dimensional map B by encoding the geometry information of the three-dimensional map using, for example, an octree structure, and encoding the attribute information of the three-dimensional map using M LoDs. In other words, NumLoD included in the bitstream of three-dimensional map B indicates M.

Client device A performs highly accurate estimation of the self-position. In this case, client device A determines that all the geometry information and all the attribute information are necessary, and requests the server to send three-dimensional map A including all the geometry information and the attribute information constructed from N LoDs. Client device A receives three-dimensional map A, and decodes all the geometry information and the attribute information constructed from N LoDs.

Client device B displays the three-dimensional map to a user. In this case, client device B determines that all the geometry information and the attribute information in M LoDs (M<N) are necessary, and requests the server to send three-dimensional map B including all the geometry information and the attribute information constructed from M LoDs. Client device B receives three-dimensional map B, and decodes all the geometry information and the attribute information constructed from M LoDs.

It is to be noted that in addition to three-dimensional map B, the server (the three-dimensional data encoding device) may generate three-dimensional map C in which attribute information in the remaining N-M LoDs is encoded, and send three-dimensional map C to client device B in response to the request from client device B. Moreover, client device B may obtain the decoding result of N LoDs using the bitstreams of three-dimensional maps B and C.

Figure 98:
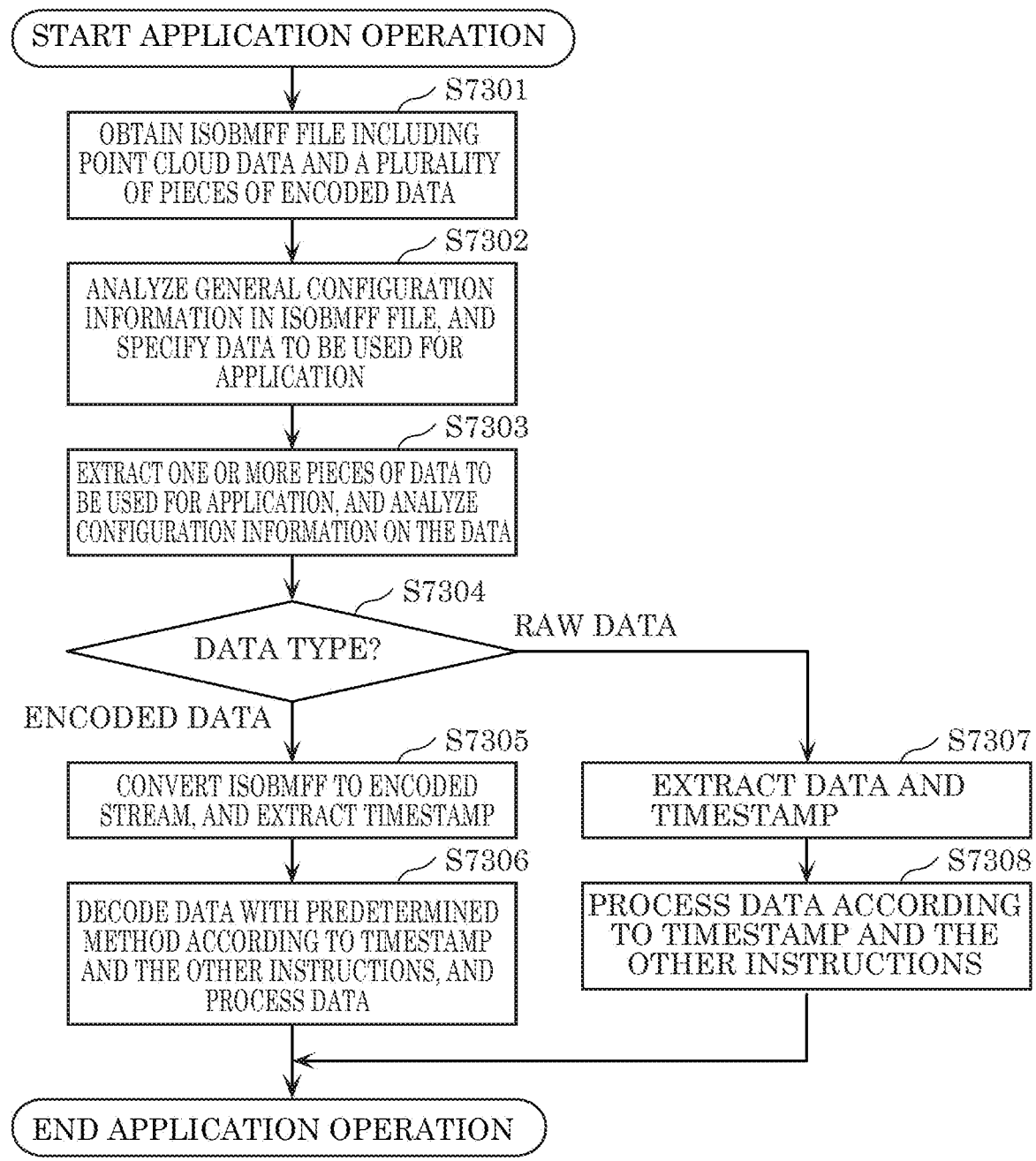
FIG. 98 is a flowchart illustrating an example of an application process according to Embodiment 7.

Hereinafter, an example of an application process will be described. FIG. 98 is a flowchart illustrating an example of the application process. When an application operation is started, a three-dimensional data demultiplexing device obtains an ISOBMFF file including point cloud data and a plurality of pieces of encoded data (S7301). For example, the three-dimensional data demultiplexing device may obtain the ISOBMFF file through communication, or may read the ISOBMFF file from the accumulated data.

Next, the three-dimensional data demultiplexing device analyzes the general configuration information in the ISOBMFF file, and specifies the data to be used for the application (S7302). For example, the three-dimensional data demultiplexing device obtains data that is used for processing, and does not obtain data that is not used for processing.

Next, the three-dimensional data demultiplexing device extracts one or more pieces of data to be used for the application, and analyzes the configuration information on the data (S7303).

When the type of the data is encoded data (encoded data in S7304), the three-dimensional data demultiplexing device converts the ISOBMFF to an encoded stream, and extracts a timestamp (S7305). Additionally, the three-dimensional data demultiplexing device refers to, for example, the flag indicating whether or not the synchronization between data is aligned to determine whether or not the synchronization between data is aligned, and may perform a synchronization process when not aligned.

Next, the three-dimensional data demultiplexing device decodes the data with a predetermined method according to the timestamp and the other instructions, and processes the decoded data (S7306).

On the other hand, when the type of the data is RAW data (RAW data in S7304), the three-dimensional data demultiplexing device extracts the data and timestamp (S7307). Additionally, the three-dimensional data demultiplexing device may refer to, for example, the flag indicating whether or not the synchronization between data is aligned to determine whether or not the synchronization between data is aligned, and may perform a synchronization process when not aligned. Next, the three-dimensional data demultiplexing device processes the data according to the timestamp and the other instructions (S7308).

Figure 99:
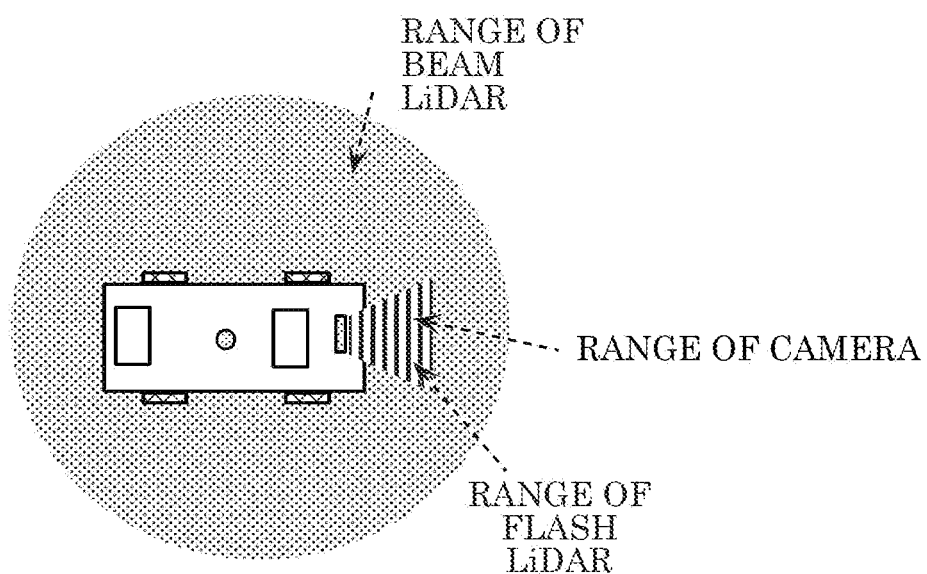
FIG. 99 is a diagram illustrating the sensor range of various sensors according to Embodiment 7.

For example, an example will be described in which the sensor signals obtained by a beam LiDAR, a FLASH LiDAR, and a camera are encoded and multiplexed with respective different encoding schemes. FIG. 99 is a diagram illustrating examples of the sensor ranges of a beam LiDAR, a FLASH LiDAR, and a camera. For example, the beam LiDAR detects all directions in the periphery of a vehicle (sensor), and the FLASH LiDAR and the camera detect the range in one direction (for example, the front) of the vehicle.

In the case of an application that integrally handles a LiDAR point cloud, the three-dimensional data demultiplexing device refers to the general configuration information, and extracts and decodes the encoded data of the beam LiDAR and the FLASH LiDAR. Additionally, the three-dimensional data demultiplexing device does not extract camera images.

According to the timestamps of the beam LiDAR and the FLASH LiDAR, the three-dimensional data demultiplexing device simultaneously processes the respective encoded data of the time of the same timestamp.

For example, the three-dimensional data demultiplexing device may present the processed data with a presentation device, may synthesize the point cloud data of the beam LiDAR and the FLASH LiDAR, or may perform a process such as rendering.

Additionally, in the case of an application that performs calibration between data, the three-dimensional data demultiplexing device may extract sensor geometry information, and use the sensor geometry information in the application.

For example, the three-dimensional data demultiplexing device may select whether to use beam LiDAR information or FLASH LiDAR information in the application, and may switch the process according to the selection result.

In this manner, since it is possible to adaptively change the obtaining of data and the encoding process according to the process of the application, the processing amount and the power consumption can be reduced.

Figure 100:
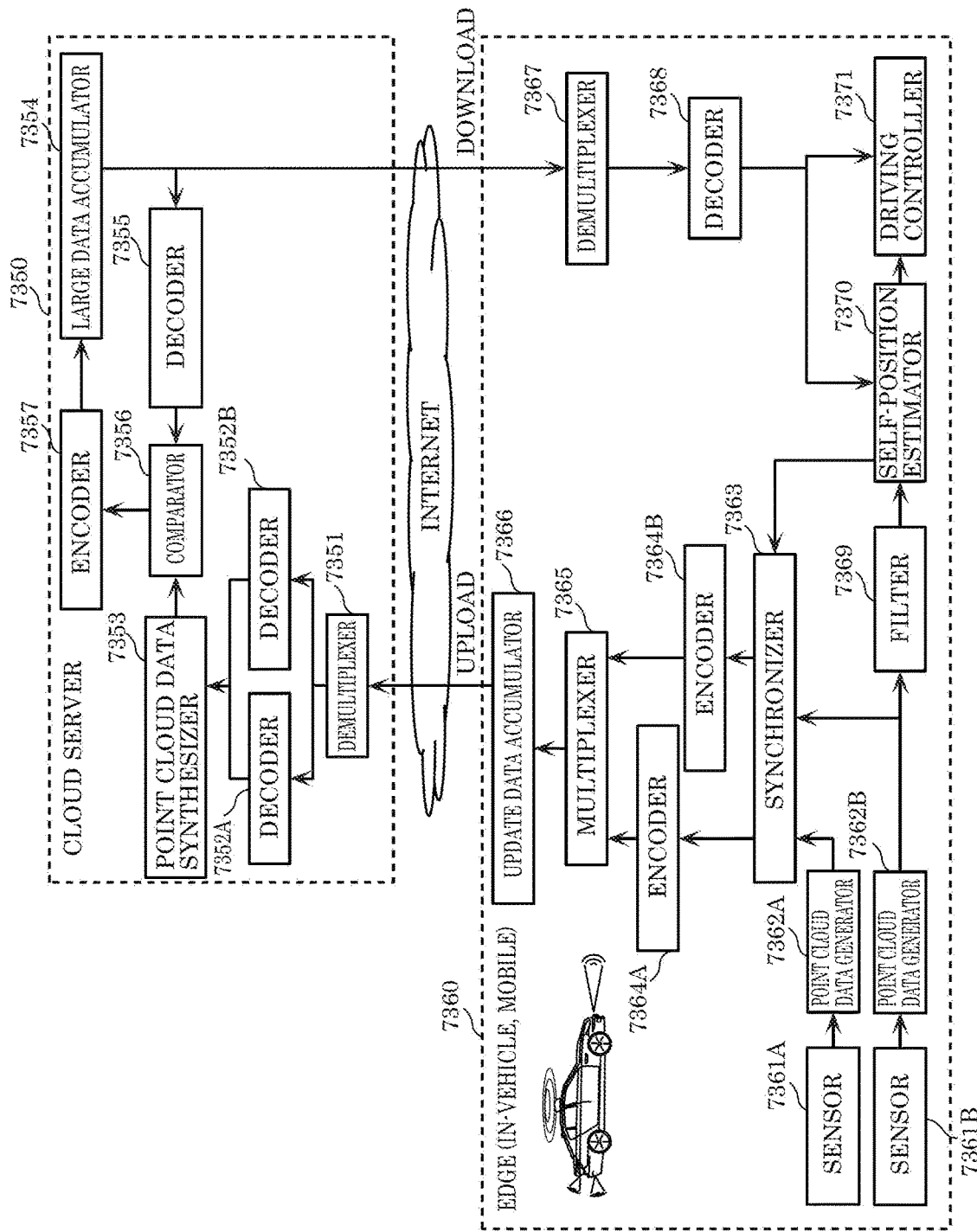
FIG. 100 is a diagram illustrating a configuration example of an automated driving system according to Embodiment 7.

Hereinafter, a use case in automated driving will be described. FIG. 100 is a diagram illustrating a configuration example of an automated driving system. This automated driving system includes cloud server 7350, and edge 7360 such as an in-vehicle device or a mobile device. Cloud server 7350 includes demultiplexer 7351, decoders 7352A, 7352B, and 7355, point cloud data synthesizer 7353, large data accumulator 7354, comparator 7356, and encoder 7357. Edge 7360 includes sensors 7361A and 7361B, point cloud data generators 7362A and 7362B, synchronizer 7363, encoders 7364A and 7364B, multiplexer 7365, update data accumulator 7366, demultiplexer 7367, decoder 7368, filter 7369, self-position estimator 7370, and driving controller 7371.

In this system, edge 7360 downloads large data, which is large point-cloud map data accumulated in cloud server 7350. Edge 7360 performs a self-position estimation process of edge 7360 (a vehicle or a terminal) by matching the large data with the sensor information obtained by edge 7360. Additionally, edge 7360 uploads the obtained sensor information to cloud server 7350, and updates the large data to the latest map data.

Additionally, in various applications that handle point cloud data in the system, point cloud data with different encoding methods are handled.

Cloud server 7350 encodes and multiplexes large data. Specifically, encoder 7357 performs encoding by using a third encoding method suitable for encoding a large point cloud. Additionally, encoder 7357 multiplexes encoded data. Large data accumulator 7354 accumulates the data encoded and multiplexed by encoder 7357.

Edge 7360 performs sensing. Specifically, point cloud data generator 7362A generates first point cloud data (geometry information (geometry) and attribute information) by using the sensing information obtained by sensor 7361A. Point cloud data generator 7362B generates second point cloud data (geometry information and attribute information) by using the sensing information obtained by sensor 7361B. The generated first point cloud data and second point cloud data are used for the self-position estimation or vehicle control of automated driving, or for map updating. In each process, a part of information of the first point cloud data and the second point cloud data may be used.

Edge 7360 performs the self-position estimation. Specifically, edge 7360 downloads large data from cloud server 7350. Demultiplexer 7367 obtains encoded data by demultiplexing the large data in a file format. Decoder 7368 obtains large data, which is large point-cloud map data, by decoding the obtained encoded data.

Self-position estimator 7370 estimates the self-position in the map of a vehicle by matching the obtained large data with the first point cloud data and the second point cloud data generated by point cloud data generators 7362A and 7362B. Additionally, driving controller 7371 uses the matching result or the self-position estimation result for driving control.

Note that self-position estimator 7370 and driving controller 7371 may extract specific information, such as geometry information, of the large data, and may perform processes by using the extracted information. Additionally, filter 7369 performs a process such as correction or decimation on the first point cloud data and the second point cloud data. Self-position estimator 7370 and driving controller 7371 may use the first point cloud data and second point cloud data on which the process has been performed. Additionally, self-position estimator 7370 and driving controller 7371 may use the sensor signals obtained by sensors 7361A and 7361B.

Synchronizer 7363 performs time synchronization and geometry correction between a plurality of sensor signals or the pieces of data of a plurality of pieces of point cloud data. Additionally, synchronizer 7363 may correct the geometry information on the sensor signal or point cloud data to match the large data, based on geometry correction information on the large data and sensor data generated by the self-position estimation process.

Note that synchronization and geometry correction may be performed not by edge 7360, but by cloud server 7350. In this case, edge 7360 may multiplex the synchronization information and the geometry information to transmit the synchronization information and the geometry information to cloud server 7350.

Edge 7360 encodes and multiplexes the sensor signal or point cloud data. Specifically, the sensor signal or point cloud data is encoded by using a first encoding method or a second encoding method suitable for encoding each signal. For example, encoder 7364A generates first encoded data by encoding first point cloud data by using the first encoding method. Encoder 7364B generates second encoded data by encoding second point cloud data by using the second encoding method.

Multiplexer 7365 generates a multiplexed signal by multiplexing the first encoded data, the second encoded data, the synchronization information, and the like. Update data accumulator 7366 accumulates the generated multiplexed signal. Additionally, update data accumulator 7366 uploads the multiplexed signal to cloud server 7350.

Cloud server 7350 synthesizes the point cloud data. Specifically, demultiplexer 7351 obtains the first encoded data and the second encoded data by demultiplexing the multiplexed signal uploaded to cloud server 7350. Decoder 7352A obtains the first point cloud data (or sensor signal) by decoding the first encoded data. Decoder 7352B obtains the second point cloud data (or sensor signal) by decoding the second encoded data.

Point cloud data synthesizer 7353 synthesizes the first point cloud data and the second point cloud data with a predetermined method. When the synchronization information and the geometry correction information are multiplexed in the multiplexed signal, point cloud data synthesizer 7353 may perform synthesis by using these pieces of information.

Decoder 7355 demultiplexes and decodes the large data accumulated in large data accumulator 7354. Comparator 7356 compares the point cloud data generated based on the sensor signal obtained by edge 7360 with the large data held by cloud server 7350, and determines the point cloud data that needs to be updated. Comparator 7356 updates the point cloud data that is determined to need to be updated of the large data to the point cloud data obtained from edge 7360.

Encoder 7357 encodes and multiplexes the updated large data, and accumulates the obtained data in large data accumulator 7354.

As described above, the signals to be handled may be different, and the signals to be multiplexed or encoding methods may be different, according to the usage or applications to be used. Even in such a case, flexible decoding and application processes are enabled by multiplexing data of various encoding schemes by using the present embodiment. Additionally, even in a case where the encoding schemes of signals are different, by conversion to an encoding scheme suitable for demultiplexing, decoding, data conversion, encoding, and multiplexing processing, it becomes possible to build various applications and systems, and to offer of flexible services.

Figure 101:
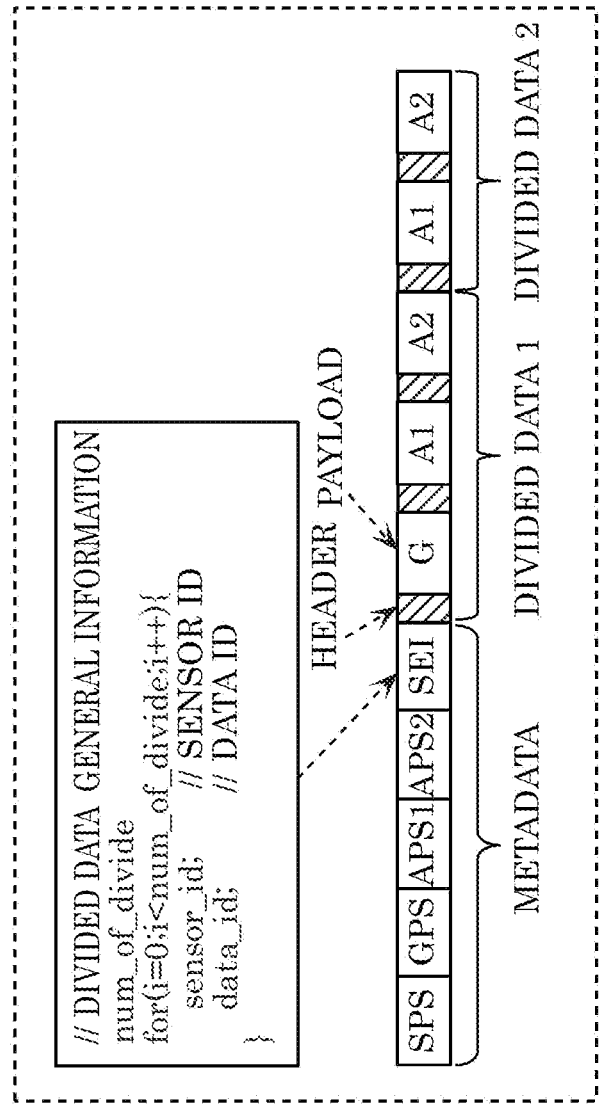
FIG. 101 is a diagram illustrating a configuration example of a bitstream according to Embodiment 7.

Hereinafter, an example of decoding and application of divided data will be described. First, the information on divided data will be described. FIG. 101 is a diagram illustrating a configuration example of a bitstream. The general information of divided data indicates, for each divided data, the sensor ID (sensor_id) and data ID (data_id) of the divided data. Note that the data ID is also indicated in the header of each encoded data.

Note that the general information of divided data illustrated in FIG. 101 includes, in addition to the sensor ID, at least one of the sensor information (Sensor), the version (Version) of the sensor, the maker name (Maker) of the sensor, the mount information (Mount Info.) of the sensor, and the position coordinates of the sensor (World Coordinate). Accordingly, the three-dimensional data decoding device can obtain the information on various sensors from the configuration information.

The general information of divided data may be stored in SPS, GPS, or APS, which is the metadata, or may be stored in SEI, which is the metadata not required for encoding. Additionally, at the time of multiplexing, the three-dimensional data encoding device stores the SEI in a file of ISOBMFF. The three-dimensional data decoding device can obtain desired divided data based on the metadata.

In FIG. 101, SPS is the metadata of the entire encoded data, GPS is the metadata of the geometry information, APS is the metadata for each attribute information, G is encoded data of the geometry information for each divided data, and A1, etc. are encoded data of the attribute information for each divided data.

Figure 102:
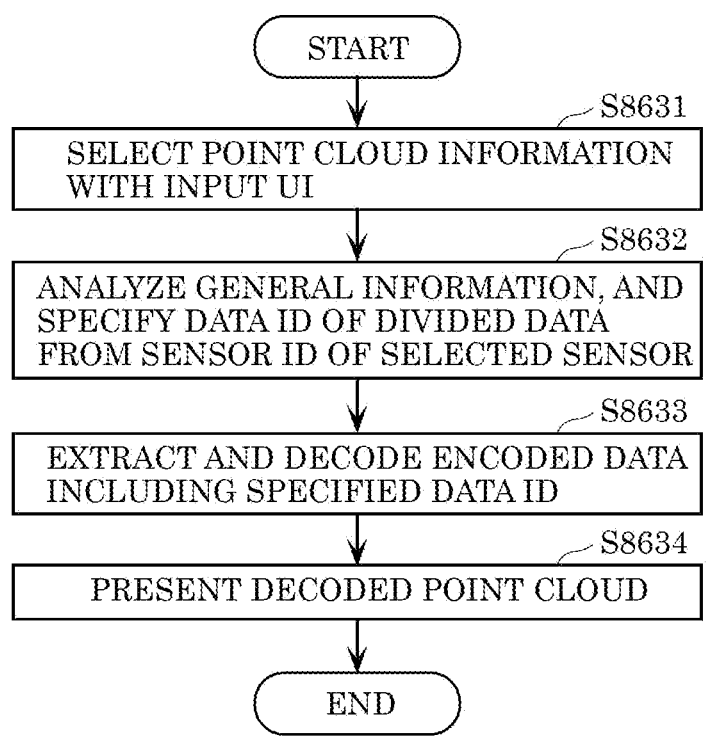
FIG. 102 is a flowchart of a point cloud selection process according to Embodiment 7.
Figure 103:
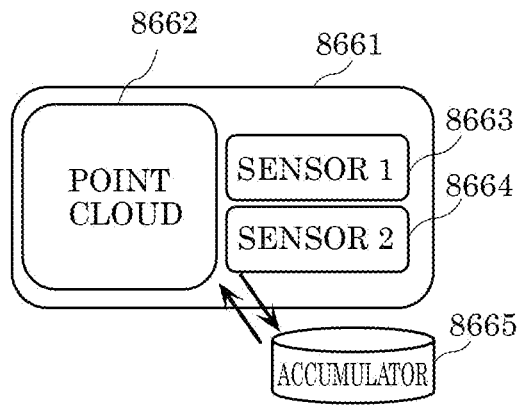
FIG. 103 is a diagram illustrating a screen example for point cloud selection process according to Embodiment 7.
Figure 104:
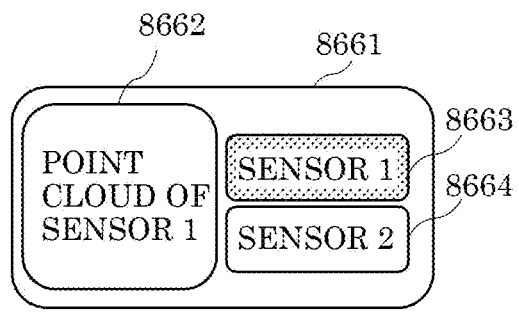
FIG. 104 is a diagram illustrating a screen example of the point cloud selection process according to Embodiment 7.
Figure 105:
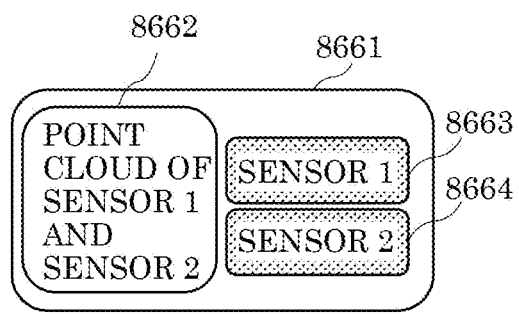
FIG. 105 is a diagram illustrating a screen example of the point cloud selection process according to Embodiment 7.

Next, an application example of divided data will be described. An example of application will be described in which an arbitrary point cloud is selected, and the selected point cloud is presented. FIG. 102 is a flowchart of a point cloud selection process performed by this application. FIG. 103 to FIG. 105 are diagrams illustrating screen examples of the point cloud selection process.

As illustrated in FIG. 103, the three-dimensional data decoding device that performs the application includes, for example, a UI unit that displays an input UI (user interface) 8661 for selecting an arbitrary point cloud. Input UI 8661 includes presenter 8662 that presents the selected point cloud, and an operation unit (buttons 8663 and 8664) that receives operations by a user. After a point cloud is selected in UI 8661, the three-dimensional data decoding device obtains desired data from accumulator 8665.

First, based on an operation by the user on input UI 8661, the point cloud information that the user wants to display is selected (S8631). Specifically, by selecting button 8663, the point cloud based on sensor 1 is selected. By selecting button 8664, the point cloud based on sensor 2 is selected. Alternatively, by selecting both button 8663 and button 8664, the point cloud based on sensor 1 and the point cloud based on sensor 2 are selected. Note that it is an example of the selection method of point cloud, and it is not limited to this.

Next, the three-dimensional data decoding device analyzes the general information of divided data included in the multiplexed signal (bitstream) or encoded data, and specifies the data ID (data_id) of the divided data constituting the selected point cloud from the sensor ID (sensor_id) of the selected sensor (S8632). Next, the three-dimensional data decoding device extracts, from the multiplexed signal, the encoded data including the specified and desired data ID, and decodes the extracted encoded data to decode the point cloud based on the selected sensor (S8633). Note that the three-dimensional data decoding device does not decode the other encoded data.

Lastly, the three-dimensional data decoding device presents (for example, displays) the decoded point cloud (S8634). FIG. 104 illustrates an example in the case where button 8663 for sensor 1 is pressed, and the point cloud of sensor 1 is presented. FIG. 105 illustrates an example in the case where both button 8663 for sensor 1 and button 8664 for sensor 2 are pressed, and the point clouds of sensor 1 and sensor 2 are presented.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a three-dimensional data encoding device and a three-dimensional data decoding device.

What is claimed is:

1. A three-dimensional data encoding method, comprising:
   encoding attribute information of three-dimensional points, the three-dimensional points being classified into one or more layers, based on geometry information of the three-dimensional points; and
   generating a bitstream including the attribute information encoded,
   in encoding of attribute information of a current three-dimensional point included in the three-dimensional points, same layer reference is performed when a total number of the one or more layers is one, the same layer reference including generating a prediction value of the attribute information of the current three-dimensional point by reference to attribute information of an other three-dimensional point included in a same layer as the current three-dimensional point.

2. The three-dimensional data encoding method according to claim 1,
   wherein when the total number of the one or more layers is one, the one or more layers do not include a layer on which the same layer reference is not performed.

3. The three-dimensional data encoding method according to claim 1,
   wherein in the encoding of the attribute information of the current three-dimensional point, upper layer reference is not performed when the total number of the one or more layers is one, and the upper layer reference is performed when the total number of the one or more layers is two or more, the upper layer reference including generating the prediction value of the attribute information of the current three-dimensional point by reference to attribute information of an other three-dimensional point included in a layer higher than a layer including the current three-dimensional point.

4. The three-dimensional data encoding method according to claim 1, comprising:
   determining, from among two or more layers, a layer on which the same layer reference is performed and a layer on which the same layer reference is not performed, when the total number of the one or more layers is two or more; and
   encoding the attribute information of the three-dimensional points, based on the determining.

5. The three-dimensional data encoding method according to claim 4,
   wherein in the encoding of the attribute information of the three-dimensional points, the same layer reference is performed on, among the two or more layers, layers ranging from an uppermost layer to an N-th layer, and the same layer reference is not performed on, among the two or more layers, a layer lower than the N-th layer, N being a natural number.

6. The three-dimensional data encoding method according to claim 1,
   wherein the bitstream includes first information indicating a layer on which the same layer reference is performed or a layer on which the same layer reference is not performed.

7. The three-dimensional data encoding method according to claim 1,
   wherein the bitstream includes second information indicating the total number of the one or more layers.

8. A three-dimensional data decoding method comprising:
   obtaining encoded attribute information of three-dimensional points from a bitstream, the three-dimensional points being classified into one or more layers, based on geometry information of the three-dimensional points; and
   decoding the encoded attribute information by performing same layer reference when a total number of the one or more layers is one, the same layer reference including generating a prediction value of attribute information of a current three-dimensional point included in the three-dimensional points by reference to attribute information of an other three-dimensional point included in a same layer as the current three-dimensional point.

9. The three-dimensional data decoding method according to claim 8,
   wherein when the total number of the one or more layers is one, the one or more layers do not include a layer on which the same layer reference is not performed.

10. The three-dimensional data decoding method according to claim 8,
    wherein in decoding of the attribute information of the current three-dimensional point, upper layer reference is not performed when the total number of the one or more layers is one, and the upper layer reference is performed when the total number of the one or more layers is two or more, the upper layer reference including generating the prediction value of the attribute information of the current three-dimensional point by reference to attribute information of an other three-dimensional point included in a layer higher than a layer including the current three-dimensional point.

11. The three-dimensional data decoding method according to claim 8, comprising:
determining, from among two or more layers, a layer on which the same layer reference is performed and a layer on which the same layer reference is not performed, when the total number of the one or more layers is two or more, and decoding the encoded attribute information, based on the determining.

12. The three-dimensional data decoding method according to claim 11,
wherein in the decoding of the encoded attribute information, the same layer reference is performed on, among the two or more layers, layers ranging from an uppermost layer to an N-th layer, and the same layer reference is not performed on, among the two or more layers, a layer lower than the N-th layer, N being a natural number.

13. The three-dimensional data decoding method according to claim 8, comprising:
obtaining, from the bitstream, first information indicating a layer on which the same layer reference is performed or a layer on which the same layer reference is not performed.

14. The three-dimensional data decoding method according to claim 8, further comprising:
obtaining, from the bitstream, second information indicating the total number of the one or more layers.

15. The three-dimensional data decoding method according to claim 8, comprising:
obtaining, from the bitstream, (1) first information indicating a layer on which the same layer reference is performed or a layer on which the same layer reference is not performed and (2) second information indicating the total number of the one or more layers; and
determining that the bitstream is not compliant with standards, in a case where the first information indicates that the same layer reference is not performed on one layer among the one or more layers when the total number of the one or more layers indicated in the second information is one.

16. A three-dimensional data encoding device comprising:
a processor; and
memory,
wherein using the memory, processor:
encodes attribute information of three-dimensional points, the three-dimensional points being classified into one or more layers, based on geometry information of the three-dimensional points; and
generates a bitstream including the attribute information encoded,
wherein in encoding of attribute information of a current three-dimensional point included in the three-dimensional points, same layer reference is performed when a total number of the one or more layers is one, the same layer reference including generating a prediction value of the attribute information of the current three-dimensional point by reference to attribute information of an other three-dimensional point included in a same layer as the current three-dimensional point.

17. A three-dimensional data decoding device comprising:
a processor; and
memory,
wherein using the memory, processor:
obtains encoded attribute information of three-dimensional points from a bitstream, the three-dimensional points being classified into one or more layers, based on geometry information of the three-dimensional points; and
decodes the encoded attribute information by performing same layer reference when a total number of the one or more layers is one, the same layer reference including generating a prediction value of attribute information of a current three-dimensional point included in the three-dimensional points by reference to attribute information of an other three-dimensional point included in a same layer as the current three-dimensional point.

* * * * *